US011537533B2

(12) United States Patent
Litichever et al.

(10) Patent No.: US 11,537,533 B2
(45) Date of Patent: Dec. 27, 2022

(54) SYSTEM AND METHOD FOR SECURELY CONNECTING TO A PERIPHERAL DEVICE

(71) Applicant: Gatekeeper Ltd., Yokneam (IL)

(72) Inventors: Gil Litichever, Modiin (IL); Oded Gutentag, Ramat Yishay (IL); Eyal Zvuluny, Tel Aviv (IL); Ariel Hershler, Efrat (IL)

(73) Assignee: Gatekeeper Ltd., Yokneam (IL)

( * ) Notice: Subject to any disclaimer, the term of this patent is extended or adjusted under 35 U.S.C. 154(b) by 94 days.

(21) Appl. No.: 16/910,330

(22) Filed: Jun. 24, 2020

(65) Prior Publication Data
US 2020/0320023 A1 Oct. 8, 2020

Related U.S. Application Data

(63) Continuation of application No. 16/198,802, filed on Nov. 22, 2018, now Pat. No. 10,733,116, which is a
(Continued)

(51) Int. Cl.
*G06F 13/10* (2006.01)
*G06F 21/56* (2013.01)
(Continued)

(52) U.S. Cl.
CPC ........ *G06F 13/107* (2013.01); *G06F 9/45504* (2013.01); *G06F 13/4282* (2013.01); *G06F 21/56* (2013.01); *G06F 21/82* (2013.01); *G06F 2213/0008* (2013.01); *G06F 2213/0024* (2013.01); *G06F 2213/0028* (2013.01);
(Continued)

(58) Field of Classification Search
None
See application file for complete search history.

(56) References Cited

U.S. PATENT DOCUMENTS

| 4,248,123 A | 2/1981 | Bunger et al. |
| 4,496,149 A | 1/1985 | Schwartzberg |

(Continued)

OTHER PUBLICATIONS

International Search Report of PCT/IL2016/050978 dated Jan. 13, 2017.
(Continued)

*Primary Examiner* — Elias Mamo
(74) *Attorney, Agent, or Firm* — May Patents Ltd.

(57) ABSTRACT

A device connectable between a host computer and a computer peripheral over a standard bus interface is disclosed, used to improve security, and to detect and prevent malware operation. Messages passing between the host computer and the computer peripherals are intercepted and analyzed based on pre-configured criteria, and legitimate messages transparently pass through the device, while suspected messages are blocked. The device communicates with the host computer and the computer peripheral using proprietary or industry standard protocol or bus, which may be based on a point-to-point serial communication such as USB or SATA. The messages may be stored in the device for future analysis, and may be blocked based on current or past analysis of the messages. The device may serve as a VPN client and securely communicate with a VPN server using the host Internet connection.

40 Claims, 48 Drawing Sheets

Related U.S. Application Data continuation of application No. 15/750,528, filed as application No. PCT/IL2016/050978 on Sep. 5, 2016, now Pat. No. 10,185,670.

(60) Provisional application No. 62/218,838, filed on Sep. 15, 2015.

(51) Int. Cl.
| | | |
|---|---|---|
| *G06F 21/82* | (2013.01) | |
| *G06F 9/455* | (2018.01) | |
| *G06F 13/42* | (2006.01) | |
| *H04L 9/40* | (2022.01) | |

(52) U.S. Cl.
CPC ............... *G06F 2213/0032* (2013.01); *G06F 2213/0036* (2013.01); *G06F 2213/0042* (2013.01); *H04L 63/0272* (2013.01); *H04L 63/08* (2013.01)

(56) References Cited

U.S. PATENT DOCUMENTS

| | | | |
|---|---|---|---|
| 4,516,260 A | 5/1985 | Breedlove et al. | |
| 4,796,891 A | 1/1989 | Milner | |
| 4,840,602 A | 6/1989 | Rose | |
| 4,968,255 A | 11/1990 | Lee et al. | |
| 5,572,643 A | 11/1996 | Judson | |
| 5,701,451 A | 12/1997 | Rogers et al. | |
| 5,793,964 A | 8/1998 | Rogers et al. | |
| 6,230,171 B1 | 5/2001 | Pacifici et al. | |
| 6,381,662 B1 | 4/2002 | Harari et al. | |
| 6,449,651 B1 | 9/2002 | Dorfman et al. | |
| 6,527,611 B2 | 3/2003 | Cummings | |
| 6,560,711 B1 | 5/2003 | Given et al. | |
| 6,618,774 B1 | 9/2003 | Dickens | |
| 6,694,316 B1 | 2/2004 | Langseth et al. | |
| 7,111,108 B2* | 9/2006 | Grundy | G06F 13/1684 |
| | | | 370/431 |
| 7,136,482 B2 | 11/2006 | Wille | |
| 7,334,001 B2 | 2/2008 | Eichstaedt et al. | |
| 7,414,186 B2 | 8/2008 | Scarpa et al. | |
| 7,430,759 B2 | 9/2008 | Piepiorra | |
| 7,557,689 B2 | 7/2009 | Seddigh et al. | |
| 7,653,573 B2 | 1/2010 | Hayes, Jr. et al. | |
| 8,209,739 B2 | 6/2012 | Terpening | |
| 8,560,604 B2 | 10/2013 | Shribman et al. | |
| 8,560,852 B2 | 10/2013 | HongQian et al. | |
| 8,560,864 B2 | 10/2013 | Chang | |
| 8,572,402 B2 | 10/2013 | Coussieu | |
| 8,646,082 B2 | 2/2014 | Lomont et al. | |
| 8,713,683 B2 | 4/2014 | Moore et al. | |
| 8,806,609 B2 | 8/2014 | Gladstone et al. | |
| 8,813,218 B2 | 8/2014 | Wang | |
| 8,826,015 B2 | 9/2014 | Lakshminarayanan et al. | |
| 8,862,803 B2* | 10/2014 | Powers | G06F 13/42 |
| | | | 710/313 |
| 8,869,308 B2 | 10/2014 | Soffer | |
| 8,984,611 B2 | 3/2015 | Jeannot | |
| 9,201,674 B2* | 12/2015 | Rogel | G06F 9/4856 |
| 9,672,360 B2* | 6/2017 | Barkan | G06F 21/31 |
| 9,772,956 B2* | 9/2017 | Christian | G06F 13/105 |
| 2007/0156850 A1 | 7/2007 | Corrion | |
| 2007/0214095 A1 | 9/2007 | Adams et al. | |
| 2007/0256337 A1 | 11/2007 | Segan | |
| 2008/0189554 A1 | 8/2008 | Ali et al. | |
| 2008/0258913 A1 | 10/2008 | Busey | |
| 2009/0024759 A1 | 1/2009 | McKibben et al. | |
| 2009/0031303 A1 | 1/2009 | Frank | |
| 2009/0172240 A1* | 7/2009 | Slaight | G06F 13/4022 |
| | | | 710/313 |
| 2010/0186076 A1 | 7/2010 | Ali et al. | |
| 2011/0088093 A1 | 4/2011 | Kang | |
| 2011/0264922 A1 | 10/2011 | Beaumont et al. | |
| 2012/0079563 A1 | 3/2012 | Green et al. | |
| 2012/0166582 A1 | 6/2012 | Binder | |
| 2012/0311207 A1 | 12/2012 | Powers et al. | |
| 2012/0324067 A1 | 12/2012 | Hari et al. | |
| 2013/0067534 A1 | 3/2013 | Soffer | |
| 2013/0103380 A1 | 4/2013 | Brandstatter et al. | |
| 2014/0181352 A1 | 6/2014 | Conrad | |
| 2014/0281553 A1 | 9/2014 | Illion et al. | |
| 2014/0289433 A1 | 9/2014 | Soffer et al. | |
| 2016/0373408 A1 | 12/2016 | Wentworth | |
| 2018/0113776 A1 | 4/2018 | Lee | |

OTHER PUBLICATIONS

Written Opinion of PCT/IL2016/050978 dated Jan. 13, 2017.
Supplementary European Search Report of EP 16845832 dated Oct. 26, 2018.
European Search Report of EP 19169437 dated Jun. 25, 2019.

* cited by examiner

SYSTEM AND METHOD FOR SECURELY CONNECTING TO A PERIPHERAL DEVICE

TECHNICAL FIELD

This disclosure relates generally to an apparatus and method for monitoring, isolating, and securing activity of a peripheral device, and in particular, to malware related security when connecting a peripheral device to a host device using a standard interface such as USB.

BACKGROUND

Unless otherwise indicated herein, the materials described in this section are not prior art to the claims in this application, and are not admitted to be prior art by inclusion in this section.

FIG. 1 shows a block diagram that illustrates a system 10 including a computer system 11 and an associated Internet 22 connection. Such configuration is typically used for computers (hosts) connected to the Internet 22 and executing a server or a client (or a combination) software. The computer system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), any other handheld or fixed location computing devices, or a combination of any of these devices. Note that while FIG. 1 illustrates various components of the computer system 11, it is not intended to represent any particular architecture or manner of interconnecting the components. It is also being appreciated that network computers, handheld computers, cell phones and other data processing systems that have fewer components or perhaps more components may also be used. For example, the computer of FIG. 1 may be an Apple Macintosh computer or a Power Book, or an IBM compatible PC.

The computer system 11 may include a bus 13, an interconnect, or other communication mechanism for communicating information, and a processor 12, commonly in the form of an integrated circuit, coupled to the bus 13 for processing information and for executing the computer executable instructions. The computer system 11 may also include a main memory 15a, such as a Random Access Memory (RAM) or other dynamic storage device, coupled to the bus 13 for storing information and instructions to be executed by the processor 12. The main memory 15a also may be used for storing temporary variables or other intermediate information during execution of instructions to be executed by the processor 12. The computer system 11 further includes a Read Only Memory (ROM) 15b (or other non-volatile memory) or other static storage device coupled to the bus 13 for storing static information and instructions for the processor 12. A storage device 15c, that may be a magnetic disk or optical disk, such as a hard disk drive (HDD) for reading from and writing to a hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, and optical disk drive may be connected to the system bus 13 by a hard disk drive interface, a magnetic disk drive interface, and an optical disk drive interface, respectively. The drives and their associated computer-readable media provide non-volatile storage of computer readable instructions, data structures, program modules and other data for the general-purpose computing devices. Typically, the computer system 11 includes an Operating System (OS) stored in a non-volatile storage 15b for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display 17 may be connected via a video adapter for supporting the display. The display 17 allows a user to view, enter, and/or edit information that is relevant to the operation of the system 10. An input device 18, including alphanumeric and other keys, is coupled to the bus 13 for communicating information and command selections to the processor 12. Another type of user input device is a cursor control 18a, such as a mouse, a trackball, or cursor direction keys for communicating direction information and command selections to the processor 12 and for controlling cursor movement on the display 17. This cursor control 18a has two degrees of freedom in two axes, a first axis (e.g., x) and a second axis (e.g., y) that allow the device to specify positions in a plane.

The computer system 11 may be used for implementing the methods and techniques described herein. According to one embodiment, these methods and techniques are performed by the computer system 11 in response to the processor 12 executing one or more sequences of one or more instructions contained in the main memory 15a. Such instructions may be read into the main memory 15a from another computer-readable medium, such as the storage device 15c. Execution of the sequences of instructions contained in the main memory 15a causes the processor 12 to perform the process steps described herein. In alternative embodiments, hard-wired circuitry may be used in place of, or in combination with software instructions to implement the arrangement. Thus, embodiments of the invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (µP), a microcontroller (µC), a Digital Signal Processor (DSP), or any combination thereof. A processor, such as the processor 12, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 12 may be integrated onto a single substrate (e.g., silicon "die"), or distributed among two or more substrates. Furthermore, various functional aspects of the processor 12 may be implemented solely as a software (or firmware) associated with the processor 12.

A non-limiting example of a processor may be 80186 or 80188 available from Intel Corporation located at Santa-Clara, Calif., USA. The 80186 and its detailed memory connections are described in the manual "80186/80188

*High-Integration* 16-*Bit Microprocessors*" by Intel Corporation, which is incorporated in its entirety for all purposes as if fully set forth herein. Other non-limiting example of a processor may be MC68360 available from Motorola Inc. located at Schaumburg, Ill., USA. The MC68360 and its detailed memory connections are described in the manual "*MC68360 Quad Integrated Communications Controller— User's Manual*" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Tex., U.S.A.), described in a data sheet published 2015 by Texas Instruments Incorporated [DS-TM4C123GH6PM-15842.2741, SPMS376E, Revision 15842.2741 June 2014], entitled: "Tiva™ TM4C123GH6PM Microcontroller—Data Sheet", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

The term "peripheral device" (or "peripheral") is used herein to include, but not limited to, any auxiliary device connectable to, works with, used to interact with, or sends data to the host computer in some way, and a peripheral device may be an input or an output device. Input devices includes a pointing device (e.g., computer mouse), a keyboard, a graphic tablet, a touchscreen, a barcode reader, an image scanner, a microphone, or a digital camera (e.g., webcam). An output device, which provides output from the host computer to a user or to another device, may be a display device, an image projector, a graphical output device, a loudspeaker, or a printer. The peripheral may be used to connect the host computer to an external network, such as a modem or a Network Interface Card (NIC). Further, the peripheral may be in part, or in full, integrated with the host computer. While exampled above regarding a general computer system, any device embedding firmware or software may equally be used, and in particular, any communication related devices such as a router or a firewall.

A memory can store computer programs or any other sequence of computer readable instructions, or data such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). A capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal, and appropriate circuitry can place the data on the bus 13. The bus 13 carries the data to the main memory 15*a*, from which the processor 12 retrieves and executes the instructions. The instructions received by the main memory 15*a* may optionally be stored on the storage device 15*c* either before or after execution by the processor 12.

The computer system 11 commonly includes a communication interface 9 coupled to the bus 13. The communication interface 9 provides a two-way data communication coupling to a network link 8 that is connected to a Local Area Network (LAN) 14. For example, the communication interface 9 may be an Integrated Services Digital Network (ISDN) card or a modem to provide a data communication connection to a corresponding type of telephone line. As another non-limiting example, the communication interface 9 may be a Local Area Network (LAN) card to provide a data communication connection to a compatible LAN. For example, Ethernet connection based on IEEE802.3 standard may be used, such as 10/100BaseT, 1000BaseT (gigabit Ethernet), 10 gigabit Ethernet (10 GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "*Internetworking Technologies Handbook*", Chapter 7: "Ethernet Technologies", pages 7-1 to 7-38, which is incorporated in its entirety for all purposes as if fully set forth herein. In such a case, the communication interface 9 typically includes a LAN transceiver or a modem, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

An Internet Service Provider (ISP) 16 is an organization that provides services for accessing, using, or participating in the Internet 22. The Internet Service Provider 16 may be organized in various forms, such as commercial, community-owned, non-profit, or otherwise privately owned. Internet services, typically provided by ISPs, include Internet access, Internet transit, domain name registration, web hosting, and colocation. Various ISP Structures are described in Chapter 2: "Structural Overview of ISP Networks" of the book entitled: "*Guide to Reliable Internet Services and Applications*", by Robert D. Doverspike, K. K. Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, web-hosting, or online storage services. Other services include virtual server, cloud services, or physical server operation. A virtual ISP (VISP) is an operation that purchases services from another ISP, sometimes called a wholesale ISP in this context, which allows the VISP's customers to access the Internet using services and infrastructure, owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (D(s), allowing routing of data between each network, without charging one another for the data transmitted—data that would otherwise have passed through a third upstream ISP, incurring charges from the upstream ISP. ISPs are requiring no upstream and having only customers (end customers and/or peer ISPs), are referred to as Tier 1 ISPs.

An arrangement 10*a* of a computer system connected to the Internet 22 is shown in FIG. 1*a*. A computer system or a workstation 7 is shown, including a main unit box 6, which encloses a motherboard on which the processor 12 and the memories 15*a*, 15*b*, and 15*c* are typically mounted. The workstation 7 may include a keyboard 2 (corresponding to the input device 18), a printer 4, a computer mouse 3 (corresponding to the cursor control 18*a*), and a display 5 (corresponding to the display 17). FIG. 1*a* further illustrates various devices connected via the Internet 22, such as a client device #1 24, a client device #2 24*a*, a data server #1 23*a*, a data server #2 23*b*, and the workstation 7, connected to the Internet 22 over a LAN 14 and via the router or gateway 19 and the ISP 16.

The client device #1 24 and the client device #2 24*a* may communicate over the Internet 22 for exchanging or obtaining data from the data server #1 23*a* and the data server #2 23*b*. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the '604 Patent'), which is incorporated in its entirety for all purposes as if fully set forth herein. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

The term "computer-readable medium" (or "machine-readable medium") is used herein to include, but not limited to, any medium or any memory, that participates in providing instructions to a processor, (such as the processor 12) for execution, or any mechanism for storing or transmitting information in a form readable by a machine (e.g., a computer). Such a medium may store computer-executable instructions to be executed by a processing element and/or control logic, and data, which is manipulated by a processing element and/or control logic, and may take many forms, including but not limited to, non-volatile medium, volatile medium, and transmission medium. The transmission media comprise coaxial cables, copper wire and fiber optics, including the wires that may constitute the bus 13. Transmission media can also take the form of acoustic or light waves, such as those generated during radio waves and infrared data communications, or other form of propagating signals (e.g., carrier waves, infrared signals, digital signals, etc.). Common forms of computer-readable media include a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 15*a*, from which the processor 12 retrieves and executes the instructions. The instructions received by the main memory 15*a* may optionally be stored on the storage device 15*c* either before or after execution by the processor 12.

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks)

participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered and error-checked delivery of a stream of octets between programs running on computers connected to a local area network, intranet, or the public Internet. It resides at the transport layer. Web browsers typically use TCP when they connect to servers on the World Wide Web, to deliver email and transfer files from one location to another. HTTP, HTTPS, SMTP, POP3, IMAP, SSH, FTP, Telnet and a variety of other protocols that are encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles the actual delivery of the data, TCP keeps track of the individual units of data transmission, called segments, which a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error-free as it streams them to an application.

The TCP protocol operations may be divided into three phases. Connections must be properly established in a multi-step handshake process (connection establishment) before entering the data transfer phase. Once data transmission is completed, the connection termination closes established virtual circuits and releases all allocated resources. A TCP connection is managed by an operating system through a programming interface that represents the local end-point for communications, the Internet socket. During the duration of a TCP connection, the local end-point undergoes a series of state changes.

The Internet Protocol (IP) is the principal communications protocol used for relaying datagrams (packets) across a network using the Internet Protocol Suite. It is considered as the primary protocol that establishes the Internet, and is responsible for routing packets across the network boundaries. IP is the primary protocol in the Internet Layer of the Internet Protocol Suite, and is responsible for delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or $3.4 \times 10^{38}$ addresses), as described in RFC 2460.

An overview of an IP-based packet 25 is shown in FIG. 2a. The packet 25 may be generally segmented into an IP data 26b to be carried as a payload, and an IP header 26f. The IP header 26f contains an IP address of the source as a Source IP Address field 26d and a Destination IP Address field 26c. In most cases, the IP header 26f and the payload 26b are further encapsulated by adding a Frame Header 26e and a Frame Footer 26a used by higher layer protocols.

The Internet Protocol is responsible for addressing hosts and routing datagrams (packets) from a source host to the destination host across one or more IP networks. For this purpose, the Internet Protocol defines an addressing system that has two functions. Addresses identify hosts, and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts, and how sub-networks of IP host addresses are divided and grouped together. IP routing is performed by all hosts, but most importantly, by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) entitled: "*Internetworking Technologies Handbook*", which are all incorporated in their entirety for all purposes as if fully set forth herein: Chapter 5: "Routing Basics" (pages 5-1 to 5-10), Chapter 30: "Internet Protocols" (pages 30-1 to 30-16), Chapter 32: "IPv6" (pages 32-1 to 32-6), Chapter 45: "OSI Routing" (pages 45-1 to 45-8) and Chapter 51: "Security" (pages 51-1 to 51-12), as well as in a IBM Corporation, International Technical Support Organization Redbook Documents No. GG24-4756-00 entitled: "*Local Area Network Concepts and Products: LAN Operation Systems and Management*", $1^{st}$ Edition May 1996, Redbook Document No. GG24-4338-00, entitled: "*Introduction to Networking Technologies*", $15^{st}$ Edition April 1994, Redbook Document No. GG24-2580-01 "*IP Network Design Guide*", $2^{nd}$ Edition June 1999, and Redbook Document No. GG24-3376-07 "*TCP/IP Tutorial and Technical Overview*", ISBN 0738494682 $8^{th}$ Edition December 2006, which are incorporated in their entirety for all purposes as if fully set forth herein. Programming, designing, and using the Internet is described in a book by Paul S. Wang and Sanda Katila entitled: "*An Introduction to*

*Web Design+Programming*" (Brooks/Cole book/Dec. 24, 2003), which is incorporated in its entirety for all purposes as if fully set forth herein.

The Internet architecture employs a client-server model, among other arrangements. The terms 'server' or 'server computer' relates herein to a device or computer (or a plurality of computers) connected to the Internet, and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or a device, or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

The Hypertext Transfer Protocol (HTTP) is an application protocol for distributed, collaborative, hypermedia information systems, commonly used for communication over the Internet. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—HTTP/1.1: Message Syntax and Routing, RFC 7231—HTTP/1.1: Semantics and Content, RFC 7232—HTTP/1.1: Conditional Requests, RFC 7233—HTTP/1.1: Range Requests, RFC 7234—HTTP/1.1: Caching, and RFC 7235—HTTP/1.1: Authentication. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request, and may further contain a requested content in its message body. A web browser is an example of a User Agent (UA). Other types of user agent include the indexing software used by search providers (web crawlers), voice browsers, mobile apps, and other software that accesses, consumes, or displays web content.

HTTP is a protocol designed to permit intermediate network elements to improve or enable communications between clients and servers. High-traffic websites often benefit from web cache servers that deliver content on behalf of upstream servers to improve response time. Web browsers cache previously accessed web resources and reuse them when possible, to reduce network traffic. HTTP proxy servers at private network boundaries can facilitate communication for clients without a globally routable address, by relaying messages with external servers. HTTP is an application layer protocol designed within the framework of the Internet Protocol Suite. Its definition presumes an underlying and reliable transport layer protocol, and Transmission Control Protocol (TCP) is commonly used. However, HTTP can use unreliable protocols such as the User Datagram Protocol (UDP), for example, in the Simple Service Discovery Protocol (SSDP). HTTP resources are identified and located on the network by Uniform Resource Identifiers (URIs), or, more specifically, Uniform Resource Locators (URLs), using the http or https URI schemes. URIs and hyperlinks in Hypertext Markup Language (HTML) documents form webs of inter-linked hypertext documents. An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol. A stateless protocol does not require the HTTP server to retain information or status.

HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "Hypertext Transfer Protocol—HTTP/1.1". In HTTP 1.1, all connections are considered persistent unless declared otherwise. The HTTP persistent connections do not use separate keep-alive messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on an HTTP persistent connection.

Operating systems. An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process management: The operating system provides an interface between an application program and the computer hardware, so that an application program can interact with the hardware only by obeying rules and procedures programmed into the operating system. The operating system is also a set of services that simplify development and execution of application programs. Executing an application program involves the creation of a process by the operating system kernel that assigns memory space and other resources, establishes a priority for the process in multitasking systems, loads program binary code into memory, and initiates execution of the application program that then interacts with the user and with hardware devices. The OS must allocate resources to processes, enable processes to share and exchange information, protect the resources of each process from other processes, and enable synchronization among processes. The OS maintains a data structure for each process, which describes the state and resource ownership of that process, enabling the OS to exert control over each process.

In many modern operating systems, there can be more than one instance of a program loaded in memory at the same time; for example, more than one user could be executing the same program, each user having separate copies of the program loaded into memory. With some programs, known as re-entrant type, it is possible to have one copy loaded into memory, while several users have shared access to it so that they each can execute the same program-code. The processor (such as the processor 12) at any instant can only be executing one instruction from one program but several processes can be sustained over a period of time by assigning each process to the processor at intervals while the remainder becomes temporarily inactive. A number of processes being executed over a period instead of at the same time, is called concurrent execution. A multiprogramming or multitasking OS is a system executing many processes concurrently. A multiprogramming requires that the processor be allocated to each process for a period, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation: The process issues a system call (sometimes called a software interrupt); for example, an I/O request occurs requesting to access a file on hard disk. Alternatively, a hardware interrupt occurs; for example, a key was pressed on the keyboard, or a timer runs out (used in pre-emptive multitasking). The stopping of one process and starting (or restarting) of another process is called a context switch or context change. In many modern operating systems, processes can consist of many sub-processes. This introduces the concept of a thread. A thread may be viewed as a sub-process; that is, a separate, independent sequence of execution within the code of one process. Threads are becoming increasingly important in the design of distributed and client-server systems and in software run on multi-processor systems.

Modes: Many contemporary processors incorporate a mode bit to define the execution capability of a program in the processor. This bit can be set to a kernel mode or a user mode. A kernel mode is also commonly referred to as supervisor mode, monitor mode or ring 0. In kernel mode, the processor can execute every instruction in its hardware repertoire, whereas in user mode, it can only execute a subset of the instructions. Instructions that can be executed only in kernel mode are called kernel, privileged, or protected instructions, to distinguish them from the user mode instructions. For example, I/O instructions are privileged. Therefore, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or the user partition of the memory. However, if user mode is set, the process can reference only the user memory space, hence two classes of memory are defined, the user space and the system space (or kernel, supervisor or protected space). In general, the mode bit extends the operating system protection rights, and is set by the user mode trap instruction, also called a supervisor call instruction. This instruction sets the mode bit, and branches to a fixed location in the system space. Since only the system code is loaded in the system space, only the system code can be invoked via a trap. When the OS has completed the supervisor call, it resets the mode bit to user-mode prior to the return.

Computer operating systems provide different levels of access to resources, and these hierarchical protection domains are often referred to as 'protection rings', and are used to protect data and functionality from faults (by improving fault tolerance) and malicious behavior (by providing computer security). A protection ring is one of two or more hierarchical levels or layers of privilege within the architecture of a computer system. These levels may be hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, kernel mode or 'Ring 0' is the level with the most privileges and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings must request access to the network, a resource restricted to a lower numbered ring.

Kernel: With the aid of the firmware and device drivers, the kernel provides the most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc. The part of the system executing in kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for correct operation of the OS. Hence, a fundamental design decision for any function to be incorporated into the OS is whether it needs to be implemented in the kernel. If it is implemented in the kernel, it executes in kernel (supervisor) space, and have access to other parts of the kernel. It is also be trusted software by the other parts of the kernel. If the function is implemented to execute in user mode, it has no access to kernel data structures.

There are two techniques by which a program executing in user mode can request the kernel services, namely 'System call' and 'Message passing'. Typically, operating systems are with one or the other of these two facilities, but not both. Assuming that a user process wishes to invoke a particular target system function, in the system call approach, the user process uses the trap instruction, so the system call should appear to be an ordinary procedure call to the application program. The OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table), to the entry point of the function which is to be invoked. When the function completes, it switches the processor to user mode and then returns control to the user process; thus simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts handling. Interrupts are central to operating systems, as they provide an efficient way for the operating system to interact with and react to its environment. Interrupts are typically handled by the operating system kernel, for providing a way of automatically saving local register contexts and running specific code in response to events. When an interrupt is received, the computer's hardware suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system kernel, part of another program, or both.

Device drivers may then relay information to a running program by various means. A program may also trigger an interrupt to the operating system. For example, if a program wishes to access hardware (such as a peripheral), it may interrupt the operating system's kernel, which causes the control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are commonly used technique for computer multitasking, especially in real-time computing systems, which are commonly referred to as interrupt-driven systems.

Memory management: A multiprogramming operating system kernel is responsible for managing all system memory that is currently in use by programs, ensuring that a program does not interfere with memory already in use by another program. Since programs share time, each program must have independent access to memory. Memory protection enables the kernel to limit a process' access to the computer's memory. Various methods of memory protection exist, including memory segmentation and paging. In both segmentation and paging, certain protected mode registers specify to the CPU what memory address it should allow a running program to access. Attempts to access other addresses will trigger an interrupt that will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and free it for reuse when no longer needed. This is critical for any advanced computer system where more than a single process might be underway at any time. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File system: Commonly a file system (or filesystem) is used to control how data is stored and retrieved. By separating the data into individual pieces, and giving each piece a name, the information is easily separated and identified, where each piece of data is called a "file". The structure and logic rules used to manage the groups of information and their names is called a "file system". There are many different kinds of file systems. Each one has a different structure and logic, properties of speed, flexibility, security, size and more. Some file systems have been designed to be used for specific applications. For example, the ISO 9660 file system is designed specifically for optical discs. File systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g., procfs), or are merely a mapping into a different file system used as a backing store. The file system manages access to both the content of files and the metadata about those files. It is responsible for arranging storage space, where reliability, efficiency, and tuning with regard to the physical storage medium are important design considerations.

A disk file system takes advantage of the ability of a disk storage media to randomly address data in a short amount of time. Additional considerations include the speed of accessing data following that initially requested and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS, and UDF. Some disk file systems are journaling file systems or versioning file systems.

TMPFS. TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive and hosts a disk file system. The tmpfs is typically a file system based on SunOS virtual memory resources, which does not use traditional non-volatile media to store file data; instead, tmpfs files exist solely in virtual memory maintained by the UNIX kernel. Because tmpfs file systems do not use dedicated physical memory for file data, but instead use VM system resources and facilities, and can take advantage of kernel resource management policies. Tmpfs is designed primarily as a performance enhancement to allow short-lived files to be written and accessed without generating disk or network I/O. Tmpfs maximizes file manipulation speed while preserving UNIX file semantics. It does not require dedicated disk space for files, and has no negative performance impact. The tmpfs is described in a Sun Microsystem Inc. paper entitled: "tmpfs: A Virtual Memory File System" by Peter Snyder, downloaded on July 2014, which is incorporated in its entirety for all purposes as if fully set forth herein.

Device Drivers: A device driver is a specific type of computer software developed to allow interaction with hardware devices. This constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program (that is also operating system specific) that enables another program, such as an operating system, applications software package, or a computer program running under the operating system kernel, to interact transparently with a hardware device, and usually provides the requisite interrupt handling necessary for any necessary asynchronous time-dependent hardware interfacing needs.

Networking: Most operating systems support a variety of networking protocols, hardware, and applications for using them, allowing computers running dissimilar operating systems to participate in a common network, for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication, to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server. The term 'client' typically refers to an application (or a device executing the application) used for retrieving or rendering resources or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) Handling: An input/output (or I/O) is the communication between an information processing system (such as a computer) and the outside world, possibly a human or other information processing system. The inputs are the signals or data received by the system, and the outputs are the signals or data sent from it. A person (or another system) may use I/O devices to communicate with a computer. For instance, a keyboard or a mouse may be an input device for a computer, while monitors and printers are considered output devices for a computer. Devices for communication between computers, such as modems and network cards, serve for both input and output.

User Interface. Every computer that is to be operated by a human being (user) requires a user interface, usually referred to as a 'shell', and is essential if human interaction is to be supported. The user interface views the directory structure and requests services from the operating system that will acquire data from input hardware devices, such as a keyboard, mouse or credit card reader, and requests operating system services to display prompts, status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically, the GUI is integrated into the kernel, allowing the GUI to be more responsive by reducing the number of context switches required for the GUI to perform its output functions.

WDM. The Windows Driver Model (WDM), also known as the Win32 Driver Model, is a standard model defining a framework for device drivers specified by Microsoft, providing unified driver models. The WDM model is based on using WDM drivers that are layered in a complex hierarchy and communicate with each other via I/O Request Packets (IRPs). The WDM is described in the publication entitled: "*Microsoft Windows Driver Model (WDM)*", by Mohamad (Hani) Atassy, submitted to Dr. Dennis R. Hafermann dated Jan. 28, 2002, and in publication entitled: "*A Comparison of the Linux and Windows Device Driver Architecture*", by Melekam Tsegaye and Ricahrd Foss, both from Rhodes University, South-Africa, downloaded from the Internet on July 2014, both are incorporated in their entirety for all purposes as if fully set forth herein.

A general schematic view of the WDM architecture 30 is shown on FIG. 3. In the example shown, three applications designated as an application #1 31a, an application #2 31b, and a web browser application #3 31c, are accessing three peripheral hardware devices, designated as peripheral #1 39a, peripheral #2 39b, and peripheral #3 39c. The model involves three layers. The lower layer is the hardware layer 34c, which includes the hardware devices and peripherals, accessed by the processor (such as the processor 12) via a hardware bus 34d, which may correspond to internal bus 13 shown in FIG. 1. The highest layer is a 'user space' layer 34a, corresponding to the user mode and to the higher 'ring' layers, such as Ring 3, and is relating to the space is the memory area where application software and some drivers execute. The kernel of the operating system provides the services as part of a 'kernel space' layer 34b, serving as an intermediate layer between the user space layer 34a and the hardware layer 34c. The kernel space 34b operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as the application #1 31a, the application #2 31b, and the (web browser) application #3 31c examped as a web browser application) access the kernel space 34b by the invoking of system calls respectively denoted as connections 32a, 32b and 32c. Typically, such system calls are processed via intermediating entity known as Windows API, such as a Win32 API 33, which accesses the kernel space 34b via a standard messaging. The Win32 API 33 is an example of a Windows API (informally WinAPI), which is Microsoft's core set of Application Programming Interfaces (APIs) available in the Microsoft Windows operating systems. Almost all Windows programs interact with the Windows API; on the Windows NT line of operating systems, a small number (such as programs started early in the Windows startup process) uses the Native API. Supporting for developers is in the form of the Windows Software Development Kit (SDK), providing documentation and tools necessary to build software based upon the Windows API and associated Windows interfaces. The Win32 API 33 is the 32-bit API for modem versions of Windows, and consists of functions implemented, as with Win16, in system DLLs. The core DLLs of the Win32 include the kernel32.dll, user32.dll, and gdi32.dll. The Win32 API is described in the tutorial entitled: "*Welcome to Version* 2.0 *of the Win32 API Tutorial*" by Prof. M. Saeed, published by Brook Miles, downloaded from the Internet on July 2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is processed in the kernel mode, which is accomplished by changing the processor execution mode to a more privileged one. The hardware sees the world in terms of the execution mode according to the processor status register, and processes are an abstraction provided by the operating system. A system call does not require a context switch to another process; it is processed in the context of whichever process invoked it. The system calls are often executed via traps or interrupts; that automatically puts the CPU into some required privilege level, and then passes control to the kernel, which determines whether the calling program should be granted the requested service. If the service is granted, the kernel executes a specific set of instructions over which the calling program has no direct control, returns the privilege level to that of the calling program, and then returns control to the calling program Implementing system calls requires a control transfer, which involves some sort of architecture-specific feature.

System calls can be roughly grouped into five major categories: process control, such as load, execute, create/terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

An I/O manager 35b, which allows devices to communicate with user-mode subsystems, commonly handles the system calls. It translates user-mode read and write commands into read or write IRPs, which it passes, to device drivers. It accepts file system I/O requests and translates them into device specific calls, and can incorporate low-level device drivers that directly manipulate hardware to either read input or write output. It also includes a cache manager to improve disk performance by caching read requests and write to the disk in the background. The I/O manager 35b may interface a power manager 35c, which deals with power events (power-off, stand-by, hibernate, etc.) and notifies affected drivers with special IRPs (Power IRPs).

A PnP manager 35a handles 'Plug and Play' and supports device detection and installation at boot time. It also has the responsibility to stop and start devices on demand such as when a bus (such as USB or FireWire) gains a new device and needs to have a device driver loaded to support it. The PnP manager 35a may be partly implemented in user mode, in the Plug and Play Service, which handles the often-complex tasks of installing the appropriate drivers, notifying services and applications of the arrival of new devices, and displaying GUI to the user.

I/O Request Packets (IRPs) are kernel mode structures that are used to communicate with each other, and with the operating system. They are data structures that describe I/O requests, to a driver, all of these parameters (such as buffer address, buffer size, I/O function type, etc.) are passed via a single pointer to this persistent data structure. The IRP with all of its parameters can be put on a queue if the I/O request cannot be performed immediately. I/O completion is reported back to the I/O manager by passing its address to a routine for that purpose, IoCompleteRequest. The IRP may be repurposed as a special kernel APC object if such is required to report completion of the I/O to the requesting thread. The I/O Manager typically creates IRPs in response to I/O requests from user mode. However, IRPs are sometimes created by the plug-and-play manager, power manager, and other system components, and can further be created by drivers and then passed to other drivers.

The WDM uses kernel-mode device drivers to enable it to interact with hardware devices, where each of the drivers has well defined system routines and internal routines that it exports to the rest of the operating system. DriverEntry is the first routine called after a driver is loaded, and is responsible for initializing the driver. All devices are seen by the user mode code as a file object in the I/O manager, though to the I/O manager itself the devices are seen as device objects, which it defines as either file, device or driver objects. The drivers may be aggregated as a driver stack 36, including kernel mode drivers in three levels: highest-level drivers 36a, intermediate drivers 36b, and low-level drivers 36c. The highest-level drivers 36a, such as file system drivers for FAT and NTFS, rely on the intermediate drivers 36b, which consist of function drivers or main driver for a device that are optionally sandwiched between lower and higher-level filter drivers. The highest-level drivers 36a typically know how files are represented on disk, but not the details of how to actually fetch the data; the intermediate level drivers 36b process the requests from the highest-level driver by breaking down a large request into a series of small chunks.

The function driver commonly possesses the details relating to how the hardware of the peripheral works, typically relies on a bus driver, or a driver that services a bus controller, adapter, or bridge, which can have an optional bus filter driver that sits between itself and the function driver. For example, a PCI bus driver detects the PCI-slot plugged card or hardware, and determines the I/O-mapped or the memory-mapped connection with the host. The intermediate drivers 36b rely on the low-level drivers 36c to function, and the lowest level drivers 36c either are legacy device drivers that control a device directly, or can be a PnP hardware bus. These lower level drivers 36*c* directly control hardware and do not rely on any other drivers. The I/O manager 35*b* communicates with the high-level driver 36*a* using IRP 37*a*, the high-level driver 36*a* communicates with the intermediate level driver 36*b* using IRP 37*b*, the intermediate level driver 36*b* communicates with the low-level driver 36*c* using IRP 37*c*, and the low-level driver 37*c* communicates with the HAL 38 using IRP 37*d*.

WDM drivers can be classified into the following types and sub-types: Device function drivers, bus drivers, and filter drivers. A function driver is a main driver for a device, and is typically written by the device vendor and is required (unless the device is being used in raw mode). A function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers for supporting miniport and other class drivers. The class drivers provide interfaces between different levels of the WDM architecture. Common functionality between different classes of drivers can be written into the class driver, and used by other class and miniport drivers. The lower edge of the class driver will have its interface exposed to the miniport driver, while the upper edge of top-level class drivers is operating system specific. Class drivers can be dynamically loaded and unloaded at will. They can do class specific functions that are not hardware or bus-specific (with the exception of bus-type class drivers) and in fact, sometimes only do class specific functions such as an enumeration.

A bus driver services a bus controller, adapter, or bridge. Microsoft provides bus drivers for most common buses, such as Advanced configuration and Power Interface (ACPI), Peripheral Component Interconnect (PCI), PnPISA, SCSI, Universal Serial Bus (USB), and FireWire. A bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high speed bus and the USB. The stream class driver provides a basic processing supporting high bandwidth, time critical, and video and audio data related hardware, and uses minidrivers for interfacing the actual hardware, and hard-disk, floppies, CDs, and DVDs are interfaces using SCSI and CDROM/DVD class driver. The Human Input Device (HID) provides an abstract view of input devices, and the Still Image Architecture (SIA) class driver is used to obtain content from a scanner and a still camera, using minidrivers. For example, accessing a hard disk (such as the storage 15*a* or the HDD 15C) may involve a file system driver as high-level driver, a volume manager driver as intermediate level driver, and a disk driver as low-level driver.

Filter drivers are optional drivers that add value to, or modify the behavior of a device and may be non-device drivers. A filter driver can also service one or more devices. Upper-level filter drivers sit above the primary driver for the device (the function driver), while lower level filter drivers sit below the function driver and above the bus driver. A driver service is a type of kernel-level filter driver implemented as a Windows service that enables applications to work with devices.

The Hardware Abstraction Layer 38, or HAL, is a layer between the physical hardware layer 34*c* of the computer and the rest of the operating system. It was designed to hide differences in hardware, and therefore provide a consistent platform on which the kernel is run. The HAL 38 includes hardware-specific code that controls I/O interfaces, interrupt controllers, and multiple processors. Typically, the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries and usually a large amount of application software to fulfill the distribution's intended use. A Linux-based system is a modular Unix-like operating system. Such a system uses a monolithic kernel, the Linux kernel, which handles process control, networking, and peripheral and file system access. Device drivers are either integrated directly with the kernel or added as modules loaded while the system is running Some components of an installed Linux system are a bootloader, for example GNU GRUB or LILO, which is executed by the computer when it is first turned on, and loads the Linux kernel into memory; an init program, which is the first process launched by the Linux kernel, and is at the root of the process tree, and starts processes such as system services and login prompts (whether graphical or in terminal mode); Software libraries which contain code that can be used by running processes; and user interface programs such as command shells, or windowing environments. A version of Linux is described, for example, in IBM Corporation (headquartered in Armonk, N.Y.) publication No. SC34-2597-03 entitled: "*Device Drivers, Features, and Commands on Red Hat Exterprise Linux* 6.3", downloaded from the Internet on July 2014, which is incorporated in its entirety for all purposes as if fully set forth herein.

The general schematic Linux driver architecture 30*a* is shown in FIG. 3*a*, and the Linux kernel is further described in Wiley Publishing, Inc. publication entitled: "*Professional Linux Kernel Architecture*", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on July 2014, which are all incorporated in their entirety for all purposes as if fully set forth herein.

Similar to the WDM 30 shown in FIG. 3, the Linux kernel involves a 'System Call Interface' 33a, receiving system calls 32d, 32e, and 32f from the respective applications such as an application #1 31a, an application #2 31b, and an application #3 31c, and serves as the denomination for the entirety of all implemented and available system calls in a kernel. The Linux kernel is based on a layered modules stack 36a, which may include three levels of modules, such as module #1 36d, module #2 36e, and module #3 36f, where the module #1 36d communicate over connection 37e with the system call interface 33a, the module #2 36e communicates with the module #1 36d over connection 37f, the module #3 36f communicates over the connection 37g with the module #2 36e, and over a connection 37h with the HAL 38.

Similar to the WDM 30 shown in FIG. 3, the Linux kernel, shown as the arrangement 30a in FIG. 3a, is using the concept of layered architecture of a modules stack 36a, which may comprise module #1 36d, module #2 36e, and module #3 36f, communicating using messaging mechanism, such as a connection 37e between the system call interface 33a and the module #1 36d, a connection 37f between the module #1 36d and the module #2 36e, a connection 37g between the module #2 36e and the module #3 36f, and a connection 37h between the module #3 36f and the HAL 38.

The modules in the modules stack 36a, typically referred to as Loadable Kernel Modules (or LKM), are object files that contain code to extend the running Linux kernel, or so-called base kernel. LKMs are used to add support for new hardware and/or filesystems, or for adding system calls. When the functionality provided by an LKM is no longer required, it can be unloaded in order to free memory and other resources. Loadable kernel modules in Linux are located in /lib/modules, and have had the extension '.ko' ("kernel object") since version 2.6 (previous versions used the .o extension), and are loaded (and unloaded) by the modprobe command. The 1smod command lists the loaded kernel modules. In emergency cases, when the system fails to boot (due to e.g. broken modules), specific modules can be enabled or disabled by modifying the kernel boot parameters list (for example, if using GRUB, by pressing 'e' in the GRUB start menu, then editing the kernel parameter line). Linux allows disabling module loading via sysctl option/proc/sys/kernel/modules_disabled. An initramfs system may load specific modules needed for a machine at boot, and then disable module loading.

Chrome OS is a Linux kernel-based operating system designed by Google Inc. out of Mountain View, Calif., U.S.A., to work primarily with web applications. The user interface takes a minimalist approach, and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "Google™ Chrome OS USER GUIDE" published 2011, which is incorporated in its entirety for all purposes as if fully set forth herein.

A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently popular mobile OSs are Android, Symbian, Apple iOS, BlackBerry, MeeGo, Windows Phone, and Bada. Mobile devices with mobile communications capabilities (e.g. smartphones) typically contain two mobile operating systems—a main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate, and provides a fluid touch interface, often using the vibration capabilities of the device to provide haptic feedback to the user. Internal hardware such as accelerometers, gyroscopes and proximity sensors are used by some applications to respond to additional user actions, for example, adjusting the screen from portrait to landscape depending on how the device is oriented, or allowing the user to steer a vehicle in a racing game by rotating the device by simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "Android Tutorial", downloaded from tutorialspoint.com on July 2014, which is incorporated in its entirety for all purposes as if fully set forth herein.

iOS (previously iPhone OS) from Apple Inc. (headquartered in Cupertino, Calif., U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS OS is described in a publication entitled: "IOS Tutorial", downloaded from tutorialspoint.com on July 2014, which is incorporated in its entirety for all purposes as if fully set forth herein.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is $1/1000$ of a second to $1/100$ of a second, via an interrupt from a hardware timer, but this interval is often changed to suit a particular application. FreeRTOS™ is described in a paper by Nicolas Melot (downloaded July 2015) entitled: "*Study of an operating system: FreeRTOS—Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "*FreeRTOS™ Modules*" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

Server. A server device (in server/client architecture) typically offers information, resources, services, and applications to clients, and is using a server dedicated or oriented operating system. A server device may consist of, be based on, include, or be included in, the workstation 7, the computer system 10 or the computer 11. Current popular server operating systems are based on Microsoft Windows (by Microsoft Corporation, headquartered in Redmond, Wash., U.S.A.), Unix, and Linux-based solutions, such as the 'Windows Server 2012' server operating system is a part of the Microsoft 'Windows Server' OS family that was released by Microsoft on 2012, providing enterprise-class datacenter and hybrid cloud solutions that are simple to deploy, cost-effective, application-focused, and user-centric, and is described in Microsoft publication entitled: "*Inside-Out Windows Server 2012*", by William R. Stanek, published 2013 by Microsoft Press, which is incorporated in its entirety for all purposes as if fully set forth herein.

Unix operating systems are widely used in servers. Unix is a multitasking, multiuser computer operating system that exists in many variants, and is characterized by a modular design that is sometimes called the "Unix philosophy," meaning the OS provides a set of simple tools that each perform a limited, well-defined function, with a unified filesystem as the main means of communication, and a shell scripting and command language to combine the tools to perform complex workflows. Unix was designed to be portable, multi-tasking and multi-user in a time-sharing configuration, and Unix systems are characterized by various concepts: the use of plain text for storing data; a hierarchical file system; treating devices and certain types of Inter-Process Communication (IPC) as files; and the use of a large number of software tools, small programs that can be strung together through a command line interpreter using pipes, as opposed to using a single monolithic program that includes all of the same functionality. Under Unix, the operating system consists of many utilities along with the master control program, the kernel. The kernel provides services to start and stop programs, handles the file system and other common "low level" tasks that most programs share, and schedules access to avoid conflicts when programs try to access the same resource or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

A client device (in server/client architecture) typically receives information resources, services, and applications from servers, and uses a client dedicated or oriented operating system. The client device may consist of, be based on, include, or be included in, the workstation 7, the computer system 10 or the computer 11. Current popular client operating systems are based on Microsoft Windows (by Microsoft Corporation, headquartered in Redmond, Wash., U.S.A.), which is a series of graphical interface operating systems developed, marketed, and sold by Microsoft. Microsoft Windows is described in Microsoft publications entitled: "Windows Internals—Part 1" and "Windows Internals—Part 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

VPN. Computer networks may use a tunneling protocol where one network protocol (the delivery protocol) encapsulates a different payload protocol Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network.

Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, and then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection.

Commonly there are two types of VPN connections, referred to as Remote Access VPN and Site-to-Site VPN. Popular VPN connections use PPTP, L2TP/IPsec, or SSTP protocols. PPTP is described in IETF RFC 2637 entitled: "*Point-to-Point Tunneling Protocol (PPTP)*", L2TP is described in IETF RFC 2661 entitled: "*Layer Two Tunneling Protocol "L2TP"*", which are both incorporated in their entirety for all purposes as if fully set forth herein. VPN and VPN uses are described in Cisco Systems, Inc. 2001 publication entitled: "IP Tunneling and VPNs", and in Cisco Systems, Inc. 2001 handbook 'Internetworking Technologies Handbook' [No. 1-58705-001-3] chapter 18 entitled: "Virtual Private Networks", and in IBM Corporation Redbook series publications entitled: "*A Comprehensive Guide to Virtual Private Networks*" including "*Vol. I: IBM Firewall, Server and Client Solutions*" [SG24-5201-00, June 1998], "Vol II: IBM Nways Router Solutions" [SG24-5234-01, November 1999], and "*Vol III: Cross-Platform Key and Policy Management*" [SG24-5309-00, November 1999], which are all incorporated in their entirety for all purposes as if fully set forth herein.

VPN and its uses are further described in the IETF RFC 4026 entitled: "*Provider Provisioned Virtual Private Network (VPN) Terminology*" that describes provider provisioned Virtual Private Network (VPN), in the IETF RFC 2764 entitled: "*A Framework for IP Based Virtual Private Networks*" that describes a framework for Virtual Private Networks (VPNs) running across IP backbones, in the IETF RFC 3931 entitled: "*Layer Two Tunneling Protocol—Version 3 (L2TPv3)*", and in the IETF RFC 2547 entitled: "BGP/MPLS VPNs" that provides a VPN method based on MPLS (Multiprotocol Label Switching) and BGP (Border Gateway Protocol), which are all incorporated in their entirety for all purposes as if fully set forth herein.

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices, or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link A site-to-site VPN connection connects two portions of a private network. The VPN server provides a routed connection to the network to which the VPN server is attached. The calling router (the VPN client) authenticates itself to the answering router (the VPN server), and for mutual authentication, the answering router authenticates itself to the calling router. In the site-to site VPN connection, the packets sent from either router across the VPN connection typically do not originate at the routers.

Negotiating encryption keys may involve performing Internet Key Exchange (IKE or IKEv2) as part of establishing a session under the Security Protocol for the Internet (IPSec), as described in IETF RFC 2409 entitled: "The Internet Key Exchange (IKE)", and in RFC 4306 entitled: "*Internet Key Exchange (IKEv2) Protocol*", which are both incorporated in their entirety for all purposes as if fully set forth herein. Alternatively or in addition, negotiating encryption keys may involve performing RSA Key Exchange or Diffie-Helman Key Exchange described in IETF RFC 2631 entitled: "Diffie-Hellman Key Agreement Method", which is incorporated in its entirety for all purposes as if fully set forth herein, as part of establishing a session under the Secure Socket Layer (SSL) or Transport Layer Security (TLS) protocol.

Web browser. A web browser 31c (commonly referred to as a browser) is a software application for retrieving, presenting, and traversing information resources on the World Wide Web. An information resource is identified by a Uniform Resource Identifier (URI/URL) and may be part of a web page, a web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links") Currently, the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier (URI), determines how the URL will be interpreted. The most commonly used URI starts with http: and identifies a resource to be retrieved over the Hypertext Transfer Protocol (HTTP). Many browsers also support a variety of other prefixes, such as 'https:' for HTTP Secure (HTTPS), 'ftp:' for the File Transfer Protocol (FTP), and 'file:' for local files. Prefixes that the web browser cannot directly handle are often handed off to another application entirely. For example, mailto: URIs are usually passed to the user's default e-mail application, and news: URIs are passed to the user's default newsgroup reader. In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to, so when a link is clicked, the browser navigates to the resource indicated by the link's target URI, and the process of bringing content to the user begins again.

Examples of web browsers functionalities and structures are described in U.S. Pat. No. 5,572,643 to Judson entitled: "Web Browser with Dynamic Display of Information Objects During Linking", in U.S. Pat. No. 5,701,451 to Rogers et al. entitled: "A Method for Fulfilling Requests of a Web Server", in U.S. Pat. No. 5,793,964 to Rogers et al. entitled: "Web Browser System", and in U.S. Pat. No. 6,230,171 to Pacifici et al. entitled: "Markup System for Shared HTML Documents", which are all incorporated in their entirety for all purposes as if fully set forth herein. The architecture and functionalities of a web browser are further described in a publication entitled: "*Architecture and evolution of the modern web browser*" by Alan Grosskurth and Michael W. Godfrey of the University of Waterloo in Canada, dated Jun. 20, 2006, in a publication by Alan Grosskurth and Michael W. Godfrey of the University of Waterloo in Canada entitled: "*A Reference Architecture for web browsers*" (downloaded May 20, 2015), in an International Business Machines (IBM) Corporation 1996 Open Blueprint publication G325-6589-00 entitled: "*Web Browser Resource Manager*", and in a paper by Adam Barth, Collin Jackson, Charles Reis, and the Google Chrome Team (downloaded May 20, 2015) entitled: "*The Security Architecture of the Chromium Browser*", which are all incorporated in their entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Wash., U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer* 8 *Accessibility Options*", which is incorporated in its entirety for all purposes as if fully set forth herein. Another popular web browser is the Google Chrome which is a freeware web browser developed by Google, headquartered in Googleplex, Mountain View, Calif., U.S.A. Google Chrome aims to be secure, fast, simple, and stable, providing strong application performance and JavaScript processing speed.

A mobile browser, also called a microbrowser, minibrowser, or Wireless Internet Browser (WIB), is a web browser designed for use on a mobile device such as a mobile phone or PDA. Mobile browsers are optimized to display Web content most effectively for small screens on portable devices. Mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals or collectively as the Mobile Web.

The mobile browser typically connects via cellular network, via Wireless LAN, or via other wireless networks, and are using standard HTTP over TCP/IP, and displays web pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, Calif., U.S.A), included with the OS X and iOS operating systems, and described in Apple publication entitled: "*Safari Web Content Guide*", dated March 2014, which is incorporated in its entirety for all purposes as if fully set forth herein.

A multitasking is a method where multiple tasks (also known as processes or programs) are performed during the same period of time—they are executed concurrently (in overlapping time periods, new tasks starting before others have ended) instead of sequentially (one completing before the next starts). The tasks share common processing resources, such as a CPU and main memory. Multitasking does not necessarily mean that multiple tasks are executing at exactly the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets a turn. The act of reassigning a CPU from one task to another one is called a context switch. When context switches occur frequently, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than there are CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily, or by an external event such as a hardware interrupt. Time sharing systems are designed to allow several programs to execute apparently simultaneously. In real-time systems, some waiting tasks are guaranteed to be given the CPU when an external event occurs. Real time systems are designed to control mechanical devices such as industrial robots, which require timely processing.

Multiprocessing is the use of two or more processors or Central Processing Units (CPUs) within a single computer system, typically combined with the ability to allocate tasks between them. The multiple processors are commonly sharing main memory and peripherals, in order to simultaneously process programs. In a multiprocessing system, all CPUs may be equal, or some may be reserved for special purposes. A combination of hardware and operating system software design considerations determine the symmetry (or lack thereof) in a given system. For example, hardware or software considerations may require that only one particular CPU respond to all hardware interrupts, whereas all other work in the system may be distributed equally among CPUs; or execution of kernel-mode code may be restricted to only one particular CPU, whereas user-mode code may be executed in any combination of processors. Systems that treat all CPUs equally, are called symmetric multiprocessing (SMP) systems. In systems where all CPUs are not equal, system resources may be divided in a number of ways, including Asymmetric Multiprocessing (ASMP), Non-Uniform Memory Access (NUMA) multiprocessing, and clustered multiprocessing.

In multiprocessing, the processors are typically used to execute a single sequence of instructions in multiple contexts (single-instruction, multiple-data or SIMD, often used in vector processing), multiple sequences of instructions in a single context (multiple-instruction, single-data or MISD, used for redundancy in fail-safe systems and sometimes applied to describe pipelined processors or hyper-threading), or multiple sequences of instructions in multiple contexts (multiple-instruction, multiple-data or MIMD). Tightly coupled multiprocessor systems contain multiple CPUs that are connected at the bus level and may have access to a central shared memory (SMP or UMA), or may participate in a memory hierarchy with both local and shared memory (NUMA). Chip multiprocessors, also known as multi-core computing, involves more than one processor placed on a single chip and can be thought of the most extreme form of tightly-coupled multiprocessing. Loosely coupled multiprocessor systems (often referred to as clusters) are based on multiple standalone single or dual processor commodity computers interconnected via a high-speed communication system (Gigabit Ethernet is common). Tightly-coupled systems perform better and are physically smaller than loosely-coupled systems, but have historically required greater initial investments and may depreciate rapidly; nodes in a loosely coupled system are usually inexpensive commodity computers and can be recycled as independent machines upon retirement from the cluster.

Filter driver. A filter driver is a Microsoft Windows compatible driver that extends or modifies the function of peripheral devices or supports a specialized device in a personal computer, and commonly relates to a driver, program, or module that is inserted into the existing driver stack to perform some specific function, while not affecting the normal working of the existing driver stack in any major way. Any number of filter drivers can be added to Windows, where upper-level filter drivers sit above the primary driver for the device (the function driver), while lower level filter drivers sit below the function driver and above a bus driver. Filter drivers may work on a certain brand of device such as a mouse or keyboard, or they may perform some operations on a class of devices, such as any mouse or any keyboard. A filter driver may be developed using the guide entitled: "*Filter Driver Development Guide*" Version 1.0a by Microsoft Corporation, dated 2004, which is incorporated in its entirety for all purposes as if fully set forth herein.

Hook. A hook (also known as a hook procedure or hook function) is a mechanism by which an application can intercept events, such as messages, mouse actions, and keystrokes, and generally refers to a function provided by a software application that receives certain data before the normal or intended recipient of the data. The hook function can thus examine or modify certain data before passing on the data. Therefore, a hook function allows a software application to examine data before the data is passed to the intended recipient. A function that intercepts a particular type of event is known as a hook procedure. The hook procedure can act on each event it receives, and then modify or discard the event. The term 'hooking' is used herein to include, but not limited to, a range of techniques used to alter, or augment the behavior of an operating system, of applications, or of other software components by intercepting function calls, messages, or events passed between software components. A code that handles such intercepted function calls, events or messages is called a "hook". Hooking is used for many purposes, including debugging and extending functionality. Examples might include intercepting keyboard or mouse event messages before they reach an application, or intercepting operating system calls in order to monitor behavior, or modify the function of an application or another component. It is also widely used in benchmarking programs, for example, frame rate measuring in 3D games, where the output and input are done through hooking. Hooking is described, for example, in the presentations by High-Tech Bridge SA and titled: "*Userland Hooking in Windows*" dated August 2011, and "*Inline Hooking in Windows*" dated September 2011, both by Brian Mariani, and both incorporated in their entirety for all purposes as if fully set forth herein.

Physical modification. A hooking may be achieved by physically modifying an executable or library before an application is running through techniques of reverse engineering. This is typically used to intercept function calls to either monitor, or replace them entirely. For example, by using a disassembler, the entry point of a function within a module can be found. It can then be altered to instead dynamically load some other library module, and then have it execute desired methods within that loaded library. If applicable, another related approach of hooking can be achieved is by altering an import table of an executable. This table can be modified to load any additional library modules as well as changing what external code is invoked when a function is called by an application. An alternate method for achieving the function of hooking is by intercepting function calls through a wrapper library. When creating a wrapper, you make your own version of a library that an application loads, with all the same functionality of the original library that it will replace, so all the functions that are accessible are essentially the same between the original and the replacement. This wrapper library can be designed to call any of the functionality from the original library, or replace it with an entirely new set of logic.

Runtime Modification. Operating systems and software may provide the means to easily insert event hooks at runtime, as long as the process inserting the hook is granted enough permission to do so. Microsoft Windows allows inserting hooks that can be used to process or modify system events and application events for dialogs, scrollbars, and menus, as well as other items. It also allows a hook to insert, remove, process, or modify keyboard and mouse events. Linux provides another example where hooks can be used in a similar manner to process network events within the kernel through NetFilter. When such functionality is not provided, a special form of hooking employs intercepting library function calls that are made by a process. Function hooking is implemented by changing the very first few code instructions of the target function to jump to an injected code. Alternatively, on systems using the shared library concept, the interrupt vector table or the import descriptor table can be modified in memory.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, while others can modify the messages or stop their progress through the chain, restricting them from reaching the next hook procedure or a destination window.

Plug-in. A plug-in (or 'plugin', 'extension', or 'add-on'/'addon') is a software component that adds a specific feature to an existing software application, for example for enabling customization. The common examples are the plug-ins used in web browsers to add new features such as search-engines, virus scanners, or the ability to utilize a new file type such as a new video format. An 'Add-on' (or 'addon') is the general term for what enhances an application, and comprises snap-in, plug-in, theme, and skin. An extension add-on tailors the core features of an application by adding an optional module, whereas a plug-in add-on would tailor the outer layers of an application to personalize functionality. A theme or a skin add-on is a preset package containing additional or changed graphical appearance details, achieved by the use of a Graphical User Interface (GUI) that can be applied to a specific software and websites to suit the purpose, topic, or tastes of different users to customize the look and feel of a piece of computer software, or an operating system front-end GUI (and window managers).

Typically, the host application provides services which the plug-in can use, including a way for plug-ins to register themselves with the host application, and a protocol for the exchange of data with plug-ins. Plug-ins depend on the services provided by the host application and do not usually work by themselves. Conversely, the host application operates independently of the plug-ins, making it possible for end-users to add and update plug-ins dynamically without needing to make changes to the host application. The term 'plug-in' is used herein to include, but not limited to, a software extension, which is software that serves to extend the capabilities of, or data available to existing software application, it becomes included in the program. Therefore, after integration, extensions can be seen as part of the browser itself, tailored from a set of optional modules.

IPC. An Inter-Process Communication (IPC) (also be referred to as inter-thread communication and inter-application communication) is a set of methods for the exchange of data between multiple threads, in one or more processes. IPC methods may use message passing, synchronization, shared memory, and Remote Procedure Calls (RPC). IPC provides an environment that allows process cooperation, and may be used for providing information sharing, computational speedup, modularity, convenience, and privilege separation. In the Windows operating system environment, the IPC provides mechanisms for facilitating communications and data sharing between processes or applications.

Common IPC methods include file sharing, where a record (or any other information) stored on disk (or any other memory) can be accessed by name using any process; a signal which is an asynchronous notification sent to a process or to a specific thread within the same process in order to notify it of an event that occurred; a socket which is a data stream sent over a network interface, either to a different process on the same computer or to another computer, such as Internet sockets; a pipe (or pipeline) which is a two-way data stream interfaced through standard input and output, and is read character by character, commonly used in Unix-like computer operating systems; message queues, which are anonymous data stream similar to the pipe that stores and retrieves information in packets, providing an asynchronous communications protocol; a semaphore which is a variable or abstract data type that is used for controlling access to a common resource; a shared memory which is a memory that may be simultaneously accessed by multiple programs with an intent to provide communication among them or avoid redundant copies, such as where one process creates an area in RAM which other processes can access; and memory mapped file, where a file that is physically present on-disk, but can also be a device, shared memory object, or other resource that the operating system can reference through a file descriptor. Few IPC mechanisms are described in Chapter 9 of the Marko Vuskovic publication 'Operating Systems', entitled: "*INTERPROCESS COMMUNICATION*", which is incorporated in its entirety for all purposes as if fully set forth herein.

The Windows operating system supports IPC mechanisms such as a clipboard, where the clipboard acts as a central depository for data sharing among applications, so when a user performs a cut or copy operation in an application, the application puts the selected data on the clipboard in one or more standard, or application-defined formats, and any other application can then retrieve the data from the clipboard, choosing from the available formats that it understands; using Component Object Model (COM), where applications that use Object Linking and Embedding (OLE) manage compound documents can be used to call on other applications for data editing; Using Data Copy enabling an application to send information to another application using the WM_COPYDATA message; DDE protocol that enables applications to exchange data in a variety of formats; and mailslots providing one-way communication where processes write messages to their mailslot.

Browser Extension. A browser extension is a computer program that extends the functionality of a web browser in some way. Extensions can be created through the use of web technologies such as HTML, JavaScript, and CSS. Browser extensions can also improve the user interface of the web browser without directly affecting a viewable content of a web page, which can be achieved through a variety of add-ons such as toolbars and plug-ins. The syntax for extensions may differ from browser to browser, or at least enough different that an extension working on a browser does not work on another one.

Plug-ins add specific abilities into browsers using Application Programming Interfaces (APIs) allowing third parties to create plug-ins that interact with the browser. The original API was NPAPI, but subsequently Google introduced the PPAPI interface in Chrome. In addition, plug-ins allow browser extensions to perform tasks such as blocking ads, creating a secure online connection, and adding applications within a browser. Common browser plug-ins include the Adobe Flash Player, the QuickTime Player, and the Java plug-in, which can launch a user-activated Java applet on a web page to its execution a local Java virtual machine.

Sockets. A socket (a.k.a. 'network socket') is an endpoint of an IPC flow across a computer network. In the case the communications is based on IP (Internet Protocol), the network sockets are referred to as Internet sockets. A socket API is an Application Programming Interface (API), usually provided by the operating system that allows application programs to control, and use network sockets. Internet socket APIs are usually based on the Berkeley sockets standard. A socket address is the combination of an IP address and a port number, similar to one end of a telephone connection in the combination of a phone number and a particular extension. Based on this address, internet sockets deliver incoming data packets to the appropriate application process or thread. Sockets are further described in a University of Toronto, Department of Computer Science presentation entitled: "*Tutorial on Socket Programming*" by Amin Tootoonchian, downloaded on August, 2014, and in the SAS Institute Inc. SHARE Session 5958 tutorial 'C Socket Programming Tutorial' entitled: "*Writing Client/Server Programs in C Using Sockets (A Tutorial) Part I*", by Greg Granger, dated February of 1998, which are both incorporated in their entirety for all purposes as if fully set forth herein.

An Internet socket is characterized by a unique combination of a Local socket address (Local IP address and port number), remote socket address (used for established TCP sockets), and the used Protocol, typically a transport protocol (e.g., TCP, UDP, raw IP, or others). Within the operating system and the application that created a socket, a socket is referred to by a unique integer value called a socket descriptor. The operating system forwards the payload of incoming IP packets to the corresponding application by extracting the socket address information from the IP and transport protocol headers and stripping the headers from the application data.

Several Internet socket types are available, such as Datagram sockets, also known as connectionless sockets, which use User Datagram Protocol (UDP), Stream sockets, also known as connection-oriented sockets, which use Transmission Control Protocol (TCP) or Stream Control Transmission Protocol (SCTP), and Raw sockets (or Raw IP sockets), typically available in routers and other network equipment. Here the transport layer is bypassed, and the packet headers are made accessible to the application. Other socket types are implemented over other transport protocols, such as Systems Network Architecture (SNA). Communicating local and remote sockets are called socket pairs. Each socket pair is described by a unique 4-tuple consisting of source and destination IP addresses and port numbers, i.e. of local and remote socket addresses. In the TCP case, each unique socket pair 4-tuple is assigned a socket number, while in the UDP case each unique local socket address is assigned a socket number.

The socket is primarily a concept used in the Transport Layer of the Internet model. Networking equipment such as routers and switches do not require implementations of the Transport Layer, as they operate on the Link Layer level (switches) or at the Internet Layer (routers). However, stateful network firewalls, network address translators, and proxy servers keep track of active socket pairs. Also in fair queuing, layer 3 switching and quality of service (QoS) support in routers, packet flows may be identified by extracting information about the socket pairs. Raw sockets are typically available in network equipment, and are used for routing protocols such as IGRP and OSPF, and in Internet Control Message Protocol (ICMP).

SaaS. Software as a Service (SaaS) is a Software Application (SA) supplied by a service provider, namely, a SaaS Vendor. The service is supplied and consumed over the Internet, thus eliminating requirements to install and run applications locally on a site of a customer as well as simplifying maintenance and support. It is particularly advantageous in massive business applications. Licensing is a common form of billing for the service, and it is paid periodically. SaaS is becoming ever more common as a form of SA delivery over the Internet and is being facilitated in a technology infrastructure called "Cloud Computing". In this form of SA delivery, where the SA is controlled by a service provider, a customer may experience stability and data security issues. In many cases the customer is a business organization that is using the SaaS for business purposes such as business software, hence, stability and data security are primary requirements.

The term "Cloud computing" as used herein is defined as a technology infrastructure facilitating supplement, consumption and delivery of IT services. The IT services are Internet based, and may involve elastic provisioning of dynamically scalable and time virtualized resources. The term "Software as a Service (SaaS)" as used herein in this application, is defined as a model of software deployment whereby a provider licenses an SA to customers for use as a service on demand. The term "customer" as used herein in this application, is defined as a business entity that is served by an SA, provided on the SaaS platform. A customer may be a person or an organization and may be represented by a user that responsible for the administration of the application in aspects of permissions configuration, user related configuration, and data security policy.

The term "SaaS Platform" as used herein in this application, is defined as a computer program that acts as a host to SAs that resides on it. Essentially, a SaaS platform can be considered as a type of specialized SA server. The platform manages underlying computer hardware and software resources, and uses these resources to provide hosted SAs with multi-tenancy and on-demand capabilities, commonly found in SaaS applications. Generally, the hosted SAs are compatible with SaaS platform and support a single group of users. The platform holds the responsibility for distributing the SA as a service to multiple groups of users over the internet. The SaaS Platform can be considered as a layer of abstraction above the traditional application server, creating a computing platform that parallels the value offered by the traditional operating system, only in a web-centric fashion. The SaaS platform responds to requirements of software developers. The requirements are to reduce time and difficulty involved in developing highly available SAs, and on-demand enterprise grade business SAs.

There is a requirement for protecting data stored in a memory from unauthorized use. The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of instructions, or data such as files, text, numbers, audio and video, as well as any other form of information represented as a string of bits or bytes. The physical means of storing information may be electrostatic, ferroelectric, magnetic, acoustic, optical, chemical, electronic, electrical, or mechanical. A memory may be in a form of Integrated Circuit (IC, a.k.a. chip or microchip). Alternatively or in addition, the memory may be in the form of a packaged functional assembly of electronic components (module). Such module may be based on a PCB (Printed Circuit Board) such as PC Card according to Personal Computer Memory Card International Association (PCM-CIA) PCMCIA 2.0 standard, or a Single In-line Memory Module (SIMM) (or DIMM) which is standardized under the JEDEC JESD-21C standard. Further, a memory may be in the form of a separately rigidly enclosed box such as a hard-disk drive.

Semiconductor memory may be based on Silicon-On-Insulator (SOI) technology, where a layered silicon-insulator-silicon substrate is used in place of conventional silicon substrates in semiconductor manufacturing, especially microelectronics, to reduce parasitic device capacitance and thereby improving performance SOI-based devices differ from conventional silicon-built devices in that the silicon junction is above an electrical insulator, typically silicon dioxide or sapphire (these types of devices are called silicon on sapphire, or SOS, and are less common). SOI-Based memories include Twin Transistor RAM (TTRAM) and Zero-capacitor RAM (Z-RAM).

A memory may be a volatile memory, where a continuous power is required to maintain the stored information such as RAM (Random Access Memory), including DRAM (Dynamic RAM) or SRAM (Static RAM), or alternatively be a non-volatile memory which does not require a maintained power supply, such as Hash memory, EPROM, EEPROM and ROM (Read-Only Memory). Volatile memories are commonly used where long-term storage is required, while non-volatile memories are more suitable where fast memory access is required. Volatile memory may be dynamic, where the stored information is required to be periodically refreshed (such as re-read and then re-written) such as DRAM, or alternatively may be static, where there is no need to refresh as long as power is applied, such as RAM. In some cases, a small battery is connected to a low-power consuming volatile memory, allowing its use as a non-volatile memory.

A memory may be read/write (or mutable storage) memory where data may be overwritten more than once and typically at any time, such as RAM and Hard Disk Drive (HDD). Alternatively, a memory may be an immutable storage where the information is retained after being written once. Once written, the information can only be read and typically cannot be modified, sometimes referred to as Write Once Read Many (WORM). The data may be written at the time of manufacture of the memory, such as mask-programmable ROM (Read Only Memory) where the data is written into the memory a part of the IC fabrication, CD-ROM (CD—Compact Disc) and DVD-ROM (DVD—Digital Versatile Disk, or Digital Video Disk). Alternately, the data may be once written to the "write once storage" at some point after manufacturing, such as Programmable Read-Only Memory (PROM) or CD-R (Compact Disc-Recordable).

A memory may be accessed using "random access" scheme, where any location in the storage can be accessed at any moment in typically the same time, such as RAM, ROM or most semiconductor-based memories. Alternatively, a memory may be of "sequential access" type, where the pieces of information are gathered or stored in a serial order, and therefore the time to access a particular piece of information or a particular address depends upon which piece of information was last accessed, such as magnetic tape-based storage. Common memory devices are location-addressable, where each individually accessible unit of data in storage is selected using its numerical memory address. Alternatively, a memory may be file-addressable, where the information is divided into files of variable length, and a file is selected by using a directory or file name (typically a human readable name), or may be content-addressable, where each accessible unit of information is selected based on the stored content (or part of). File addressability and content addressability commonly involves additional software (firmware), hardware, or both.

Various storage technologies are used for the medium (or media) that actually holds the data in the memory. Commonly in use are semiconductor, magnetic, and optical mediums. Semiconductor based medium is based on transistors, capacitors or other electronic components in an IC, such as RAM, ROM and Solid-State Drives (SSDs). A currently popular non-volatile semiconductor technology is based on a flash memory, and can be electrically erased and reprogrammed. The flash memory is based on NOR- or NAND-based single-level cells (SLC) or multi-level cells (MLC), made from floating-gate transistors. Non-limiting examples of applications of flash memory include personal and laptop computers, PDAs, digital audio players (MP3 players), digital cameras, mobile phones, synthesizers, video games consoles, scientific instrumentation, industrial robotics and medical electronics. The magnetic storage uses different types of magnetization on a magnetic or a ferromagnetic coated surface as a medium for storing the information. The information is accessed by read/write heads or other transducers. Non-limiting examples of magnetic-based memory are Floppy disk, magnetic tape data storage and HDD.

In optical storage, typically an optical disc is used that stores information in deformities on the surface of a circular disc, and the information is read by illuminating the surface with a laser diode and observing the reflection. The deformities may be permanent (read only media), formed once (write once media) or reversible (recordable or read/write media). Non-limiting examples of read-only storage, commonly used for mass distribution of digital information such as music, audio, video or computer programs, include CD-ROM, BD-ROM (BD—Blu-ray Disc) and DVD-ROM. Non-limiting examples of write-once storage are CD-R, DVD-R, DVD+R, and BD-R, and non-limiting examples of recordable storage are CD-RW (Compact Disc-ReWritable), DVD-RW, DVD+RW, DVD-RAM, and BD-RE (Blu-ray Disc Recordable Erasable). Another non-limiting example is magneto-optical disc storage, where the magnetic state of a ferromagnetic surface stores the information, which can be read optically. 3D optical data storage is an optical data storage, in which information can be recorded and/or read, with three-dimensional resolution.

A storage medium may be removable, designed to be easily removed from, and easily installed or inserted into the computer by a person, typically without the need for any tool, and without needing to power off the computer or the associated drive. Such a capability allows for archiving, transporting data between computers, and buying and selling software. The medium may be read using a reader or player that reads the data from the medium, may be written by a burner or writer, or may be used for writing and reading by a writer/reader commonly referred to as a drive. Commonly in the case of magnetic or optical based mediums, the medium has the form factor of a disk, which is typically a round plate on which the data is encoded, respectively known as magnetic disc and optical disk. The machine that is associated with reading data from and writing data onto a disk is known as a disk drive. Disk drives may be internal (integrated within the computer enclosure) or may be external (housed in a separate box that connects to the computer). Floppy disks, that can be read from or written on by a floppy drive, are a non-limiting example of removable magnetic storage medium, and CD-RW (Compact Disc-ReWritable) is a non-limiting example of a removable optical disk. A commonly-used non-volatile removable semiconductor based storage medium is referred to as a memory card. A memory card is a small storage device, commonly based on flash memory, and can be read by a suitable card reader.

A memory may be accessed via a parallel connection or bus (wherein each data word is carried in parallel on multiple electrical conductors or wires), such as PATA, PCMCIA or EISA, or via serial bus (such as bit-serial connections) such as USB or Ethernet based on IEEE802.3 standard, or a combination of both. The connection may further be wired in various topologies such as multi-drop (electrical parallel), point-to-point, or daisy-chain. A memory may be powered via a dedicated port or connector, or may be powered via a power signal carried over the bus, such as SATA or USB.

A memory may be provided according to a standard, defining its form factor (such as its physical size and shape) and electrical connections (such as power and data interface). A standard-based memory may be easily inserted to, or removed from, a suitable corresponding slot (a.k.a. expansion slots) of a computer or other digital device. In one non-limiting example, a memory card using a PC Card form factor according to PCMCIA 2.0 (or JEIDA 4.1) is used that is suitable for mounting into a corresponding PCMCIA-compatible slot, supporting 16 or 32-bit width interface, and connected via 68 pin connectors. Similarly, CardBus according to PCMCIA 5.0 may be used. In one non-limiting example, the memory is in the form of SD (Secure Digital) Card, based on standard by SD Card Association (SDA), which is commonly used in many small portable devices such as digital video camcorders, digital cameras, audio players and mobile phones. Other types of memory cards may be equally used, such as CompactFlash (CF), MiniSD card, MicroSD Card, and xD-Picture Card.

In another non-limiting example, a memory may be provided as a USB drive (such as a USB Flash drive), which is a portable enclosed card that plugs into a computer USB port and communicates with a USB host. Such flash-based memory drives are commonly referred to as "thumb drives", "jump drives", and "memory sticks". Such USB mass storage devices and others are described in "*Chapter* 1: *Mass Storage basics*", downloaded October 2011 from: http://www.lvr.com/files/usb_mass_storage_chapter_1.pdf, which is incorporated in its entirety for all purposes as if fully set forth herein. In another non-limiting example, the memory is designed to fit into a drive bay in a computer enclosure. Commonly such drive bays are standard-sized, and used to store disk drives. The drives may be usually secured with screws or using a tool-less fasteners. A current popular standard is the 3.5 inches (3.5") bays, which dimensions are specified in SFF standard specifications SFF-8300 and SFF-8301, which were incorporated into the EIA (Electronic Industries Association) standard EIA-470.

Traditionally, computer-related storage was categorized to main memory, secondary and tertiary storages, having different latency (access time), capacity, and size. The main memory (or primary memory or internal memory) referred to the memory that was directly accessible by the CPU, and typically stored the program to be executed by the processor. The secondary storage (or external memory or auxiliary storage) referred to a memory which was not directly accessible to the CPU and thus required input/output channels, commonly offering larger storage capacity than the main memory. The tertiary storage involved mass storage media, commonly associated with a dismount removable media, used for archiving rarely accessed information. The latency of accessing a particular location is typically nanoseconds for primary storage, milliseconds for secondary storage, and seconds for tertiary storage. The capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote giga=$2^{30}$=$1024^3$=1,073,741,824, and the prefix 'T' is used to denote tera=$2^{40}$=$1024^4$=1,099,511, 627,776.

A memory may be Direct-Attached Storage (DAS), where the memory is directly connected to a host, computer, server, or workstation, commonly without a network in between. Common examples involve a number of hard disk drives (HDD) connected to a processor or a computer through a Host Bus Adapter (HBA). Commonly, serial and point-to-point connections are used, such as SATA, eSATA, SCSI, SAS and Fibre Channel. Alternatively, a memory can be part of a Network-attached Storage (NAS), wherein a self-contained file level storage (typically arranged as a server) is connected to a network, providing data sharing to other devices (such as heterogeneous clients), commonly via a network device such as a hub, switch or router. NAS is specialized for its task by its hardware, software, or both, and thus provides faster data access, easier administration, and simple configuration. NAS is typically associated with an LAN, and provides an Ethernet interface based on IEEE802.3 standard may be used such as 10/100BaseT, 1000BaseT/TX (gigabit Ethernet), 10 gigabit Ethernet (10 GE or 10 GbE or 10 GigE per IEEE Standard 802.3ae-2002as standard), 40 Gigabit Ethernet (40 GbE), or 100 Gigabit Ethernet (100 GbE as per Ethernet standard IEEE P802.3ba). In another alternative, a memory may be part of a Storage Area Network (SAN), which is a high-speed (commonly dedicated) network (or sub-network) for sharing storage devices, such as disk mays, tape libraries and optical jukeboxes. The SAN allows multiple computers or servers to access multiple storage devices using a network such as WAN or LAN. SAN often utilizes a Fibre Channel fabric topology, made up of a number of Fibre Channel switches.

Blu-ray Disc (official abbreviation BD) is an optical disc storage medium designed to supersede the DVD format, where blue laser is used to read the disc, allowing information to be stored at a greater density than is possible with the longer-wavelength red laser used for DVDs. The disc diameter is 120 mm and the disc thickness is 1.2 mm of plastic optical disc, the same size as DVDs and CDs. Blu-ray Discs contain 25 GB (23.31 GiB) per layer, with dual layer discs (50 GB) being the norm for feature-length video discs. Triple layer discs (100 GB) and quadruple layers (128 GB) are available for BD-XL Blu-ray re-writer drives. The Blu-ray technology and its uses are described in the White Paper "Blu-ray Disc Format, 4. Key Technologies", by Blu-ray Disc Founders, August 2004, in the brochure entitled: "*Blu-ray Technology—DISCover the infinite storage media*", by DISC Archiving Systems B.V., 2010, and in a Whitepaper entitled: "*Sustainable Archival Storage—The Benefits of Optical Archiving*", by DISC Archiving Systems B.V., downloaded from www.disc-group.com, which are all incorporated in their entirety for all purposes as if fully set forth herein.

Today, Hard Disk Drives (HDD) are used as secondary storage in general purpose computers, such as desktop personal computers and laptops. An HDD is a non-volatile, random access digital data storage device, featuring rotating rigid platters on a motor-driven spindle within a protective enclosure. The enclosure may be internal to the computer system enclosure, or external. Data is magnetically read from, and written to, the platter by read/write heads that float on a film or air above the platters. The HDDs are typically interfaced using high-speed interfaces, commonly of a serial type. Common HDDs structure, characteristics, operation, form factors, and interfacing are described in "Hard-Disk Basics" compiled from PCGUIDE.COM by Mehedi Hasan, which is incorporated in its entirety for all purposes as if fully set forth herein. Most SSDs include a controller that incorporates the electronics that bridge the NAND memory components to the host computer. The controller is an embedded processor that executes firmware-level code and is one of the most important factors of SSD performance. Functions performed by the controller include Error correction (ECC), Wear leveling, Bad block mapping, Read scrubbing and read disturb management, Read and write caching, and Garbage collection. Information about SSD technology, marketing and applications are provided in Martin B., Dell entitled: "*DELL Solid State Disk (SSD) Drive—Storage Solutions for Select Poweredge Server*", May 2009, in Janukowicz J., Reisel D., White-Paper entitled: "*MLC Solid State Drives: Accelerating the Adoption of SSDs*", IDC #213730, September 2008, and in Dufrasne B., Blum K, Dubberke U., IBM Corp. Redbooks Redpaper entitled: "*DS8000: Introducing Solid State Drives*" (2009), which are all incorporated in their entirety for all purposes as if fully set forth herein.

The connection of peripherals and memories, such as HDD, to a processor may be via a bus. A communication link (such as Ethernet, or any other LAN, PAN or WAN communication link) may also be regarded as bus herein. A bus may be an internal bus (a.k.a. local bus), primarily designed to connect a processor or CPU to peripherals inside a computer system enclosure, such as connecting components over the motherboard or backplane. Alternatively, a bus may be an external bus, primarily intended for connecting the processor or the motherboard to devices and peripherals external to the computer system enclosure. Some buses may be doubly used as internal or as external buses. A bus may be of parallel type, where each word (address or data) is carried in parallel over multiple electrical conductors or wires; or alternatively, may be bit-serial, where bits are carried sequentially, such as one bit at a time. A bus may support multiple serial links or lanes, aggregated or bonded for higher bit-rate transport. Non-limiting examples of internal parallel buses include ISA (Industry Standard architecture); EISA (Extended ISA); NuBus (IEEE 1196); PATA—Parallel ATA (Advanced Technology Attachment) variants such as IDE, EIDE, ATAPI, SBus (IEEE 1496), VESA Local Bus (VLB), PCI and PC/104 variants (PC/104, PC/104 Plus, and PC/104 Express). Non-limiting examples of internal serial buses include PCIe (PCI Express), Serial ATA (SATA), SMBus, and Serial Peripheral Bus (SPI) bus. Non-limiting examples of external parallel buses include HIPPI (HIgh Performance Parallel Interface), IEEE-1284 ('Centronix'), IEEE-488 (a.k.a. GPIB—General Purpose Interface Bus) and PC Card/PCMCIA. Non-limiting examples of external serial buses include USB (Universal Serial Bus), eSATA and IEEE 1394 (a.k.a. Firewire). Non-limiting examples of buses that can be internal or external are Futurebus, Infini-Band, SCSI (Small Computer System Interface), and SAS (Serial Attached SCSI).

The bus medium may be based on electrical conductors, commonly copper wires based cable (may be arranged as twisted-pairs) or a fiber-optic cable. The bus topology may use point-to-point, multi-drop (electrical parallel) and daisy-chain, and may further be based on hubs or switches. A point-to-point bus may be full-duplex, providing simultaneous, two-way transmission (and sometimes independent) in both directions, or alternatively a bus may be half-duplex, where the transmission can be in either direction, but only in one direction at a time. Buses are further commonly characterized by their throughput (data bit-rate), signaling rate, medium length, connectors, and medium types, latency, scalability, quality-of-service, devices per connection or channel, and supported bus-width. A configuration of a bus for a specific environment may be automatic (hardware or software based, or both), or may involve user or installer activities such as software settings or jumpers. Recent buses are self-repairable, where a spare connection (net) is provided which is used in the event of a malfunction in a connection. Some buses support hot-plugging (sometimes known as hot swapping), where a connection or a replacement can be made, without significant interruption to the system, or without the need to shut-off any power. A well-known example of this functionality is the Universal Serial Bus (USB) that allows users to add or remove peripheral components such as a mouse, keyboard, or printer.

A bus may be defined to carry a power signal, either in separate dedicated cable (using separate and dedicated connectors), or commonly over the same cable carrying the digital data (using the same connector). Typically dedicated wires in the cable are used for carrying a low-level DC power level, such as 3.3 VDC, 5 VDC, 12 VDC and any combination thereof. A bus may support master/slave configuration, where one connected node is typically a bus master (e.g., the processor or the processor-side), and other nodes (or node) are bussed slaves. A slave may not connect or transmit to the bus until given permission by the bus master. A bus timing, strobing, synchronization, or clocking information may be carried as a separate signal (e.g., clock signal) over a dedicated channel, such as separate and dedicated wired in a cable, or alternatively may use embedded clocking (a.k.a. self-clocking), where the timing information is encoded with the data signal, commonly used in line codes such as Manchester code, where the clock information occurs at the transition points. Any bus or connection herein may use proprietary specifications, or preferably be similar to, based on, substantially according to, or fully compliant with, an industry standard (or any variant thereof) such as those referred to as PCI Express, SAS, SATA, SCSI, PATA, InfiniBand, USB, PCI, PCI-X, AGP, Thunderbolt, IEEE 1394, FireWire, and Fibre Channel.

Fibre-Channel Fibre-Channel, or FC, is a gigabit-speed network technology primarily used for storage networking, and has recently become the standard connection type for storage area networks (SAN) in enterprise storage. Fibre-Channel is standardized in the T11 Technical Committee of the InterNational Committee for Information Technology Standards (INCITS), an American National Standards Institute (ANSI) accredited standards committee. Fibre Channel signaling can run on both twisted-pair copper wire and fiber-optic cables. Fibre Channel Protocol (FCP) is a transport protocol (similar to TCP used in IP networks) that predominantly transports SCSI commands over Fibre Channel networks. There are three major Fibre-Channel topologies, describing how a number of ports are connected together: Point-to-Point (FC-P2P), where two devices are connected directly to each other; Arbitrated loop (FC-AL) where all devices are in a loop or ring (similar to token ring networking); and Switched fabric (FC-SW), where devices or loops of devices are connected to Fibre Channel switches (similar conceptually to modern Ethernet implementations). Some Fibre-Channel devices support SFP transceiver, mainly with LC fiber connector, while some 1GFC devices use GBIC transceiver, mainly with SC fiber connector. Fibre-Channel is further described in "*Fibre Channel Solutions Guide*" by FCIA—Fibre Channel Industry Association (www.fibrechannel.org, September 2010), "Technology Brief—Fibre Channel Basics", by Apple Computer, Inc. (May 2006), and Weimer T. of Unylogix, "*Fibre Channel Fundamentals*" (available for download from the Internet October 2011), which are all incorporated in their entirety for all purposes as if fully set forth herein.

InfiniBand InfiniBand is a switched fabric communications link used in high-performance computing and enterprise data centers. Its features include high throughput, low latency, quality of service and failover, and it is designed to be scalable InfiniBand offers point-to-point bidirectional serial links intended for the connection of processors with high-speed peripherals such as disks. On top of the point-to-point capabilities, InfiniB and also offers multicast operations as well. It supports several signaling rates, and links can be bonded together for additional throughput. The SDR serial connection's signaling rate is 2.5 gigabit per second (Gbit/s) in each direction per connection. DDR is 5 Gbit/s and QDR is 10 Gbit/s. FDR is 14.0625 Gbit/s and EDR is 25.78125 Gbit/s per lane. Lanes can be aggregated in units of 4 or 12, called 4× or 12×. A 12× QDR link therefore carries 120 Gbit/s raw, or 96 Gbit/s of useful data. As of 2009, most systems use a 4× aggregate, implying a 10 Gbit/s (SDR), 20 Gbit/s (DDR) or 40 Gbit/s (QDR) connections. InfiniBand uses a switched fabric topology, as opposed to a hierarchical switched network like traditional Ethernet architectures. Most of the network topologies are Fat-Tree (Clos), mesh or 3D-Torus. The InfiniBand technology is further described in the White Paper "*Introduction to InfiniBand™*", Mellanox technologies Inc., Document Number 2003WP Rev. 1.90, in the document by Grun P. of InfiniBand™ Trade Association: "*Introduction to InfiniBand™ for End Users*", 2010, and in the White Paper "*An Introduction to InfiniBand—Bringing I/O up to speed*" Rev. Number: v1.1, by JNI Corporation, Jan. 25, 2002, which are all incorporated in their entirety for all purposes as if fully set forth herein.

SATA. Serial ATA (SATA or Serial Advanced Technology Attachment) is a computer bus interface for connecting host bus adapters to mass storage devices such as hard disk drives and optical drives. Serial ATA industry compatibility specifications originate from. The Serial ATA International Organization (a.k.a. SATA-IO, serialata.org), and the specification defines three distinct protocol layers: physical, link, and transport. Serial ATA was designed to replace the older parallel ATA (PATA) standard (often called by the old name IDE), offering several advantages over the older interface: reduced cable size and cost (7 conductors instead of 40), native hot swapping, faster data transfer through higher signaling rates, and more efficient transfer through an (optional) I/O queuing protocol. SATA host-adapters and devices communicate via a high-speed serial cable over two pairs of conductors. In contrast, parallel ATA (PATA) uses a 16-bit wide data bus with many additional support and control signals, all operating at much lower frequency. To ensure backward compatibility with legacy ATA software and applications, SATA uses the same basic ATA and ATAPI command-set as legacy ATA devices.

Advanced Host Controller Interface (AHCI) is an open host controller interface published and used by Intel, which has become a de facto standard. It allows the use of the advanced features of SATA such as hotplugging and native command queuing (NCQ). If AHCI is not enabled by the motherboard and chipset, SATA controllers typically operate in "IDE emulation" mode, which does not allow features of devices to be accessed if the ATA/IDE standard does not support them. The SATA standard defines a data cable with seven conductors (3 grounds and 4 active data lines in two pairs) and 8 mm wide wafer connectors on each end. SATA cables can have lengths up to 1 meter (3.3 ft), and connect one motherboard socket to one hard drive. The SATA standard specifies a power connector that differs from the decades old, four-pin Molex connector found on pre-SATA devices. Like the data cable, it is wafer-based, but its wider 15-pin shape prevents accidental misidentification and forced insertion of the wrong connector type. Standardized in 2004, eSATA (the 'e' standing for external) provides a variant of SATA meant for external connectivity. While it has revised electrical requirements and that the connectors and cables are not identical with SATA, the protocol and logical signaling are compatible on the (internal) SATA level.

SATA uses a point-to-point architecture. The physical connection between a controller and a storage device is not shared among other controllers and storage devices. SATA defines multipliers, which allows a single SATA controller to drive multiple storage devices. The multiplier performs the function of a hub; the controller and each storage device are connected to the hub. The SATA bus, protocol and applications are further described in a paper entitled: "*Serial ATA technology, Technology Brief 4th edition*", by Hewlett-Packard Development Company, L.P., TC1108815, October 2011, in a white paper entitled: "*External Serial ATA*", by Silicon Image, Inc., September 2004, in Krotov I. Redpaper entitled: "IBM System x Server Disk Drive Interface Technology", IBM Corp. Document REDP-4791-00, Oct. 10, 2011, entitled: "*Serial ATA Advanced Host Controller Interface (AHCI)*", Revision 1.0, downloaded from Intel website, October 2011, and a white-paper entitled: "*Serial ATA—A comparison with Ultra ATA Technology*", downloaded from the web site www.seagate.com on October 2011, which are all incorporated in their entirety for all purposes as if fully set forth herein.

Handling the SATA protocol may be performed by the processor of the device, or by the SATA interface, or by both, where each component is involved with different protocol related functionality or different protocol layer. The SATA interface components handle the SATA protocol physical layer (PHY), and thus may include a transceiver (transmitter+receiver), a serializer/de-serializer, a symbol aligner, a SERDES, data buffers, presence detection, and line-code encoding/decoding, and clocking mechanism. Similarly, the SATA interface components or the device processor (or both) may handle the link layer of the SATA protocol, such as handling out-of-band signaling, frame negotiation and arbitration, CRC calculation, flow control, frame acknowledgement and status, and data scrambling/descrambling. Further, the SATA interface components or the device processor (or both) may handle the transport layer of the SATA protocol such as receiving a FIS and decoding its type, as well as constructing and transmitting FIS, initialization, and error detection. The SATA interface components may use or may be based on TMS320C674x/OMAP-L1x Processor available from Texas Instruments Incorporated, described in the User's Guide named "*TMS320C674x/OMAP-L1x Processor Serial ATA (SATA) Controller*", Literature Number SPRUGGJBC dated March 2011, which is incorporated in its entirety for all purposes as if fully set forth herein.

An example of an SATA connection of an HDD 41 is shown in a view 40 in FIG. 4. The HDD 41 is connected via a bus power cable 46 and a bus data cable 47 to the motherboard 42, which may correspond to the computer 11 shown in FIG. 1. The bus power cable 46 includes two wires and terminates with power connectors 48a and 48b, respectively capable of mating with the motherboard mounted power connector 43a and the HDD power connector 43b. The data power cable 47 includes 5 wires, and terminates with data connectors 49a and 49b, respectively capable of mating with the motherboard mounted data connector 44a and the HDD power connector 44b. The HDD 41 connected via the power cable 46 and the data cable 47 to the motherboard 42 is shown in a view 40a in FIG. 4a. For example, the bus may be SATA bus. In this example, the data cable 47 is a SATA data cable having 7 conductors (instead of the 5 shown), 3 grounds and 4 active data lines arranged in two pairs (each carrying differential signaling). Connectors 49a and 49b are SATA data cable wafer-based connectors, mating with SATA data connectors 44a and 44b. Similarly, the power cable 46 is a SATA power cable having 5 conductors (instead of the 2 shown), and carrying 3.3 VDC, 5 VDC and 12 VDC. Connectors 48a and 48b are SATA power cable wafer-based connectors having 15 pins, mating with SATA power connectors 43a and 43b.

PCIe. PCI Express (Peripheral Component Interconnect Express), officially abbreviated as PCIe, is a computer expansion card standard designed to replace the older PCI, PCI-X, and AGP bus standards. PCIe has numerous improvements over the aforementioned bus standards, including higher maximum system bus throughput, lower I/O pin count and smaller physical footprint, better performance-scaling for bus devices, a more detailed error detection and reporting mechanism, and native hot plug functionality. More recent revisions of the PCIe standard support hardware I/O virtualization. The PCIe electrical interface is also used in a variety of other standards, most notably ExpressCard, a laptop expansion card interface. Format specifications are maintained and developed by the PCI-SIG (PCI Special Interest Group), a group of more than 900 companies that also maintain the Conventional PCI specifications. PCIe 3.0 is the latest standard for expansion cards that is available on mainstream personal computers.

Conceptually, the PCIe bus is like a high-speed serial replacement of the older PCI/PCI-X bus an interconnect bus using shared address/data lines. A key difference between a PCIe bus and the older PCI is the bus topology. PCI uses a shared parallel bus architecture, where the PCI host and all devices share a common set of address/data/control lines. In contrast, PCIe is based on point-to-point topology, with separate serial links connecting every device to the root complex (host). Due to its shared bus topology, access to the older PCI bus is arbitrated (in the case of multiple masters), and limited to 1 master at a time, in a single direction. A PCIe bus link supports full-duplex communication between any two endpoints, with no inherent limitation on concurrent access across multiple endpoints. In terms of bus protocol, PCIe communication is encapsulated in packets. The work of packetizing and de-packetizing data and status-message traffic is handled by the transaction layer of the PCIe port. Radical differences in electrical signaling and bus protocol require the use of a different mechanical form factor and expansion connectors (and thus, new motherboards and new adapter boards); PCI slots and PCIe slots are not interchangeable. The PCIe link between 2 devices can consist of anywhere from 1 to 32 lanes. In a multi-lane link, the packet data is striped across lanes, and peak data-throughput scales with the overall link width. The lane count is automatically negotiated during device initialization, and can be restricted by either endpoint. For example, a single-lane PCIe (x1) card can be inserted into a multi-lane slot (x4, x8, etc.), and the initialization cycle auto-negotiates the highest mutually supported lane count. The link can dynamically down-configure the link to use fewer lanes, thus providing some measure of failure tolerance in the presence of bad or unreliable lanes. The PCIe standard defines slots and connectors for multiple widths: x1, x4, x8, x16, and x32. As a point of reference, a PCI-X (133 MHz 64 bit) device and PCIe device at 4-lanes (x4), Gen1 speed have roughly the same peak transfer rate in a single-direction: 1064 MB/sec. The PCIe bus has the potential to perform better than the PCI-X bus in cases where multiple devices are transferring data communicating simultaneously, or if communication with the PCIe peripheral is bidirectional. A lane is commonly composed of a transmit pair and a receive pair, each of differential lines. Each lane is composed of 4 wires or signal paths, meaning conceptually, each lane is a full-duplex byte stream, transporting data packets in 8-bit 'byte' format, between the endpoints of a link, in both directions simultaneously. Physical PCIe slots may contain from one to thirty-two lanes, in powers of two (1, 2, 4, 8, 16 and 32). Lane counts are written with an x prefix (e.g., x16 represents a sixteen-lane card or slot), with x16 being the largest size in common use.

A PCIe card fits into a slot of its physical size or larger (maximum x16), but may not fit into a smaller PCIe slot (x16 in an x8 slot). Some slots use open-ended sockets to permit physically longer cards and negotiate the best available electrical connection. The number of lanes actually connected to a slot may also be less than the number supported by the physical slot size. A non-limiting example is a x8 slot that actually only runs at x1. These slots allow any x1, x2, x4 or x8 cards, though only running at x1 speed. This type of socket is called a x8 (x1 mode) slot, meaning, it physically accepts up to x8 cards, but only runs at x1 speed. The advantage is that it can accommodate a larger range of PCIe cards without requiring motherboard hardware to support the full transfer rate. This keeps the design and implementation costs down. The PCIe uses double-sided edge-connector, and power is provided over the same connection. PCI Express Mini Card (also known as Mini PCI Express, Mini PCIe, and Mini PCI-E) is a replacement for the Mini PCI form factor, based on PCI Express. PCI Express Mini Cards are 30×50.95 mm. There is a 52 pin edge connector, consisting of two staggered rows on a 0.8 mm pitch. Each row has 8 contacts, a gap equivalent to 4 contacts, then a further 18 contacts. A half-length card is also specified 30×26.8 mm Cards have a thickness of 1.0 mm (excluding components). AdvancedTCA is a PCIe variant providing a complement to CompactPCI for larger applications; supports serial based backplane topologies. AMC: a complement to the AdvancedTCA specification; supports processor and I/O modules on ATCA boards (×1, ×2, ×4 or ×8 PCIe). It has the connector bracket reversed so it cannot fit in a normal PCI Express socket, but is pin compatible, and may be inserted if the bracket is removed. FeaturePak is a tiny expansion card format (43×65 mm) for embedded and small form factor applications; it implements two x1 PCIe links on a high-density connector along with USB, I2C, and up to 100 points of I/O. Thunderbolt is a variant from Intel that combines DisplayPort and PCIe protocols in a form factor compatible with Mini DisplayPort. The PCIe is further described in the tutorial, "*PCI Express—An Overview of the PCI Express Standard*", National Instruments, Published Aug. 13, 2009, in the White Paper entitled: "*Creating a PCI Express™ Interconnect*", Intel Corporation, Downloaded October 2011, in a paper entitled: "*PHY Interface for the PCI Express™ Architecture*", Version 2.00, Intel Corporation 2007, and in Cooper S., One Stop Systems, Presentation entitled: "*Utilizing PCI Express Technology*", Downloaded October 2011, which are all incorporated in their entirety for all purposes as if fully set forth herein.

Serial Attached SCSI (SAS) is a computer bus based on a point-to-point serial protocol that replaces the parallel SCSI bus technology, and uses the standard SCSI command set. SAS offers backwards-compatibility with second-generation SATA drives. SATA 3 Gbit/s drives may be connected to SAS backplanes, but SAS drives may not be connected to SATA backplanes. The T10 technical committee of the International Committee for Information Technology Standards (INCITS) develops and maintains the SAS protocol; the SCSI Trade Association (SCSITA) promotes the technology. SASA is based on full-duplex with link aggregation (4-ports wide at 24 Gbit/s) over 10 meters external cable, and may connect to 255 device port expanders. At the physical layer, the SAS standard defines the connectors and voltage levels. The physical characteristics of the SAS wiring and signaling are compatible with and have loosely tracked that of SATA up to the present 6 Gbit/s rate, although SAS defines more rigorous physical signaling specifications as well as a wider allowable differential voltage swing intended to support longer cabling. While SAS-1.0/SAS-1.1 adopted the physical signaling characteristics of SATA at the 1.5 Gbit/s and 3 Gbit/s rates, SAS-2.0 development of a 6 Gbit/s physical rate led the development of an equivalent SATA speed. According to the SCSI Trade Association, 12 Gbit/s is slated to follow 6 Gbit/s in a future SAS-3.0 specification.

A typical Serial Attached SCSI system consists of an initiator, a target, a Service Delivery Subsystem and expanders. An Initiator is a device that originates device-service and task-management requests for processing by a target device and receives responses for the same requests from other target devices. Initiators may be provided as an on-board component on the motherboard (as is the case with many server-oriented motherboards) or as an add-on host bus adapter. A Target is a device containing logical units and target ports that receives device service and task management requests for processing, and sends responses for the same requests to initiator devices. A target device could be a hard disk or a disk array system. A Service Delivery Subsystem is the part of an I/O system that transmits information between an initiator and a target. Typically, cables connecting an initiator and target with or without expanders and backplanes constitute a service delivery subsystem. Expanders are devices that form part of a service delivery subsystem and facilitate communication between SAS devices. Expanders facilitate the connection of multiple SAS End devices to a single initiator port. An initiator may connect directly to a target via one or more PHYs. Nearline SAS or NL-SAS drives are enterprise SATA drives with an SAS interface, head, media, and the rotational speed of traditional enterprise-class SATA drives with the fully capable SAS interface typical for classic SAS drives.

The components known as Serial Attached SCSI Expanders (SAS Expanders) facilitate communication between large numbers of SAS devices. Expanders contain two or more external expander-ports. Each expander device contains at least one SAS Management Protocol target port for management and may contain SAS devices itself. For example, an expander may include a Serial SCSI Protocol target port for access to a peripheral device. An expander is not necessary to interface an SAS initiator and target, but allows a single initiator to communicate with more SAS/SATA targets. Edge expanders can do direct table routing and subtractive routing. A fanout expander can connect up to 255 sets of edge expanders, known as an edge expander device set, allowing for even more SAS devices to be addressed. The subtractive routing port of each edge expanders will be connected to the PHYs of a fanout expander. The SAS is further described in White Paper "serial Attached SCSI and Serial Compatibility", Intel Corporation Doc. 0103/OC/EW/PP/1K—254402-001, 2002, in the Product Manual "Serial Attached SCSI (SAS) Interface Manual", Publication number: 100293071, Rev. B, Seagate Technology LLC, May 2006, and in Technology Brief, 4$^{th}$ edition, "Serial Attached SCSI technologies and architectures", Hewlett-Packard Development Company, L.P., TC0000772, August 2011, which are all incorporated in their entirety for all purposes as if fully set forth herein.

USB. USB (Universal Serial Bus) is an industry standard developed in the mid-1990s that defines the cables, connectors, and protocols used for connection, communication and power supply between computers and electronic devices. USB was designed to standardize the connection of computer peripherals, such as keyboards, pointing devices, digital cameras, printers, portable media players, disk drives, and network adapters for personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices. A USB system has an asymmetric design, consisting of a host, a multitude of downstream USB ports, and multiple peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including the hub devices (if present), may be connected to a single host controller. USB devices are linked in series through hubs. There always exists one hub known as the root hub, which is built into the host controller. A physical USB device may consist of several logical sub-devices that are referred to as device functions. A host assigns one, and only one device address to a function.

USB device communication is based on pipes (logical channels). A pipe is a connection from the host controller to a logical entity, found on a device, and named an endpoint. Because pipes correspond 1-to-1 to endpoints, the terms are sometimes used interchangeably. A USB device can have up to 32 endpoints: 16 into the host controller and 16 out of the host controller. The USB standard reserves one endpoint of each type, leaving a theoretical maximum of 30 for normal use. USB devices seldom have this many endpoints. There are two types of pipes: stream and message pipes, depending on the type of data transfer: isochronous transfers, at some guaranteed data rate (often, but not necessarily, as fast as possible), but with possible data loss (e.g., real-time audio or video), interrupt transfers, relating devices that need guaranteed quick responses (bounded latency) (e.g., pointing devices and keyboards), bulk transfers, where large sporadic transfers using all remaining available bandwidth, but with no guarantees on bandwidth or latency (e.g., file transfers), and control transfers, typically used for short, simple commands to the device, and a status response, used, for example, by the bus control pipe number 0. Endpoints are grouped into interfaces and each interface is associated with a single device function. An exception to this is endpoint zero, which is used for device configuration, and is not associated with any interface. A single device function composed of independently controlled interfaces is called a composite device. A composite device only has a single device address because the host only assigns a device address to a function.

USB Power. The USB 1.x and 2.0 specifications provide a 5 V supply on a single wire from which connected USB devices may draw power. The specification provides for no more than 5.25 V, and no less than 4.75 V (5 V±5%) between the positive and negative bus power lines. For USB 3.0, the voltage supplied by low-powered hub ports is 4.45-5.25 V. A unit load is defined as 100 mA in USB 2.0, and 150 mA in USB 3.0. A device may draw a maximum of 5 unit loads (500 mA) from a port in USB 2.0; 6 (900 mA) in USB 3.0. There are two types of devices: low-power and high-power. A low-power device draws at most 1 unit load, with minimum operating voltage of 4.4 V in USB 2.0, and 4 V in USB 3.0. A high-power device draws the maximum number of unit loads permitted by the standard. Every device functions initially as low-power, but the device may request high-power and will get it if the power is available on the providing bus. Some devices, such as high-speed external disk drives, require more than 500 mA of current, and therefore cannot be powered from one USB 2.0 port. Such devices usually come with a Y-shaped cable that has two USB connectors to be plugged into a computer. With such a cable, a device can draw power from two USB ports simultaneously. A bus-powered hub initializes itself at 1 unit load, and transitions to maximum unit loads after it completes hub configuration. Any device connected to the hub will draw 1 unit load regardless of the current draw of devices connected to other ports of the hub (i.e. one device connected on a four-port hub will draw only 1 unit load despite the fact that more unit loads are being supplied to the hub). A self-powered hub will supply maximum supported unit loads to any device connected to it. In addition, the VBUS will present 1 unit load upstream for communication if parts of the hub are powered down.

USB supports the following signaling rates (the terms speed and bandwidth are used interchangeably, and "high-" is alternatively written as "hi-"). A low-speed rate of 1.5 Mbit/s (~483 kB/s) is defined by USB 1.0. It is very similar to full-bandwidth operation except each bit takes 8 times as long to transmit. The full-speed rate of 12 Mbit/s (~1.43 MB/s) is the basic USB data rate defined by USB 1.0. All USB hubs support full-bandwidth. A high-speed (USB 2.0) rate of 480 Mbit/s (~57 MB/s) was introduced in 2001. All hi-speed devices are capable of falling back to full-bandwidth operation if necessary; i.e., they are backward compatible with USB 1.1. Connectors are identical for USB 2.0 and USB 1.x. A SuperSpeed (USB 3.0) provides a rate of 5.0 Gbit/s (~596 MB/s). USB 3.0 connectors are generally backwards compatible, but include new wiring and full duplex operation. USB signals are transmitted on a twisted-pair data cable with 90 Ω±15% characteristic impedance, labeled D+ and D−. Prior to USB 3.0, half-duplex differential signaling was used to reduce the effects of electromagnetic noise on longer lines. Transmitted signal levels are 0.0 to 0.3 volts for low and 2.8 to 3.6 volts for high in full-bandwidth and low-bandwidth modes, and −10 to 10 mV for low and 360 to 440 mV for high in hi-bandwidth mode. In FS mode, the cable wires are not terminated, but the HS mode has termination of 45 Ω to ground, or 90 Ω differential to match the data cable impedance, reducing interference due to signal reflections. USB 3.0 introduces two additional pairs of shielded twisted wire and new, mostly interoperable contacts in USB 3.0 cables, for them. They permit the higher data rate, and full duplex operation. The USB is further described in "*Universal Serial Bus* 3.0 *Specification*", Revision 1.0, Jun. 6, 2011, downloaded from www.usb.org, and in Peacock C., "*USB in a Nutshell*", 3$^{rd}$ Release, November 23, which are all incorporated in their entirety for all purposes as if fully set forth herein. USB 2.0 is described in Cypress Semiconductor Corporation Application Note AN57294 Document No. 001-57294 Rev. *E (2014) entitled: USB 101: "An *Introduction to Universal Serial Bus* 2.0", which is incorporated in its entirety for all purposes as if fully set forth herein.

A view 50 in FIG. 5 shows of a laptop 51, which may correspond to the computer 10 shown in FIG. 1. The laptop 51 is shown to include a display screen 58 (may be corresponding to display 17 in FIG. 1), a keyboard 59 (may be corresponding to input device 18 in FIG. 1) and a touch-pad surface 56 (may be corresponding to cursor control 18a in FIG. 1). The laptop 51 may connect to peripherals via two USB ports, shown as standard Type-A receptacles 53a and 53b. FIG. 5 further shows a USB flash drive 52, having a standard Type-A plug 54. Such a flash drive typically consists of a small printed circuit board carrying the circuit elements and a USB connector, insulated electrically and protected inside a plastic, metal, or rubberized case which can be carried in a pocket or on a key chain, for example. The USB connector may be protected by a removable cap, or by retracting into the body of the drive, although it is not likely to be damaged if unprotected. Most flash drives use a standard type-A USB connection allowing plugging into a port on a personal computer, but drives may be using other interfaces. Such a flash drive 52 commonly includes a flash-based memory. View 50a is a close view of the flash drive 52 and the USB connections. Referring now to FIG. 5a showing a view 55 of the flash drive 52 inserted into the laptop 51 using the USB connection, and view 55a is a close view of the USB connection. The connection allows for the bi-directional serial communication between the flash drive 52 and the laptop 51, and further provides mechanical support and power feeding to the USB drive 52.

HID. The USB Human Interface Device class (USB HID class) is a part of the USB specification for computer peripherals which specifies a device class (a type of computer hardware) for human interface devices such as keyboards, mice, game controllers, and alphanumeric display devices, and allows designers to create USB-based devices and applications without the need for custom driver development. The USB HID class describes devices used with nearly every modem computer. Many predefined functions exist in the USB HID class, and these functions allow hardware manufacturers to design a product to USB HID class specifications, and expect it to work with any software that also meets these specifications. The USB HID is described in a USB Implementers' Forum Oct. 28, 2004 publication Version 1.12, entitled: "*HID Usage Tables*", and in Silicon Laboratories Application Note AN249 Rev. 0.5 3/11 (2011), entitled: "*Human Interface Device Tutorial*", which are both incorporated in their entirety for all purposes as if fully set forth herein.

CDC. USB Communications Device Class (or USB CDC) is a composite Universal Serial Bus device class that includes more than one interface, such as a custom control interface, data interface, audio, or mass storage related interfaces. The communications device class is used primarily for modems, but also for ISDN and fax machines and telephony applications for performing regular voice calls. Devices of this class are also implemented in embedded systems such as mobile phones so that a phone may be used as a modem, fax or network port, and the data interfaces are generally used to perform bulk data transfer. CDC is described in a paper by the USB IF Revision 1.1 (Errata 1) dated Nov. 3, 2010, entitled: "*Universal Serial Bus CDC subclass Specification for Wireless Mobile Communications Devices*", which is incorporated in its entirety for all purposes as if fully set forth herein.

MSD. The USB Mass Storage Device class (also known as USB MSC or UMS) is a set of computing communications protocols defined by the USB Implementers Forum (USB—IF) that makes a USB device accessible to a host computing device and enables file transfers between the host and the USB device. To a host, the USB device acts as an external hard drive: the protocol set interfaces with a number of storage devices. MSD is described in a paper by the USB IF Revision 1.4 dated Feb. 19, 2010, entitled: "*Universal Serial Bus Mass Storage Class—Specification Overview*", which is incorporated in its entirety for all purposes as if fully set forth herein.

USB Endpoint. A physical USB device may consist of several logical sub-devices that are referred to as device functions. A single device function composed of independently controlled interfaces is called a composite device. A composite device only has a single device address because the host only assigns a device address to a function. A composite device may provide several functions, for example, a webcam (video device function) with a built-in microphone (audio device function). An alternative is a compound device, in which the host assigns each logical device a distinctive address and all logical devices connect to a built-in hub that connects to the physical USB cable. Endpoints are grouped into interfaces and each interface is associated with a single device function. An exception to this is endpoint zero, which is used for device configuration and is not associated with any interface.

USB device communication is based on pipes (logical channels). A pipe is a connection from the host controller to a logical entity, found on a device, and named an endpoint. Because pipes correspond 1-to-1 to endpoints, the terms are sometimes used interchangeably. USB endpoints actually reside on the connected device: the channels to the host are referred to as pipes. A USB device could have up to 32 endpoints (16 IN, 16 OUT), though its rare to have so many. An endpoint is defined and numbered by the device during initialization (the period after physical connection called "enumeration"), and so is relatively permanent, whereas a pipe may be opened and closed.

An endpoint of a pipe is addressable with a tuple (device_address, endpoint_number) as specified in a TOKEN packet that the host sends when it wants to start a data transfer session. If the direction of the data transfer is from the host to the endpoint, an OUT packet (a specialization of a TOKEN packet) having the desired device address, and endpoint number is sent by the host. If the direction of the data transfer is from the device to the host, the host sends an IN packet instead. If the destination endpoint is a unidirectional endpoint whose manufacturer's designated direction does not match the TOKEN packet (e.g. the manufacturer's designated direction is IN while the TOKEN packet is an OUT packet), the TOKEN packet is ignored. Otherwise, it is accepted and the data transaction can start. A bi-directional endpoint, on the other hand, accepts both IN and OUT packets. When a USB device is first connected to a USB host, the USB device enumeration process is started. The enumeration starts by sending a reset signal to the USB device. The data rate of the USB device is determined during the reset signaling. After reset, the USB device's information is read by the host, and the device is assigned a unique 7-bit address. If the device is supported by the host, the device drivers needed for communicating with the device are loaded, and the device is set to a configured state. If the USB host is restarted, the enumeration process is repeated for all connected devices.

Enumeration. When a USB device is first connected to a host, the USB enumeration process is initiated. Enumeration is the process of exchanging information between the device and the host that includes learning about the device. Additionally, the enumeration includes assigning an address to the device, reading descriptors (which are data structures that provide information about the device), and assigning and loading a device driver. This entire process can occur in seconds. Once this process is complete, the peripheral device is ready to transfer data to the host. USN Enumeration is described in Future Technology Devices International Limited (FTDI) Technical Note TN_113, Document Reference No. :FT_000180, Version 1.0, Issue Date: 2009 Oct. 28, entitled: "*Simplified Description of USB Device Enumeration*", and in Free Software Foundation, Inc. document version 1.2, November 2002 by Shakthi Kannan entitled:

"*USB Simply Buffered (USB)—Device Enumeration*", which are both incorporated in their entirety for all purposes as if fully set forth herein.

The transfer of digital data signals between two devices, systems, or components, commonly makes use of a line driver for transmitting the signal to the conductors serving as the transmission medium connecting the two modules, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors, and pin identification and pin-out. In one example, the module circuit can use an industry or other standard used for interfacing serial binary data signals. Preferably the line drivers and line receivers and their associated circuitry will be protected against electrostatic discharge (ESD), electromagnetic interference (EMI/EMC), and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC.

A line driver typically converts the logic levels used by the module internal digital logic circuits (e.g., CMOS, TTL, LSTTL and HCMOS) to a signal to be transmitted. In order to improve the common-mode noise rejection capability, and to allow higher data rates, a balanced and differential interface may be used. For example, a balanced interface line driver may be an RS-422 driver such as RS-422 transmitter MAX3030E, available from Maxim Integrated Products, Inc. of Sunnyvale, Calif., U.S.A., described in the data sheet "±15 *kV ESD-Protected, 3.3V Quad RS-422 Transmitters*" publication number 19-2671 Rev.0 October 2002, which is incorporated in its entirety for all purposes as if fully set forth herein. A line receiver typically converts the received signal to the logic levels used by the module internal digital logic circuits (e.g., CMOS, TTL, LSTTL and HCMOS). For example, industry standard TIA/EIA-422 (a.k.a. RS-422) can be used for a connection, and the line receiver may be an RS-422 compliant line receiver, such as RS-422 receiver MAX3095, available from Maxim Integrated Products, Inc. of Sunnyvale, Calif., U.S.A., described in the data sheet "±15 *kV ESD-Protected,* 10 *Mbps,* 3*V/5V, Quad RS-422/RS-*485 *Receivers*" publication number 19-0498 Rev.1 10/00, which is incorporated in its entirety for all purposes as if fully set forth herein. American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled: "*TIA/EIA-422-B Overview*" and in B&B Electronics publication "RS-422 and RS-485 Application Note" dated June 2006, which are incorporated in their entirety for all purposes as if fully set forth herein.

A transmission scheme may be based on the serial binary digital data standard Electronic Industries Association (EIA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. For example, RS-232 transceiver MAX202E may be used, available from Maxim Integrated Products, Inc. of Sunnyvale, Calif., U.S.A., described in the data sheet "±12 kV ESD-Protected, +5V RS-232 Transceivers" publication number 19-0175 Rev. 6 Mar. 2005, which is incorporated in its entirety for all purposes as if fully set forth herein.

A 2-way communication interface may use the EIA/TIA-485 (formerly RS-485), which supports balanced signaling and multipoint/multi-drop wiring configurations. Overview of the RS-422 standard can be found in National Semiconductor Application Note 1057 publication AN012882 dated October 1996 and titled: "Ten ways to Bulletproof RS-485 Interfaces", which is incorporated in their entirety for all purposes as if fully set forth herein. In this case, RS-485 supporting line receivers and line driver are used, such as for example, RS-485 transceiver MAX3080 may be used, available from Maxim Integrated Products, Inc. of Sunnyvale, Calif., U.S.A., described in the data sheet "Fail-Safe, High-Speed (10 Mbps), Slew-Rate-Limited RS-485/RS-422 Transceivers" publication number 19-1138 Rev. 3 December 2005, which is incorporated in its entirety for all purposes as if fully set forth herein.

SPI/I$^2$C. I$^2$C (Inter-Integrated Circuit), is a multi-master, multi-slave, single-ended, serial computer bus, typically used for attaching lower-speed peripheral ICs to processors and microcontrollers. I²C uses only two bidirectional open-drain lines, Serial Data Line (SDA) and Serial Clock Line (SCL), pulled up with resistors. Typical voltages used are +5 V or +3.3 V although systems with other voltages are permitted. The I$^2$C reference design has a 7-bit or a 10-bit (depending on the device used) address space, and common I²C bus speeds are the 100 kbit/s standard mode and the 10 kbit/s low-speed mode, but arbitrarily low clock frequencies are also allowed. Recent revisions of I²C can host more nodes, and run at faster speeds (400 kbit/s Fast mode, 1 Mbit/s Fast mode plus or Fm+, and 3.4 Mbit/s High Speed mode).

The bus uses a clock (SCL) and data (SDA) lines with 7-bit addressing, and has two roles for nodes: master and slave, where master node is a node that generates the clock and initiates communication with slaves, and a slave node is a node that receives the clock and responds when addressed by the master. The bus is a multi-master bus which means, any number of master nodes can be present. Additionally, master and slave roles may be changed between messages (after a STOP is sent). There may be four potential modes of operation for a given bus device, although most devices only use a single role and its two modes: 'master transmit': master node is sending data to a slave, 'master receive': master node is receiving data from a slave, 'slave transmit': slave node is sending data to the master, and 'slave receive': slave node is receiving data from the master. The master is initially in master transmit mode by sending a start bit followed by the 7-bit address of the slave it wishes to communicate with, which is finally followed by a single bit representing whether it wishes to write(0) to or read(1) from the slave. The I²C is described in NXP Semiconductors N.V. user manual document Number UM10204 Rev. 6 released 4 Apr. 2014, entitled: "*UM*10204*—I*$^2$*C-bus specification and*

*user manual*", which is incorporated in its entirety for all purposes as if fully set forth herein.

The Serial Peripheral Interface (SPI) bus is a synchronous serial communication interface specification used for short distance communication, primarily in embedded systems, such as for directly connecting components to a processor. SPI devices communicate in full duplex mode using a master-slave architecture with a single master, where the master device originates the frame for reading and writing, and multiple slave devices are supported through selection with individual slave select (SS) lines. Also known as a 'four-wire serial bus', the SPI bus specifies four logic signals: SCLK: Serial Clock (output from master), MOSI: Master Output, Slave Input (output from master), MISO: Master Input, Slave Output (output from slave), and SS: Slave Select (active low, output from master). SPI and I²C buses are described in Renesas Application Note AN0303011/Rev1.00 (September 2003) entitled: "*Serial Peripheral Interface (SPI) & Inter-IC (IC2) (SPI_I2C)*", in CES 466 presentation (downloaded July 2015) entitled: "Serial Peripheral Interface", in Embedded Systems and Systems Software 55:036 presentation (downloaded July 2015) entitled: "*Serial Interconnect Buses—I²C (SMB) and SPI*", and in Microchip presentation (downloaded July 2015) entitled: "*SPI™—Overview and Use of the PICmicro Serial Peripheral Interface*", which are all incorporated in their entirety for all purposes as if fully set forth herein.

GPIO. General-Purpose Input/Output (GPIO) is a generic pin on an integrated circuit whose behavior, including whether it is an input or output pin, can be controlled by the user at run-time. GPIO pins have no special purpose defined, and go unused by default, so that the system integrator building a full system that uses the chip might find it useful to have a handful of additional digital control lines, and having these available from the chip can avoid the effort of having to arrange additional circuitry to provide them.

The work station 7 shown in the view la may use USB, as shown in a view 60 in FIG. 6, for connecting the motherboard main enclosure 6 to the peripherals, such as to the display 5, the computer pointing device ('mouse') 3, the keyboard 2, or the printer 4. In such a case, a USB cable is used for connection to the computer enclosure 6, such as a cable 61 connecting the pointing device 3 to the computer enclosure 6. In such a case, the computer enclosure 6 include a USB host interface, and each of the USB peripherals (such as the pointing device 6 or the printer 4) includes a mating USB peripheral interface.

A block diagram of USB (hardware and software) related functionalities is shown in a view 70 in FIG. 7. A USB host device 71, which may correspond to the computer 6 in the view 60 or to the computer system 10 in FIG. 1, is employing an USB Host Interface 71a, is connectable to an USB peripheral device 72 using a USB Peripheral Interface 72a and employing an endpoint 79, which may correspond to the pointing device 3, the printer 4, the display 5 or the keyboard 2, using a USB cable 78, which may correspond to the USB cable 61 shown in the view 60. The USB Host Interface 71a refers to all the USB host related functionalities, which may be implemented in hardware or software that are required in order for the host 71 to interconnect as a host device using the USB standard. Similarly, the USB Peripheral Interface 72a refers to all the USB host related functionalities, which may be implemented in hardware or software, that are required in order for the peripheral device 72 to interconnect as a peripheral device using the USB standard. The USB connection allows the host device 71 to use the functionality provided by an endpoint 79 (or function) in the peripheral device 72.

The physical point-to-point connection use connecting an USB connector 75b (which may correspond to connector 54 in the view 55a) of the USB cable 78 to a mating USB host connector 75a (which may correspond to connector 53a in the view 55a) in the host device 71, and connecting the other end of the cable 78 having an USB connector 75c to a mating USB peripheral connector 75d in the USB peripheral device 72. The physical layer of the USB protocol is handled by the USB transceiver 77a (connected to the USB host connector 75a) in the host device 71 and the USB transceiver 77b (connected to the USB host connector 75d) in the peripheral device 72. The USB transceivers (transceiver=transmitter+receiver) typically include a USB line driver and a USB line receiver, as well as voltage level shifter. Each of the USB transceivers may use, be based on, or may include a USB transceiver model No. MAX3349EA available from Maxim Integrated Products (Headquartered in Sunnyvale, Calif., U.S.A.) described in a data sheet by Maxim Integrated Products (2006) No. 19-0667; Rev. 0; October 2006, entitled: "*USB 2.0 Full-Speed Transceiver with UART Multiplexing Mode*", or the USB transceiver may use, be based on, or may include a USB transceiver model No. TUSB1310 available from Texas Instruments (Headquartered in Dallas, Tex., U.S.A.) described in a Texas Instruments data manual No. SLLSE16E (Revised May 2011) entitled: "*TUSB1310—USB 3.0 Transceiver*", which are both incorporated in their entirety for all purposes as if fully set forth herein.

The lower USB protocol layers (except the physical layer) are typically handled by a USB controller as part of a USB interface, and involve creating and identifying packets, supporting the various transfer modes, providing or extracting the clock and other timing mechanisms. Commonly, a USB controller component or IC embeds USB transceiver (such as the USB transceivers 77a or 77b) in the same component or IC. The USB host interface 71a employs a USB host controller 69, and the USB peripheral interface 72a employs a USB peripheral controller 74. The USB host controller 69 may use, be based on, or may include, a USB host controller model No. FT313H available from Future Technology Devices International Limited (Headquartered in Glasgow, Scotland) and described in a data sheet Document No. FT_000589 Version 1.2 dated 2013 entitled: "*FT313H USB2.0 HS Host Controller*", which is incorporated in its entirety for all purposes as if fully set forth herein. The USB peripheral controller 74 may use, be based on, or may include, a USB peripheral controller model No. MAX3420E available from Maxim Integrated Products, Inc. (Headquartered in Glasgow, Scotland) and described in a data sheet Document No. 19-3781; Rev 4, February 2015 entitled: "*MAX3420E—USB Peripheral Controller with SPI Interface*", which is incorporated in its entirety for all purposes as if fully set forth herein.

Commands, messages, or any other information directed to the end-point 79 is received at the USB host controller 69 from a processor 66 (which may correspond to the processor 12 in the computer 10) connected over an internal bus 67 (which may correspond to the bus 13 in the computer 10), that may be PCIe type bus. Alternatively or in addition, the data to be sent may be obtained over a connection 67a by the processor 66 that in turn sends the data to the USB connection. The commands, messages, or any other information is handled according to the USB protocol by the USB host controller 69, transmitted using a line driver by the USB transceiver 77a over the USB cable 78 and received by a line receiver in the USB transceiver 77b in the peripheral device 72, where the information sent is identified and extracted by the USB peripheral controller 74, and transferred for handling by the end-point 79. Similarly, status, messages, or any other information from the end-point 79 is received as a payload by the USB peripheral controller 74, and transmitted by the USB transceiver 77b over the USB cable 78 to the USB host interface 71a in the host device 71, and identified and extracted by the USB host controller 69, to be received and used by the processor 66 or by other component or device via the connection 67a.

A control and support of the USB host operation typically use USB host drivers 76b that may be integrated with the operating system (OS) 76a. For example, the operating system (OS) 76a may consist, may be based on, or may use WDM or Linux based as shown in arrangement 30, or may consist, may be based on, or may use FreeRTOS™, and the USB host drivers are integrated as part of the drivers stack 36. Alternatively or in addition, the operating system 76a may consist, may be based on, or may be UNIX based as shown in arrangement 30a and the USB host drivers are integrated as part of the stack 36a. Commonly, the OS 76a and the USB host drivers 76b are stored in a memory 73 (which may correspond to the main memory 15a or the storage device 15c in the computer 10) connected to the processor 66, so they can be accessed and executed by the processor 66. The USB host drivers 76b may use, may be based on, or may consist of, the TivaWare™ library available from Texas Instruments Incorporated (Headquartered in Dallas, Tex., U.S.A.) described in a Texas Instruments Incorporated 2015 User's Guide No. SW-TM4C-DRL-UG-2.1.1.71 entitled: "*TivaWare™ Peripheral Driver Library*", which is incorporated in its entirety for all purposes as if fully set forth herein.

Electrical power to the host device 71 is required for its described functions. A dedicated power source may be used such as a battery or a dedicated connection to an external DC power source via a power supply that contains a DC/DC converter. In another embodiment, a power supply 64 is power fed from the AC power supply via AC plug connector 62 and an AC power cord 63, and thus may include an AC/DC converter, for converting the AC power (commonly 115VAC/60 Hz or 220 VAC/50 Hz) into the required DC voltage or voltages. Such power supplies are known in the art, and typically involves converting 120 or 240 volt AC supplied by a power utility company to a well-regulated lower voltage DC for electronic devices. In one embodiment, power supply 64 is integrated into a single device or circuit, in order to share common circuits. Further, the power supply 64 may include a boost converter, such as a buck-boost converter, charge pump, inverter and regulators as known in the art, as required for conversion of one form of electrical power to another desired form and voltage. While power supply 64 (either separated or integrated) can be an integral part and housed within the host device 71 enclosure, it may be enclosed as a separate housing connected via cable to the camera assembly. For example, a small outlet plug-in step-down transformer shape can be used (also known as wall-wart, "power brick", "plug pack", "plug-in adapter", "adapter block", "domestic mains adapter", "power adapter", or AC adapter). Further, power supply 64 may be a linear or switching type.

The USB power signal carried over the USB cable 78 is produced by the USB source 26a, which is power fed from power supply 64, and is controlled by the USB host controller 69 via the connection 68. The USB power signal is terminated at a USB sink 26b that is part of the USB peripheral interface 72a in the peripheral device 72 serving as the USB power signal end point. In case of a self-powered peripheral device 72, a local battery, or an external AC or DC power source is used for electrically powering the peripheral device 72 hardware circuitry, commonly using a power supply (not shown in the figure) similar to the host device 71 power supply 64. Alternatively, the peripheral device 72 is a bus-powered device, powered only from the USB power signal carried over the USB cable 78, as shown in an arrangement 70a in FIG. 7a. In addition to the USB sink 26b functionality, a power supply 64a powered from the USB power signal, typically including a DC/DC converter for converting between the USB power voltage level and the required voltages required by the peripheral device 72 electronic circuits, such as logic levels 3.3 VDC or 5 VDC. The power supply 64a may electrically power feed both the USB peripheral interface 72a and the end point 79 circuits.

PLD. A Programmable Logic Device (PLD) is an electronic component used to build reconfigurable circuits. A PLD may be reconfigured by programming in the field by a user to provide a logic function. Examples of PLDs include PAL (Programmable Array Logic), GAL (Generic Array Logic), CPLD (Complex Programmable Logic Device), and FPGA (Field-Programmable Gate Array). A PLD is effectively a combination of a logic device and a memory device, where the memory is used to store the pattern that was given to the chip during programming. The memory is typically electrically programmable and eraseable, may be volatile or non-volatile, and is commonly an integrated circuit using common storage technology such as Silicon antifuses, SRAM, EPROM or EEPROM cells, or Flash memory. Further, the memory may be internal to the PLD or external to it. The programming typically uses a programming language such as Verilog and VHDL.

A CPLD is a PLD with complexity between that of PALs and FPGAs, and architectural features of both. The building block of a CPLD is the macrocell, which contains logic implementing disjunctive normal form expressions and more specialized logic operations, thus forming the logic functions with sea-of-gates (for example, a sum of products). Typically, a CPLD contain on-chip non-volatile memory. An FPGA is a PLD that contains programmable logic components called "logic blocks", and a hierarchy of reconfigurable interconnects that allow the blocks to be wired together. Logic blocks can be configured to perform complex combinational functions, or merely simple logic gates like AND and XOR. In most FPGAs, the logic blocks also include memory elements, which may be simple flip-flops or complete blocks of memory. In many cases, an FPGA uses a memory external to the component.

PLDs such as CPLD and FPGA are field programmable, allowing a user to change the logic per specific needs, and further for updating the programming by storing a new content into the PLD associated memory, being internal or external to the device. A processor (or a direct memory) is connected to the PLD associated memory, and writes the programming content into it. In case of malware in the system or an error in the communication link, the written content may be damaged, similar to the above discussion regarding writing to a peripheral device such as an HDD.

Oscillator. An electronic oscillator is an electronic circuit that produces a periodic, oscillating electronic signal, often a sine wave or a square wave. Oscillators typically convert direct current (DC) from a power supply to an alternating current signal, and are widely used in many electronic devices. Common examples of signals generated by oscillators include signals broadcast by radio and television transmitters, clock signals that regulate computers and quartz clocks, and the sounds produced by electronic beepers and video games. There are two main types of electronic oscillator: the linear or harmonic oscillator, and the nonlinear or relaxation oscillator. A feedback linear oscillator commonly includes an amplifier with its output fed back into its input through a filter. The most common form of linear oscillator is an electronic amplifier such as a transistor or op amp connected in a feedback loop with its output fed back into its input through a frequency selective electronic filter to provide positive feedback. When the power supply to the amplifier is first switched on, electronic noise in the circuit provides a signal to get oscillations started. The noise travels around the loop and is amplified and filtered until very quickly it becomes a sine wave at a single frequency.

Feedback oscillator circuits can be classified according to the type of frequency selective filter they use in the feedback loop. In an RC oscillator circuit, the filter is a network of resistors and capacitors, and are mostly used to generate lower frequencies, for example, in the audio range. Common types of RC oscillator circuits are the phase shift oscillator and the Wien bridge oscillator. In an LC oscillator circuit, the filter is a tuned circuit (often called a tank circuit; the tuned circuit is a resonator) consisting of an inductor (L) and capacitor (C) connected together. Charge flows back and forth between the capacitor's plates through the inductor, so the tuned circuit can store electrical energy oscillating at its resonant frequency. LC oscillators are often used at radio frequencies, when a tunable frequency source is necessary, such as in signal generators, tunable radio transmitters and the local oscillators in radio receivers. Typical LC oscillator circuits are the Hartley, Colpitts, and Clapp circuits. In a crystal oscillator circuit the filter is a piezoelectric crystal (commonly a quartz crystal having a very high Q-factor). The crystal mechanically vibrates as a resonator, and its frequency of vibration determines the oscillation frequency. Negative feedback oscillators are using, in addition to the feedback oscillators that use two-port amplifying active elements such as transistors and op amps, devices with negative resistance, such as magnetron tubes, tunnel diodes, lambda diodes and Gunn diodes.

Crystal Oscillator. A crystal oscillator is an electronic oscillator circuit that uses the mechanical resonance of a vibrating crystal of piezoelectric material to create an electrical signal with a very precise frequency. This frequency is commonly used to keep track of time (as in quartz wristwatches), to provide a stable clock signal for digital integrated circuits, and to stabilize frequencies for radio transmitters and receivers. The most common type of piezoelectric resonator used is the quartz crystal, so oscillator circuits incorporating them became known as crystal oscillators, but other piezoelectric materials including polycrystalline ceramics are used in similar circuits. Quartz crystals are manufactured for frequencies from a few tens of kilohertz to hundreds of megahertz. More than two billion crystals are manufactured annually. Most are used for consumer devices such as wristwatches, clocks, radios, computers, and cellphones. Quartz crystals are also found inside test and measurement equipment, such as counters, signal generators, and oscilloscopes.

The crystal oscillator circuit sustains oscillation by taking a voltage signal from the quartz resonator, amplifying it, and feeding it back to the resonator. The rate of expansion and contraction of the quartz is the resonant frequency, and is determined by the cut and size of the crystal. When the energy of the generated output frequencies matches the losses in the circuit, an oscillation can be sustained. An oscillator crystal has two electrically conductive plates, with a slice or tuning fork of quartz crystal sandwiched between them. During startup, the controlling circuit places the crystal into an unstable equilibrium, and due to the positive feedback in the system, any tiny fraction of noise starts to get amplified, ramping up the oscillation. The crystal resonator can also be seen as a highly frequency-selective filter in this system; it will only pass a very narrow subband of frequencies around the resonant one, attenuating everything else. Eventually, only the resonant frequency will be active. As the oscillator amplifies the signals coming out of the crystal, the signals in the crystal's frequency band will become stronger, eventually dominating the output of the oscillator. The narrow resonance band of the quartz crystal filters out all the unwanted frequencies.

Quartz crystal resonators and oscillators are described in a tutorial presentation by John R. Vig (dated January 2000) SLCET-TR-88-1 (Rev. 8.4.2)—AD-A328861 (revised) entitled: "Quartz Crystal Resonators and Oscillators—For Frequency Control and timing Applications", in a tutorial presentation by Olie Manchini (of Frequency Electronics, Inc.) in IEEE Long Island Chapter on Mar. 18, 2004 entitled: "*Tutorial—Precision Frequency Generation Utilizing OCXO and Rubidium Atomic Standards with Applications for Commercial, Space, Military, and Challenging Environments*", and in Microchip Technology Inc. 2002 Application Note DS00826A entitled: "*Crystal Oscillator Basics and Crystal Selection for rfPIC™ and PlCmicro® Devices*", which are both incorporated in their entirety for all purposes as if fully set forth herein.

Clock signal. In electronics circuits and especially in synchronous digital circuits, a clock signal is a particular type of signal that oscillates between a high and a low state, and is utilized like a metronome to coordinate actions of circuits. A clock signal is typically produced by a clock generator, which typically consists of, or uses, an oscillator such as a quartz oscillator. The most common clock signal is in the form of a square wave with a 50% duty cycle, usually with a fixed, constant frequency, and circuits using the clock signal for synchronization may become active at either the rising edge, falling edge, or, in the case of double data rate, both in the rising and in the falling edges of the clock cycle. Most integrated circuits (ICs) of sufficient complexity use a clock signal in order to synchronize different parts of the circuit, cycling at a rate less than the worst-case internal propagation delays. In some cases, more than one clock cycle is required to perform a predictable action. As ICs become more complex, the problem of supplying accurate and synchronized clocks to all the circuits becomes increasingly difficult. The preeminent example of such complex chips is the microprocessor, the central component of modern computers, which relies on a clock from a crystal oscillator. The only exceptions are asynchronous circuits such as asynchronous CPUs.

The clock distribution network (or clock tree, when this network forms a tree) distributes the clock signal(s) from a common point to all the elements that need it. Clock signals are typically loaded with the greatest fanout, and operate at the highest speeds of any signal within the synchronous system. Since the data signals are provided with a temporal reference by the clock signals, the clock waveforms must be particularly clean and sharp. Furthermore, these clock signals are particularly affected by technology scaling, in that, long global interconnect lines become significantly more resistive as line dimensions are decreased. This increased line resistance is one of the primary reasons for the increasing significance of clock distribution on synchronous performance Finally, the control of any differences and uncertainty in the arrival times of the clock signals can severely limit the maximum performance of the entire system, and create catastrophic race conditions in which an incorrect data signal may latch within a register.

Most synchronous digital systems consist of cascaded banks of sequential registers with combinational logic between each set of registers. The functional requirements of the digital system are satisfied by the logic stages. Each logic stage introduces a delay that affect timing performance, and the timing performance of the digital design can be evaluated relative to the timing requirements by a timing analysis. Often special consideration must be made to meet the timing requirements. For example, the global performance and local timing requirements may be satisfied by the careful insertion of pipeline registers into equally spaced time windows, to satisfy critical worst-case timing constraints. The proper design of the clock distribution network helps ensure that critical timing requirements are satisfied and that no race conditions exist (see also clock skew).

LPF. A Low-Pass Filter (LPF) is a filter that passes signals with a frequency lower than a certain cutoff frequency, and attenuates signals with frequencies higher than the cutoff frequency. The amount of attenuation for each frequency depends on the filter design. Low-pass filters exist in many different forms, including electronic circuits (such as a hiss filter used in audio), anti-aliasing filters for conditioning signals prior to analog-to-digital conversion, digital filters for smoothing sets of data, acoustic barriers, bluffing of images, and so on. Low-pass filters provide a smoother form of a signal, removing the short-term fluctuations, and leaving the longer-term trend. An LPF may be structured as a Chebyshev filter, a Butterworth filter, a Bessel filter, or an Elliptic filter.

One simple first-order passive low-pass is an RC filter, where the filter circuit consists of a resistor in series with a load, and a capacitor in parallel with the load. The capacitor exhibits reactance, and blocks low-frequency signals, forcing them through the load instead. At higher frequencies, the reactance drops, and the capacitor effectively functions as a short circuit. Another example of a passive first order filter is an RL filter, which is an electric circuit composed of resistors and inductors driven by a voltage or current source. A first order RL circuit is composed of one resistor and one inductor, and is the simplest type of RL circuit. An example of a second order passive filter is an RLC filter that is an RLC circuit (the letters R, L and C can be in other orders), which is an electrical circuit consisting of a resistor, an inductor, and a capacitor, connected in series or in parallel. The RLC part of the name is due to those letters being the usual electrical symbols for resistance, inductance and capacitance respectively. Higher order passive filters may be used as well, in addition to active filters, such as filters using an operational amplifier, as described in National Semiconductors Corporation Application Note 779 (RRD-830M75, April 1991) entitled: "*A Basic Introduction to Filters— Active, Passive, and Switched-Capacitor*", which is incorporated in its entirety for all purposes as if fully set forth herein. Using LPF for filtering power lines is described in an article published 2004 by Power Electronics and Motion Control Council (EPE-PEMC-C) authored by K. S. Kostov et al. entitled: "*Designing Power Line Filters for DC-DC Converters*", which is incorporated in its entirety for all purposes as if fully set forth herein.

Galvanic Isolation. Galvanic isolation is a principle of isolating functional sections of electrical systems to prevent current flow; no direct conduction path is permitted. Energy or information can still be exchanged between the sections by other means, such as capacitance, induction, or electromagnetic waves, or by optical, acoustic, or mechanical means. Galvanic isolation is used where two or more electric circuits must communicate, but their grounds may be at different potentials. It is an effective method of breaking ground loops by preventing unwanted current from flowing between two units sharing a ground conductor. Galvanic isolation is also used for safety, preventing accidental current from reaching ground through a person's body.

Transformers couple by magnetic flux, where the primary and secondary windings of a transformer are not connected to each other (an autotransformer has a conductive connection between its windings and so does not provide isolation). The voltage difference that may safely be applied between windings without the risk of breakdown (the isolation voltage) is specified in kilovolts by an industry standard. While transformers are usually used to change voltages, isolation transformers with a 1:1 ratio are used in safety applications. Opto-isolators transmit information by light waves, where the sender (light source) and receiver (photosensitive device) are not electrically connected; typically, they are held in place within a matrix of opaque, insulating plastic. Isolation of digital signals is described in a Developer's Guide SLLA284A Revised November 2014 by Texas Instruments Incorporated entitled "Digital Isolator Design Guide", data-bus transformer-based isolators are described in a data sheet KMP_1600C_B05 published 2011 by Murata Power Solutions, Inc. entitled: "1600C & 1630C—*Quad Data-Bus Isolators*", and SPI isolator is described in a data sheet LT 0514 Rev. C by Linear Technology Corporation (downloaded July 2015) entitled: "*LTM2883—SPI/Digital or I$^2$C µModule Isolator with Adjustable±12.5V and 5V Regulated Power*", which are all incorporated in their entirety for all purposes as if fully set forth herein.

Malware. Malware, short for 'malicious software', is a general term used to refer to a variety of forms of hostile or intrusive software. Typically, a malware is software or program that is inserted into a system, usually covertly, with the intent of compromising the confidentiality, integrity, or availability of the victim's data, applications, or operating system or of otherwise annoying or disrupting the victim. Malware is commonly used or programmed by attackers to disrupt computer operation, gather sensitive information, or gain access to private computer systems. It can appear in the form of code, scripts, active content, firmware, and other software. Malware may be used to steal sensitive information of personal, financial, or business importance by black hat hackers with harmful intentions. Malware is sometimes used broadly against governments or corporations to gather guarded information, or to disrupt their operation in general. However, malware is often used against individuals to gain personal information such as social security numbers, bank or credit card numbers, and so on. Left unguarded, personal and networked computers can be at considerable risk of these threats. Malware includes computer viruses, ransomware, worms, Trojan horses, rootkits, backdoors, keyloggers, dialers, spyware, adware, malicious BHOs, rogue security software and other malicious programs. Some malware is disguised as genuine software, and may come from an official company website, or otherwise in the form of a useful or attractive program that has the harmful malware embedded in it along with additional tracking software. Further, as used herein, a malware will include any non-authentic software or firmware, such as software/firmware (or changes in such software) in a device that was not originally installed by the device manufacturer.

A computer virus is a form of malware that is designed to self-replicate, make copies of itself, and distribute the copies to other files, programs, or computers, without the user's consent. When executed, the virus replicates by inserting copies of itself (possibly modified) into other computer programs, data files, or the boot sector of the hard drive. Once this replication succeeds, the affected areas are then said to be "infected". Viruses often perform some type of harmful activity on infected hosts, such as stealing hard disk space or CPU time, accessing private information, corrupting data, displaying political or humorous messages on the user's screen, spamming their contacts, or logging their keystrokes. Virus writers commonly use social engineering, and exploit detailed knowledge of security vulnerabilities to gain access to their hosts' computing resources. Motives for creating viruses can include seeking profit, desire to send a political message, personal amusement, to demonstrate that a vulnerability exists in the software, for sabotage and denial of service, or simply because they wish to explore artificial life and evolutionary algorithms.

Ransomware (which when carried out correctly is called cryptoviral extortion, but is sometimes also called scareware) comprises a class of malware which restricts access to the computer system that it infects, and demands a ransom paid to the creator of the malware in order for the restriction to be removed. Some forms of ransomware encrypt files on the system's hard drive, while some may simply lock the system and display messages intended to coax the user into paying. Ransomware typically propagates like a conventional computer worm, entering a system through, for example, a downloaded file or a vulnerability in a network service. The program will then run a payload: such as one that will begin to encrypt personal files on the hard drive. Ransomware payloads, especially ones that do not encrypt files, utilize elements of scareware to coax the user into paying for its removal. The payload may, for example, display notices purportedly issued by companies or law enforcement agencies which falsely claim that the user's system had been used for illegal activities, or contains illegal content such as pornography, and unlawfully obtained software. In any case, the ransomware will attempt to extort money from the system's user by forcing them to purchase either a program to decrypt the files it had encrypted, or an unlock code which will remove the locks it had applied.

A computer worm is a standalone malware computer program that is completely self-contained and self-propagating, and replicates itself in order to spread to other computers. Often, it uses a computer network to spread itself, relying on security failures on the target computer to access it. Unlike a computer virus, it does not need to attach itself to an existing program. Worms usually cause at least some harm to the network, even if only by consuming bandwidth, whereas viruses usually corrupt or modify files on a targeted computer. Many worms that have been created are designed only to spread, and do not attempt to change the systems they pass through. However, even these "payload free" worms can cause major disruption by increasing network traffic and other unintended effects. A "payload" code in the worm is designed to do more than spread the worm—it might delete files on a host system (e.g., the ExploreZip worm), encrypt files in a cryptoviral extortion attack, or send documents via e-mail. A very common payload for worms is to install a backdoor on the infected computer to allow the creation of a "zombie" computer under control of the worm author. Networks of such machines are often referred to as botnets and are very commonly used by spam senders for sending junk email or to cloak their website's address. Backdoors can be exploited by other malware, including worms.

A 'Trojan horse', or 'Trojan', is a non-self-replicating type of malware program that appears to be benign but actually has a hidden malicious purpose, which commonly gains privileged access to the operating system while appearing to perform a desirable function but instead, drops a malicious payload, often including a backdoor allowing unauthorized access to the target's computer. These backdoors tend to be invisible to average users, but may cause the computer to run slow. Trojans do not attempt to inject themselves into other files like a computer virus, but may steal information, or harm their host computer systems. Trojans may use drive-by downloads or install via online games or internet-driven applications in order to reach target computers.

A rootkit is a collection of files that is installed on a system to alter the standard functionality of the system in a malicious and stealthy way. Often malicious, the rootkit is designed to hide the existence of certain processes or programs from the normal methods of detection, and enable continued privileged access to a computer. Rootkit installation can be automated, or an attacker can install it once they've obtained root or Administrator access. Obtaining this access is a result of a direct attack on a system, such as by exploiting a known vulnerability or password (either by cracking, privilege escalation, or social engineering). Once installed, it becomes possible to hide the intrusion as well as to maintain privileged access. Full control over a system means that existing software can be modified, including software that might otherwise be used to detect or circumvent it. Rootkit detection is difficult because a rootkit may be able to subvert the software that is intended to find it. Detection methods include using an alternative and trusted operating system, behavioral-based methods, signature scanning, difference scanning, and memory dump analysis. Removal can be complicated or practically impossible, especially in cases where the rootkit resides in the kernel; reinstallation of the operating system may be the only available solution to the problem. When dealing with firmware rootkits, removal may require hardware replacement, or specialized equipment.

Keystroke logging, often referred to as 'keylogging' or 'Keyboard Capturing', is the action of recording (or logging) or monitoring the keys struck on a keyboard, typically in a covert manner so that the person using the keyboard is unaware that their actions are being monitored. It also has very legitimate uses in studies of human-computer interaction. There are numerous keylogging methods, ranging from hardware and software-based approaches to acoustic analysis.

Spyware is a malware that is intended to violate a user's privacy, typically by gathering information about a person or organization without their knowledge, and that may send such information to another entity without the user's consent, or that asserts control over a computer without the consumer's knowledge. These programs may be designed to monitor users' web browsing, display unsolicited advertisements, or redirect affiliate marketing revenues to the spyware creator. "Spyware" is mostly classified into four types: system monitors, Trojans, adware, and tracking cookies. Spyware is mostly used for the purposes such as tracking and storing internet users' movements on the web, and serving up pop-up ads to internet users. Whenever spyware is used for malicious purposes, its presence is typically hidden from the user, and can be difficult to detect. Some spyware, such as keyloggers, may be installed by the owner of a shared, corporate, or public computer intentionally in order to monitor users. The functions of spyware can extend beyond simple monitoring. Spyware can collect almost any type of data, including personal information like Internet surfing habits, user logins, and bank or credit account information. Spyware can also interfere with user control of a computer by installing additional software, or redirecting Web browsers. Some spyware can change computer settings, which can result in slow Internet connection speeds, unauthorized changes in browser settings, or changes to software settings. Sometimes, spyware is included along with genuine software, and may come from a malicious website.

Spyware does not necessarily spread in the same way as a virus or worm because infected systems generally do not attempt to transmit, or copy the software to other computers. Instead, spyware installs itself on a system by deceiving the user, or by exploiting software vulnerabilities. Most spyware is installed without users' knowledge, or by using deceptive tactics. Spyware may try to deceive users by bundling itself with desirable software. Other common tactics are using a Trojan horse. Some spyware authors infect a system through security holes in the Web browser or in other software, so that when the user navigates to a Web page controlled by the spyware author, the page contains code that attacks the browser and forces the download and installation of the spyware.

A backdoor is a method of bypassing normal authentication procedures, securing illegal remote access to a computer, obtaining access to plaintext, and so on, while attempting to remain undetected. Commonly a backdoor is a malicious program that listens for commands on a certain Transmission Control Protocol (TCP) or User Datagram Protocol (UDP) port. Once a system has been compromised, one or more backdoors may be installed in order to allow easier unauthorized access in the future. Backdoors may also be installed prior to other malicious software, to allow attackers entry. A backdoor in a login system might take the form of a hard-coded user and password combination that gives access to the system. The backdoor may take the form of an installed program (e.g., Back Orifice) or may subvert the system through a rootkit.

Trusted System. A trusted system is a system that employs hardware, software and procedures for allowing its use to process a range of sensitive, personal, or classified information, and is assumed to be reasonably suited to performing its intended functions while being reasonably secured from intrusion and misuse, and to provide a reasonable level of availability, reliability, and correct operation, while adhering to commonly accepted security procedures. An untrusted system is a system that has not been evaluated, or examined for correctness and adherence to the security policy, and may include incorrect or malicious code that attempts to circumvent the security mechanisms.

Timestamp. A timestamp is a sequence of characters or encoded information identifying when a certain event occurred, usually giving date and time of day, sometimes accurate to a small fraction of a second, and refers to digital date and time information attached to the digital data. For example, computer files contain timestamps that tell when the file was last modified, and digital cameras add timestamps to the pictures they take, recording the date and time the picture was taken. A timestamp is the time at which an event is recorded by a computer, not the time of the event itself. In many cases, the difference may be inconsequential: the time at which an event is recorded by a timestamp (e.g., entered into a log file) should be close to the time of the event. Timestamps are typically used for logging events or in a Sequence of Events (SOE), in which case each event in the log or SOE is marked with a timestamp. In a file system such as a database, timestamp commonly mean the stored date/time of creation or modification of a file or a record. The ISO 8601 standard standardizes the representation of dates and times, which are often used to construct timestamp values; and IETF RFC 3339 defines a date and time format for use in Internet protocols using the ISO 8601 standard representation.

RTC. Real-Time Clock (RTC) ICs measure time, even when the power of the main device is off. During these times, RTC ICs draw power from an auxiliary battery or supercapacitor. Most modern RTC ICs reduce package pin count by supporting a serial interface. An example of an RTC IC is model No. DS1339A available from Maxim Integrated Products, Inc. (Headquartered in San Jose, Calif., U.S.A.), described in a data sheet No. 19-6425; Rev 2; January 2015 (2015) by Maxim Integrated Products, Inc. entitled: "*DS1339A—Low-Current, $I^2C$, Serial Real-Time Clock*", which is incorporated in its entirety for all purposes as if fully set forth herein, and may be used as described in a tutorial 5791 (dated Mar. 28, 2014) by Maxim Integrated Products, Inc. entitled: "*Tips for Writing Bulletproof Real-Time Clock Control Code*", which is incorporated in its entirety for all purposes as if fully set forth herein.

Video. Any video content herein may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. A intraframe or interframe compression may be used, and the compression may a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

The USB interface has become a ubiquitous interface technology in a range of electronic devices since the introduction of its first version in 1996. USB is universally adopted by the PC industry as the primary interface for computer peripherals, and it is projected that 3 billion units will be used by 2018, primarily driven by the need for faster data transmission speeds between peripheral devices and host computers. The popularity of USB can be attributed to its rapid evolution in sync with changing consumer needs over the years, while the ownership of electronic devices is on a steep rise with the number of electronic devices per person. This spiraling increase in electronic devices per capita is intensifying the need to exchange data among these devices. For instance, high-definition video recorders typically generate tens of gigabytes of data that have to be transferred to a personal computer for viewing, editing or archiving. Cameras need to connect to printers for printing captured images directly without downloading and storing onto computers. Portable media players, external HDDs and flash drives often store huge volumes of uncompressed images, audio and other digital files. Transferring such uncompressed and raw content from one device to another requires faster transfer rates. Additionally, user applications also demand better connectivity performance between PCs and advanced peripherals. The rapid proliferation of USB 3.0 enabled storage devices is also helping drive growth of the USB 3.0 technology, in particular with the introduction of high-bandwidth storage devices such as 64 GB flash drives and terabyte external HDs. Transfer of content from these storage devices to computers typically demands faster transmission speeds and high bandwidth capacity, which are provided by the USB 3.0 specification.

USB Threat. The USB interface standard conquered the world over the past two decades. Thanks to its versatility, and practically, USB devices are connected to, and in many cases even built into, virtually all computers. Almost any computer peripheral, from storage and input gadgets to healthcare devices, can connect over this ubiquitous technology, and many more device classes connect over USB to charge their batteries. However, since different device classes can plug into the same connectors, one type of device can turn into a more capable or malicious type without the user noticing. By simply reprogramming USB controller chip in a peripheral, one device type may be changed to another, such as to fully impersonate another device type, or to turn a device to a malicious one. For example, a USB device may emulate a keyboard and issue commands on behalf of the logged-in user, for example, to exfiltrate files or install malware. Such malware, in turn, can infect the controller chips of other USB devices connected to the computer. Further, a device may also spoof a network card, and change the computer's DNS setting to redirect traffic. Furthermore, a modified thumb drive or external hard disk may, upon detecting that the computer is starting up, boot a small virus, which infects the computer operating system prior to boot.

Once infected, computers and their USB peripherals may never be trusted again. To make matters worse, cleaning up after an incident is hard because, simply reinstalling the operating system, the standard response to otherwise ineradicable malware, does not address the infections at their root. The USB thumb drive, from which the operating system is reinstalled, may already be infected, as may the hardwired webcam or other USB components inside the computer. The threat and vulnerability of using USB peripherals are further described in a CERT-UK Publication (2014) entitled: "*The 'BadUSB' vulnerability: An introduction*", and in a United States Computer Emergency Readiness Team (US-CERT) published 2012, by Pennie Walters (of Carnegie Mellon University) entitled: "*The Risks of Using Portable Devices*", which are both incorporated in their entirety for all purposes as if fully set forth herein.

Another USB related threat involves infected USB drivers or any other related software or firmware. Due to the proliferation of the USB standard and the complexity involved in implementing the standard, many ready-to-use USB drivers are offered by various vendors, saving the effort of development of such drivers for various USB peripherals and hosts. Such USB drivers may be infected during manufacturing or as part of the supply chain, and may render a system using such drivers as untrusted and malware infected.

A peripheral card having a Personal Computer ("PC") card form factor and removably coupled external to a host system is described in U.S. Pat. No. 6,381,662 to Harari et al. entitled: "Removable Mother/Daughter Peripheral Card", which is incorporated in its entirety for all purposes as if fully set forth herein. The peripheral card is further partitioned into a mother card portion and a daughter card portion, where the daughter card is removably coupled to the mother card. In the preferred embodiment, a low-cost flash "floppy" is accomplished by the daughter card containing only flash EEPROM chips, and being controlled by a memory controller residing on the mother card. Other aspects of this disclosure include a comprehensive controller on the mother card able to control a predefined set of peripherals on daughter cards connectable to the mother card; relocation of some host resident hardware to the mother card to allow for a minimal host system; a mother card that can accommodate multiple daughter cards; daughter cards that also operates directly with hosts having embedded controllers; daughter cards carrying encoded data and information for decoding it.

A method and apparatus for blocking the operation of selected USB devices at the hardware level, while allowing the operation of selected USB devices and external USB hubs to continue to operate normally, is described in Canadian Patent Application No. CA2810044 to Eljezovic et al. entitled: "Method and Apparatus for Restricting the Operation of USB Devices", which is incorporated in its entirety for all purposes as if fully set forth herein. In particular, the method provides for the restricted operation of one or a plurality of USB devices by altering one or a plurality of data fields contained within a USB transaction.

U.S. Pat. No. 8,572,402 to Beaumont et al. entitled: "Digital video guard", which is incorporated in its entirety for all purposes as if fully set forth herein, relates to the veracity of information displayed to a user of a computer, and information provided to a computer by human input devices such as mice and keyboards. A Digital Video Guard (DVG) device is described, and is a peripheral that is retrofitted to commodity computer devices, and resides in-line with a digital display, and enables secure end-to-end interactions between a user and a displayed (usually remote) application. In-band signaling within the digital video stream is used to carry encrypted information from a local or remote source, over untrusted network infrastructure through the digital video guard device to a user. The DVG decrypts and verifies the integrity of the digital video, and the integrity of the displayed information is indicated by a trusted LED on the DVG hardware. Portions of the video signal may be designated as trusted, if the received data has been encrypted, signed, or labeled as trustworthy.

An interface apparatus and method between a computer and an input peripheral are disclosed in U.S. Pat. No. 6,560,711 to Given et al. entitled: "Activity Sensing Interface Between a Computer and an Input Peripheral", which is incorporated in its entirety for all purposes as if fully set forth herein. The interface may be for activity sensing in the vicinity of the computer and signal activation indicative thereof to the computer so that the computer will not activate its normal security procedures, such as a password protected screen saver mode for example, during times of input peripheral inactivity so long as user presence is sensed. When a user leaves the vicinity of the computer, normal operation of a computer's resident security will control computer function. The apparatus when embodied in hardware includes a detector or sensor that detects the presence of the user, a controller receiving output signals from the detector and monitoring input peripheral activity, and host computer/input peripheral routing circuitry.

A secure motherboard for a computer, wherein each user accessible peripheral port is protected by hardware-based peripheral protection circuitry soldered to the motherboard, is described in U.S. Pat. No. 8,869,308 to Soffer entitled: "Computer Motherboard Having Peripheral Security Functions", which is incorporated in its entirety for all purposes as if fully set forth herein. The protection circuitry provides security functions decreasing the vulnerability of the computer to data theft. User input ports such as keyboard and mouse peripheral ports are coupled to the computer through a security function that enforce unidirectional data flow only from the user input devices to the computer. Display port uses a security function which isolates the EDID in the display from the computer. Authentication device such as smart card reader is coupled to the computer via a port having a security function which enumerates the authentication device before coupling it to the computer.

An apparatus for mediating communication between a universal serial bus (USB) device and a host computing device is described in U.S. Pat. No. 8,862,803 to Powers et al. entitled: "Mediating Communication of a Universal Serial Bus Device", which is incorporated in its entirety for all purposes as if fully set forth herein. In an example, the apparatus includes a USB host interface configured to be connected to a downstream USB device, and a USB device interface configured to be connected to an upstream host computing device. The apparatus also includes a mediation module positioned between the USB host interface and the USB device interface, and configured to determine whether the USB device is authorized to communicate with the host computing device.

Apparatus and methods prevent malicious data in Universal Serial Bus (USB) configurations by providing a hardware firewall, is described in U.S. Pat. No. 8,646,082 to Lomont et al. entitled: "USB Firewall Apparatus and Method", which is incorporated in its entirety for all purposes as if fully set forth herein. A hardware device interconnected between a host and the USB monitors communication packets and blocks packets having unwanted or malicious intent. The device may act as a hub, enabling multiple devices to connect to a single host. The device may only allow mass storage packets from a device recognized as a mass storage device. The device may block enumeration of unwanted devices by not forwarding packets between the device and the host. The device may be operative to assign a bogus address to a malicious device so as not to transfer communications from the device further up the chain to the host. The device may provide shallow or deep packet inspection to determine when a trusted device is sending possible malicious data, or provide packet validation to block packets that are malformed.

A USB security device that allows users to practice safe-charging when connecting their devices to public computers by preventing accidental data exchange through a USB cable is described in an article by Anthony Cuthbertson published Aug. 27, 201 in International Business Times at web page: www.ibtimes.co.uk/usb-condom-protects-your-device-infections-1462751 (preceded by http://), entitled: "*USB Condom Protects Your Device From Infections*", which is incorporated in its entirety for all purposes as if fully set forth herein.

UltraBlock™ USB is a hardware-based write blocker available from Digital Intelligence, Inc. (Headquartered in New Berlin, Wis., U.S.A.), that allows a USB mass storage device (i.e. flash drives, thumb drives, external USB hard drives, etc.) to be connected to a personal computer for forensic image acquisition and analysis. The UltraBlock™ supports connection to the Host PC via FireWire400 (1394A), or USB 2.0 interfaces. By using the UltraBlock™ USB data can be read from the USB mass storage device without data being inadvertently modified during the acquisition and analysis. The UltraBlock™ USB is described in a user guide published 2005 by Digital Intelligence, Inc. entitled: "*UltraBlock™ USB—User Manual*", and in Marshall University Forensic Science Center (MISDE) (Huntington, W. Va., U.S.A.) September 2006 publication entitled: "Functionality Test of Tableau® UltraBlock™ Forensic USB Bridge Device", which are both incorporated in their entirety for all purposes as if fully set forth herein. A 'Condom USB' device that acts as a stopgap between any USB enabled device and your computer. As soon as the Condom USB detects a virus, built-in software shuts off USB access, verifies the problem, and removes the nasty bug, then reopens the communication bridge to your computer. A 'Condom USB' is described in an article by Long Tran (Jan. 7, 2009) in a Yanko design web page (www.yankodesign.com/2009/01/07/condom-protects-you-from-viruses/ (preceded by http://)) entitled: "Condom Protects You From Viruses!", which are both incorporated in their entirety for all purposes as if fully set forth herein.

A security USB connector implements an intrusion prevention function preventing the propagation of malicious codes to a host terminal from a USB device while minimizing host terminal resource consumption, and an intrusion prevention system using the same are disclosed in U.S. Patent Application Publication No. 2011/0088093 to KANG et al. entitled: "Usb Connector and Intrusion Prevention System Using the Same", which is incorporated in its entirety for all purposes as if fully set forth herein. A security USB connector is positioned between the host terminal supporting a USB host and a USB device, and a security inspection is performed on data transferred from the USB device to the host terminal through the security USB connector. Also, a host terminal without an intrusion prevention function can prevent an intrusion by using the portable security USB connector.

Security arrangements for a Universal Serial Bus (USB) protocol stack of a USB host system are provided in U.S. Pat. No. 8,713,683 to Moore et al. entitled: "Security Arrangements for Extended USB Protocol Stack of a USB Host System", which is incorporated in its entirety for all purposes as if fully set forth herein. The security arrangements prevent an unauthorized or suspicious USB device from communicating with the host system, detect suspicious activity originating from a device which is already communicating with the host system and may provide notification to a user.

A device for preventing the rewriting and revision of the firmware installed on one or more USB devices is described in U.S. Patent Application Publication No. 2012/0079563 to Green et al. entitled: "Method and Apparatus for Minimizing Network Vulnerability via Usb Devices", which is incorporated in its entirety for all purposes as if fully set forth herein. The device including a male Universal Serial Bus (USB) connector for connecting the device to a host, a female USB connector for receiving the USB device, an integrated circuit, and a detector blocking the transmission of a device firmware update (DFU) from the host to USB device.

U.S. Pat. No. 8,984,611 to Jeannot entitled: "System, Apparatus and Method for Securing Electronic Data Independent of Their Location", which is incorporated in its entirety for all purposes as if fully set forth herein, discloses a system, apparatus and method for securing electronic files and folders independent of their location. A computer network implemented system for securing data is provided. The system includes a central server that manages access to a secure data architecture that enables one or more data security operations including data encryption, data decryption and secure data sharing. A security appliance is also provided that is interoperable with each of one or more computer devices to integrate each computer device into the secure architecture so as to enable data security operations at each computer device, by authenticating a user of each computer device to the security appliance, and the central server.

A system and method for providing temporary access to a host computer from a remote computer is disclosed in U.S. Pat. No. 6,449,651 to Dorfman et al. entitled: "System and Method for Providing Temporary Remote Access to a Computer", which is incorporated in its entirety for all purposes as if fully set forth herein. The host computer maintains a system date and time and is connected to the remote computer over a communications link. The system includes a first dongle and a second dongle. The first dongle is adapted to be connected to a parallel port of the host computer, and includes a first program memory for storing an encryption algorithm and a temporary memory for storing a key for use with the encryption algorithm A second dongle is adapted to be connected to the remote computer, and includes a second program memory for storing a copy of the encryption algorithm and a non-volatile memory for storing a copy of the key for use with the copy of said encryption algorithm A date range is stored in the non-volatile memory of the second dongle and includes a starting date on which temporary access will begin, and an ending date for the temporary access. The second program memory also includes program logic to deactivate the second dongle when the second dongle is accessed by the remote computer on a date outside of the date range.

A secure communication kit is disclosed in U.S. Patent Application Publication No. 2014/0281553 to Eli Berl Illion et al. entitled: "Secure Communications Kit and Client Device for Securely Communicating Using the Same", which is incorporated in its entirety for all purposes as if fully set forth herein. The secure communication kit may include a plurality of tangible security tokens; each security token storing one or more cryptographic keys and a group identifier. A first cryptographic key stored on each security token may correspond to one of the cryptographic key(s) stored on every of the other security tokens. The group identifier stored on each security token may correspond to each group identifier stored on every of the other security tokens. A client device for securely communicating using the secure communication kit is also disclosed.

A portable system and method for accessing data remotely are disclosed in U.S. Pat. No. 8,826,015 to Lakshminarayanan et al. entitled: "Portable System and Method for Remotely Accessing Data", which is incorporated in its entirety for all purposes as if fully set forth herein. The system and method include a first module and a second module, each of the modules being associated with the host system, wherein the first module is capable of being connected to the host system and the second module, and the second module is capable of being connected to the remote system to establish a secure communication channel between the first and second modules across the data link to access the data.

A secure remote access is described in U.S. Patent Application Publication No. 2007/0156850 to Corrion entitled: "Secure Remote Access Using Portable Storage Device", which is incorporated in its entirety for all purposes as if fully set forth herein. A communication between a portable storage device and a local computer is detected and a secure connection is established between the local computer and a remote storage device in response to the detecting. A secure portable electronic device for providing secure services when used in conjunction with a host computer having a central processing unit, use two hardware device protocols readily supported by computer operating systems, is described in U.S. Pat. No. 8,560,852 to HongQian et al. entitled: "Method and System for Communication Between a USB Device and a USB Host", which is incorporated in its entirety for all purposes as if fully set forth herein.

A secure portable electronic device for providing secure services when used in conjunction with a host computer having a central processing unit is described in U.S. Patent Application Publication No. 2008/0189554 to Ali et al. entitled: "Method and System for Securing Communication Between a Host Computer and a Secure Portable Device", which is incorporated in its entirety for all purposes as if fully set forth herein. The secure portable device communicates with the host computer via a host agent program executing on the host computer from the secure portable device. Periodically, the host agent and a corresponding program executing on the secure portable device, cooperate to verify the integrity and authenticity of the host agent program, for example, in conjunction with exchanging a new session key.

A secure portable electronic device for providing secure services when used in conjunction with a host computer is described in U.S. Patent Application Publication No. 2010/0186076 to Ali et al. entitled: "Method and System of Providing Security Services Using a Secure Device", which is incorporated in its entirety for all purposes as if fully set forth herein. The secure portable device includes a read-only memory partition, a read/write memory partition, and a secure memory partition. The secure portable device includes instructions stored in the read-only partition including a host agent containing instructions executable by the host computer. The secure portable device also includes instructions stored in the secure memory partition, which includes a card agent containing instructions executable by central processing units secure portable electronic device, and includes a card agent communications module for communicating with the host agent, and a security module for accessing private information stored in the secure memory partition. The host agent includes a host agent communications module for communicating with the card agent and at least one function requiring use of private information stored in the secure memory partition of the portable device and operable to transmit a request to the card agent to perform a corresponding function requiring the use of private information stored on the portable device.

A managed Universal Serial Bus (USB) service capability is disclosed in U.S. Patent Application Publication No. 2012/0324067 to Hari et al. entitled: "Method and Apparatus for Remote Delivery of Managed USB Services via a Mobile Computing Device", which is incorporated in its entirety for all purposes as if fully set forth herein. The managed USB service capability is configured to use a mobile computing device (e.g., a smartphone or other suitable mobile computing device) to support a set of services for a computer (e.g., a desktop, a laptop, and the like), capable of connecting to the mobile computing device via a USB connection. The managed USB service capability enables local and/or remote control of the mobile computing device to operate in various USB device classes, such that the mobile computing device can provide various managed USB services for the computer via the peripheral connection. In this manner, the mobile computing device may be dynamically configured to operate as one or more of a network interface, a virtual private network (VPN) client, a smart card, a serial console, a mass-storage device, a booting device, and the like.

Techniques for improving security in virtual private network are disclosed in U.S. Pat. No. 8,806,609 to Gladstone et al. entitled: "Security for Remote Access VPN", which is incorporated in its entirety for all purposes as if fully set forth herein. In one embodiment, key information is generated for a virtual private network (VPN) connection between a first device and a second device. A plurality of shares is then generated based on the key information. A first set of one or more shares is stored on a dongle that is paired to the first device. A second set of one or more shares is stored on the first device. In response to a request to resume the VPN connection, the first set of shares is retrieved from the dongle. The key information is reconstructed based on the first set of shares and the second set of shares. The reconstructed key information may then be used to resume the VPN connection.

In consideration of the foregoing, it would be an advancement in the art to provide methods and systems supporting, or isolating access to an internal peripheral, an improved security, verifying authentic software, malware vulnerability reduction, or a malware operation detection/prevention, that are simple, secure, cost-effective, reliable, easy to use or sanitize, has a minimum part count, minimum hardware, and/or uses existing and available components, protocols, programs and applications for providing better security and additional functionalities, and provides a better user experience.

SUMMARY

A device connectable between a host computer and a peripheral device, using a standard bus comprises a single enclosure that houses first, second, and third modules. The first module may comprise a first connector connectable to a first cable for connecting to the host computer; a first transceiver coupled to the first connector for transmitting messages to, and receiving messages from, the host computer over the first cable using the standard bus; and a first memory storing a first firmware and a first processor for executing the first firmware, the first processor may be coupled to control, and to communicate with, the first transceiver; and the first module may be configured to emulate the peripheral device to the host computer. The second module may comprise a second connector connectable to a second cable for connecting to the peripheral device; a second transceiver coupled to the second connector for transmitting messages to, and receiving messages from, the peripheral device over the second cable using the standard bus; and a second memory storing a second firmware and a second processor for executing the second firmware, the second processor may be coupled to control, and to communicate with, the second transceiver; and the second module may be configured to emulate the host computer to the peripheral device. The third module may comprise a third memory storing a third firmware and a third processor for executing the third firmware, the third processor may be coupled to control, and to communicate with, the second transceiver; and the third module may be communicatively coupled to the first module exclusively over a first local bus, and may be communicatively coupled to the second module exclusively over a second local bus. The device may be operative to detect a malware or malware activity, and the malware may consist of, may include, or may be based on, a computer virus, spyware, DoS (Denial of Service), rootkit, ransomware, adware, backdoor, Trojan horse, or a destructive malware.

The peripheral device may be an input device for receiving data from a user and may consist of, or may comprise, a keyboard, a pointing device, a trackball, a touch-pad, a touch-screen, a scanner, a digital camera, or a joystick. Alternatively or in addition, the peripheral device may be an output device for notifying data to a user and may consist of, or may comprise, a printer, a display, or a speaker, and the user notification may consist of, may comprise, or may be based on, text, graphics, tactile, audio, or video. Alternatively or in addition, the peripheral device may be a non-volatile memory, and at least part of the messages may be associated with reading from, or writing to, the non-volatile memory, that may consist of, or may comprise, a Hard Disk Drive (HDD), Solid State Drive (SSD), RAM, SRAM, DRAM, TTRAM, Z-RAM, ROM, PROM, EPROM, EEPROM, Flash-based memory, CD-RW, DVD-RW, DVD+RW, DVD-RAM BD-RE, CD-ROM, BD-ROM, or DVD-ROM.

The standard bus may be an industry standard bus, and the first and second connectors, the first and second cables, the first and second transceivers, the communication between the first module and the host computer, and the communication between the second module and the peripheral device, may be according to, or may be based on, the industry standard bus. The industry standard bus may define a point-to-point serial communication, and may be according to, or may be based on, a Universal Standard Bus (USB) that may be according to, or may be based on, USB 2.0 or USB 3.0. Alternatively or in addition, the industry standard bus may be according to, or may be based on, a Peripheral Component Interconnect (PCI) Express, Small Computer System Interface (SCSI), Serial Attached SCSI (SAS), Serial ATA (SATA), InfiniBand, PCI, PCI-X, AGP, Thunderbolt, IEEE 1394, FireWire, or Fibre-Channel standard.

The first firmware may comprise a first operating system for execution by the first processor, the second firmware may comprise a second operating system for execution by the second processor, and the third firmware may comprise a third operating system for execution by the third processor. The first, second, or third operating system (or all of them) may consist of, may comprise, may be according to, or may be based on, Linux. Alternatively or in addition, the first, second, or third operating system (or all of them) may consist of, may comprise, may be according to, or may be based on, Microsoft Windows or WDM, that may be according to, or may be based on, Microsoft Windows 7, Microsoft Windows XP, Microsoft Windows 8, Microsoft Windows 8.1, or Google Chrome OS. Alternatively or in addition, the first, second, or third operating system (or all of them) may consist of, may comprise, may be according to, or may be based on, a mobile operating system that may consist of, may comprise, may be according to, or may be based on, Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Alternatively or in addition, the first, second, or third operating system (or all of them) may comprise, may be according to, may use, or may be based on, a class driver, a Human Input device (HID) driver, a minidriver, a class driver, a USB host driver, a USB peripheral driver, a PnP driver, a msdos.sys driver, a io.sys driver, a config.sys driver, or a function driver.

The first or the second local bus (or both) may be a synchronous serial bus, and may be a master/slave bus for connecting ICs, such as Serial Peripheral Interface (SPI) bus or Inter-Integrated Circuit (PC) bus. The first or the second local bus (or both) may be a bi-directional bus, that may be a half-duplex or a full-duplex bus. Alternatively or in addition, the first or the second local bus (or both) may be a uni-directional bus, where the first local bus may exclusively allow data transfer from the first module to the third module or from the third module to the first module. Alternatively or in addition, the second local bus may exclusively allow data transfer from the first module to the second module or from the third module to the second module.

The first or second local bus (or both) may use isolation barriers so that the respective first or second module may be galvanically isolated over the respective bus from the third module. The isolation barrier may use or may be based on capacitance, induction, or electromagnetic waves, or optical means, and the first or second local bus (or both) may comprise or may use optocouplers, or isolation transformers for galvanically isolating the respective modules.

The standard bus may be defined to carry a power signal where the first cable may be connected to carry a first power signal, and the second cable may be connected to carry a second power signal, the first module may be configured to terminate the first power signal carried over the first cable, and the second module may be configured to supply the second power signal.

The device may further comprise a first, second, and third power connections, the first module may be connected to be powered exclusively from the first power connection, the second module may be connected to be powered exclusively from the second power connection, and the third module may be connected to be powered exclusively from the third power connection. The device may be used with a power source, and may further comprise a first Low Pass Filter (LPF) connected between the power source and the first power connection, a second Low Pass Filter (LPF) connected between the power source and the second power connection, and a third Low Pass Filter (LPF) connected between the power source and the third power connection. The first, second, or third LPF (or all of them) may be structured according to, may be based on, or may comprise, a Chebyshev filter, a Butterworth filter, a Bessel filter, or an Elliptic filter, and may be structured according to, may be based on, or may comprise first order passive LPF that may be according to, may be based on, or may comprise, RC, RL, or RLC filter.

The power source may be a primary or rechargeable battery. Alternatively or in addition, the power source may be an AC power source, and the device may further comprise a step-down transformer and an AC/DC converter for DC powering the modules. The first cable further may carry a power signal, and each of the device, the first module, the second module, or the third module, may be entirely, or in part, powered from the power signal.

The device may be integrated with the host computer, and the single enclosure may further house the host computer. The device may be integrated with the peripheral device, and the single enclosure may further house the peripheral device.

The first, second, or third module (or all of them) may be implemented in the form of a die, an IC, a box-shaped enclosure, a PCB carrying ICs and other electronic components, a plug-in card, or a removable enclosure. The single enclosure may be a box-shaped enclosure, hand-held, or shaped as a 'stick' or 'dongle'. Alternatively or in addition, the single enclosure may be shaped or constructed as a plug-in and removable unit with the host computer or with the peripheral device, and may be mechanically attachable, and electrically connectable (such as to the host computer) using the first connector. Alternatively or in addition, the single enclosure may be mechanically attachable and electrically connectable using the second connector (such as to the peripheral device).

The device may further comprise a first, second, and third clock connections, the first module may be connected to exclusively use the first clock connection, the second module may be connected to exclusively use the second clock connection, and the third module may be connected to exclusively use the third clock connection. An oscillator, which may be a quartz crystal oscillator, may connect to supply a clock signal to the first, second, and third clock connections. Alternatively, the device may further comprise a first, second, and third oscillators (each may be a quartz crystal oscillator) respectively connected to supply a clock signal to the first, second, and third clock connections.

The device may be further used in connecting to an additional peripheral device using the standard bus, the device may further comprise in the single enclosure a fourth module that comprises a third connector connectable to a third cable for connecting to the additional peripheral device; a third transceiver coupled to the third connector for transmitting messages to, and receiving messages from, the additional peripheral device over the third cable using the standard bus; and a fourth memory storing a fourth firmware and a fourth processor for executing the fourth firmware, the fourth processor may be coupled to control, and to communicate with, the third transceiver; and the fourth module may be configured to emulate the host computer to the additional peripheral device. The third module may be communicatively coupled to the fourth module exclusively over a third local bus and the device may be configured to pass messages between the additional peripheral device and the host computer over the third local bus.

The device may further comprise in the single enclosure, a sensor that outputs sensor data in response to a physical phenomenon, where the sensor may be coupled to the third processor for responding to the physical phenomenon. The sensor may be an occupancy sensor for detecting occupancy of a space by a human body, and the sensor may output data in response to detecting a presence of a human body by using electric effect, inductive coupling, capacitive coupling, triboelectric effect, piezoelectric effect, fiber optic transmission, or radar intrusion sensing. Alternatively or in addition, the occupancy sensor may consist of, may comprise, or may be based on, an acoustic sensor, opacity, geomagnetism, magnetic sensors, magnetometer, and reflection of transmitted energy, infrared laser radar, microwave radar, electromagnetic induction, or vibration. Alternatively or in addition, the occupancy sensor may consist of, may comprise, or may be based on, a motion sensor that may be a mechanically actuated sensor, passive or active electronic sensor, ultrasonic sensor, microwave sensor, tomographic detector, passive infrared (PIR) sensor, laser optical detector, or acoustical detector. Alternatively or in addition, the sensor may be a photoelectric sensor that responds to a visible or an invisible light, the invisible light may be infrared, ultraviolet, X-rays, or gamma rays, and the photoelectric sensor may be based on the photoelectric or photovoltaic effect, and may consist of, or may comprise, a semiconductor component that may consist of, or may comprise, a photodiode, or a phototransistor. The photoelectric sensor may use or may be based on Charge-Coupled Device (CCD) or a Complementary Metal-Oxide Semiconductor (CMOS) component.

The device may further comprise in the single enclosure a sensor that outputs sensor data in response to a physical phenomenon produced by the peripheral device, the sensor may be coupled to the third processor for responding to the physical phenomenon. The sensor may be a piezoelectric sensor that uses the piezoelectric effect, includes single crystal material or a piezoelectric ceramics, and may use transverse, longitudinal, or shear effect mode. Alternatively or in addition, the sensor may comprise multiple sensors arranged as a directional sensor array directed to the peripheral device, and may further be operative to estimate the number, magnitude, frequency, Direction-Of-Arrival (DOA), distance, or speed of the signal impinging the sensor array. Alternatively or in addition, the sensor may be a thermoelectric sensor that responds to a temperature or a temperature gradient of an object such as the peripheral device. The thermoelectric sensor may sense the peripheral device temperature using conduction, convection, or radiation, and may consist of, or may comprise, a Positive Temperature Coefficient (PTC) thermistor, a Negative Temperature Coefficient (NTC) thermistor, a thermocouple, a quartz crystal, or a Resistance Temperature Detector (RTD).

Alternatively or in addition, the sensor may be a photoelectric sensor that responds to visible or an invisible light (such as infrared, ultraviolet, X-rays, or gamma rays), and the photoelectric sensor may be based on the photoelectric or photovoltaic effect, and may consist of, or may comprise, a semiconductor component that may consist of, or may comprise, a photodiode, a phototransistor, or a solar cell. Alternatively or in addition, the sensor may be an electroacoustic sensor that responds to a sound produced by the peripheral device, the electroacoustic sensor may respond to audible or inaudible audio, and the electroacoustic sensor may be a microphone that may be omnidirectional, unidirectional, or bidirectional. The microphone may be based on the sensing the incident sound based motion of a diaphragm or a ribbon, and may consist of, or may comprise, a condenser, an electret, a dynamic, a ribbon, a carbon, or a piezoelectric microphone. Alternatively or in addition, the sensor may consist of, or may comprise, a nanosensor, a crystal, or a semiconductor, and may be ultrasonic based, or a proximity sensor.

The device may be used with a VPN server communicating with the host computer over the Internet; the third firmware may further comprise a VPN client for execution by the third processor, so that when executed by the third processor, the device establishes a VPN connection with the VPN server over the Internet via the host computer, that may be according to, may use, or may be based on, Point-to-Point Tunneling Protocol (PPTP), Layer Two Tunneling Protocol (L2TP), or Secure Socket Tunneling Protocol (SSTP). The device may be further configured to transmit to the VPN server over the established VPN messages that were received from the peripheral device, or to transmit to the peripheral device messages that were received from the VPN server over the established VPN. The peripheral device may consist of, or may include, a non-volatile memory storing a content, and the device may be further configured to read the entire of, or a part of, the content from the non-volatile memory, and may transmit the read content to the VPN server over the established VPN connection.

The device may be configured to pass messages received from the peripheral device to the host computer, and pass messages received from the host computer to the peripheral device, or both. The device may further be selectable to be in first and second states, so that in the first state the device may be operative to pass transparently messages between the peripheral device and the host computer, and in the second state the device may be operative to block messages from passing between the peripheral device and the host computer. The device may further comprise in the single enclosure the sensor that outputs sensor data in response to a physical phenomenon produced by the peripheral device, the sensor may be coupled to the third processor for responding to the physical phenomenon, and the device may be configured to change states in response to the sensor output data.

The third firmware may include instructions that when executed, causes the third processor to identify and analyze a message received from the peripheral device over the second local bus, to identify and analyze a message received from the host computer over the first local bus, or both. The third firmware may further include instructions that when executed, causes the third processor to store in memory the identified message from the peripheral device, or from the host computer. The device may be used with a group of messages (that may be stored in the third memory), and the third firmware may further include instructions that when executed, causes the third processor to check whether the identified message is included in the group, and the device may further selectable to be in the first and second states, and responsive to the identified message being included in the group, or responsive to the identified message not being included in the group, the device may shift from a first state to a second state.

The third firmware may include instructions that when executed, may cause the third processor to identify and analyze a group containing multiple consecutively received messages received from the peripheral device over the second local bus, to identify and analyze a message received from the host computer over the first local bus, or both. The device may be used with a first group of multiple messages, and the third firmware may further include instructions that when executed, causes the third processor to check whether the identified messages group is included in the first group. The device may be used with a criterion, and the identified messages group may be analyzed whether the criterion is satisfied, and the criterion may be based on a pattern of the messages or on a repetition of a specific message in the group or on an order of defined messages in the group.

A method may be used for analyzing messages by the device connected between the host computer and the peripheral device using a standard bus. The method may comprise emulating the peripheral device to the host computer using the first processor, executing the first firmware stored in the first memory, for receiving messages from, and transmitting messages to, the host computer over the first cable using the standard bus; emulating the host computer to the peripheral device using the second processor executing the second firmware stored in the second memory, for receiving messages from, and transmitting messages to, the peripheral device over a second cable using the standard bus; analyzing messages using the third processor executing the third firmware stored in the third memory; transporting messages between the host computer and the third processor exclusively over the first local bus; and transporting messages between the peripheral device and the third processor exclusively over the second local bus.

The method may be used with a criterion and may further comprise receiving a first message by the second processor from the peripheral device; sending the first message over the second local bus to the third processor; checking the first message by the third processor for satisfying the criterion; responsive to the message satisfying the criterion, sending the first message over the first local bus to the second processor; and sending the first message by the first processor to the host computer. The first message may be associated with the user action, and the peripheral device may be an input device for sensing an action by a user, and may consist of, or comprise, a keyboard, a pointing device, a trackball, a touch-pad, a touch-screen, a scanner, a digital camera, or a joystick.

The method may be used with a criterion and may further comprise receiving a first message by the first processor from the host computer; sending the first message over the first local bus to the third processor; checking the first message by the third processor for satisfying the criterion; responsive to the message satisfying the criterion, sending the first message over the second local bus to the second processor; and sending the first message by the second processor to the peripheral device. The peripheral device may be an output device for notifying information to a user and may consist of, or comprise, a printer, a display, or a speaker, and the user notification may consist of, comprise, or may be based on, text, graphics, tactile, audio, or video. The first message may be associated with the information used for the user notification.

The first firmware may comprise the first operating system, the second firmware may comprise the second operating system, and the third firmware may comprise the third operating system, and the method may further comprise executing, by the first processor, the first operating system; executing, by the second processor, the second operating system; and executing, by the third processor, the third operating system. The standard bus may be defined to carry a power signal and the first cable may be connected to carry a first power signal and the second cable may be connected to carry a second power signal, and the method may further comprise receiving the first power signal from the first cable; and supplying the second power signal to the second cable.

The method may be used with the power source, and may further comprise receiving an electrical power from a power source; supplying a first power signal from the power source to the first power connection; supplying a second power signal from the power source to the second power connection; and supplying a third power signal from the power source to the third power connection. The power source may be an AC power source supplying AC power, and the method further comprising stepping-down the voltage of the AC power, and converting the stepped-down AC power to a DC power signal. Each of the first, second, and third power signal may be a DC power signal, such as nominal 3.3 VDC, 5 VDC, or 12 VDC. The method may be used with the first Low Pass filter (LPF) connected between the power source and the first power connection, the second Low Pass Filter (LPF) connected between the power source and the second power connection, and the third Low Pass Filter (LPF) connected between the power source and the third power connection, and may further comprise filtering the first power signal by the first Low Pass filter (LPF); filtering the second power signal by the second Low Pass filter (LPF); and filtering the third power signal by the third Low Pass filter (LPF). The first cable may carry a power signal, and the method may further comprise receiving the power signal from the first cable; powering, entirely or in part, the first processor and the first memory by the power signal from the first cable; powering, entirely or in part, the third processor and the third memory by the power signal from the first cable; and powering, entirely or in part, the second processor and the second memory by the power signal from the first cable.

The first processor, the second processor, and the third processor may be integrated with the host computer or with the peripheral device, or may be enclosed in the single enclosure that may be a box-shaped enclosure. The method may further comprise mechanically attaching and electrically connecting the single enclosure to the host computer, or to the peripheral device.

The method may be used with the first, second, and third clock connections, the first processor may be connected to use exclusively the first clock connection, the second processor may be connected to use exclusively the second clock connection, and the third processor may be connected to use exclusively the third clock connection. The method may further be used with an oscillator providing the clock signal, and may further comprise receiving the clock signal from the oscillator; supplying the first clock signal from the oscillator to the first clock connection; supplying the second clock signal from the oscillator to the second clock connection; and supplying the third clock signal from the oscillator to the third clock connection. Alternatively or in addition, the method may be used with the first, second, and third oscillators respectively connected to supply the respective clock signal to the respective first, second, and third clock connections.

The method may further be for connecting to the additional peripheral device using the standard bus, and may further comprise emulating the host computer to the additional peripheral device using a fourth processor executing a fourth firmware stored in a fourth memory, for receiving messages from, and transmitting messages to, the additional peripheral device over a third cable using the standard bus; and transporting messages between the host computer and the fourth processor exclusively over a third local bus. The fourth processor may be communicatively coupled to the fourth processor exclusively over the third local bus for passing messages between the additional peripheral device and the host computer over the third local bus.

The method may be used with the sensor that outputs sensor data in response to a physical phenomenon coupled to the third processor, and the analyzing of the messages may comprise receiving the sensor data from the sensor, and also checking the sensor data according to a criterion. The method may further be used with the sensor that outputs sensor data in response to a physical phenomenon produced by the peripheral device; the sensor may be coupled to the third processor, and the analyzing of the messages comprising receiving the sensor data from the sensor; and checking the sensor data according to a criterion.

The method may be used with the VPN server communicating with the host computer over the Internet; the third firmware further comprises the VPN client for execution by the third processor, and the method may further comprise establishing a VPN connection with the VPN server over the Internet via the host computer. The VPN connection may be according to, may use, or may be based on, Point-to-Point Tunneling Protocol (PPTP), Layer Two Tunneling Protocol (L2TP), or Secure Socket Tunneling Protocol (SSTP). The method may further comprise receiving first messages from the peripheral device by the second processor, and transmitting, by the third processor, the first messages to the VPN server over the established VPN. Alternatively or in addition, the method may further comprise receiving first messages from the VPN server over the established VPN via the host computer by the first processor; and transmitting, by the third processor, the first messages to the peripheral device. The peripheral device may consist of, or may include, a non-volatile memory storing a content, and the method may further comprise reading the entire of, or a part of, the content from the non-volatile memory; and transmitting the read content to the VPN server over the established VPN connection.

The method may further comprise receiving first messages from the peripheral device; sending the first messages to the host computer; receiving second messages from the host computer; and sending the second messages to the peripheral device.

The method may use the criterion, and the analyzing of the messages may comprise identifying the message received from the peripheral device over the second local bus or from the host computer over the first local bus; checking if the received message satisfies the criterion, and storing the identified message in a memory. The method may be used with a group of messages, and the criterion may comprise the identified message being in the group. The method may further comprise identifying a group containing multiple, consecutively messages received from the peripheral device over the second local bus, or from the host computer over the first local bus; checking if the received messages sequence satisfies the criterion; and storing the identified received messages sequence in a memory. The method may use a group of multiple messages' sequences, and the criterion may comprise the identified received messages sequence being in the group, and may be based on a repetition of a specific message in the sequence or on an order of defined messages in the sequence.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, is like designations denote like elements. Understanding that these drawings only provide information concerning typical embodiments of the invention and are not therefore to be considered limiting in scope.

DETAILED DESCRIPTION

Figure 1:
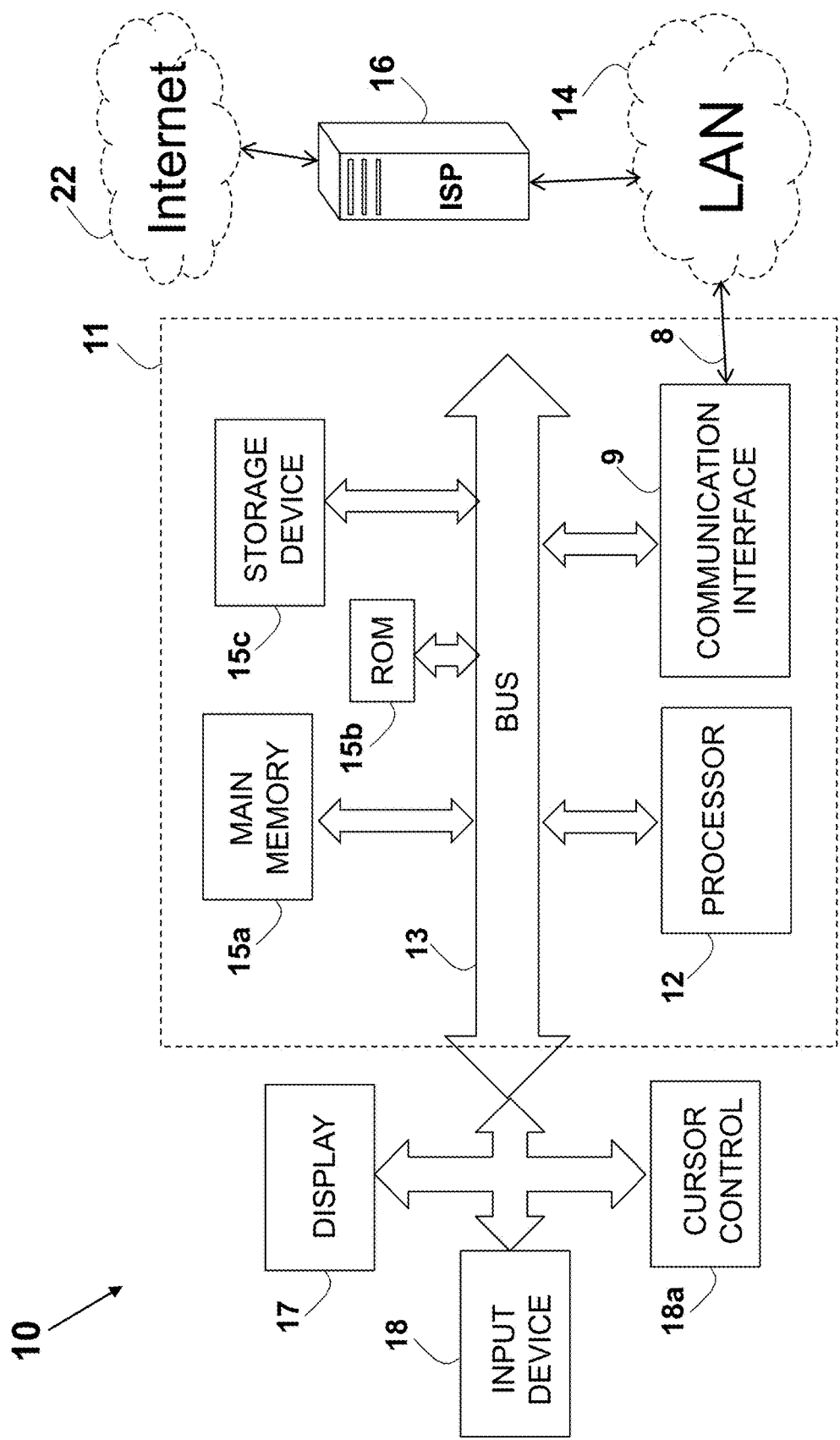
FIG. 1 illustrates schematically a block diagram of a computer connected to the Internet.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, a reference to "a component surface" includes reference to one or more of such surfaces. The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Figure 8:
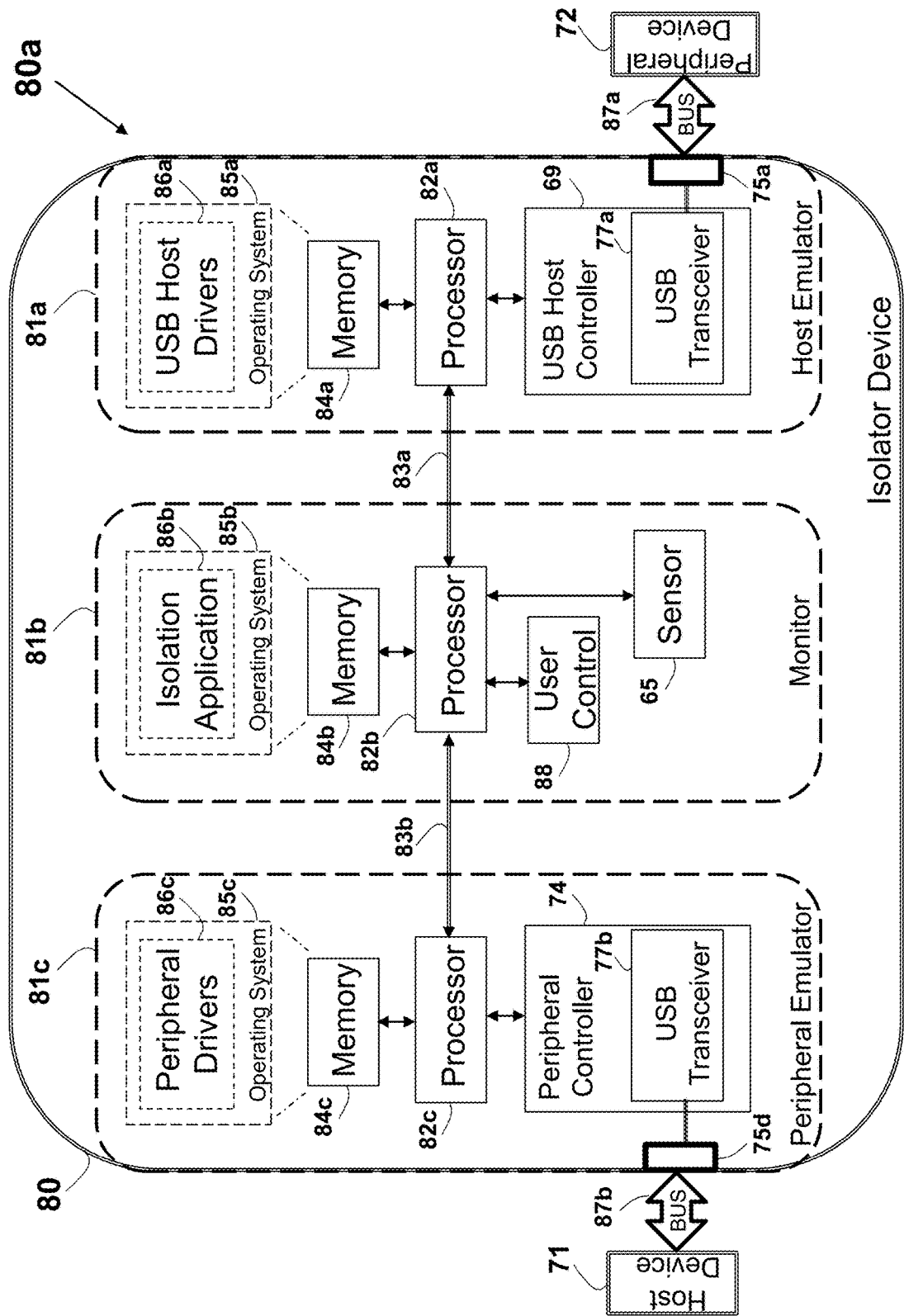
FIG. 8 illustrates schematically a block diagram of an isolator device connected between a host device and a peripheral device.

An Isolator Device 80 for handling and mitigating USB threats is shown in an arrangement 80a in FIG. 8. The isolator 80 is connected in series between the peripheral device 72 and the host device 71, respectively using a USB connection 87a (such as the USB cable 78) and a USB connection 87b. The isolator device 80 includes three modules: a peripheral emulator module 81c, a monitor module 81b, and a host emulator 81a. Preferably, the modules are as practical as possible isolated and independent of each other, and share minimum components and functionalities as possible. The isolator device is associated with two states, namely 'normal' operation and 'suspected' operation. In the normal operation mode, it is assumed that no threat exists, and no malware is functioning or affecting the peripheral device 72, the host device 71, or both. Preferably, in normal operation mode the isolator 80 is as transparent as practical, and the functionalities relating to the peripheral device 72 connected to the host device 71 over a USB connection as described in the arrangement 70 are retained. In the suspected operation mode, the isolator device 80 blocks part or all of the information to be transferred either from the peripheral device 72 to the host device 71, or from the host device 71 to the peripheral device 72, or both.

The host emulator 81a is based on the USB host interface 71a and its main functionality is to present and emulate a full USB host interface to the peripheral device 72, so that for all practical purposes, the peripheral device 72 behaves and senses as it is connected directly to the host device 71. The host emulator 81a includes a USB host interface that includes the USB host connector 75a, the USB transceiver 77a, and the USB host controller 69, all managed and operated under the control of a processor 82a, which may be similar or identical to the processor 65 shown in the arrangement 70. The processor 82a executes instructions, store, and read data with the memory 84a, which may correspond to the memory 73. The memory 84a may store an operating system 85a (which may correspond to the OS 76a), integrated with USB host drivers 86a (which may correspond to the USB host drivers 76b in the arrangement 70). The OS 85a may consist, may be based on, or may use WDM or Linux, or may consist, may be based on, or may use FreeRTOS™ or Android, Commands, messages, information, and any other data from or to the end point 79 in the peripheral device 72, which are carried as payload in the USB protocol are communicated over a local bus 83a to a processor 82b of the monitor module 81b. Any connection or bus, either parallel or serial, and either synchronous or asynchronous, that may be used for connecting between ICs or components, such as the connection between ICs or components mounted on the same PCB, may be used as the local bus 83a. Preferably, the local bus 83a is a serial point-to-point bus such as SPI or I$^2$C, and this local bus 83a is the only data transfer means between the host emulator module 81a and the monitor module 81b.

The peripheral emulator 81c is based on the USB peripheral interface 71a and its main functionality is to present and emulate a full USB peripheral interface to the host device 71, so that for all practical purposes, the host device 71 behaves, functions, and senses as it is connected directly to the peripheral device 72. The peripheral emulator 81c includes a USB peripheral interface that includes the USB peripheral connector 75d, the USB transceiver 77b, and the USB peripheral controller 74, all managed and operated under the control of a processor 82c, which may be similar or identical to the processor 65 shown in the arrangement 70. The processor 82c executes instructions, stores, and reads data in the memory 84c, which may correspond to the memory 73. The memory 84c may store an operating system 85c (which may correspond to the OS 76a), integrated with USB peripheral drivers 86c. The OS 85c may consist, may be based on, or may use WDM or Linux, or may consist, may be based on, or may use FreeRTOS™ or Android, Commands, messages, information, and any other data from or to the end-point 79 in the peripheral device 72, which are carried as payload in the USB protocol, are communicated over a local bus 83b to a processor 82b of the monitor module 81b. The local bus 83b may be similar to, identical to, or different from the local bus 83a. Any connection or bus, either parallel or serial, and either synchronous or asynchronous, that may be used for connecting between ICs or components, such as connections between ICs or components mounted on the same PCB, may be used as the local bus 83b. Preferably, the local bus 83b is a serial point-to-point bus such as SPI or I²C. Preferably, the local bus 83b is a serial point-to-point bus such as SPI or I²C, and this local bus 83b is the only data transfer means between the peripheral emulator module 81c and the monitor module 81b.

The monitor module 81b serves as a mediator and connected between the peripheral emulator module 81 and the host emulator module 81a, so that any information communicated between the host device 71 and the peripheral device 72 passes through this module, and may be analyzed, passed, or blocked by the monitor module 81b. The monitor module 81b includes the processor 82b that manages and control the module, which may be similar or identical to the processor 12 shown in the arrangement 10. The processor 82b executes instructions, stores, and reads data in the memory 84c, which may correspond to the memory 15a. The memory 84b may store an operating system 85b (which may correspond to the OS 76a), integrated with an isolation application 86b that intercept, analyze, block, or otherwise manipulate or act upon the commands, messages, information, and any other data from, or to, the end-point 79 in the peripheral device 72. The OS 85b may consist, may be based on, or may use WDM or Linux, or may consist, may be based on, or may use FreeRTOS™ or Android.

Each of the processors in the modules is directed only by the software included in the memory in the module, and interacts and controls only the hardware in that module, and preferably, the only data transfer between the modules is via the local buses 83a and 83b. Preferably, any failure of infection in one module preferably does not change, impact, or affect the software, the hardware, or the operation (or functionality) of any of the rest of the modules. Further, since the operating systems and the processors are isolated to each module, a malware infection, such as in USB related drivers obtained from a third party, is not propagated to the other modules in the isolator device 80.

Figure 8A:
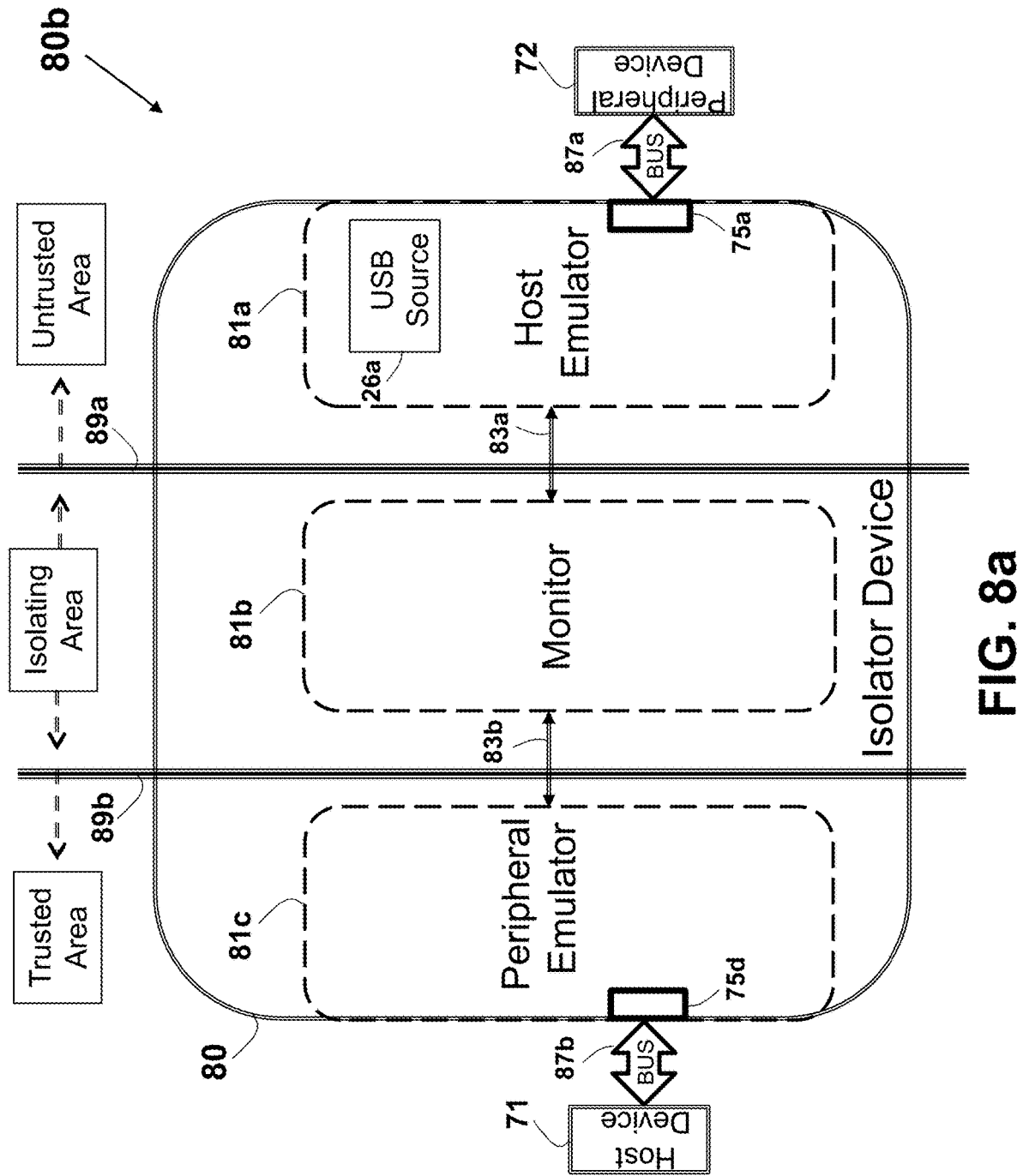
FIG. 8a illustrates schematically a block diagram of modules isolations in an isolator device connected between a host device and a peripheral device.

In one example, the host device 71 is assumed a trusted system or environment, while the peripheral device 72 trustworthiness is unknown and thus cannot be trusted. Hence, the isolator device 80 may be connected as a local 'Firewall' securely connecting the host device 71 and the peripheral device 72, analyzing the messaging between these devices and identifying a suspected activity, thus protecting any infection from the peripheral device 72 to affect or penetrate the host device 71. Such application is pictorially shown as an arrangement 80b in FIG. 8a, showing a barrier vertical line 89b isolating the host device 71 side as trusted, and a barrier vertical line 89a isolating peripheral device 72 side as untrusted, where only the monitor module 81b in the isolator device 80 connects as a 'gatekeeper' between the trusted area and the untrusted one, and perform monitoring and analysis of the USB traffic and allows for identifying and stopping suspicious activity. Alternatively or in addition, the isolator device 80 may be used for protecting the peripheral device 72 from a malware infection or activity by the host device 71.

Preferably, the monitor module 81b and the host emulator module 81a are communicatively coupled solely over the local bus 83a, which may be a bi-directional bus supporting half-duplex of full-duplex communication. Similarly, the monitor module 81b and the peripheral emulator module 81c are preferably communicatively coupled solely over the local bus 83b, which may be a bi-directional bus supporting half-duplex of full-duplex communication. In one example, the local buses 83a and 83b use different lines or connections for each communication direction, as shown in an arrangement 90 in FIG. 9.

As part of the local bus 83a, messaging from the monitor module 81b directed to the host emulator module 81a are only carried over the connection 93d, which may be a wire, a trace on a PCB, or an inter-IC connection such as a conductive path over a semiconductor substrate. The connection 93d is signal fed from a digital logic output stage 91d (which may be a buffer or a driver) in the monitor module 81b and the digital signal is received by a digital logic input stage 92d (which may be a receiver) in the host emulator module 81a. Similarly, as part of the local bus 83a, messaging directed to the monitor module 81b from the host emulator module 81a are only carried over the connection 93a, which may be a wire, a trace on a PCB, or an inter-IC connection such as a conductive path over a semiconductor substrate. The connection 93a is signal fed from a digital logic output stage 91a (which may be a buffer or a driver) in the host emulator module 81a and the digital signal is received by a digital logic input stage 92a (which may be a receiver) in the monitor module 81b. For example, the local bus 83a may be SPI bus where the monitor module 81b assumes the role of a 'Master' and the Host emulator module 81a assumes the role of a 'Slave', and the connection 93d implements the MOSI (Master-Output-Slave-Input) line, and the connection 93a implements the MISO (Master-Input-Slave-Output) line.

As part of the local bus 83b, messaging from the monitor module 81b directed to the peripheral emulator module 81c, are only carried over the connection 93b, which may be a wire, a trace on a PCB, or an inter-IC connection such as a conductive path over a semiconductor substrate. The connection 93b is signal fed from a digital logic output stage 91b (which may be a buffer or a driver) in the monitor module 81b and the digital signal is received by a digital logic input stage 92b (which may be a receiver) in the host emulator module 81a. Similarly, as part of the local bus 83b, messaging directed to the monitor module 81b from the peripheral emulator module 81a are only carried over the connection 93c, which may be a wire, a trace on a PCB, or an inter-IC connection such as a conductive path over a semiconductor substrate. The connection 93c is signal fed from a digital logic output stage 91c (which may be a buffer or a driver) in the peripheral emulator module 81c and the digital signal is received by a digital logic input stage 92c

(which may be a receiver) in the monitor module 81b. For example, the local bus 83b may be SPI bus where the monitor module 81b assumes the role of a 'Master' and the peripheral emulator module 81c assumes the role of a 'Slave', and the connection 93b implements the MOSI (Master-Output-Slave-Input) line and the connection 93c implements the MISO (Master-Input-Slave-Output) line.

In a case where the peripheral device 72 is an input device (such as the keyboard 2 or the pointing device 3), most (or all) of the messages are directed from the peripheral device 72 to the host device 71, and minimum or none traffic is expected in the other direction: from the host device 71 to the peripheral device 72. Hence, traffic directed to the peripheral device 72 may preferably be blocked, for example for inhibiting an infected device impersonating as an input peripheral device to extract data from the host device 71. Such a blocking may be performed logically, such as under software control (e.g., firmware or software in the monitor module 81b). In one example, the blocking may be performed in the physical layer as shown in an arrangement 90a in FIG. 9a. As illustrated, the connection 93d that may be the sole connectivity for allowing data transfer from the monitor module 81b to the host emulator module 81a may physically not be implemented, shown as a disconnection 'X' 94d. It is noted that in such a scheme, neither malfunction of the isolator device 80, nor any infected firmware or software therein may result in any data to be leaked from the host device 71 to the peripheral device 72. Alternatively or in addition, the connection 93c may physically not be implemented, shown as a disconnection 'X' 94c in an arrangement 90b in FIG. 9b.

Alternatively or in addition, the peripheral device 72 may be an output device (such as the display 5 or the printer 4), most (or all) of the messages are directed to the peripheral device 72 from the host device 71, and minimum or none traffic is expected in the other direction to the host device 71 from the peripheral device 72. Hence, traffic directed from the peripheral device 72 may preferably be blocked, for example for inhibiting an infected device impersonating as an output peripheral device to insert malware-related data to the host device 71. Such a blocking may be performed logically, such as under software control (e.g., firmware or software in the monitor module 81b). In one example, the blocking may be performed in the physical layer as shown in an arrangement 90c in FIG. 9c. As illustrated, the connection 93a which may be the sole connectivity for allowing data transfer to the monitor module 81b from the host emulator module 81a may physically not be implemented, shown as a disconnection 'X' 94a. It is noted that in such a scheme, neither malfunction of any component of the isolator device 80 nor any infected firmware or software therein may result in any data to be leaked to the host device 71 from the peripheral device 72. Alternatively or in addition, the connection 93b may physically not be implemented, shown as a disconnection 'X' 94b in an arrangement 90d in FIG. 9d.

In order to properly emulate a USB peripheral interface, the peripheral emulator module 81c includes the USB sink 26b that adheres to the USB standard requirements for USB power termination, as shown in an arrangement 100 illustrating an isolator module 80c. Similarly, in order to properly emulate a USB host interface, the host emulator module 81a includes the USB source 26c that adheres to the USB standard requirements for USB power supply, as shown in the arrangement 100 illustrating the isolator module 80c.

Figure 10:
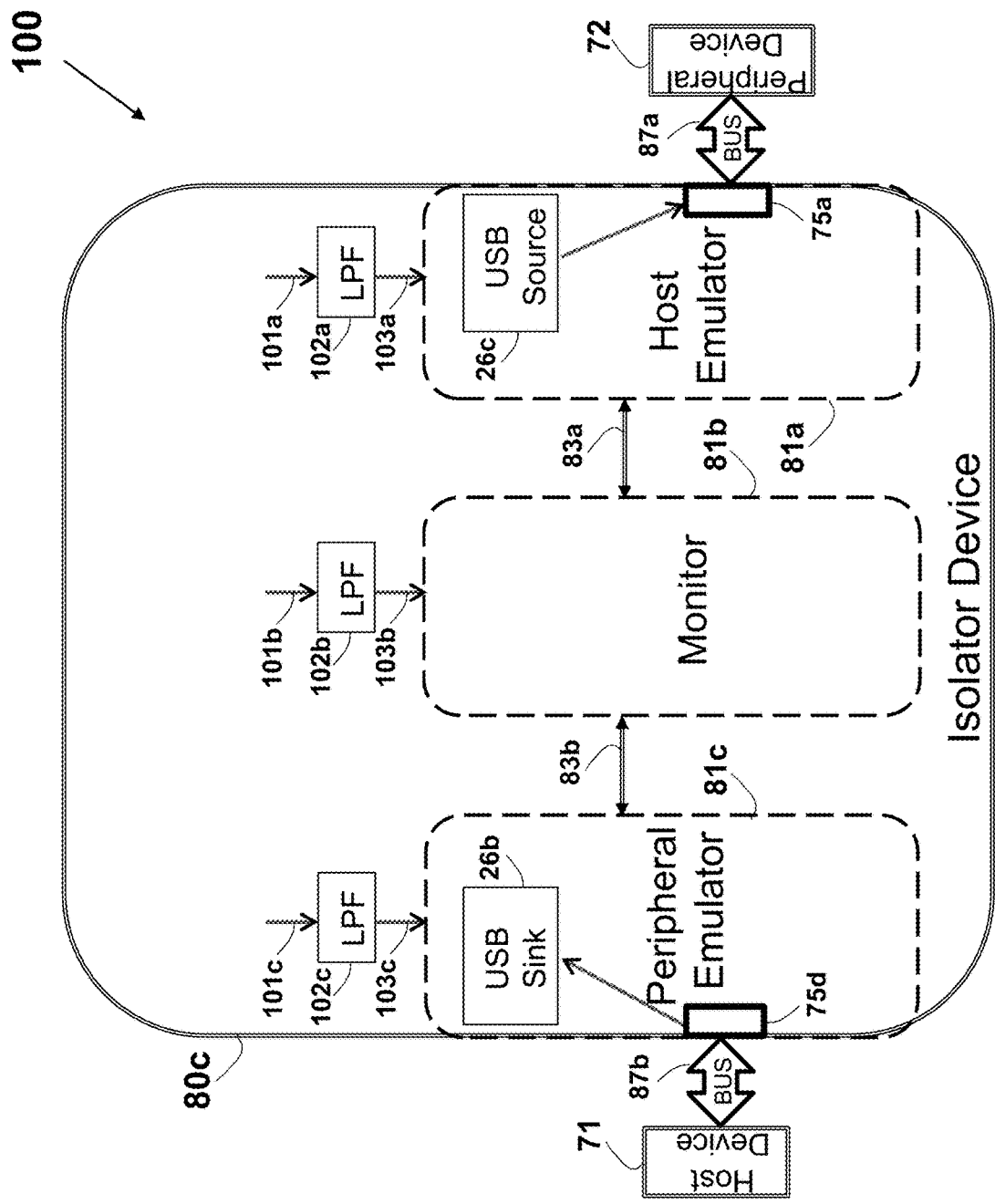
FIG. 10 illustrates schematically a block diagram of modules powering scheme in an isolator device connected between a host device and a peripheral device.

In order to provide isolation between the modules in the isolator device 80, a single power connection in each module is preferably used for powering exclusively that module. Typically, each of the modules is powered by a logic power level such as 3.3 VDC or 5 VDC. As exampled regarding the isolator device 80c shown as part of the arrangement 100 in FIG. 10, a single power connection 103c is used to power all the circuitry associated with the peripheral emulator module 81c, a single power connection 103b is used to power all the circuitry associated with the monitor module 81b, and a single power connection 103a is used to power all the circuitry associated with the host emulator module 81a. Preferably, in order to ensure that data is exchanged between the modules only as intended, such as via the local buses and not via the shared power lines or power source, a Low Pass Filter (LPF) is connected in series to each of the modules power connections. An LPF 102c is connected between the non-filtered power connection 101c and the filtered power connection 103c for powering and isolating the peripheral emulator module 81c, an LPF 102b is connected between the non-filtered power connection 101b and the filtered power connection 103b for powering and isolating the monitor module 81b, and an LPF 102a is connected between the non-filtered power connection 101a and the filtered power connection 103a for powering and isolating the host emulator module 81a. The LPFs are preferably design to pass only the DC signal (such as 3.3 VDC or 5 VDC), and to stop any other signals, and in particular any communication signals, from entering the modules. The LPS may be similar to, identical to, or distinct from each other. Each of the LPFs may be structured based on a Chebyshev filter, a Butterworth filter, a Bessel filter, or an Elliptic filter, and may be a first order or a second order filter. Further, each of the LPFs may be passive, such as an RC, an RL, or an RLC filter.

Figure 10A:
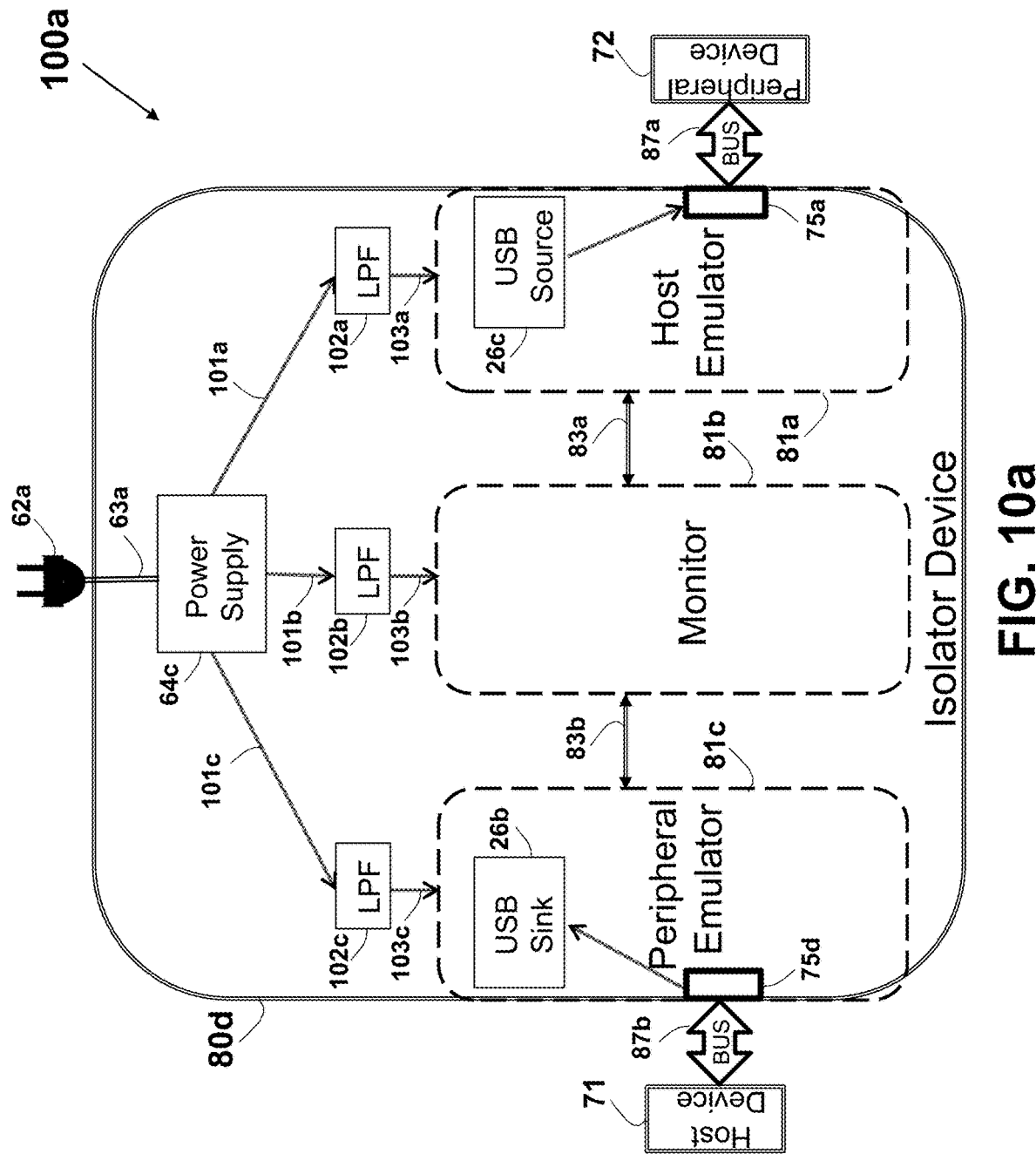
FIG. 10a illustrates schematically a block diagram of AC powering scheme of an isolator device connected between a host device and a peripheral device.

In one example, the isolator device 80d is locally powered from a local dedicated power source via the power connector, such as an AC power connector 62a shown as part of an arrangement 100a in FIG. 10a. The power source may be the mains AC power, and then a power supply 64c may be used, which is power fed from the common AC power supply via the AC plug connector 62a and a power cord 63a, using the mains AC power (commonly 115 VAC/60 Hz in North America or 220 VAC/50 Hz in Europe) as the power source. Such a power supply 64c commonly includes an AC/DC converter, for converting the AC voltage power supplies commonly include voltage stabilizers for ensuring that the output remains within certain limits under various load conditions, and typically employs a transformer, silicon diode bridge rectifier, reservoir capacitor and voltage regulator IC, and converts the incoming voltage to the required low-level stabilized DC voltage or voltages, commonly suitable for power the digital circuits of the isolator device 80 circuits, such as 3.3 VDC, 5 VDC or 12 VDC, and various voltages required by the internal electronics circuitry of the isolator device 80. In the example of the isolator device 80c shown as part of the arrangement 100a, all the three modules within the isolator device 80d are powered from the same power source (the AC mains via the AC power plug 62a) and via the same power supply 64c.

Alternatively or in addition, the isolator device 80 may be partly or fully powered from a battery, that substitutes the power supply 64c and the AC connection via the AC plug 62a. The battery may be a primary battery or cell, in which an irreversible chemical reaction generates the electricity, and thus the cell is disposable and cannot be recharged, and need to be replaced after the battery is drained. Such battery replacement may be expensive and cumbersome. Alternatively or in addition, a rechargeable (secondary) battery may be used, such as a nickel-cadmium based battery. In such a case, a battery charger is employed for charging the battery while it is in use or not in use. Various types of such battery chargers are known in the art, such as trickle chargers, pulse chargers and the like. The battery charger may be integrated with the field unit or be external to it. The battery may be a primary or a rechargeable (secondary) type, may include a single or few batteries, and may use various chemicals for the electro-chemical cells, such as lithium, alkaline and nickel-cadmium. Common batteries are manufactured in pre-defined standard output voltages (1.5, 3, 4.5, 9 Volts, for example), as well as defined standard mechanical enclosures (usually defined by letters such as "A", "AA", "B", "C" sizes), and 'coin' type. In one embodiment, the battery (or batteries) is held in a battery holder or compartment, and thus can be easily replaced.

Figure 10B:
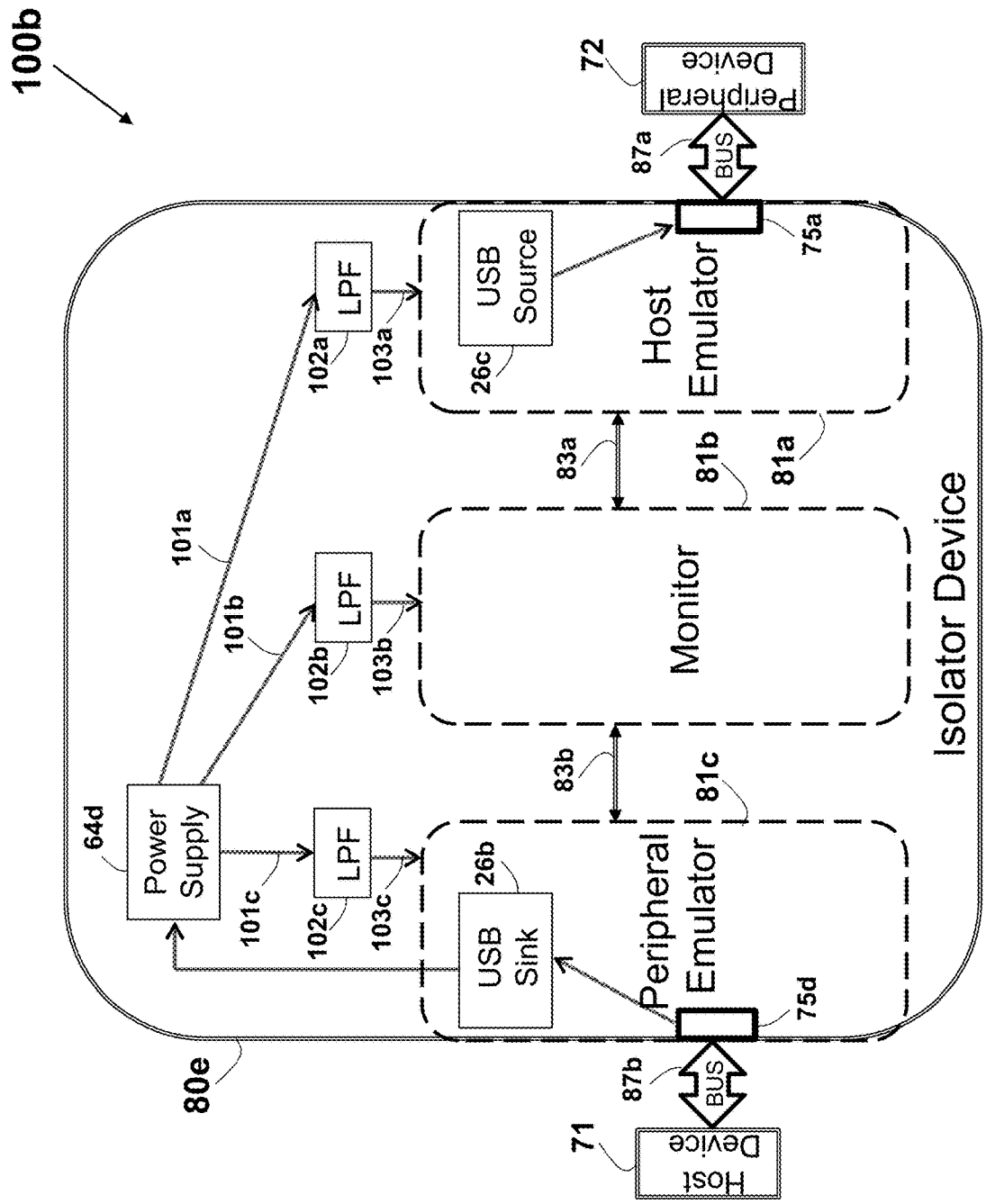
FIG. 10b illustrates schematically a block diagram of USB-powering scheme of an isolator device connected between a host device and a peripheral device.

In one example, shown in an arrangement 100b in FIG. 10b, the isolator device 80c is power fed from the power carried by the USB bus cable. Commonly a DC power is provided and extracted by the USB sink 26b or from the USB connector 75d, feeding a power supply 64d. The power supply 64d typically includes a DC/DC converter that may be a linear or switching type, which converts the incoming voltage to the required low-level stabilized DC voltage or voltages, commonly suitable for power the digital circuits, such as 3.3 VDC, 5 VDC or 12 VDC, and various voltages required by the internal electronics circuitry of the isolator device 80c. The DC/DC converter or the AC/DC converter may include a boost converter, such as a buck-boost converter, charge pump, inverter and regulators as known in the art, as required for conversion of one form of electrical power to another desired form and voltage.

Figure 10C:
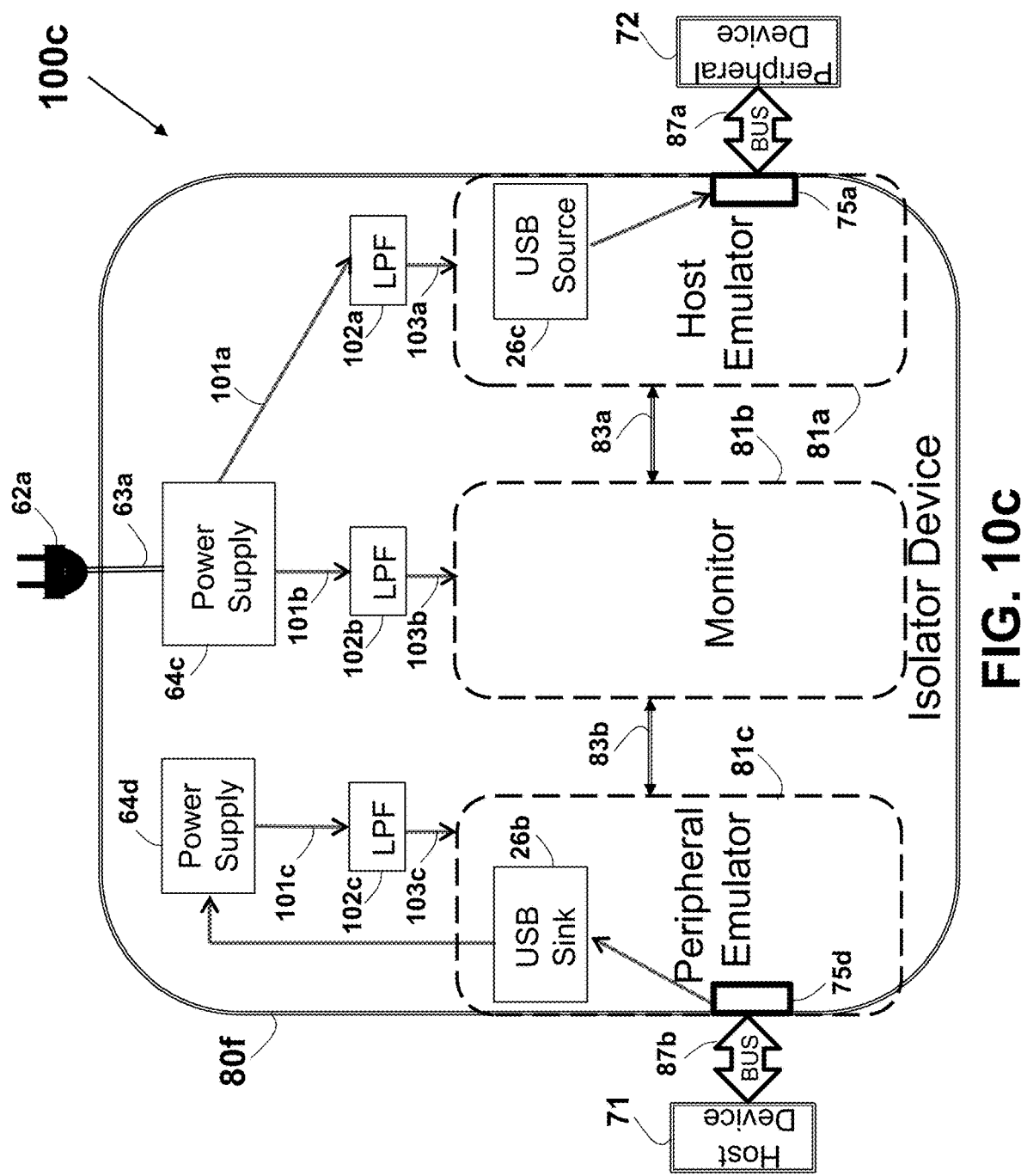
FIGS. 10c and 10d illustrate schematically a block diagram of both USB-powering and AC-powering of an isolator module connected between a host device and a peripheral device.
Figure 10D:
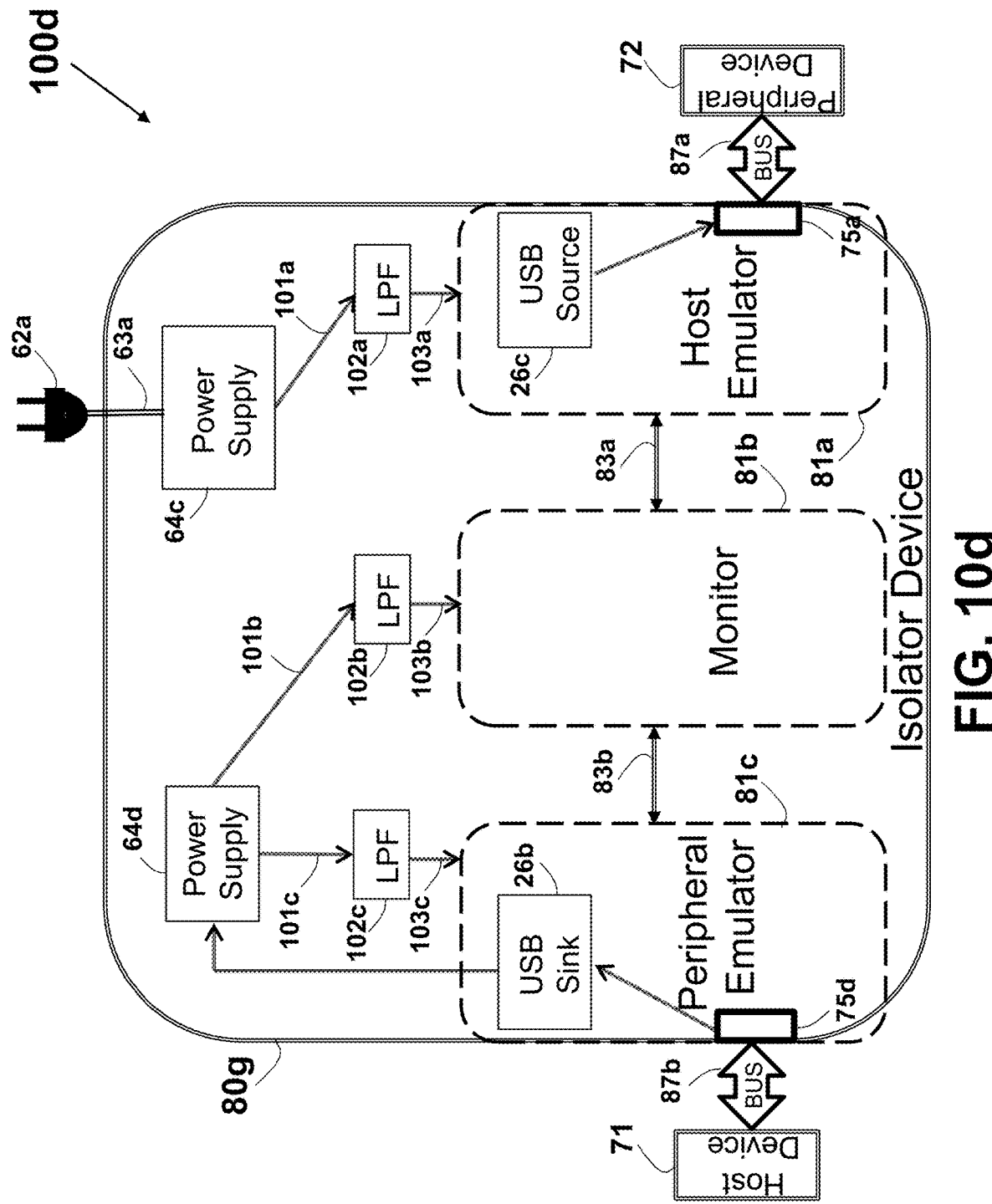

Alternatively or in addition, part of the modules may be powered from the USB power, while others may use a local powering scheme, for example due to a power consumption beyond the carried USB power specifications. An example is shown as an arrangement 100c in FIG. 10c, illustrating an isolator module 80f where only the peripheral emulator module 81c is fed from the USB power via the power supply 64d (that may include DC/DC converter), while the monitor module 81b and the host emulator module 81a are being locally powered from an AC source via the AC power plug 62a and the power supply 64c (that may include AC/DC converter). Another example is shown as an arrangement 100d in FIG. 10d, illustrating an isolator module 80g where the peripheral emulator module 81c and the monitor module 81b are fed from the USB power via the power supply 64d (that may include DC/DC converter), while only the host emulator module 81a is being locally powered from an AC source via the AC power plug 62a and the power supply 64c (that may include AC/DC converter).

Each of the modules may be individually and separately enclosed or structured, such as using separate PCBs or separate enclosures for each module. Alternatively or in addition, each of the module may be implemented as a die (or chip) or as an Integrated Circuit (IC), and may include, or be based on, a PLD. The isolator device 80 may be integrated or embedded, in part or in full, in the peripheral device 72 or in the host device 71. For example, the isolator device 80 may be integrated within the enclosure of computer 11, such as being implemented as circuits mounted on the computer 11 motherboard or PCB along with the processor 12.

Preferably, the isolator device 80 may be enclosed in a single dedicated enclosure. In one example, the isolator device 80 may be implemented in a form of Integrated Circuit (IC, a.k.a. chip or microchip). Alternatively or in addition, the isolator device 80 may be in the form of a packaged functional assembly of electronic components (module). Such module may be based on a PCB (Printed Circuit Board) such as PC Card according to Personal Computer Memory Card International Association (PCMCIA) PCMCIA 2.0 standard, or a Single In-line Memory Module (SIMM) (or DIMM) which is standardized under the JEDEC JESD-21C standard. Alternatively, the enclosure may be in a PC Card form factor according to PCMCIA 2.0 (or JEIDA 4.1) is used, suitable for mounting into a corresponding PCMCIA-compatible slot, supporting 16 or 32-bit width interface, and connected via 68 pins connectors. Similarly, CardBus according to PCMCIA 5.0 may be used. In one non-limiting example, the enclosure may be in the form of SD (Secure Digital) Card, based on standard by SD Card Association (SDA), which is commonly used in many small portable devices such as digital video camcorders, digital cameras, audio players and mobile phones. Other types of memory cards may be equally used, such as CompactFlash (CF), MiniSD card, MicroSD Card, and xD-Picture Card.

In one example, the isolator device 80 circuitry uses a dedicated PCB that is enclosed in a protective enclosure, and connects via a PCB-mounted connector such as in PCMCIA or ExpressCard standard expansion cards. Preferably, such a connection supports hot-plugging. The ExpressCard standard specifies two form factors, ExpressCard/34 (34 mm wide) and ExpressCard/54 (54 mm wide, in an L-shape), where the connector is the same on both (34 mm wide). Standard cards are 75 mm long (10.6 mm shorter than CardBus) and 5 mm thick, but may be thicker on sections that extend outside the standard form. The 34 mm slot accepts only 34 mm cards, while the 54 mm slot accepts both 34 mm and 54 mm cards. A diagonal guide in the rear of the 54 mm slot guides 34 mm cards to the connector.

Figure 11:
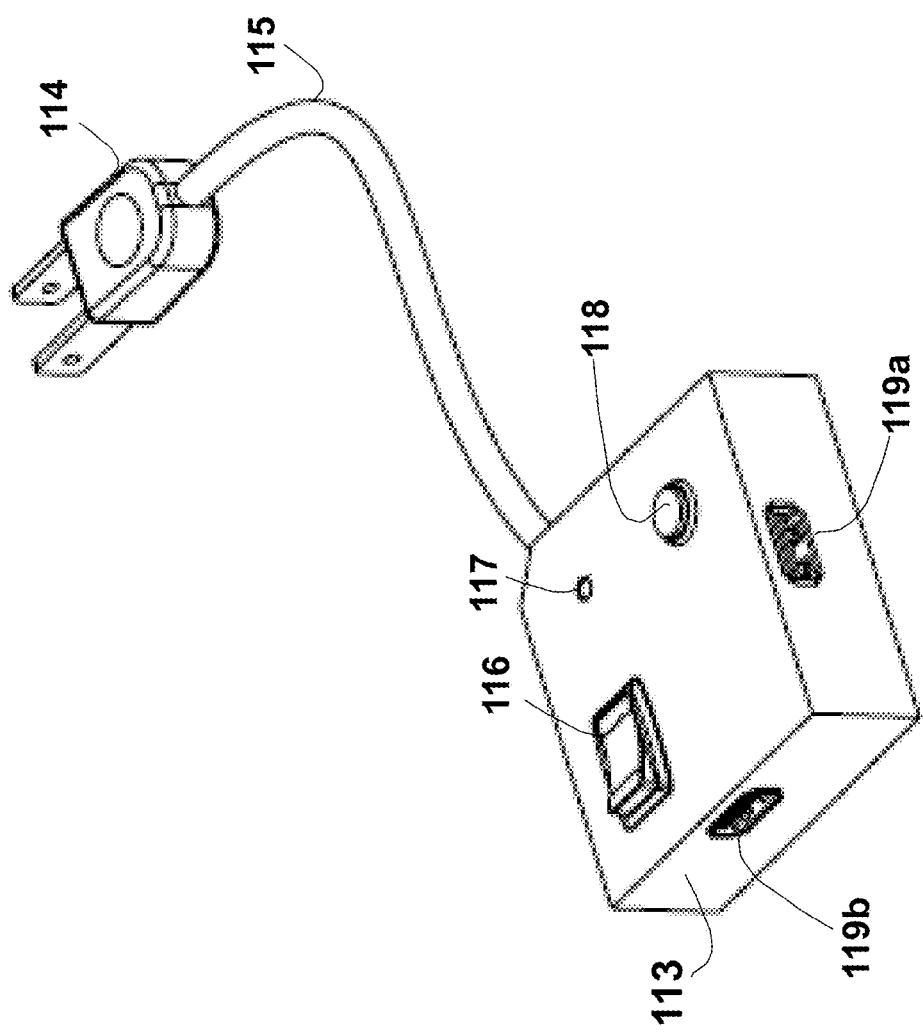
FIG. 11 depicts schematically an enclosure of an AC-powered isolator module.

Further, the enclosure form factor may be box-shaped having a protecting enclosure, further having one or more connectors for connecting to the buses for connecting to peripheral device 72 and to the host device 71, using the suitable standard bus connectors. Preferably, the enclosure may be in the form of a separately rigidly enclosed box. Such a box may be configured to be portable, hand-held, to be placed on a desk, or to be wall-mounted. An example for such a box-shaped enclosure 113 is shown in FIG. 11, connected to be AC powered via an AC power plug 114 (which may correspond to the AC plug 62a) via an AC cable 115 (which may correspond to the AC cord 63a), and supporting two USB connectors 119a and 119b (which may correspond to the USB connectors 75a and 75d). The enclosure 113 further include an on/off switch 116, and user operated push-button 118 (which may be part of the user control 88, and an LED 117 for visually indication status to a user. While the enclosure 113 is shown shaped as a rectangular cross-section box with all sides flat (or substantially flat) is shown, the box used may have (or be based on) a cross section (horizontal or vertical) that is square, elongated, round or oval, sloped or domed top surfaces, or non-vertical sides. Similarly, the shape of a cube or right rectangular prism can be used, or can be based upon. A horizontal or vertical circular cross section can be used (or be based upon) such as simple geometric shapes such as, a cylinder, sphere, cone, pyramid, or torus.

Figure 11A:
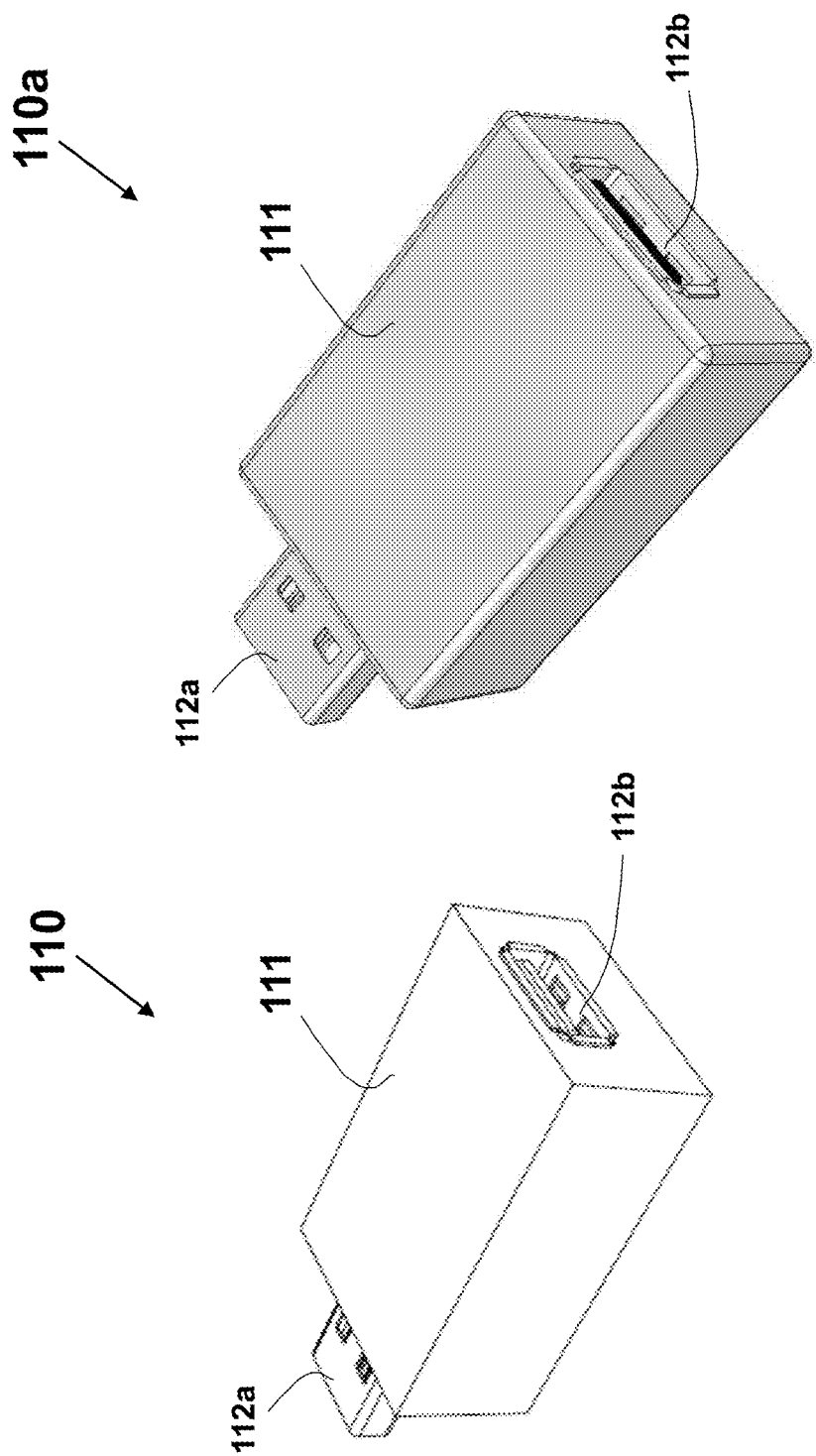
FIG. 11a depicts schematically an enclosure of a USB-powered isolator module.
Figure 11B:
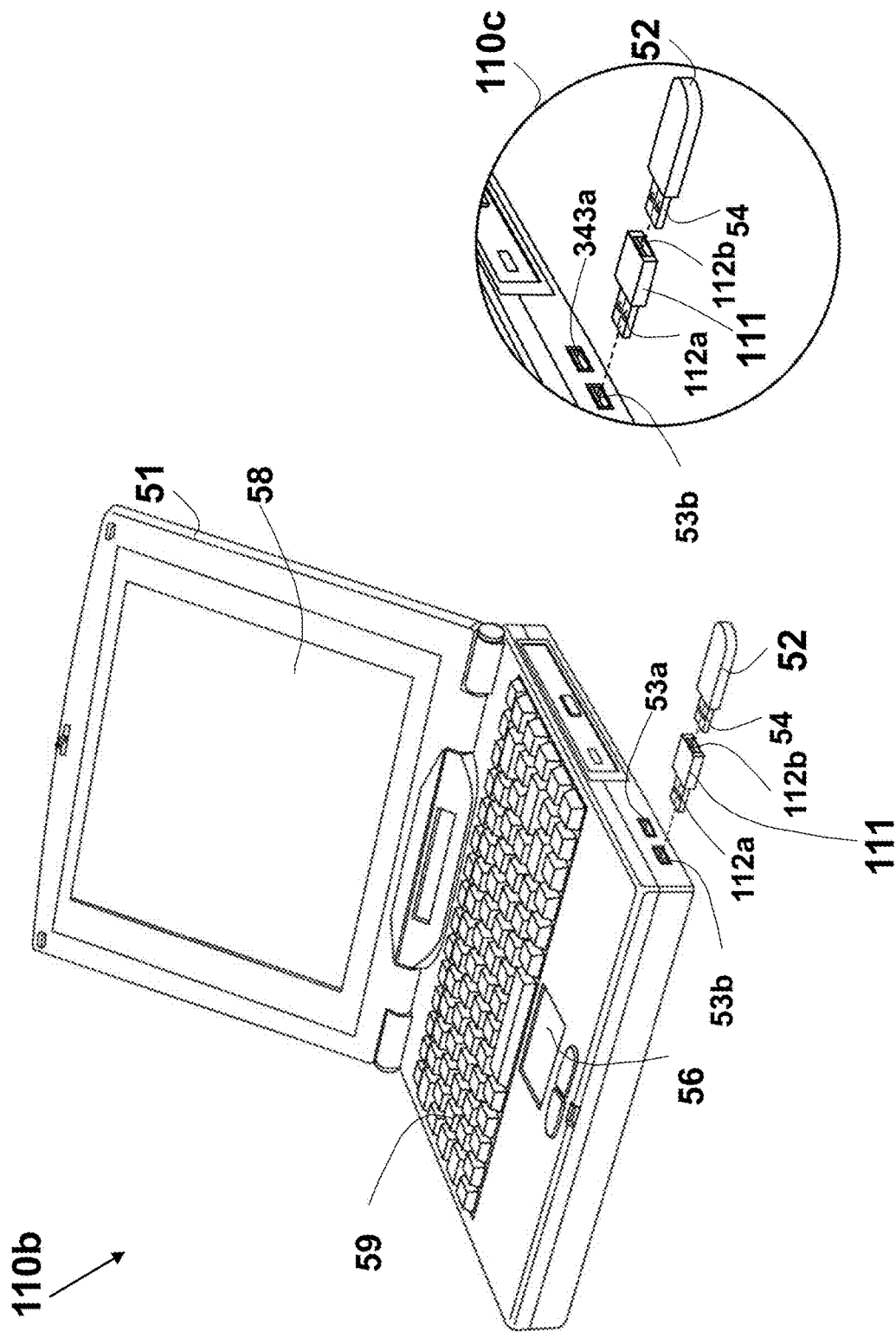
FIG. 11b depicts schematically a laptop, an isolator device, and 'thumb drive' flash drive.
Figure 11C:
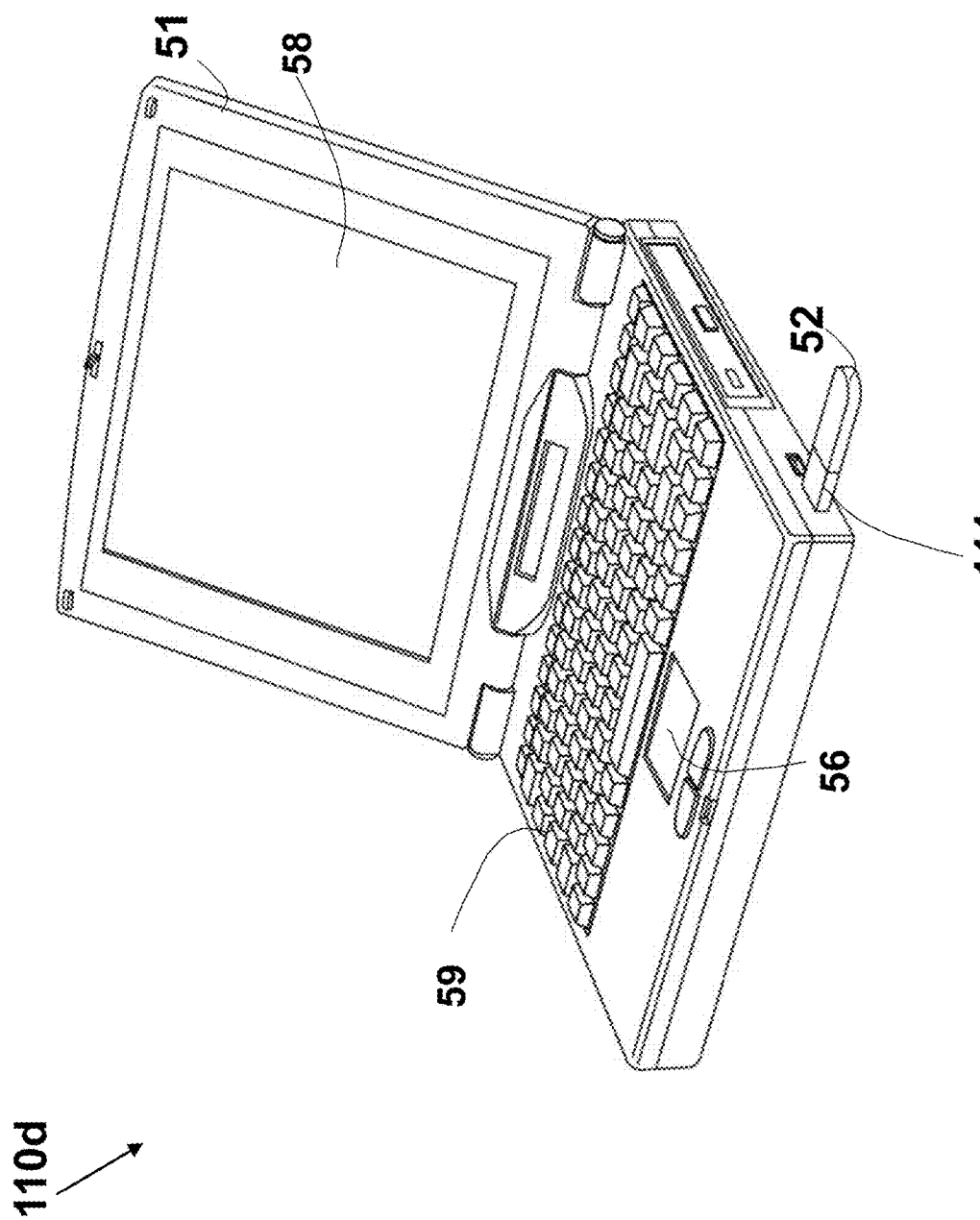
FIG. 11c depicts schematically a laptop, and 'thumb drive' flash drive inserted thereto via an isolator device.

In one example, the isolator device 80 is packaged in a single enclosure configured to, or shaped as, a 'thumb drive', 'stick' or 'dongle', such as an enclosure 111 shown schematically in a view 110 and pictorially in a view 110a in FIG. 11a, where the USB connectors are used for both electrical connection and mechanical support or attachment. The enclosure 111 includes a Type-A receptacle 112b, (which may correspond to the connector 75a) which may mate with the A-Type plug of the peripheral device 72, and an A-Type plug 112a that mates with the Type-A receptacle of the host device 71. Using such an enclosure 111 in the arrangement 50 above, may allow the use of unchanged laptop 51 (serving as the host device 71) and the flash drive 52 (serving as the peripheral device 72) to be easily connected as shown in views 110b and 110c in FIG. 11b, where USB connector 54 of the flash drive 52 is inserted to the USB connector 112b of the enclosure 111, which in turn is inserted to the respective USB connector 53b of the laptop 51, rendering the enclosure 111 mechanically attached or secured, and electrically connected to the laptop 51, as shown in a view 110d in FIG. 11c.

Preferably, the monitor module 81b and the host emulator module 81a are communicatively coupled solely over the local bus 83a, which may be a bi-directional bus supporting half-duplex of full-duplex communication. Similarly, the monitor module 81b and the peripheral emulator module 81c are preferably communicatively coupled solely over the local bus 83b, which may be a bi-directional bus supporting half-duplex of full-duplex communication. In one example, the local buses 83a and 83b use different lines or connections for each communication direction, as shown in the arrangement 90 in FIG. 9. For a secured, reliable, and trusted operation, it is preferred that the local buses 83a and 83b are galvanically isolated, for improving the common-mode rejection, and for avoiding data leakage or impact via ground lines, via a wireless (such as by induction), or using any other common-mode based scheme. Such hardening of the isolator device 80 may include adding a galvanic isolation to all the data carrying connections between the modules, namely all the lines or the connections of the local buses 83a and 83b.

Figure 9:
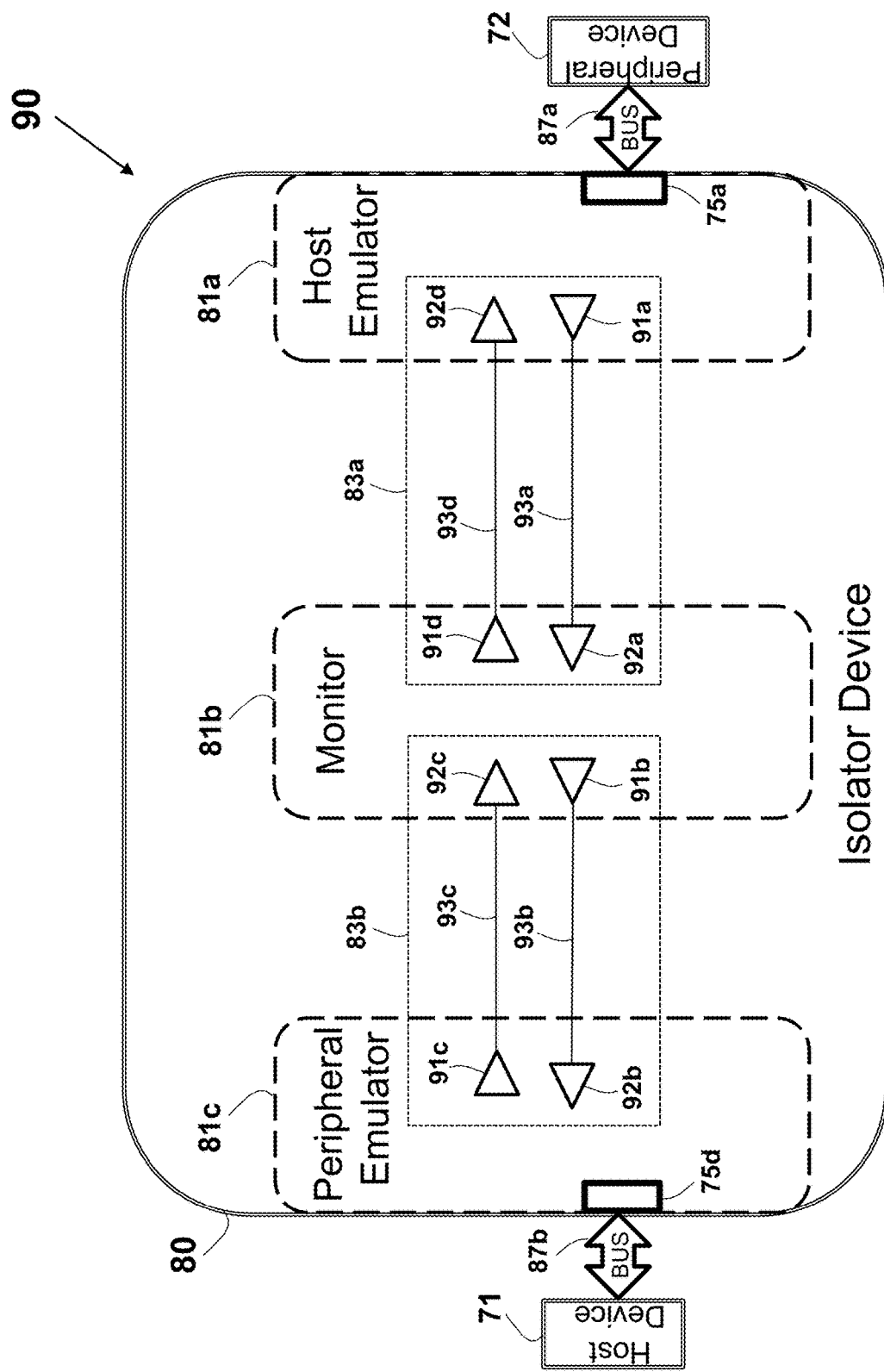
FIG. 9 illustrates schematically a block diagram of bidirectional local buses in an isolator device connected between a host device and a peripheral device.
Figure 9A:
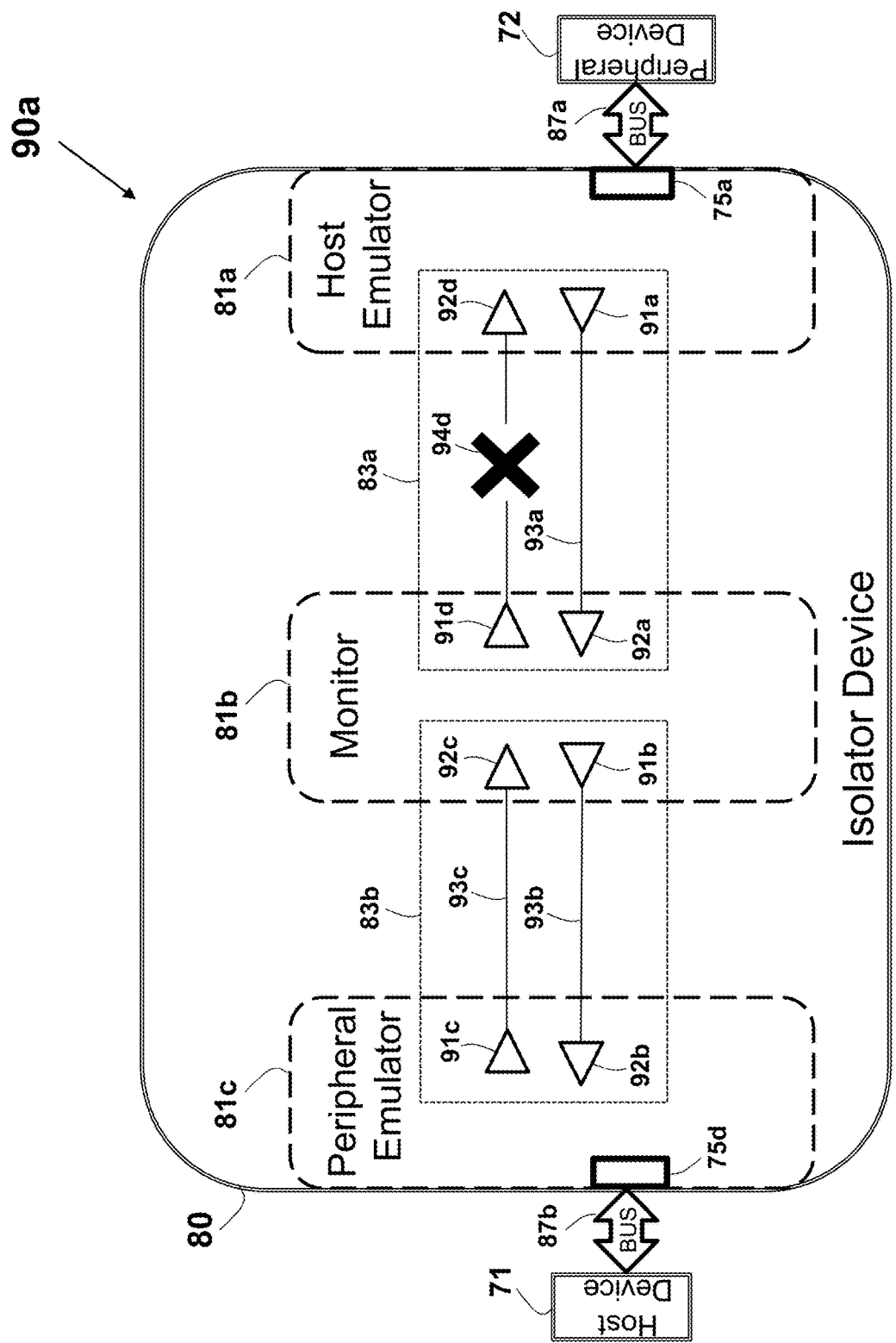
FIGS. 9a, 9b, 9c, and 9d illustrate schematically a block diagram of a unidirectional local bus in an isolator device connected between a host device and a peripheral device.
Figure 9B:
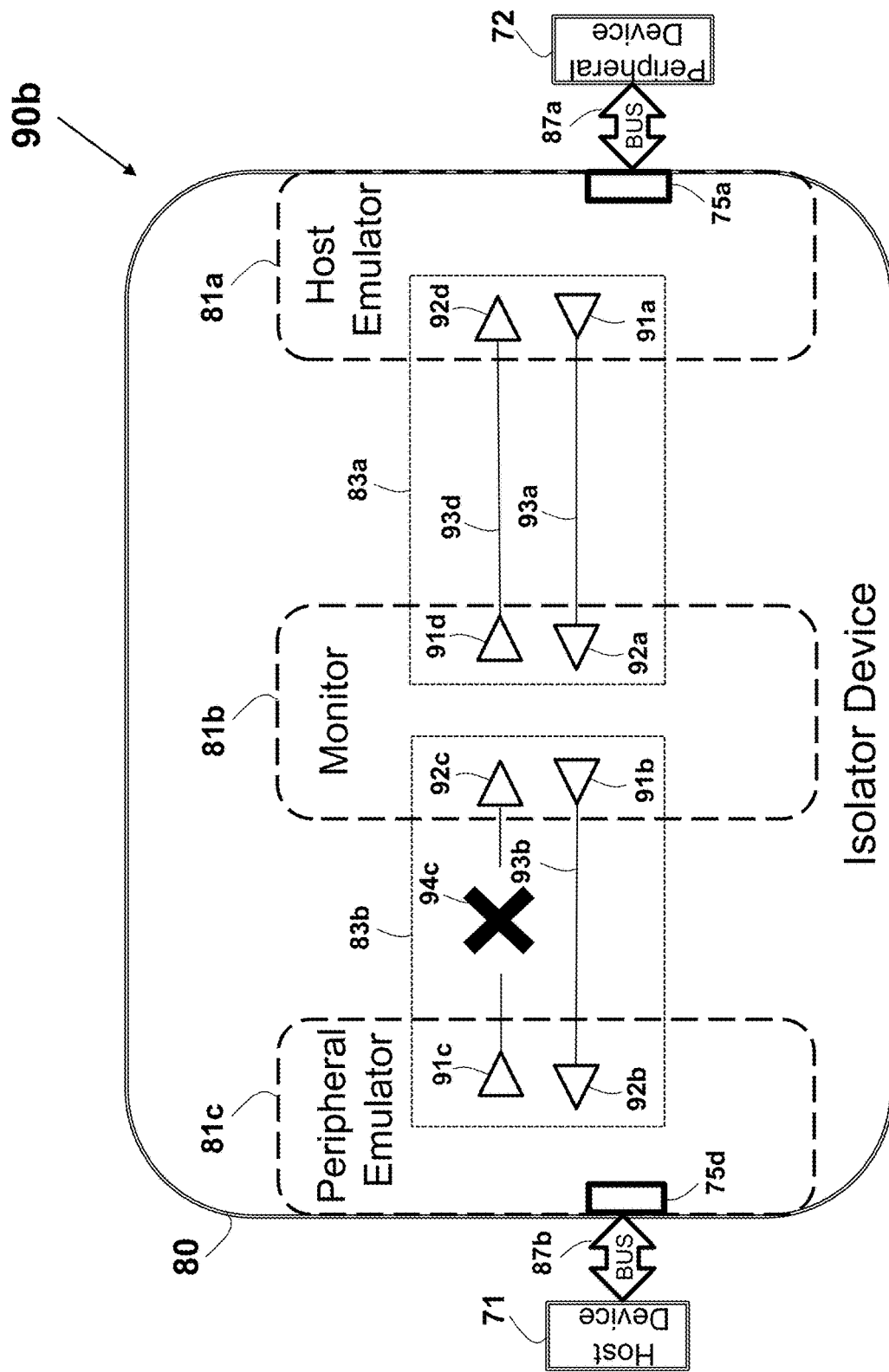
Figure 9C:
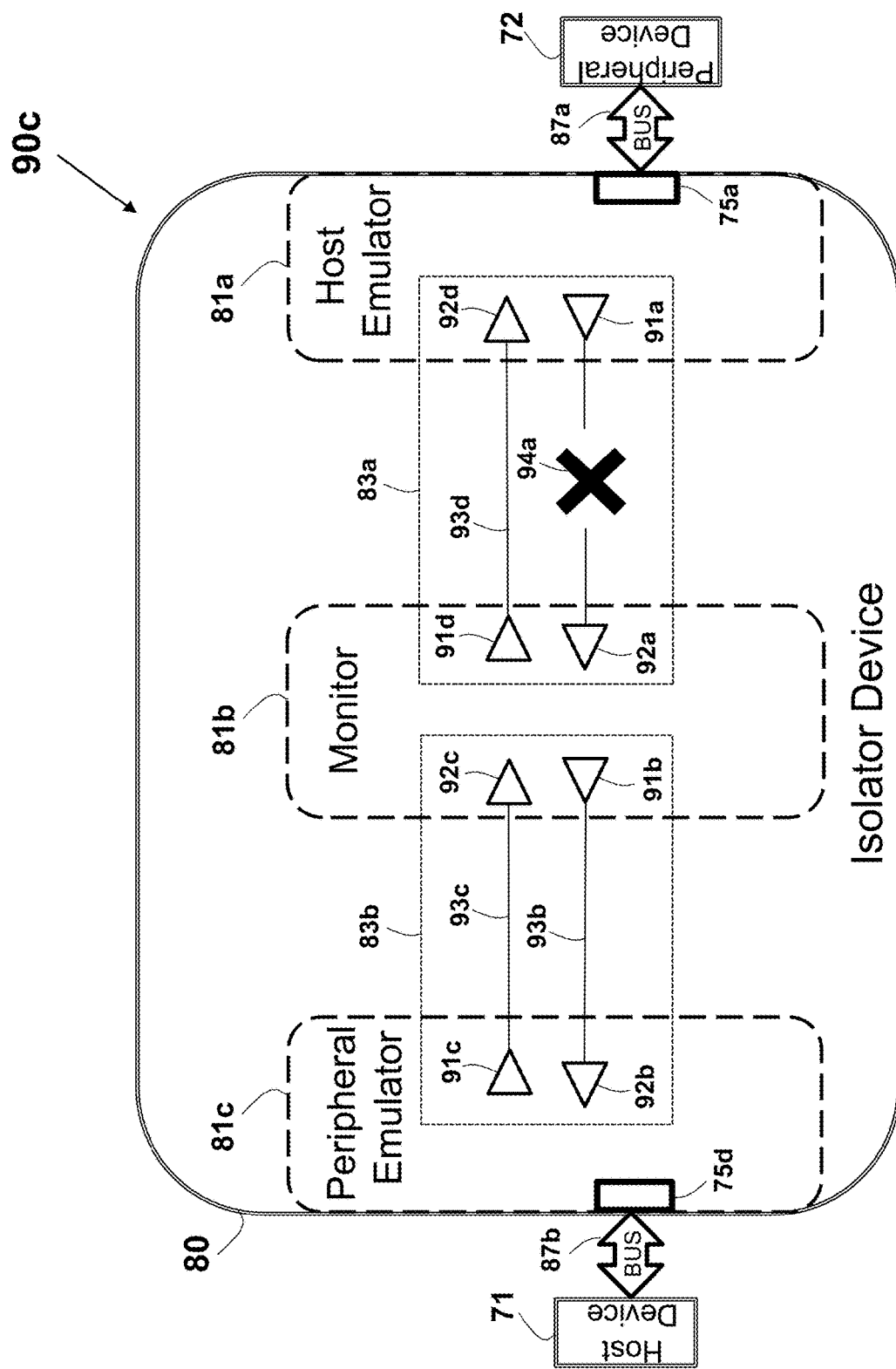
Figure 9D:
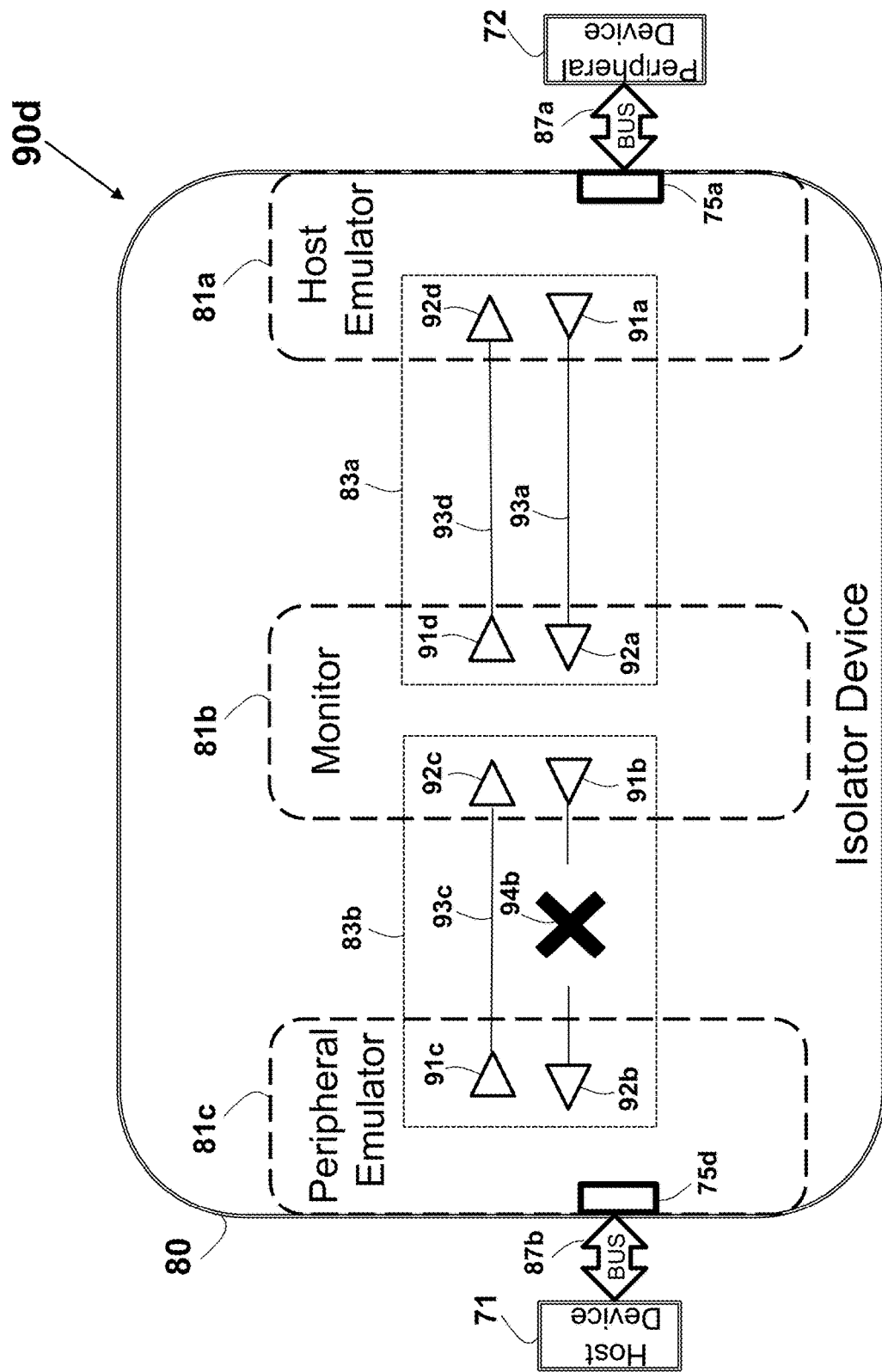
Figure 12:
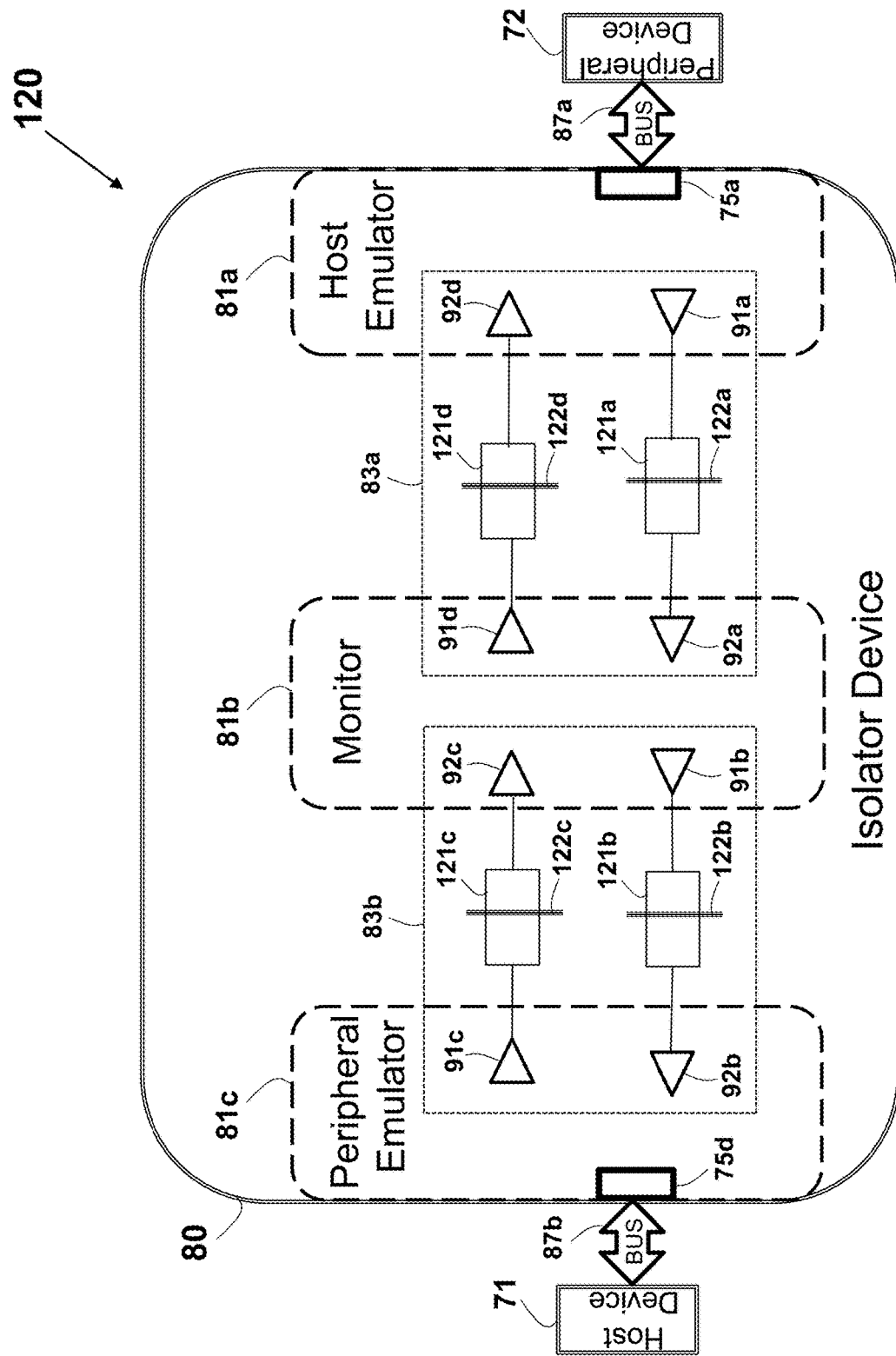
FIG. 12 illustrates schematically a block diagram of isolated bidirectional local buses in an isolator device connected between a host device and a peripheral device.
Figure 12A:
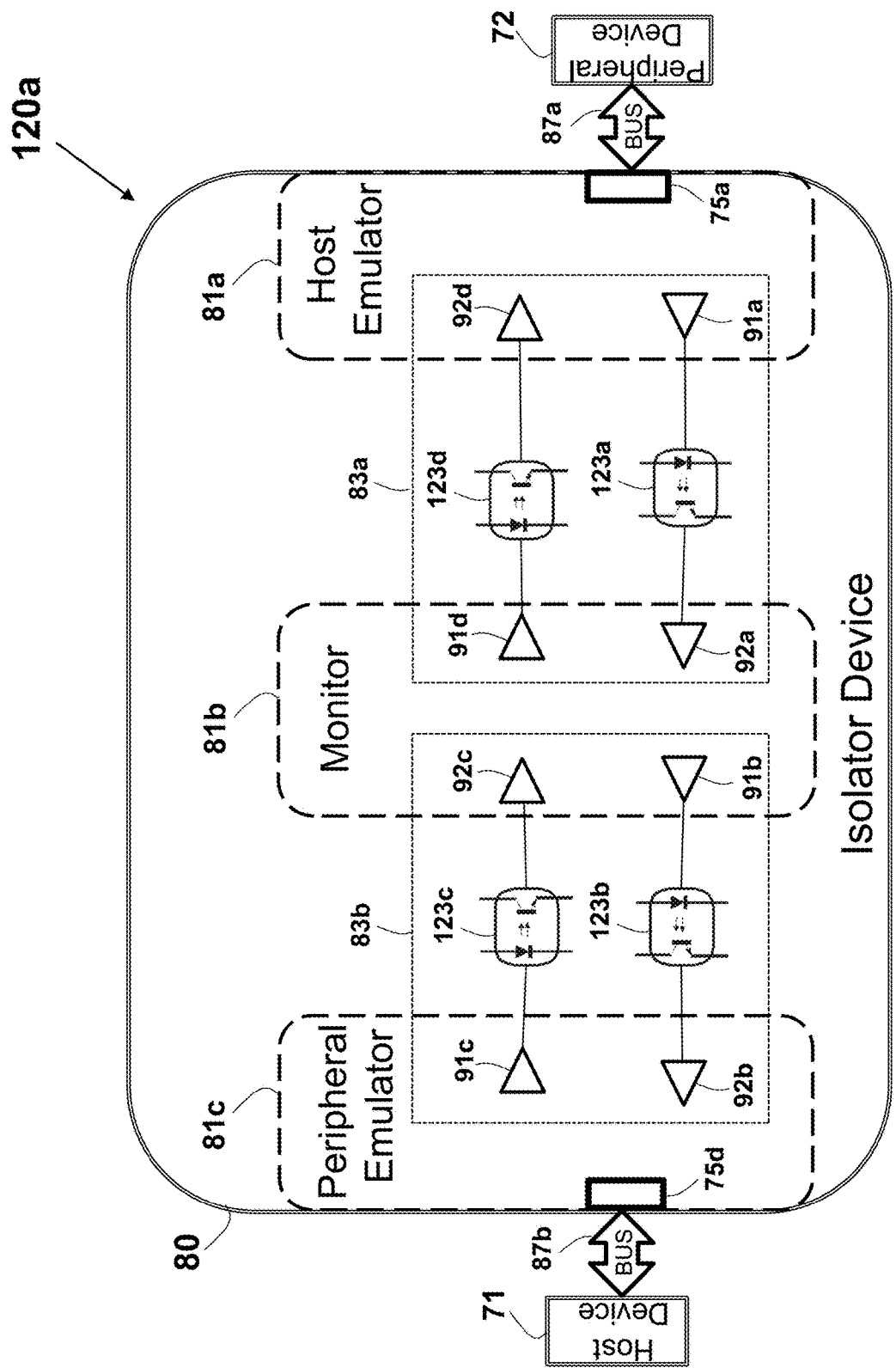
FIG. 12a illustrates schematically a block diagram of optocoupler-based isolated bidirectional local buses in an isolator device connected between a host device and a peripheral device.

An example of such an isolation scheme assuming that the local buses are each including only two connections, based on the arrangement 90 in FIG. 9, is shown as an arrangement 120 in FIG. 12. As a substitute to the direct conductive connections 93a, 93b, 93c, and 93d, a galvanic isolation component is inserted having a galvanic barrier. The isolation components may include, or be based on, isolation transformers or opto-isolators (optocouplers). An isolation component 121a having a barrier 122a is connected between the digital logic output 91a and the digital logic input 92a as a substitute to the conductive direct connection 93a, an isolation component 121b having a barrier 122b is connected between the digital logic output 91b and the digital logic input 92b as a substitute to the conductive direct connection 93b, an isolation component 121c having a barrier 122c is connected between the digital logic output 91c and the digital logic input 92c as a substitute to the conductive direct connection 93b, and an isolation component 121d having a barrier 122d is connected between the digital logic output 91d and the digital logic input 92d as a substitute to the conductive direct connection 93d. In one example, the isolation components are implemented as optocouplers as shown in an arrangement 120a in FIG. 12a, where the isolation components 121a, 121b, 121c, and 121d are respectively consisting of, using, or including, optocouplers 123a, 123b, 123c, and 123d.

Each of the processors (such as the processor 82c in the peripheral emulator module 81c, the processor 82b in the monitor module 81b and the processor 82a in the host emulator module 81a) in the isolation device 80 requires a clock signal for proper operation. Further, a clock signal is required for properly generating and encoding the USB signals to be transmitted over a USB cable, and a clock signal is required for the Phase-Locked-Loop (PLL) operation for properly decoding and detecting the received USB signals over a USB connection. In order to satisfy the requirements of the USB standard, or in order to allow operation at high communication rates, an accurate frequency clock signal is required, such as generated by a quartz crystal oscillator.

In order to practically provided isolation between the modules, each of the modules is arranged to have a single clock input that is connected to, and serves, all the components and circuits in the module requiring a clock signal.

Figure 13:
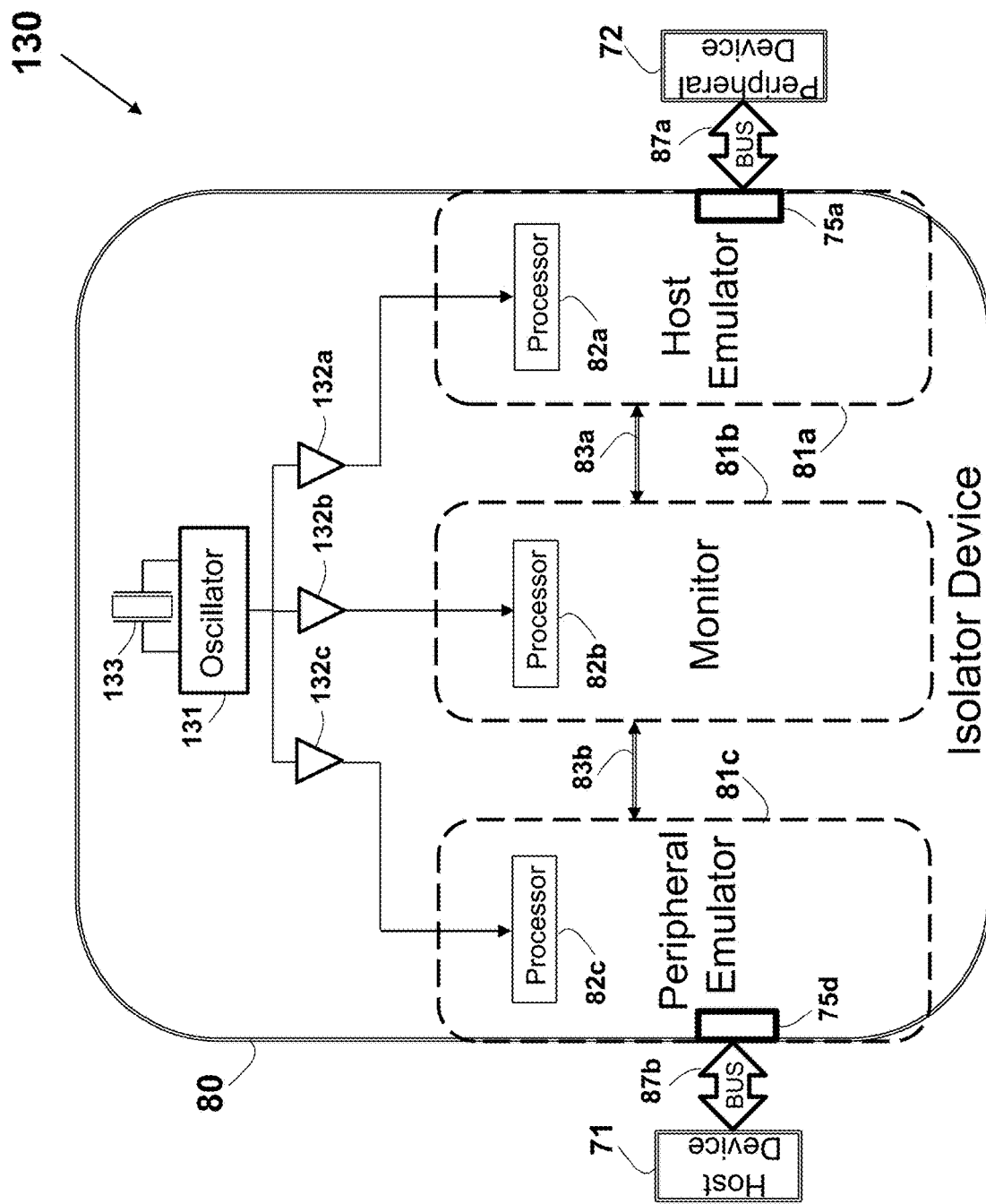
FIG. 13 illustrates schematically a block diagram of a centralized clock signal scheme in an isolator device connected between a host device and a peripheral device.

In one example, a clock distribution network (or clock tree, when this network forms a tree) may be used, where the clock signal is generated by a single oscillator, and distributed from a common point to the clock modules connections. Such a scheme is shown in an arrangement 130 in FIG. 13. A single oscillator 131 is employed, which may be a crystal quartz oscillator using a connected quartz crystal 133 setting the clock frequency, and the output clock signal is fanned to three output stages or output components, that may be drivers or buffers. An output device 132a connects the clock signal generated by the oscillator 131 to the single clock connection 134a of the host emulator module 81a, an output device 132b connects the clock signal generated by the oscillator 131 to the single clock connection 134b of the monitor module 81a, and an output device 132c connects the clock signal generated by the oscillator 131 to the single clock connection 134c of the peripheral emulator module 81a.

Figure 13A:
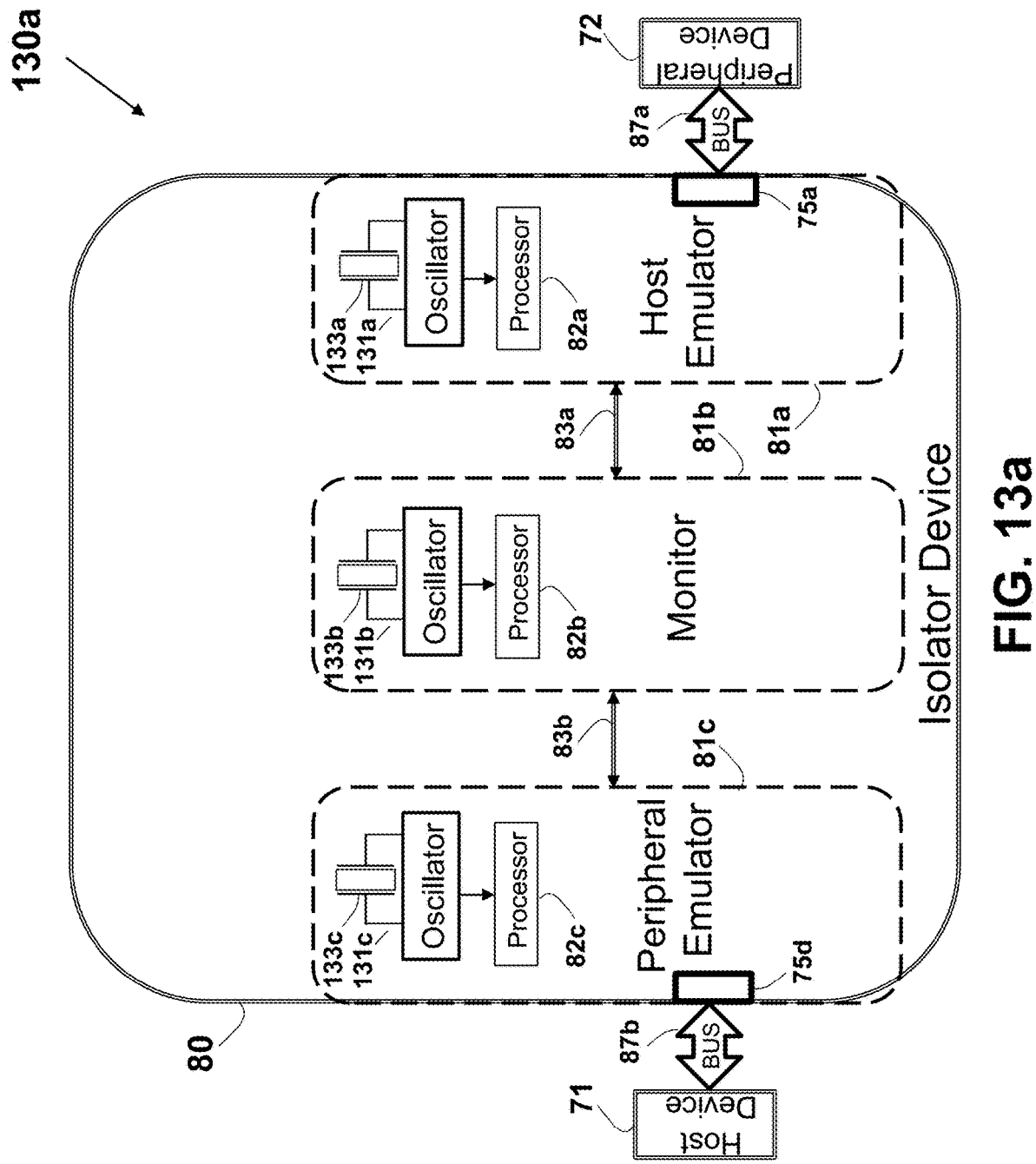
FIG. 13a illustrates schematically a block diagram of a separated crystal oscillator-based clock signals scheme in an isolator device connected between a host device and a peripheral device.

Alternatively or in addition, the electrical isolation between the modules may be enhanced by using distinct and separate clock generation and distribution circuits for each of the modules, as shown in an arrangement 130a in FIG. 13a. A crystal oscillator 131a using a quartz crystal 133a is provided in the host emulator module 81a, and is used to feed a clock signal solely to the circuits in this module. Preferably, the oscillator 131a and any other related clock distributing circuits are power fed from the power connection 103a of the host emulator module 81a, as shown in the arrangement 100 in FIG. 10. A crystal oscillator 131b using a quartz crystal 133b is provided in the monitor module 81b, and is used to feed a clock signal solely to the circuits in this module. Preferably, the oscillator 131b and any other related clock distributing circuits are power fed from the power connection 103b of the host emulator module 81a, as shown in the arrangement 100 in FIG. 10, and a crystal oscillator 131c using a quartz crystal 133c is provided in the peripheral emulator module 81c, and is used to feed a clock signal solely to the circuits in this module. Preferably, the oscillator 131c and any other related clock distributing circuits are power fed from the power connection 103c of the host emulator module 81a, as shown in the arrangement 100 in FIG. 10.

In order to notify a human user of a status or otherwise alert for any detected or identified event, the user control 88 may include an annunciator, which may be activated by the processor 82b. The annunciator may consist of one or more visual or audible signaling component, or any other devices that indicate a status to the person. The annunciator may include a visual signaling device. In one example, the device illuminates a visible light, such as a Light-Emitting-Diode (LED), or uses a Liquid Crystal Display (LCD) that uses changes in the reflectivity in an applied electric field. The LED may be a multi-color LED, such as LED Part No. 08L5015RGBC available from RSR Electronics, Inc. from NJ, U.S.A., described in data-sheet Multi Color LED Part No. 08L5015RGBC, which is incorporated in its entirety for all purposes as if fully set forth herein.

However, any type of visible electric light emitter such as a flashlight, an incandescent lamp, and compact fluorescent lamps can be used. Multiple light emitters may be used, and the illumination may be steady, blinking or flashing. Further, a single-state visual indicator may be used to provide multiple indications, such as by using different colors (of the same visual indicator), different intensity levels, variable duty-cycle and so forth. Further, the visual signaling may be associated with the isolator device 80 function. Such conceptual relationships may include, for example, the light emitters' brightness, appearance, location, type, color and steadiness that are influenced by the estimated value.

In one example, the annunciator operation is based on a numerical digital display that provides readings in the form of numbers of the estimated value of any value derived thereof. For example, the annunciator may use the quadruple digits, seven-segments, LED display Part No.: LTC-3610G available from Lite-On Electronics, Inc., and described in Lite-On Electronics, Inc., Publication BNS-OD-C131/A4 downloaded March 2011, which is incorporated in its entirety for all purposes as if fully set forth herein. Similarly, the annunciator may be based on an alphanumerical digital display that provides readings in the form of characters, including numbers, letters or symbols. For example, the annunciator may use the quadruple digits, seven-segments, LED display Part No.: LTM-8647AC available from Lite-On Electronics, Inc., and described in Lite-On Electronics, Inc., Publication BNS-OD-C131/A4 downloaded March 2011, which is incorporated in its entirety for all purposes as if fully set forth herein.

The invention can be similarly used to display word messages in a variety of fashions and formats, such as scrolling, static, bold, and flashing. The device may further display visual display material beyond words and characters, such as arrows, symbols, ASCII and non-ASCII characters, still images such as pictures and video. The annunciator may use any electronic display or any other output device used for the presentation of visual information. The display may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. Analog displays commonly use interfaces such as composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Standard digital interfaces such as an IEEE1394 interface, also known as FireWire™, may be used. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

In one example, the annunciator affects sound or music generation. The estimated value may be associated with a musical tune (or a tone) or any other single sound, which is played upon activation of the annunciator. The annunciator may include an audible signaling device (sounder) that emits audible sounds that can be heard by a human (having frequency components in the 20-20,000 Hz band). In one example, the device is a buzzer (or beeper), a chime, a whistle or a ringer. Buzzers are known in the art, and are either electromechanical or ceramic-based piezoelectric sounders that make a high-pitch noise. The sounder may emit a single or multiple tones, and can be in continuous or intermittent operation. In another example, the sounder simulates the voice of a human being or generates music, typically by using an electronic circuit having a memory for storing the sounds (e.g., click, gong, music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein. A 'Gong' sound may be generated using SAE 800 from Siemens, described in Data-sheet "Programmable Single-/Dual-/Triple-Tone Gong, SAE 800, Siemens semiconductor Group, 02.05", which is incorporated in its entirety for all purposes as if fully set forth herein.

In one example, a human voice talking is played by the annunciator. The sound may be a syllable, a word, a phrase, a sentence, a short story or a long story, and can be based on speech synthesis or pre-recorded. Male or female voice can be used, being young or old. The text sounded is preferably associated with the shape or theme. For example, an estimated value or quality associated value derived thereof of the system can be heard, such as 'good', 'not in field' and 'low quality'.

A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein.

Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Some examples of devices that include generation of an audio signal such as music are disclosed in U.S. Pat. No. 4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al. entitled: "Electronic Instructional Apparatus", in U.S. Pat. No. 4,248,123 to Bunger et al. entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein.

Further, the user control 88 may be used for sending the notification or alert to a user. The notification to the user device may be text based, such as an electronic mail (e-mail), website content, fax, or a Short Message Service (SMS). Alternatively or in addition, the notification or alert to the user device may be voice-based, such as a voicemail, a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

The monitor module 81*b* may comprise a sensor 65 having an output coupled to the processor 82*b* and responsive to a physical phenomenon. The sensor 65 may provide an electrical output signal in response to a physical, chemical, biological or any other phenomenon, serving as a stimulus to the sensor. The sensor may serve as, or be, a detector, for detecting the presence of the phenomenon. Alternatively or in addition, a sensor may measure (or respond to) a parameter of a phenomenon or a magnitude of the physical quantity thereof. For example, the sensor 65 may be a thermistor or a platinum resistance temperature detector, a light sensor, a pH probe, a microphone for audio receiving, or a piezoelectric bridge. Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current.

In the case of a changing characteristic sensor or in the case of an active sensor, the unit may include an excitation or measuring circuits (such as a bridge) to generate the sensor electrical signal. The sensor output signal may be conditioned by a signal conditioning circuit. The signal conditioner may involve time, frequency, or magnitude related manipulations. The signal conditioner may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sample-and-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of an analog sensor, an analog to digital (A/D) converter may be used to convert the conditioned sensor output signal to a digital sensor data. The unit may include a computer for controlling and managing the unit operation, processing the digital sensor data and handling the unit communication. The unit may include a modem or transceiver coupled to a network port (such as a connector or antenna), for interfacing and communicating over a network.

The sensor 65 may be an analog sensor having an analog signal output such as analog voltage or current, or may have continuously variable impedance. Alternatively on in addition, the sensor 65 may have a digital signal output. A sensor may serve as a detector, notifying only the presence of a phenomenon, such as by a switch, and may use a fixed or settable threshold level. A sensor may measure time-dependent or space-dependent parameters of a phenomenon. A sensor may measure time-dependencies or a phenomenon such as the rate of change, time-integrated or time-average, duty-cycle, frequency or time period between events. A sensor may be a passive sensor, or an active sensor requiring an external source of excitation. The sensor may be semiconductor-based, and may be based on MEMS technology.

The sensor 65 may be a motion detector or an occupancy sensor. A motion detector is a device for motion detection, that contains a physical mechanism or electronic sensor that quantifies motion commonly in order alert the user of the presence of a moving object within the field of view, or in general confirming a change in the position of an object relative to its surroundings or the change in the surroundings relative to an object. The object may be the peripheral device 72. This detection can be achieved by both mechanical and electronic methods. In addition to discrete, on or off motion detection, it can also consist of magnitude detection that can measure and quantify the strength or speed of this motion or the object that created it. Motion can be typically detected by sound (acoustic sensors), opacity (optical and infrared sensors and video image processors), geomagnetism (magnetic sensors, magnetometers), a reflection of the transmitted energy (infrared laser radar, ultrasonic sensors, and microwave radar sensors), electromagnetic induction (inductive-loop detectors), and vibration (triboelectric, seismic, and inertia-switch sensors). Acoustic sensors are based on Electret effect, inductive coupling, capacitive coupling, triboelectric effect, piezoelectric effect, and fiber optic transmission. Radar intrusion sensors usually have the lowest rate of false alarms. In one example, an electronic motion detector contains a motion sensor that transforms the detection of motion into an electrical signal. This can be achieved by measuring optical or acoustical changes in the field of view. Most motion detectors can detect up to 15-25 meters (50-80 ft.). An occupancy sensor is typically a motion detector that is integrated with hardware or software-based timing device. For example, it can be used for preventing illumination of unoccupied spaces, by sensing when motion has stopped for a specified time period, in order to trigger a light extinguishing signal.

One basic form of mechanical motion detection is in the form of a mechanically-actuated switch or trigger. For electronic motion detection, passive or active sensors may be used, where four types of sensors commonly used in motion detectors spectrum: Passive infrared sensors (passive) which looks for body heat, while no energy is emitted from the sensor, ultrasonic (active) sensors that send out pulses of ultrasonic waves, and measures the reflection off a moving object, microwave (active) sensor that sends out microwave pulses and measures the reflection off a moving object, and tomographic detector (active) which senses disturbances to radio waves as they travel through an area surrounded by mesh network nodes. Alternatively or in addition, motion can be electronically identified using an optical detection or acoustical detection. Infrared light or laser technology may be used for optical detection. Motion detection devices, such as PIR (Passive Infrared Sensor) motion detectors, have a sensor that detects a disturbance in the infrared spectrum, such as a person or an animal.

Many motion detectors use a combination of different technologies. These dual-technology detectors benefit with each type of sensor, and false alarms are reduced. Placement of the sensors can be strategically mounted to lessen the chance of pets activating alarms. Often, PIR technology will be paired with another model to maximize accuracy and reduce energy usage. PIR draws less energy than microwave detection, and so many sensors are calibrated so that when the PIR sensor is tripped, it activates a microwave sensor. If the latter also picks up an intruder, then the alarm is sounded. As interior motion detectors do not 'see' through windows or walls, motion-sensitive outdoor lighting is often recommended to enhance comprehensive efforts to protect a property. Some application for motion detection are (a) detection of unauthorized entry, (b) detection of cessation of occupancy of an area to extinguish lights and (c) detection of a moving object, which triggers a camera to record subsequent events.

The sensor 65 may be a CCD or CMOS based image sensor, for capturing still or video images. The image capturing hardware integrated with the unit may contain a photographic lens (through a lens opening) focusing the required image onto an image sensor. The image may be converted into a digital format by an image sensor AFE, (Analog Front End) and an image processor. An image or video compressor for compression of the image information may be used for reducing the memory size and reducing the data rate required for the transmission over the communication medium. Similarly, the sensor may be a voice sensor such as a microphone, and may similarly include a voice processor or a voice compressor (or both). The image or voice compression may be standard or proprietary, may be based on intraframe or interframe compression, and may be lossy or non-lossy compression.

The sensor may be thermoelectric sensor, for measuring, sensing or detecting the temperature (or the temperature gradient) of an object, which may be solid, liquid or gas. Such sensor may be a thermistor (either PTC or NTC), a thermocouple, a quartz thermometer, or an RTD. The object may be the peripheral device 72. The sensor may be based on a Geiger counter for detecting and measuring radioactivity or any other nuclear radiation. Light, photons, or other optical phenomena may be measured or detected by a photosensor or photodetector, used for measuring the intensity of visible or invisible light (such as infrared, ultraviolet, X-ray or gamma rays). A photosensor may be based on the photoelectric or the photovoltaic effect, such as a photodiode, a phototransistor, solar cell or a photomultiplier tube. A photosensor may be a photoresistor based on photoconductivity, or a CCD where a charge is affected by the light. The sensor may be an electrochemical sensor used to measure, sense, or detect a matter structure, properties, composition, and reactions, such as pH meters, gas detector, or gas sensor. Using semiconductors, oxidation, catalytic, infrared or other sensing or detection mechanisms, the gas detector may be used to detect the presence of a gas (or gases) such as hydrogen, oxygen or CO. The sensor may be a smoke detector for detecting smoke or fire, typically by an optical detection (photoelectric) or by a physical process (ionization).

A sensor may be an image sensor for providing digital camera functionality, allowing an image (either as still images or as a video) to be captured, stored, manipulated and displayed. The image capturing hardware integrated with the sensor unit may contain a photographic lens (through a lens opening) focusing the required image onto a photosensitive image sensor array disposed approximately at an image focal point plane of the optical lens, for capturing the image and producing electronic image information representing the image. The image sensor may be based on Charge-Coupled Devices (CCD) or Complementary Metal-Oxide-Semiconductor (CMOS). The image may be converted into a digital format by an image sensor AFE, (Analog Front End) and an image processor, commonly including an analog to digital (A/D) converter coupled to the image sensor for generating a digital data representation of the image. The unit may contain a video compressor, coupled between the analog to digital (A/D) converter and the transmitter for compressing the digital data video before transmission to the communication medium. The compressor may be used for lossy or non-lossy compression of the image information, for reducing the memory size and reducing the data rate required for the transmission over the communication medium. The compression may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

The digital data video signal carrying a digital data video according to a digital video format, and a transmitter coupled between the port and the image processor for transmitting the digital data video signal to the communication medium. The digital video format may be based on one out of: TIFF (Tagged Image File Format), RAW format, AVI (Audio Video Interleaved), DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

The sensor 65 may be an electroacoustic sensor that responds to sound waves (which are essentially vibrations transmitted through an elastic solid or a liquid or gas), such as a microphone, which converts sound into electrical energy, usually by means of a ribbon or diaphragm set into motion by the sound waves. The sound may be audio or audible, having frequencies in the approximate range of 20 to 20,000 hertz, capable of being detected by human organs of hearing. Alternatively or in addition, the microphone may be used to sense inaudible frequencies, such as ultrasonic (a.k.a. ultrasound) acoustic frequencies that are above the range audible to the human ear, or above approximately 20,000 Hz. A microphone may be a condenser microphone (a.k.a. capacitor or electrostatic microphone) where the diaphragm acts as one plate of a two plates capacitor, and the vibrations changes the distance between plates, hence changing the capacitance.

An electret microphone is a capacitor microphone based on a permanent charge of an electret or a polarized ferroelectric material. A dynamic microphone is based on electromagnetic induction, using a diaphragm attached to a small movable induction coil that is positioned in a magnetic field of a permanent magnet. The incident sound waves cause the diaphragm to vibrate, and the coil to move in the magnetic field, producing a current. Similarly, a ribbon microphone uses a thin, usually corrugated metal ribbon suspended in a magnetic field, and its vibration within the magnetic field generates the electrical signal. A loudspeaker is commonly constructed similar to a dynamic microphone, and thus may be used as a microphone as well. In a carbon microphone, the diaphragm vibrations apply varying pressure to a carbon, thus changing its electrical resistance. A piezoelectric microphone (a.k.a. crystal or piezo microphone) is based on the phenomenon of piezoelectricity in piezoelectric crystals such as potassium sodium tartrate. A microphone may be omnidirectional, unidirectional, bidirectional, or provide other directionality or polar patterns.

The term 'message' is used herein to include any type of information or one or more datagram, handled as a single, as a set or as a group of datagrams. The datagram may be a packet or a frame, or any other type of group of data bytes (or bits) which represent an information unit.

Figure 14:
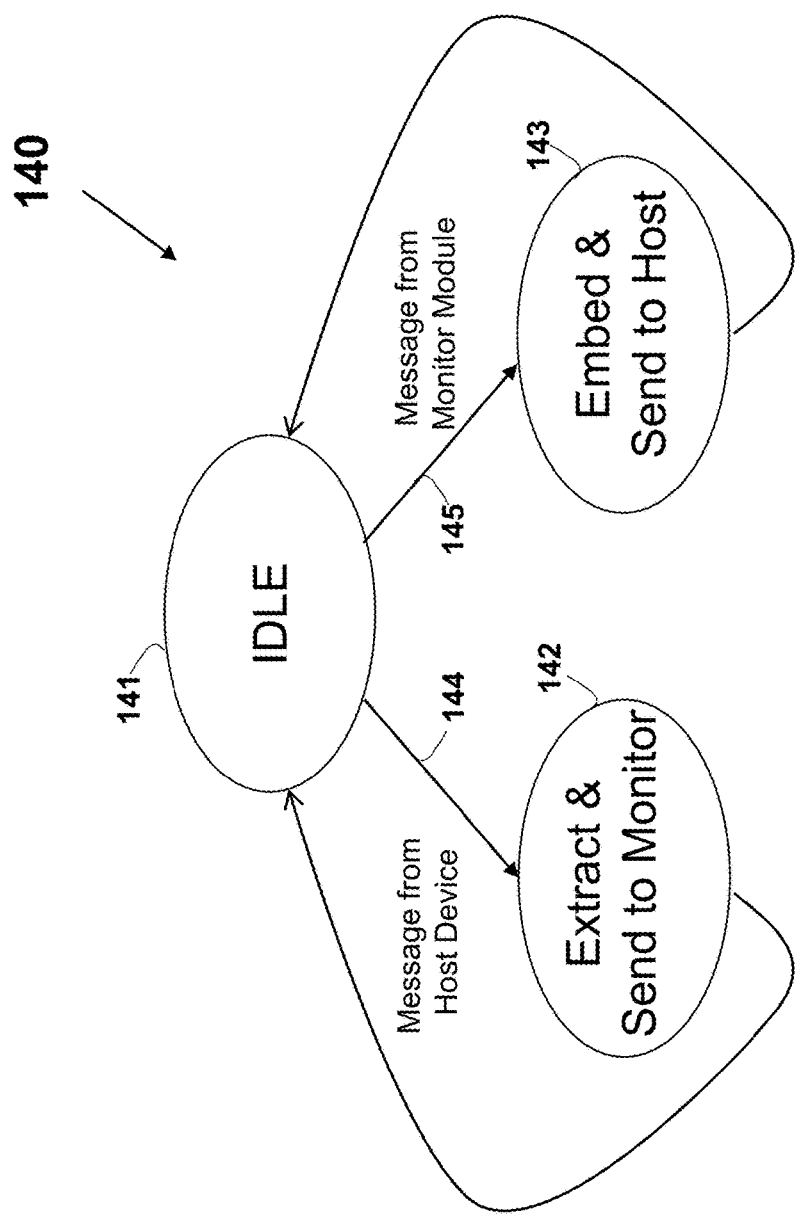
FIG. 14 illustrates schematically a state diagram of a peripheral emulator module in an isolator device connected between a host device and a peripheral device.

A general state diagram 140 of the operation of the peripheral emulator module 81c, that may be executed by the processor 82c under instructions stored in the memory 84c, is shown in FIG. 14. After completing the USB initialization phase (including enumeration) with the host device 71 over the USB connection 87b, the module enters an 'IDLE' state 141, where no payload data or messages are flowing to or from the host device 71, and the peripheral emulator module 81c is generally idling, and is only handling overhead and handshaking as required by the USB standard over the USB connection 87b with the host device 71. Upon detecting 144 a message sent over the USB connection 87b from the host device 71 destined to the end-point 79 in the peripheral device 72, as part of a "Extract & Send to Monitor" state 142, the actual message (command, control, or data transfer) is extracted by removing the USB related overhead, and the message is transmitted over the local bus 83b to the processor 82b in the monitor module 81b. Similarly, upon detecting 145 a message (typically generated by the end-point 79 in the peripheral device 72) over the local bus 83b from the processor 82b in the monitor module 81b, that is to be sent over the USB connection 87b to the host device 71, as part of a "Embed & Send to Host" state 142, the actual message (command, control, or data transfer) is embedded in the required USB related overhead, and the message is transmitted over the USB connection 87b to the host device 71. The state of the peripheral emulator module 81c may be indicated to the user visually or audibly by using the annunciator.

Figure 14A:
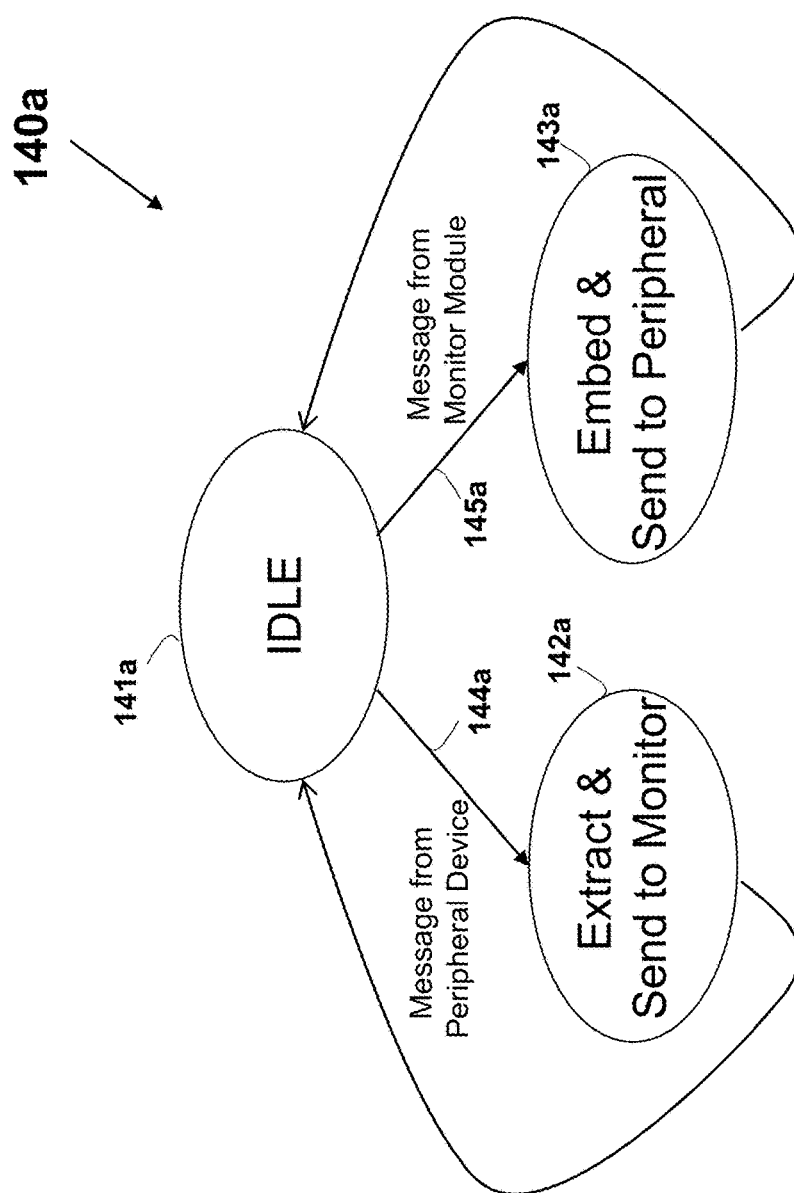
FIG. 14a illustrates schematically a state diagram of a host emulator module in an isolator device connected between a host device and a peripheral device.

A general state diagram 140a of the operation of the host emulator module 81a, that may be executed by the processor 82a under instructions stored in the memory 84a, is shown in FIG. 14a. After completing the USB initialization phase (including enumeration) with the peripheral device 72 over the USB connection 87a, the module enters an 'IDLE' state 141a, where no payload data or messages are flowing to or from the peripheral device 72, and the host emulator module 81a is generally idling, and is only handling routine overhead and handshaking as required by the USB standard over the USB connection 87a with the peripheral device 72. Upon detecting 144a a message sent over the USB connection 87a from the peripheral device 71 destined to the host device 71, as part of a "Extract & Send to Monitor" state 142a, the actual message (command, control, or data transfer) is extracted by removing the USB related overhead, and the message is transmitted over the local bus 83a to the processor 82b in the monitor module 81b. Similarly, upon detecting 145a a message (typically destined to the end-point 79 in the peripheral device 72) over the local bus 83a from the processor 82b in the monitor module 81b, that is to be sent over the USB connection 87a to the peripheral device 72, as part of a "Embed & Send to Peripheral" state 142a, the actual message (command, control, or data transfer) is embedded in the required USB related overhead, and the message is transmitted over the USB connection 87a to the peripheral device 72. The state of the host emulator module 81a may be indicated to the user visually or audibly by using the annunciator.

Figure 15:
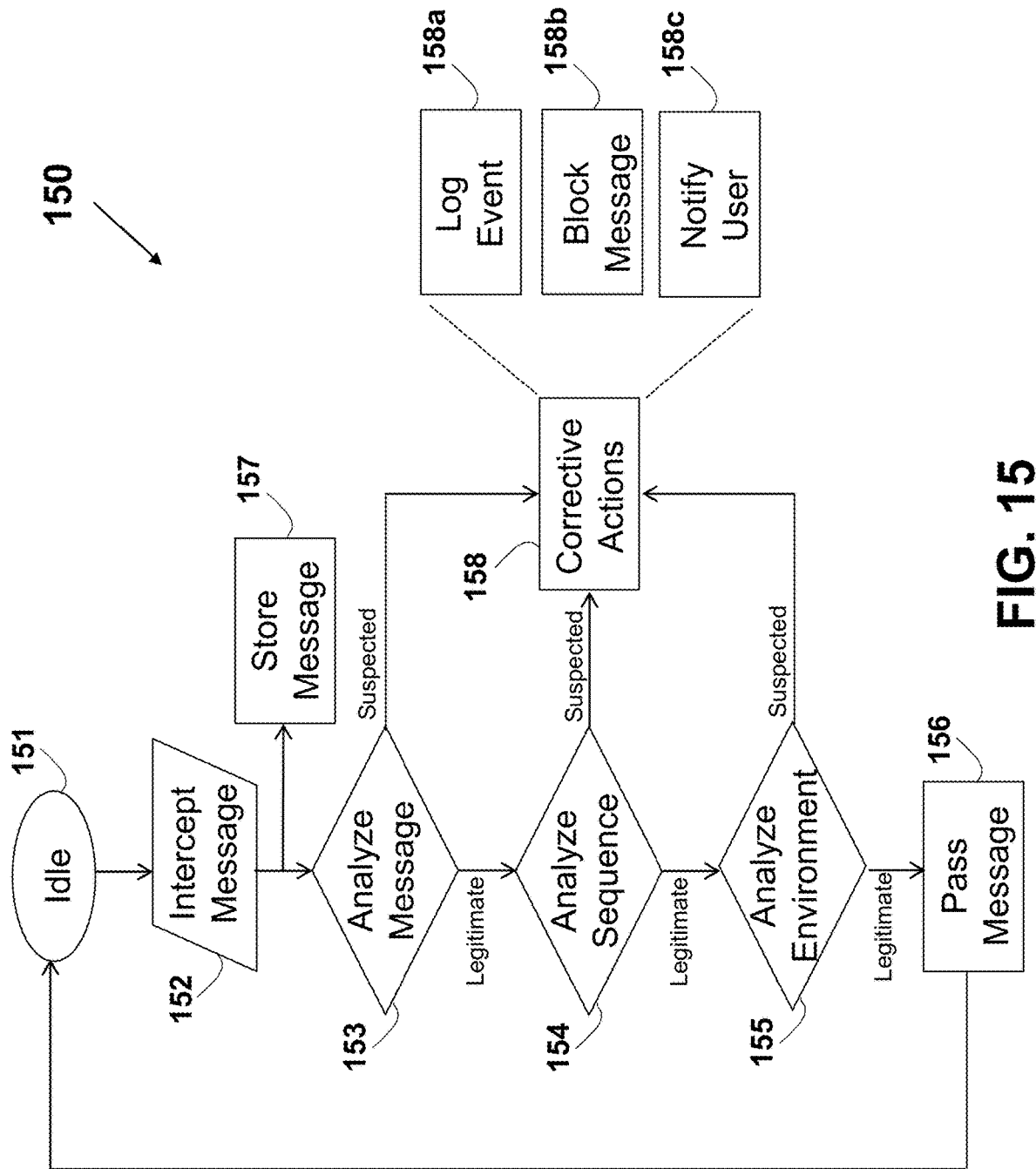
FIG. 15 illustrates schematically a simplified flowchart of a monitor module in an isolator device connected between a host device and a peripheral device.

A general flow chart 150 of the operation of the monitor module 81b, that may be executed by the processor 82b under instructions stored as part of the isolation application 86b in the memory 84b, is shown in FIG. 15. After completing an initialization phase the module an 'IDLE' step 151, where the monitor module 81b is generally idling, until a message is received from the host emulator module 81a over the local bus 83b, or until a message is received from the peripheral emulator module 81c over the local bus 83a, as part of an "Intercept Message" step 152. The intercepted message may be stored for future manipulation or comparison as part of a "Store Message" step 157.

In one example, a memory in the monitor module 81b (such as the memory 84b) includes a database of potential USB HID classes, where each HID class is associated with a set of criterions defining normal, regular, conventional, or any other non-suspected or non-malware associated activities, interactions, or messages. Upon connecting a USB peripheral device 72 and identifying the device HID class, the set of criterions associated with the detected HID class is applied, and the peripheral device activity is checked using the set of criterions.

Upon receiving a message, such as in the case of using an input device by a person (e.g., typing on a keyboard or moving a pointing device), the message is checked as part of an "Analyze Message" step 153. In this step, a single piece of information, such as the received message or a single part thereof, is checked, such as a character, string, word, or a single file. The analysis may apply a black-list (blacklist) or a white-list (whitelist) concept (or both). A blacklist is a list of entries, such that upon being detected in the message (or part thereof), renders the component as "suspected", while the lack of such entries may render the component as "legitimate". Conversely or in addition, a white-list concept may be applied, referring to a list of entries that upon being detected in the message (or part thereof), renders the component as "legitimate", while the lack thereof may render the component as "suspected".

An interface standard is typically a generally accepted technical document describing one or more functional characteristics or physical characteristics, necessary to allow the exchange of information between two or more (usually different) systems or pieces of equipment, commonly in order for a device from one vendor to interact, communicate, or interface with another device of another vendor. In particular, standards may define a list of the messages (such as opcodes or characters) and their related functionality, allowing for an application (provided by one vendor) to effectively use, and interface with a peripheral provided by another vendor. In one example, a peripheral device operation is associated with an industry standard defining the messages and their meaning. For example, keyboards are known to provide characters according to the ASCII code. In such a case, the black list may include a list of characters that are not used, or are not defined, by the appropriate standard. Alternatively or in addition, the black list may include messages defined by the standard as 'reserved' or 'vendor use only'. Alternatively or in addition, the black list may include messages (or part thereof) that are rarely used, such as various control characters that are for legacy support purposes, or are applicable only to special scenarios. Alternatively or in addition, the black list may include messages (or part thereof) that are not relevant to a specific organization, or a specific individual human, or a group of people. For example, when using a keyboard, an organization located and active only in the US may include in the black list characters in language that are not used by anyone in that organization.

In one example, the message (or a part thereof) may consist of, include, or may be associated with a numerical value, which may be an indication of a quantity. In such a case, the numeric value may be compared to a preset threshold. The threshold may be a maximum value, whereupon a component related numerical value exceeding the threshold is determined as 'suspected', while a numerical value below the threshold is determined as 'legitimate'. Alternatively or in addition, the threshold may be a minimum value, whereupon a component related numerical value exceeding the threshold is determined as 'legitimate', while a numerical value below the threshold is determined as 'suspected'.

For example, a component numerical parameter may be the associated with a date. A threshold may be used in order to identify invalid dates, and such component will be considered as 'suspected'. For example, a day of the month is limited to 31 (or less, according to the month), and a month is limited to be under 12. For example, a component associated with a date of 2014-10-45 (assuming YYYY-MM-DD format), denoting the 45$^{th}$ day in October, at year 2014, is considered as 'suspected', since the date value exceeds 31. Similarly, a component associated with a date of 2014-14-31 is considered as 'suspected', since the month value exceeds 12. Conversely, dates such as 2014-10-31 or 2015-1-31 are considered as 'legitimate'. Further, a minimum threshold of "1" may be used, thus rendering dates such as 2013-0-15, 2012-8-0, or 0-0-0 as 'suspected'. Further, the dates that are after the current date, such as a component associated with the date 2245-3-6 may as well be rendered as 'suspected'.

In one example, the black list includes a list of HID classes, such as input devices only or even limited only to keyboards. Hence, upon connecting a peripheral device having HID class that is in the black-list, a 'suspected' state may be assumed.

In the case a message is found 'suspected' as part of the "Analyze Message" step 153, such as when the intercepted message is found to be in the black-list associated with the peripheral device 72 HID class, the monitor module 81$b$ assumes that there is a threat relating to the peripheral device 72 operation, and next performs a "Corrective Actions" step 158 that further handles and mitigates the threat and its consequences. In a case where the message was found to be "Legitimate", such as when the intercepted message is found to be in the white-list (or not in the black list) associated with the peripheral device 72 HID class, an "Analyze Sequence" step 154 is executed.

As part of the "Analyze Sequence" step 154, a group of the last messages is checked as a group. The former messages that were stored as part of the "Store Message" step 157 may be fetched from the respective memory to form the messages sequence to be analyzed.

In one example, the sequence is checked versus time, using a timer. Any timer for measuring time intervals may be used, and may be hardware based, which is typically a digital counter that either increment or decrement at a fixed frequency, which is often configurable, and which interrupts the processor when reaching zero, or alternatively a counter with a sufficiently large word size that will not reach its counter limit before the end of life of the system. Alternatively or in addition, a software based timer may be used, for example implemented by the processor 82$b$, typically as a service of the operating system. Typically, the time measurement is based on the clock signal provided to the processor.

In one example, the sequence includes two consecutive messages, and the time interval between the two messages is measured by the timer. Alternatively or in addition, the time interval between a start of a first message in the sequence and an end of a last message is measured by the timer, further allowing calculating a rate of the sequence receipt (i.e., in messages per second or bits per second). The measured time interval (or the calculated rate) may be compared to a preset threshold. The threshold may be a maximum value, whereupon a measured time (or rate) exceeding the threshold is determined as 'suspected', while a numerical value below the threshold is determined as 'legitimate'. Alternatively or in addition, the threshold may be a minimum value, whereupon a measured time (or rate) exceeding the threshold is determined as 'legitimate', while a numerical value below the threshold is determined as 'suspected'. Such a timing measurement may be used to ascertain that the input device is indeed operated by a human, and is not an automaton. In the example of a keyboard as an input device, it is estimated that human typing speed is in the 10-80 Word Per Minute (wpm) range, hence a measured rate bot in this range, such as 100 wpm, may be considered as "suspected".

Alternatively or in addition, known problematic patterns, such as patterns known to be originated by a malware, may be detected by applying pattern-matching algorithm to the messages sequence, and such patterns may be identified as suspected. Further, anomaly detection (or outlier detection) scheme may be used, based on identification of opcodes which do not conform to an expected pattern or other items in a dataset, and typically the anomalous opcode (or sequence) is declared as suspected. Several categories of anomaly detection techniques exist, all of which may be used to analyze sequences. For example, unsupervised anomaly detection techniques detect anomalies in an unlabeled test data set under the assumption that the majority of the instances in the data-set are normal by looking for instances that seem to fit least to the remainder of the data set. Supervised anomaly detection techniques require a data set that has been labeled as "normal" and "abnormal", and involves training a classifier (the key difference in many other statistical classification problems is the inherent unbalanced nature of the outlier detection). Semi-supervised anomaly detection techniques construct a model by representing normal behavior from a given normal training data set, and then testing the likelihood of a test instance to be generated by the learned model. The anomaly detection may further based on, or use, one or more of the schemes described in the University of Minnesota Technical Report TR 07-017 entitled: "*Anomaly Detection: A survey*", by Varun Chandola, Arindam Banerjee, and Vopin Kumar, dated Aug. 15, 2007, which is incorporated in its entirety for all purposes as if fully set forth herein.

Alternatively or in addition to the examples herein regarding analyzing the content of a message or of a sequence of message, the format or file structure of a group of messages may be equally analyzed to satisfy a pre-set criterion or criteria. In one example, the peripheral device 72 is a video camera, outputting video data stream in an MPEG-2 or MPEG-4 format. In this case, the messages sequence is related to the video stream may be analyzed to have a data rate that is in specified limit. Further, the received messages may be checked to be in the form of the expected MP2 or MP4 standard, and in the case no match is found, the data stream is considered as 'suspected'.

Alternatively or in addition, a group of multiple (consecutive or non-consecutive) messages or commands are analyzed together as a set or group, where the criterion is based on checking the order or the order pattern or the relationships between the messages in the group. For example, if a message of a type 'A' is expected to appear only after a message of a type 'B', and in the analyzed group the message 'A' appears after the message 'C', the group may be classified as 'suspected'. Further, if a certain message appears multiple times (consecutively or non-consecutively), and such repetition is not legitimate, then such group may be classified as 'suspected'. Other variations of analyzing the type, repetition, and order may be used for the analysis.

In the case a sequence of messages is found 'suspected' as part of the "Analyze Sequence" step 154, the monitor module 81b assumes that there is a threat relating to the peripheral device 72 operation, and next performs a "Corrective Actions" step 158 that further handles and mitigates the threat and its consequences. In a case where the message was found to be "Legitimate", an "Analyze Environment" step 155 is executed. As part of this step, a message or a sequence of messages are checked versus an environmental condition, which may not be related to the message or messages content.

In one example, the message timing, such as the time of receiving the message, is checked using a Time of Day (TOD) information. The time of day, such as hour, day, day of the week, or day of the month, may be obtained using a software, or based on an RTC component (or IC) in the monitor module 81b. Since an input peripheral device, and sometimes an output peripheral device, is assumed to be interacting with a human, an activity of such an input peripheral device when no human is present is suspected, and may be a malware-related activity. For example, an organization employing an isolator device 80 may define specific periods when it is not likely that human is present and interact with the input peripheral, such as late at night (e.g., 23:00 to 5:00), weekends, and holidays. Any peripheral device activity in the defined time periods may be assumed as 'suspected'.

Figure 16:
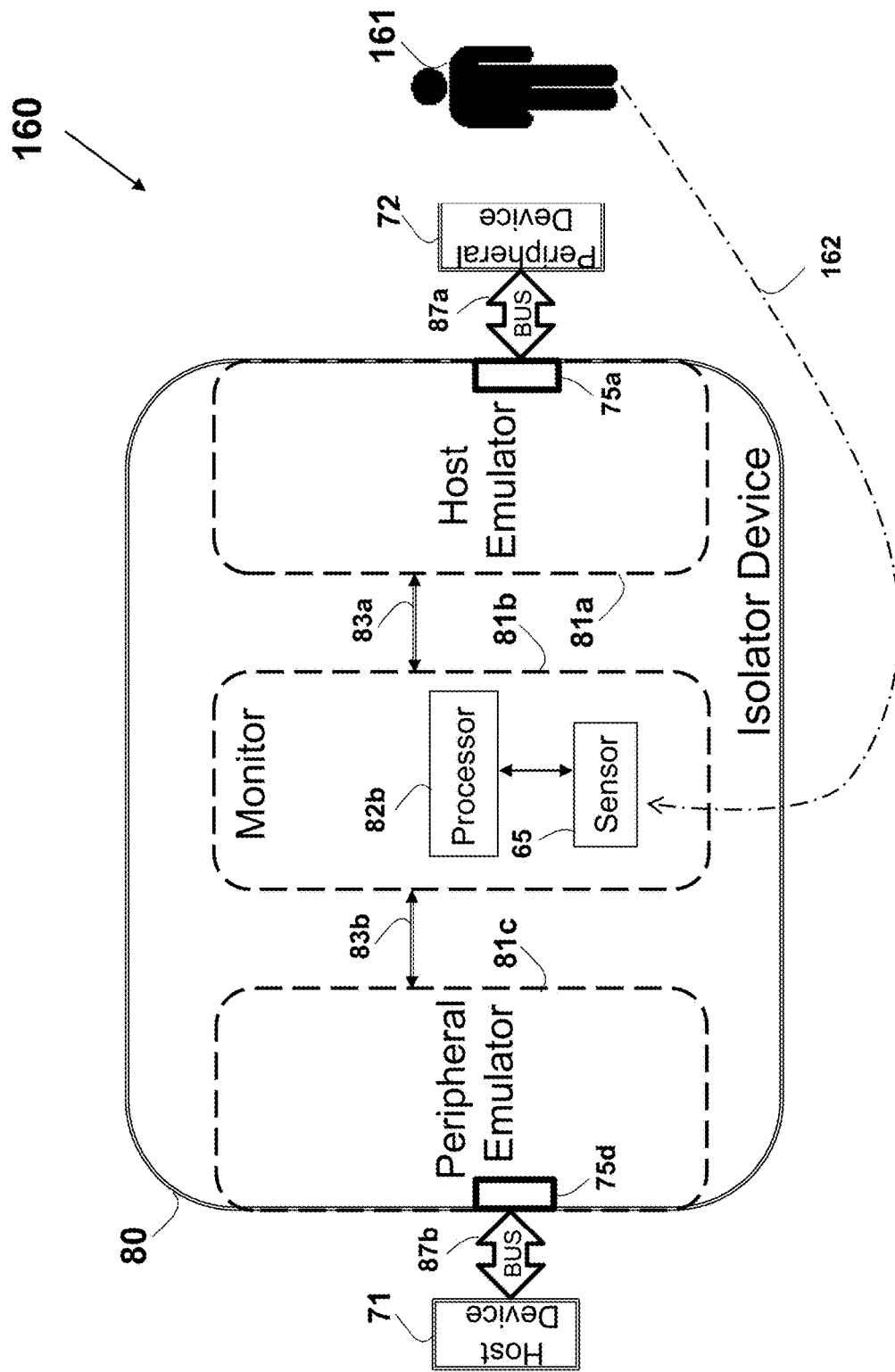
FIG. 16 illustrates schematically a block diagram of environmental sensing of a human by an isolator device connected between a host device and a peripheral device.

Alternatively or in addition, the sensor 65 is used to sense the presence of a human body. Such a scheme is pictorially shown as an arrangement 160 in FIG. 16, where a presence of a person 161 preferably in the vicinity of the peripheral device 72 is sensed by the sensor 65, as illustrated by a dashed line 162. In a case where a peripheral device 72 activity, such as an input device, and there is traffic over the USB connection 87a, but no human presence is sensed by the sensor 65, the activity is considered as 'suspected'. The sensor 65 may be any occupancy sensor for detecting occupancy of a space by a human body, providing a response to detecting a presence of a human by using electric effect, inductive coupling, capacitive coupling, triboelectric effect, piezoelectric effect, fiber optic transmission, or radar intrusion sensing. The occupancy sensor may consist of, comprise, or may be based on, a motion sensor, an acoustic sensor, opacity, geomagnetism, magnetic sensors, magnetometer, reflection of transmitted energy, infrared laser radar, microwave radar, electromagnetic induction, or vibration. The motion sensor may be a mechanically actuated sensor, passive or active electronic sensor, ultrasonic sensor, microwave sensor, tomographic detector, passive infrared (PIR) sensor, laser optical detector, or acoustical detector. Alternatively or in addition, the sensor may be a photoelectric sensor that responds to a visible or an invisible light, the invisible light may be infrared, ultraviolet, X-rays, or gamma rays, and the photoelectric sensor may be based on the photoelectric or photovoltaic effect, and may consist of, or comprise, a semiconductor component that consists of, or comprises, a photodiode, or a phototransistor. The photoelectric sensor may be based on Charge-Coupled Device (CCD) or a Complementary Metal-Oxide Semiconductor (CMOS) component.

Figure 16A:
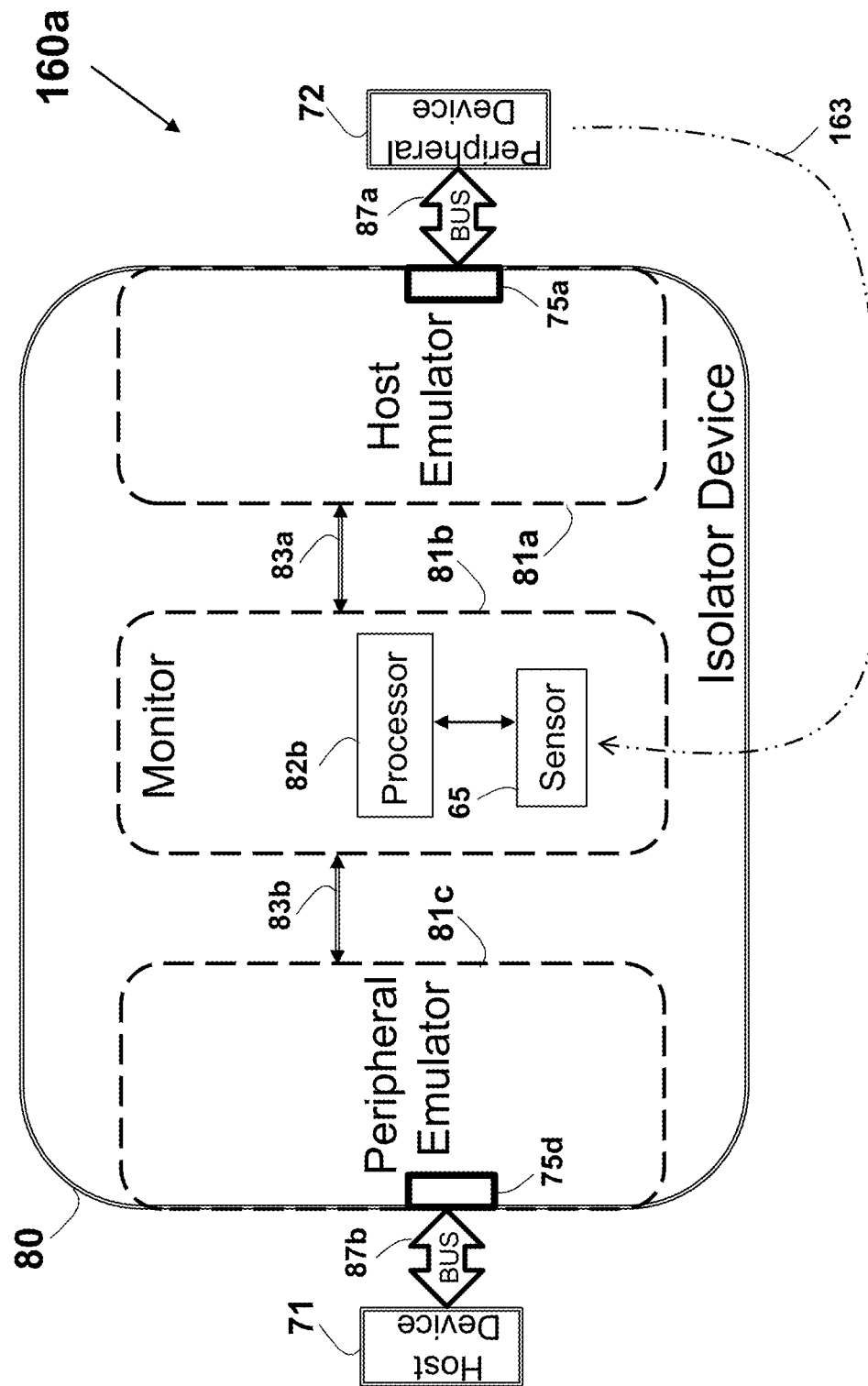
FIG. 16a illustrates schematically a block diagram of environmental sensing of a peripheral device by an isolator device connected between a host device and the peripheral device.

Alternatively or in addition, the sensor 65 may be used to sense a physical phenomenon produced by the peripheral device 72 as part of its operation, and the monitor module 81b may check the correlation between the messaging activity of the peripheral device 72 and the sensed physical phenomenon sensed by the sensor 65. Such a scheme is pictorially shown as an arrangement 160a in FIG. 16a, where the peripheral device 72 physical phenomenon is sensed by the sensor 65 as illustrated by a dashed line 163. For example, a keyboard serving as a peripheral, emits a typical sound each time a key is pressed. In such a case, the sensor 65 may be a microphone for obtaining and analyzing the keyboard emitted sound. In an example where characters are received as messages from the USB connected keyboard, but no typical sound received by the microphone (serving as the sensor 65), or where the frequency of the sound does not correlate with the characters rate, the activity may be considered as 'suspected'.

In the case an environment check is found 'suspected' as part of the "Analyze Environment" step 155, the monitor module 81b assumes that there is a threat relating to the peripheral device 72 operations, and next performs the "Corrective Actions" step 158 that further handles and mitigates the threat and its consequences. In a case where the environment was found to be "Legitimate", the message received from the host emulator module 81a is transparently passed to the peripheral emulator module 81c, for transferring it to the host device 71 over the USB connection 87b, as part of a "Pass Message" step 156, followed by resuming to the "Idle" step 151.

Figure 17:
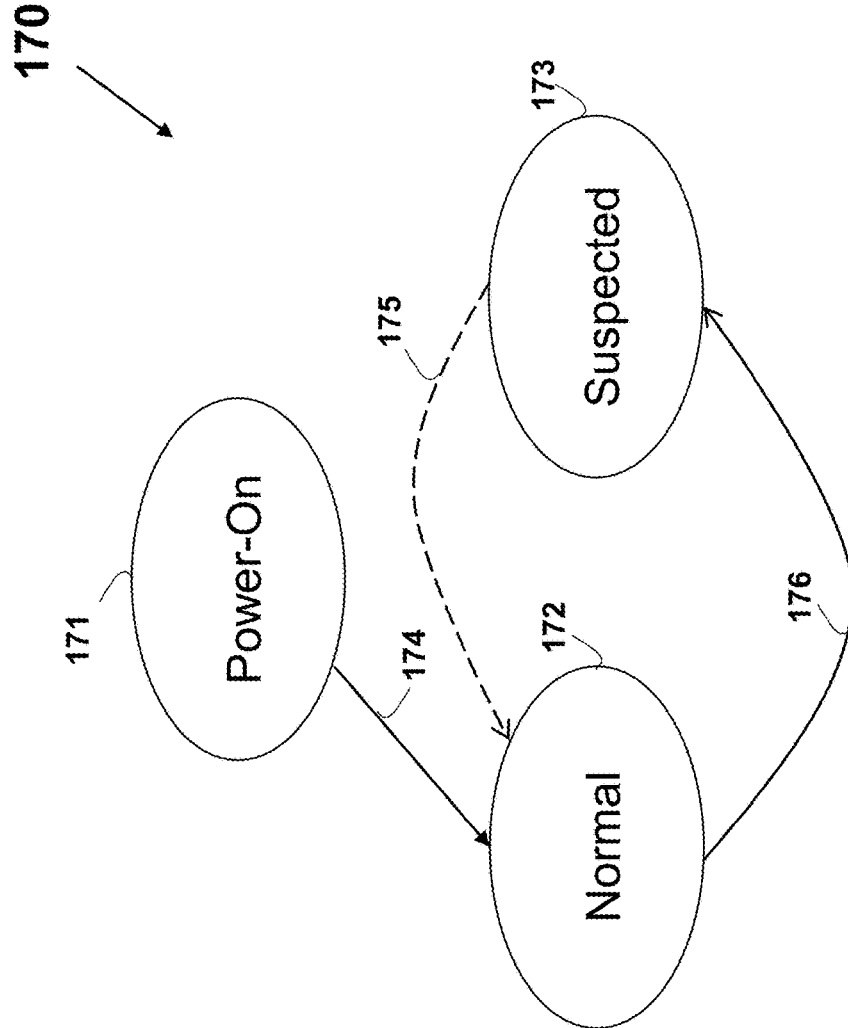
FIG. 17 illustrates schematically a state diagram of a monitor module in an isolator device connected between a host device and a peripheral device.

A state diagram 170 shown in FIG. 17 illustrates the monitor module 81b general states, which may be considered the isolator device 80 main operational states. Upon powering up at a "Power-On" state 171, various initialization processes are performed by the monitor module 81b, automatically or by a default followed (shown as a line 174) by a "Normal" state 172, in which messages received from either the peripheral emulator module 81c over the local bus 83b, or from the host emulator module 81a over the local bus 83a are intercepted and checked according to, or based on, the flow chart 150 shown in FIG. 15, and assuming no threat is detected, the received messages are transparently and unchanged transferred to the other module, as part of the "Pass Message" step 156. Upon detecting a threat (shown as line 176) as a 'Suspected' activity by analyzing a message as part of the "Analyze Message" step 153, by analyzing a group of messages as part of the "Analyze Sequence" step 154, or by analyzing the environment as part of the "Analyze Environment" step 155, the isolator device 80 shifts to a "Suspected" state 173. Various actions may be performed at this state as part of the "Corrective Actions" step 158. Preferably, the isolator module 80 (or the monitor module 81b) stays at the "Suspected" state, as long as the suspected peripheral device 72 is connected over the USB connection 87a, and may resume normal operation only by re-powering the isolator device 80. Alternatively or in addition, an active user action 175 may be required to 'override' the system for reverting to the "Normal" state 172, such as by mechanically pushing a button (such as the button 118) or by physically disconnecting the peripheral module 71 thus inhibiting the USB connection 87a.

Various actions may be performed as part of the "Corrective Actions" step 158 (which may correspond to the "Suspected" state 173), as described in the flow chart 150 in FIG. 15. The actions may include a "Log Event" step 158a, a "Block Message" step 158b, or a "Notify User" step 158c. A record or entry including information relating to the event of determining a message or an environmental condition to be 'Suspected' may be stored in a log file, such as a database, as part of the "Log Event" step 158a. The log file may be stored in a memory such as the memory 84b (preferably a non-volatile memory) in the monitor module 81b, and may be preferably accesses by the host device 71 over the USB connection 87b for further storing, analyzing, or manipulating. A record regarding a 'Suspected' event may include identification of the suspected peripheral device 72, such as its HID (or MSD), identification number, and any other identifying information, as well as the timing related information such as the time (preferably in TOD format) of its connection and the time when it was determined to be suspected, and the reason for this decision, such as the message, the message sequence, or the environmental condition, upon which such determination was made, including the criterion that was not satisfied.

In the 'suspected' state 173, in contrast to the actions taken as part of the "Pass Message" step 156, messages received from the peripheral device 72, or messages directed to the peripheral device 72, are blocked as part of the "Block Message" step 158b. Further, the logical USB connection 87a may be inhibited, obviating any traffic to or from the peripheral device, either by the monitor module 81b, or by forcing the host emulator module 81a to 'suspend' mode. Alternatively or in addition, the power supplied to the peripheral device 72 over the USB connection 87a may be disconnected, such as by controlling the USB source 26c to disconnect the USB power to the USB connection 87a.

As part of the "Notify user" step 158c, the user is locally notified of entering the "Suspected" state 173 by using visual, audible, or any other notification means. The user notification may use the annunciator that may be part of the User Control 88. Alternatively or in addition, the notification or alert may be sent to a remote user. The notification to the user device may be text based, such as an electronic mail (e-mail), website content, fax, or a Short Message Service (SMS). Alternatively or in addition, the notification or alert to the user device may be voice-based, such as a voicemail or a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

While exampled regarding and input peripheral device, the system and methods herein equally applies to any type of peripheral, including an output peripheral device.

Figure 1A:
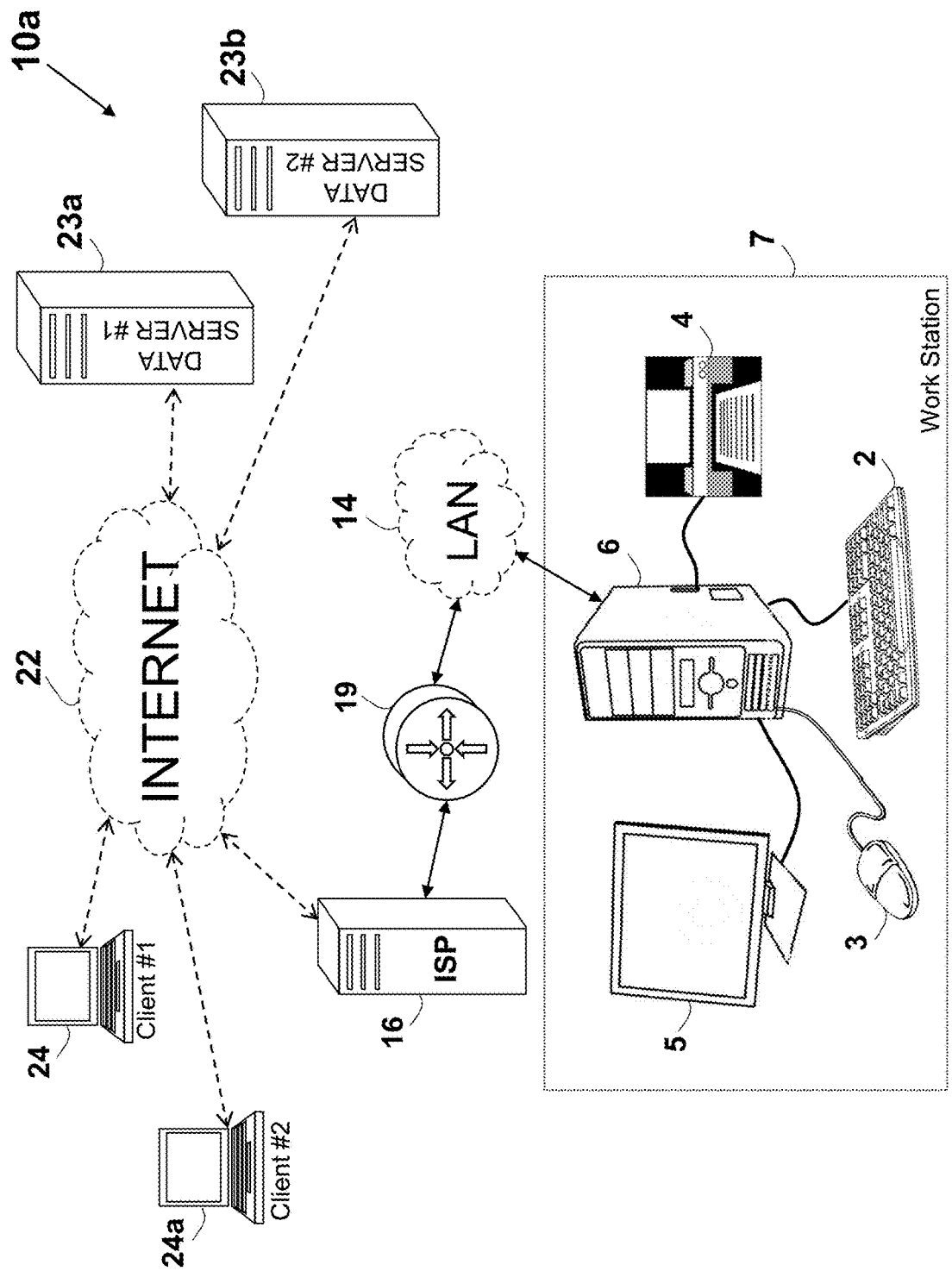
FIG. 1a illustrates schematically the Internet and servers, clients, and a computer workstation connected via the Internet.
Figure 2:
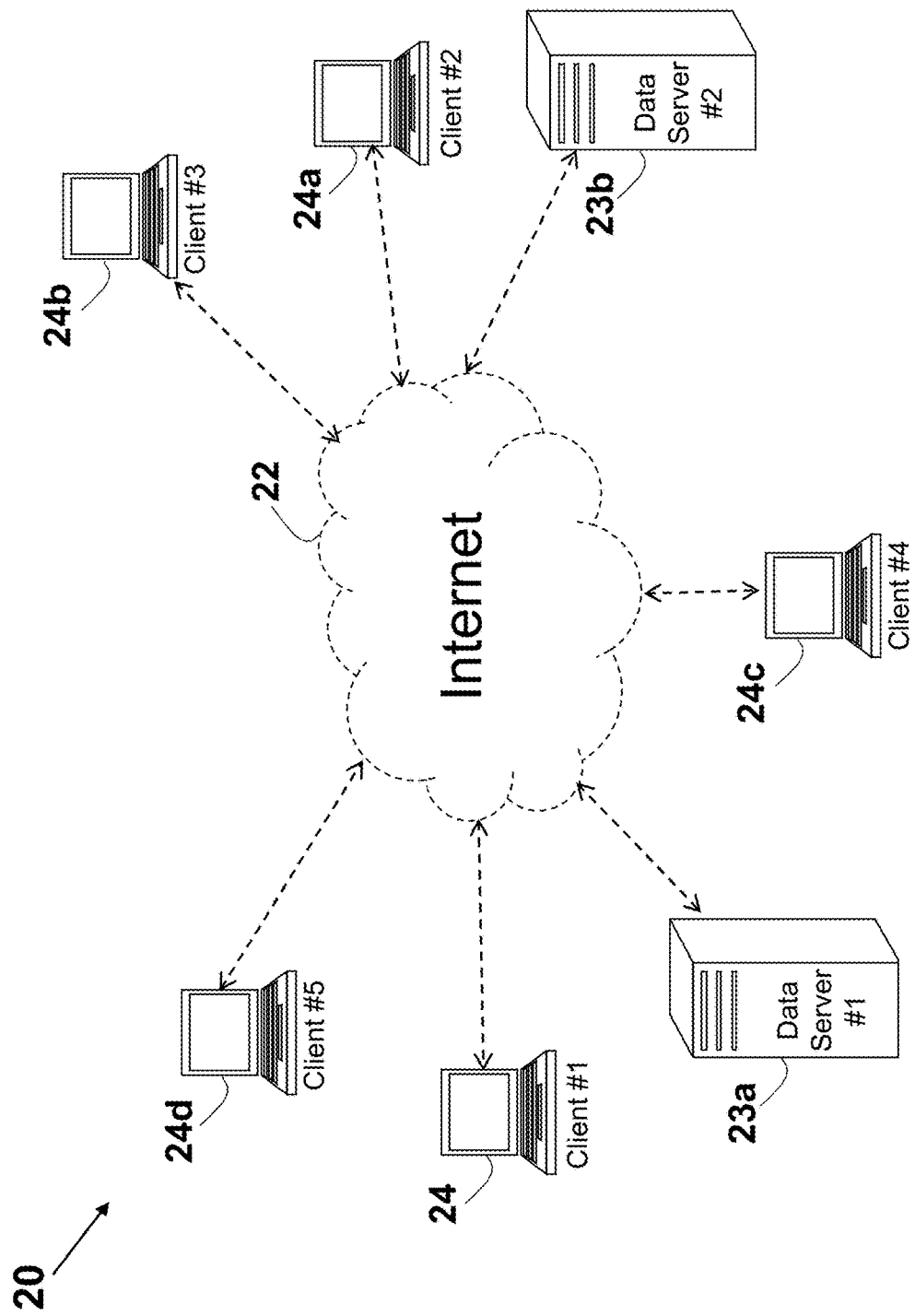
FIG. 2 illustrates schematically the Internet, servers and clients connected over the Internet.
Figure 2A:
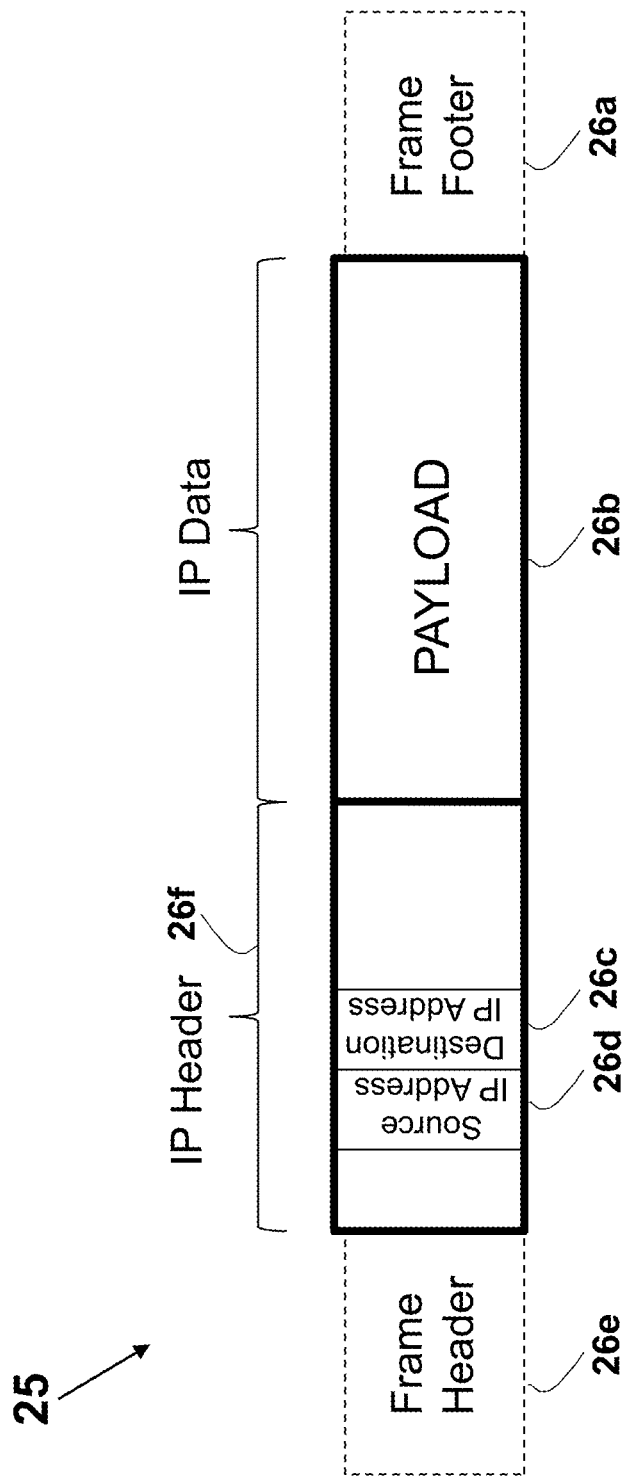
FIG. 2a illustrates schematically a structure of an IP-based packet.
Figure 3:
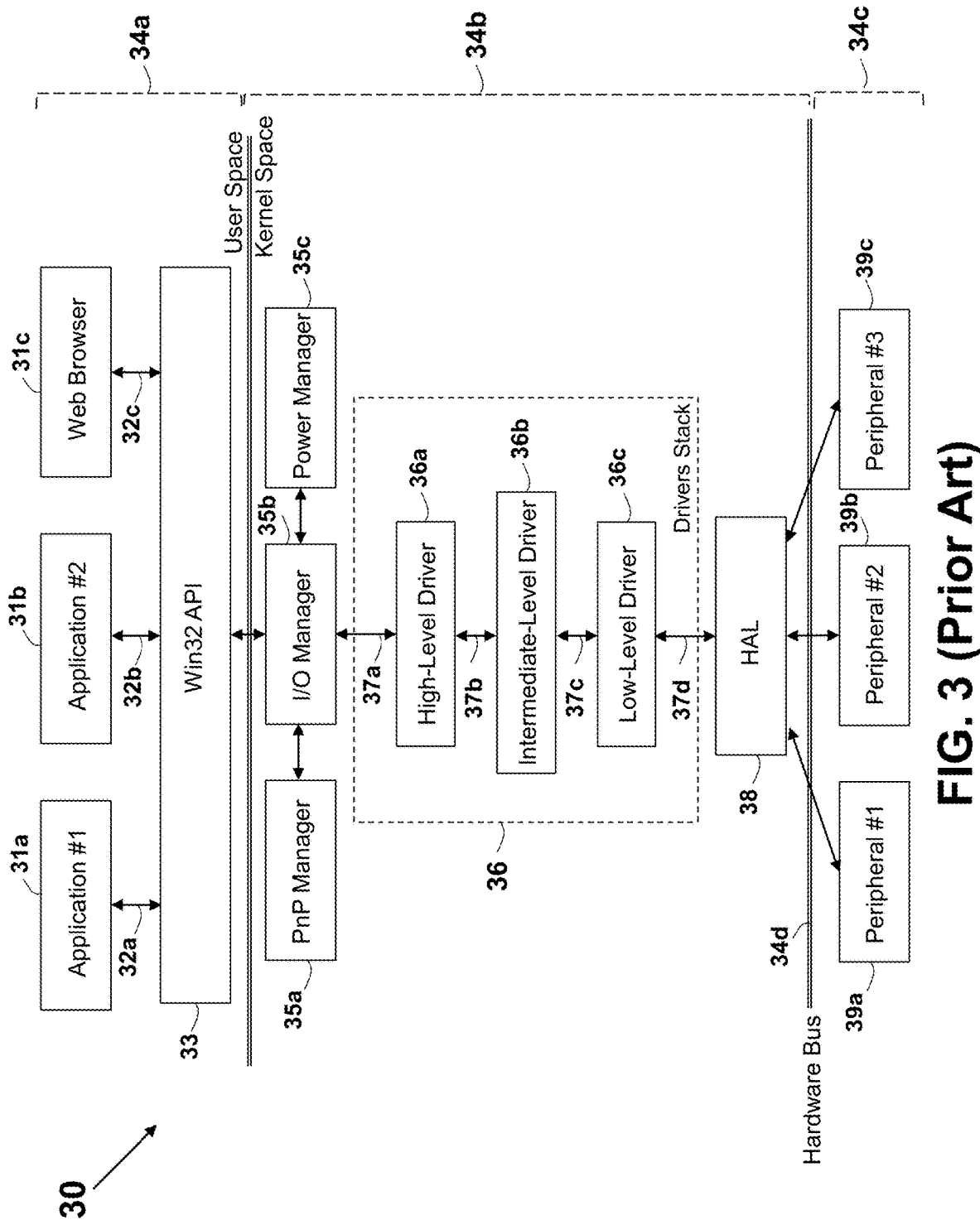
FIG. 3 illustrates schematically a simplified flowchart of an Operating System (OS) using a WDM architecture.
Figure 3A:
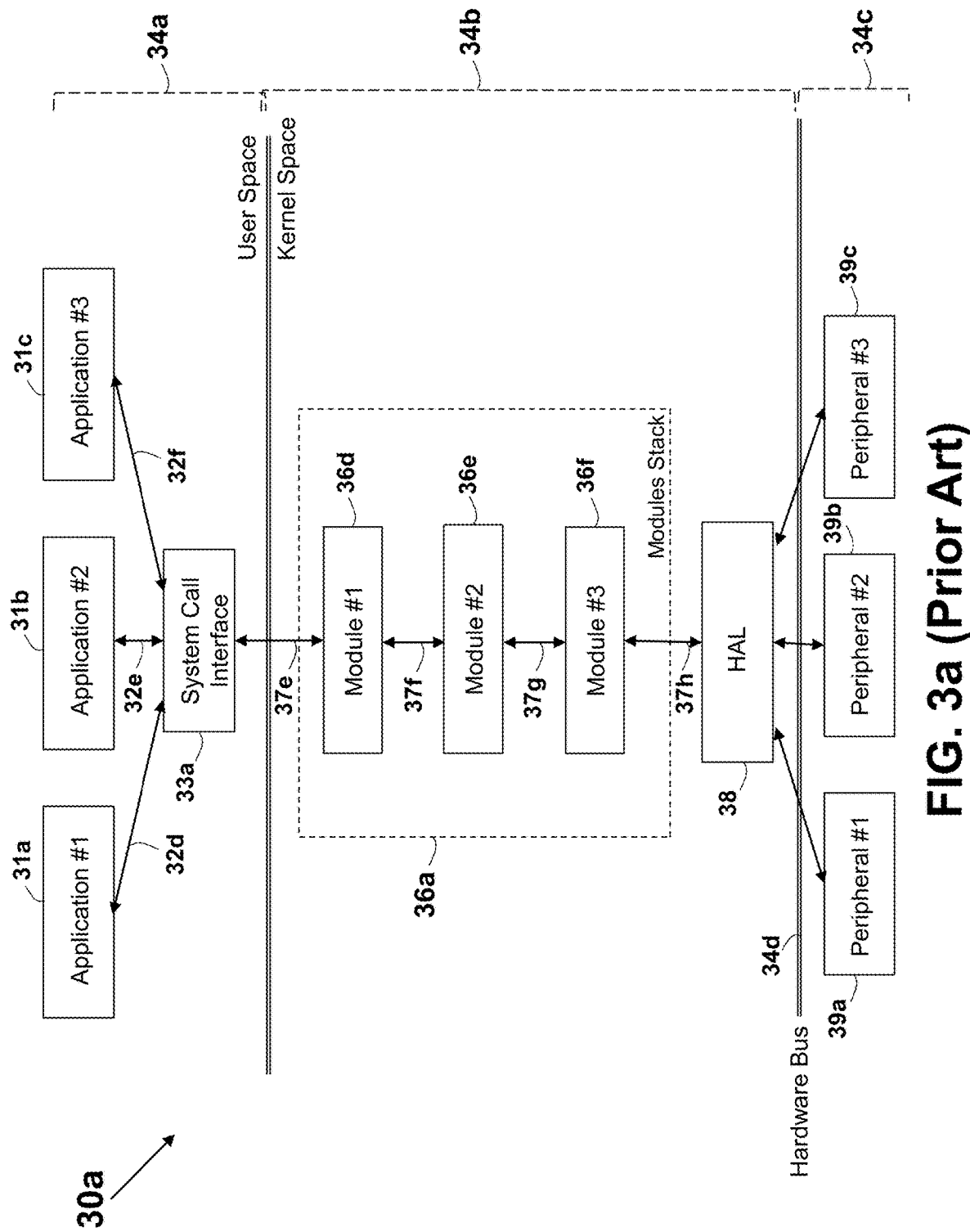
FIG. 3a illustrates schematically a simplified flowchart of an Operating System (OS) using a Linux architecture.
Figure 18:
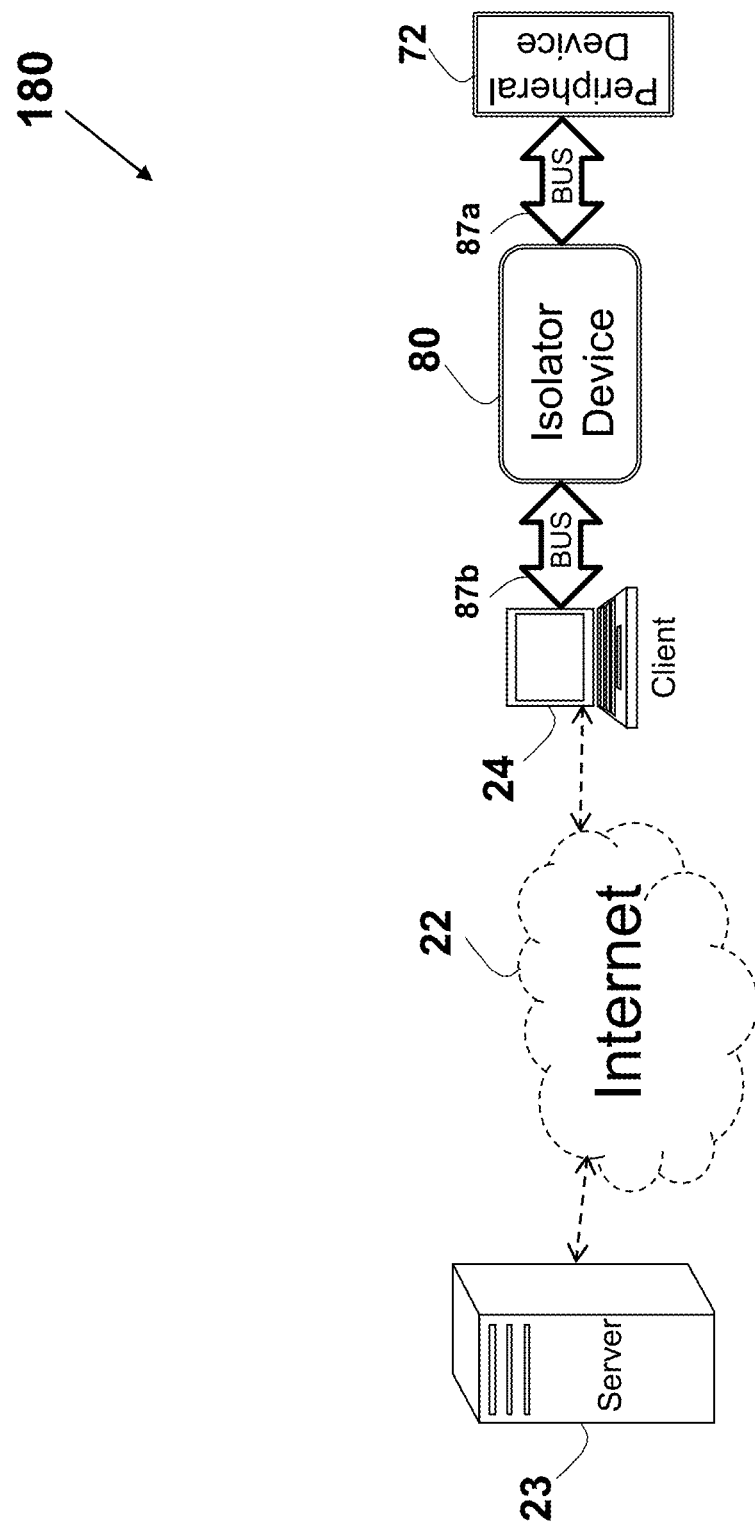
FIG. 18 illustrates schematically a block diagram of a peripheral device connected to a server via an isolator device connected between a host device and the peripheral device.
Figure 18A:
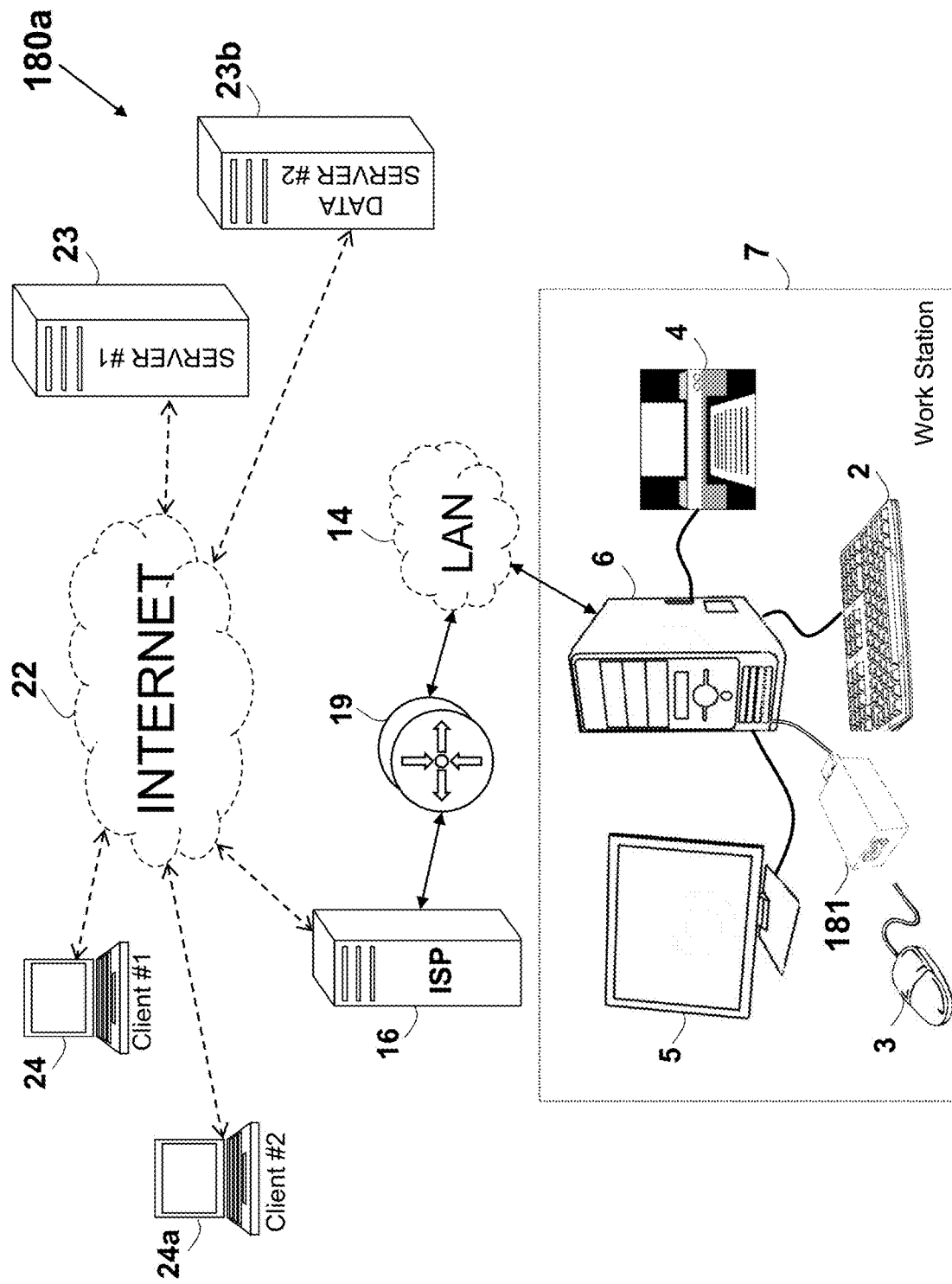
FIG. 18a illustrates schematically a block diagram of a pointing device connected to a server via a 'dongle'-shaped isolator device connected between a host device and the pointing device.

In one example, the isolator device 80 may be used for enabling communication between the peripheral device 72 and a remote server device, while using the host device 71 as a communication channel Such an arrangement 180 is shown in FIG. 18, illustrating a client device 24 serving as the host device 71, communicating via the Internet 22 with a remote server 23. Such an arrangement 180a is pictorially shown in FIG. 18a that is be based on the arrangement 10a shown in FIG. 1a, where the isolator device 80 enclosed in a dongle enclosure 181 is connected between the pointing device 3 and the computer enclosure 6, and communicating via the computer 6, the LAN 14, the router or gateway 19, and the ISP 16 to the Internet 22, for communicating with the server device #1 23.

Since the communication with the server device 23 is over a public or non-trusted network, such as the Internet 22, a secured communication should be used. Preferably, an encrypted tunneling connection is used, such as where the isolator device 80 and the server device 23 negotiate encryption keys, essentially creating an encrypted "tunnel" connection through the un-trusted network, and then communicate encrypted information over the un-trusted network, where the encrypted information is decrypted at the endpoints. Any secured tunneling protocol or technology may be used.

Figure 18B:
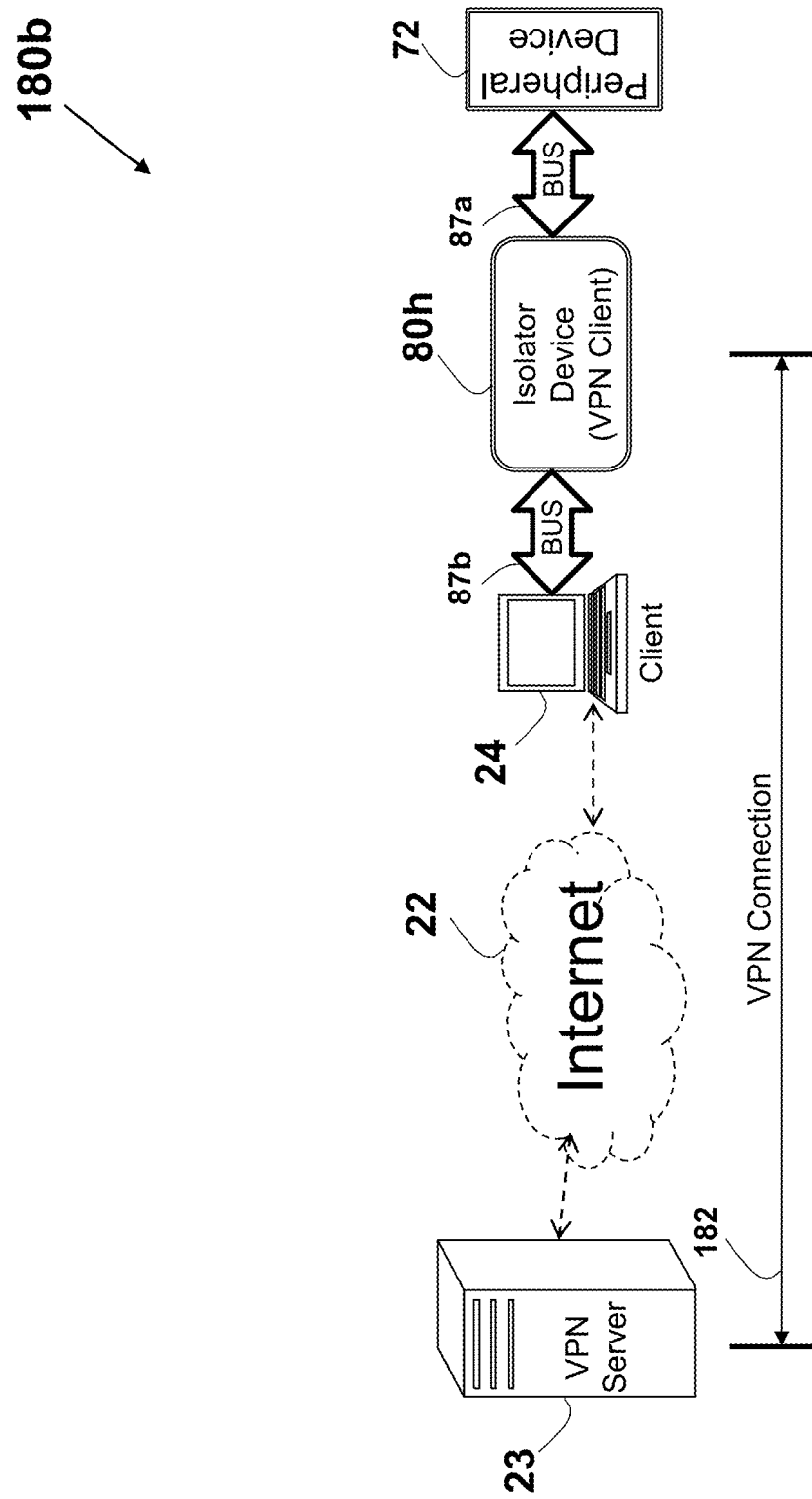
FIG. 18b illustrates schematically a block diagram of a peripheral device connected to a server over a VPN connection using a VPN client isolator device connected between a host device and the peripheral device.

In one example, shown as an arrangement 180b in FIG. 18b, a VPN (Virtual Private Network) protocol is used, that may be based on Point-to-Point Tunneling Protocol (PPTP), Layer Two Tunneling Protocol (L2TP), or Secure Socket Tunneling Protocol (SSTP). A VPN connection 182 is formed between the isolator device 80h serving as a VPN client, and executes a VPN client software as part of the isolation application 86b to establish the VPN connection 182 through the non-trusted network, such as the public Internet 22, to a VPN server 23, which executes VPN server software. In this arrangement, the peripheral device 72 can securely transmit or obtain information from private network resources through the VPN tunnel 182, even though one or more intermediate networks are un-trusted.

Two-factor authentication for VPNs may be used for the VPN connection 182, which may involve providing authentication data from a hardware token to VPN software on a separate machine. One example of a hardware token used for two-factor authentication is the RSA SecurID card. Typically, the hardware token (the card) generates authentication material at the outset of the VPN session when the user enters a Personal Identification Number (PIN) into the token. The user then copies the authentication material displayed by the token into the VPN software. This two-factor process protects the private network if the device running the VPN software is misplaced or stolen. However, this process is inconvenient for the user and can only be used at the outset of a VPN session; the process cannot be used to protect the secret data of an always-on VPN.

The isolator device 80*h*, serving as the VPN client, initiates the VPN connection 182 with VPN server 23 over a public network. For example, the VPN server device 23 may receive a request to create the VPN connection 182 from VPN client 80*h*. In response, the VPN server 23 authenticates VPN client 80*h*, negotiates encryption keys with the VPN client device 80*h*, and establishes the VPN connection 182 between the two devices. Negotiating encryption keys may involve performing Internet Key Exchange (IKE or IKEv2) as part of establishing a session under the Security Protocol for the Internet (IPSec), as described in IETF RFC 2409 and RFC 4306. Alternatively, negotiating encryption keys may involve performing RSA Key Exchange or Diffie-Helman Key Exchange (RFC 2631) as part of establishing a session under the Secure Socket Layer (SSL) or Transport Layer Security (TLS) protocol. The encryption keys are used by the VPN client 80*h* and the VPN server 23 to encrypt, and decrypt data communicated between the two devices over any public or untrusted network.

In one example, the key data used by the VPN client 80*h* is based on a content of a non-volatile memory device, such as a CompactFlash (CF), MiniSD card, MicroSD Card, or xD-Picture Card. The key data, which may serve as the resumption credentials, comprises information required to resume the VPN connection later without requiring the VPN client device 80*h* to re-authenticate with the VPN server device 23. According to one embodiment, the key data include authentication information. For example, the authentication information may include a username, password, security question answers and/or a digital certificate. In addition or alternatively, the authentication information may include one or more long-term VPN authentication keys. For example, long-term authentication keys include private keys, such as an RSA signing key, or shared secret keys, such as an IKE pre-shared key, that are used at the outset of a VPN session to authenticate a VPN endpoint. The VPN session may be an IKE session, or an SSL, TLS, or DTLS session. The key data may also include one or more session keys that are used to encrypt and/or decrypt messages sent and received over the VPN connection. An ongoing VPN session typically has secret keys that are session specific. For IPSec, session keys include ESP and IKE phase two keys. For SSL, TLS, or DTLS, session keys are the keys generated from the pre-master secret.

In operation, the VPN server 23 accepts VPN connections from the VPN client 80*h*, and is communicatively coupled to a plurality of network resources, including various network resources. Once a secure communication channel 182 has been established between the VPN client 80*h* and the VPN server 23 over the Internet 22, the VPN client 80*h* may securely access data residing on the VPN server 23 or any related resources, and the VPN server device 23 may securely access data residing in the peripheral device 72.

In one example, the peripheral device 72 is a non-volatile memory device, such as a USB Flash drive or a Hard Disk-Drive (HDD), or any other device classified as an USB Mass Storage Device class (USB MSC or UMS). Any memory type may equally be applied, may be a random-accessed or a sequential-accessed memory, and may be location-based, randomly-accessed, and can be written multiple times. The memory may be volatile and based on semiconductor storage medium, such as RAM, SRAM, DRAM, TTRAM and Z-RAM, and may be non-volatile and based on semiconductor storage medium, such as ROM, PROM, EPROM or EEPROM, and may be Hash-based, such as SSD drive or USB 'Thumb' drive. The memory may be based on non-volatile magnetic storage medium, or on an optical storage medium that is recordable and removable, and may include an optical disk drive, such as CD-RW, DVD-RW, DVD+RW, DVD-RAM BD-RE, CD-ROM, BD-ROM or DVD-ROM.

Figure 18C:
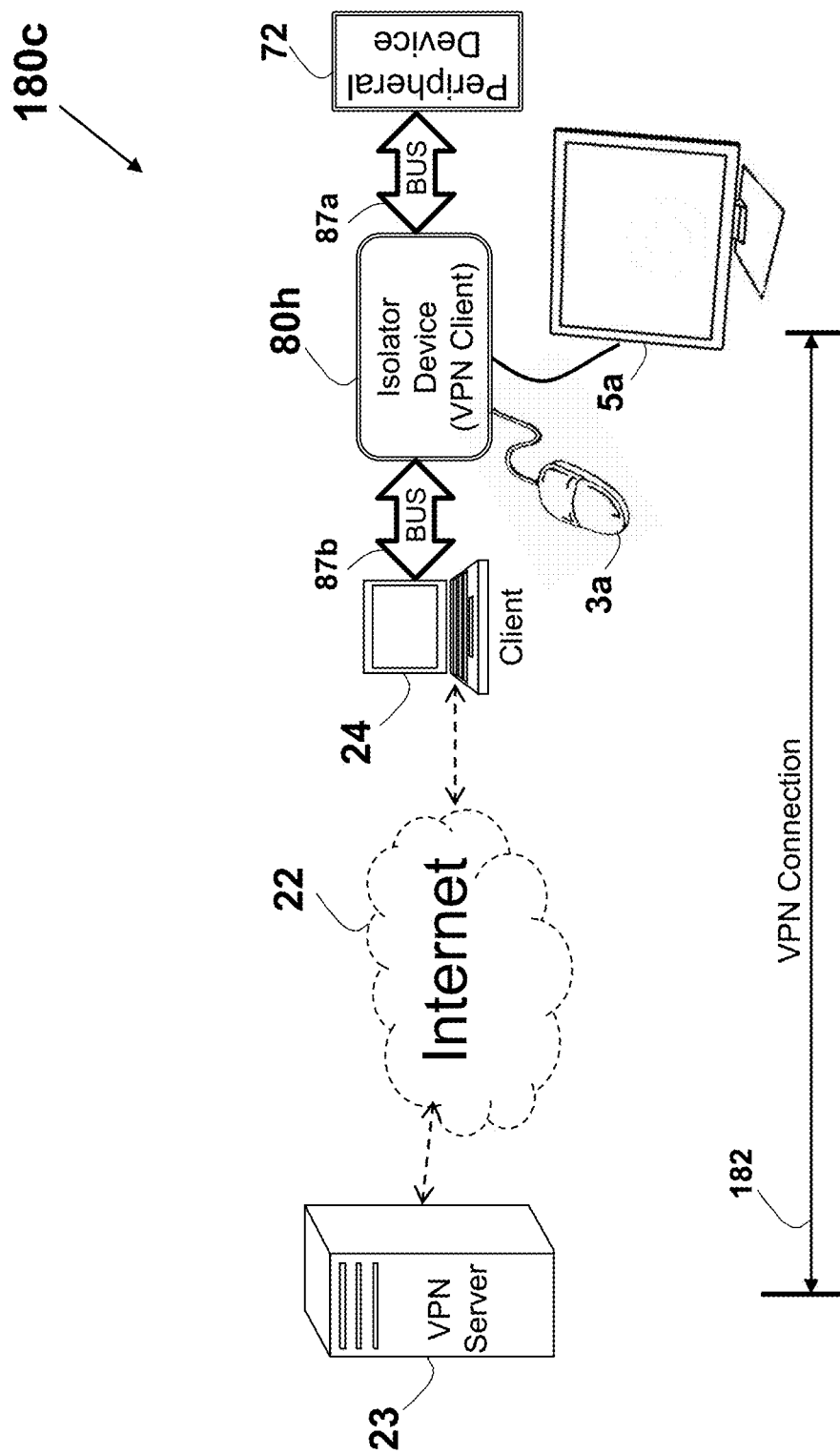
FIG. 18c illustrates schematically a block diagram of a peripheral device connected to a server over a VPN connection using an isolator device connected to local user control devices and connected between a host device and the peripheral device.
Figure 18D:
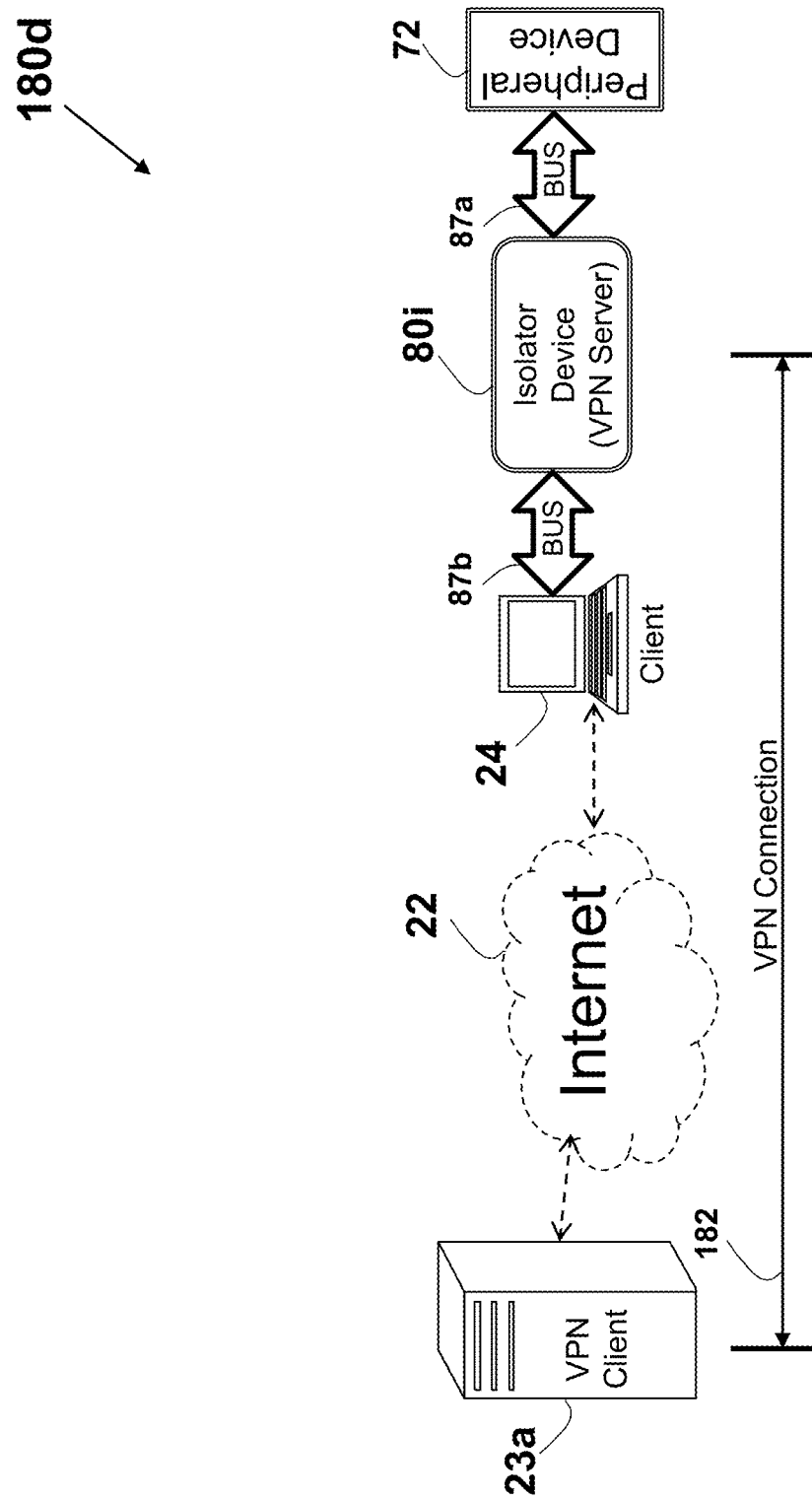
FIG. 18d illustrates schematically a block diagram of a peripheral device connected to a server over a VPN connection using a VPN server isolator device connected between a host device and the peripheral device.
Figure 18E:
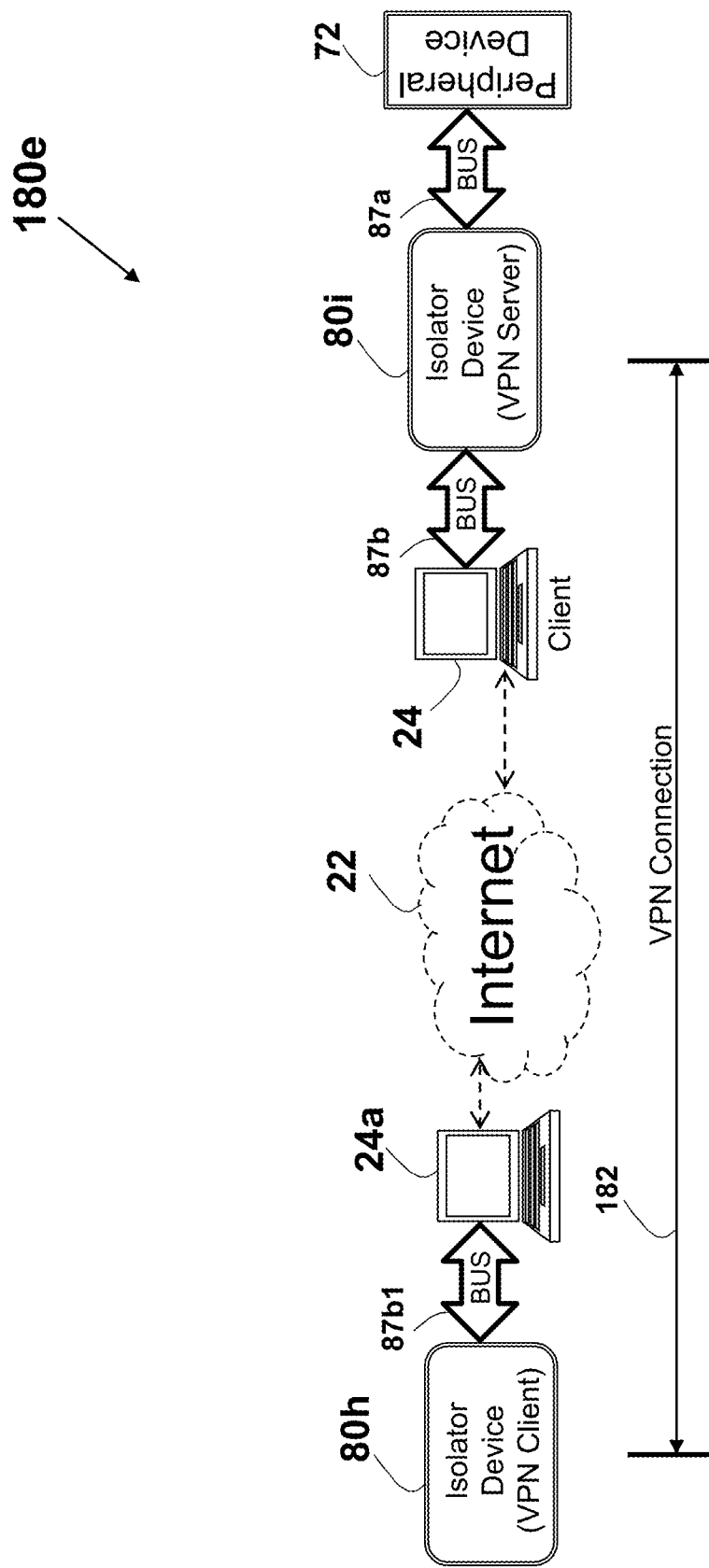
FIG. 18e illustrates schematically a block diagram of a VPN connection between a VPN server isolator device and a VPN client isolator device.

In such a case, the arrangement 180*b* may be used for checking the data stored in the memory device, such as for verifying the data integrity, or for checking for infection or presence of a malware, using the services provided by the VPN server 23. In operation, the data stored in the memory device is read by the isolator device 80*h*, and sent over the VPN tunnel 182 to the VPN server 23 to be checked therein. In one example, all the data (such as all the files) stored in the memory device are read by the isolator device 80*h* and sent over the VPN connection 182 to be checked by the VPN server 23. Alternatively or in addition, part of the stored data (such as selected files) may only be read and sent for verification. The data or files may be selected by a user, and may use various user interface peripherals, as shown in an arrangement 180*c* in FIG. 18*c*, using a pointing device 3*a* and a display 5*a* as a user interface to control the isolator device 80*h*. In such a case, the isolation application 86*b* may include the instructions for reading the memory device content, either as a whole or selected by a user via the respective peripheral devices, reading the data from the peripheral device 72 via the USB connection 87*a* using the host emulator module 81*a*, and sending the data over the secured VPN connection 182 to the VPN server 23.

Figure 4:
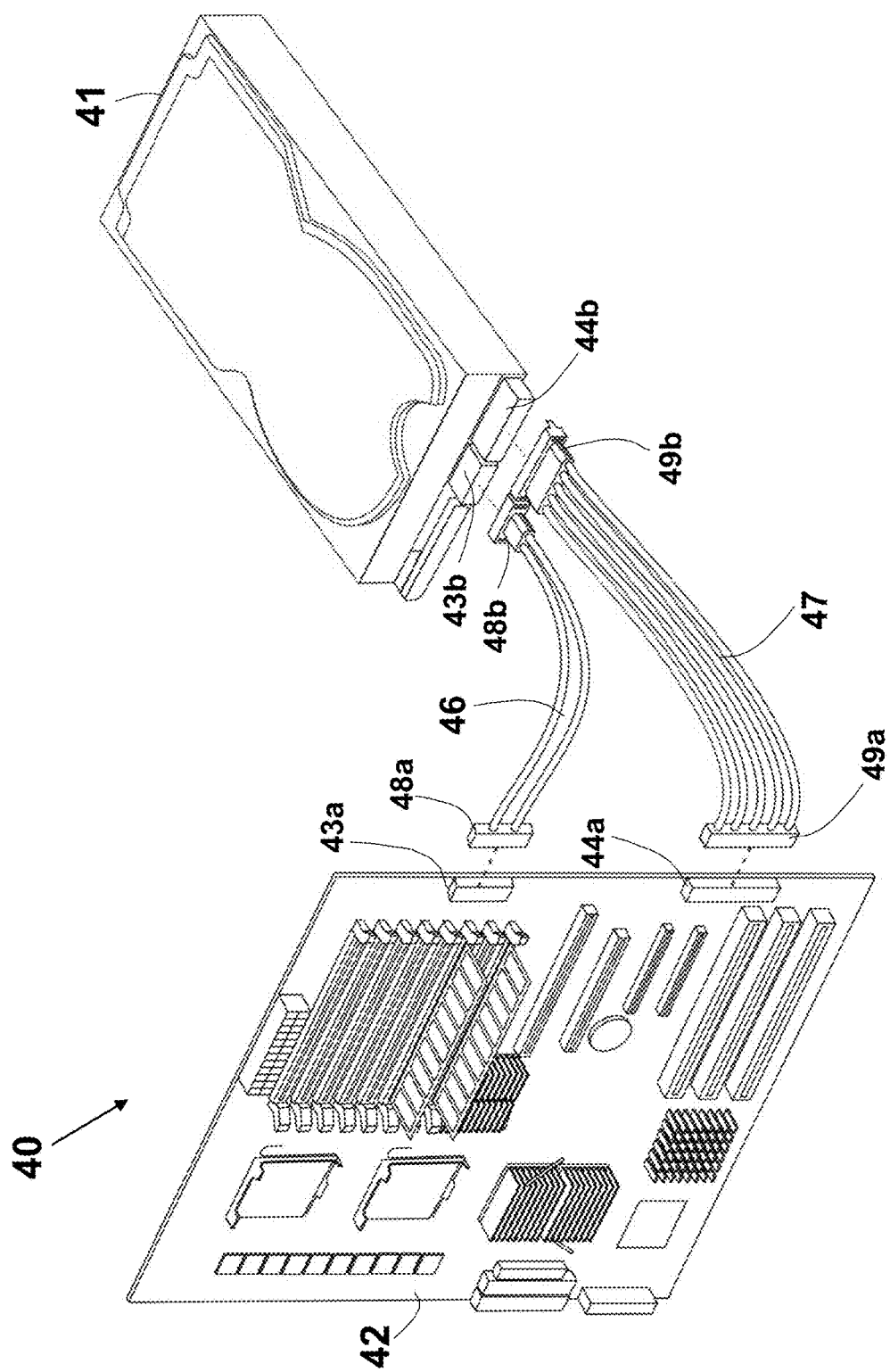
FIG. 4 depicts schematically an HDD, a motherboard, and SATA bus cables for connecting.
Figure 4A:
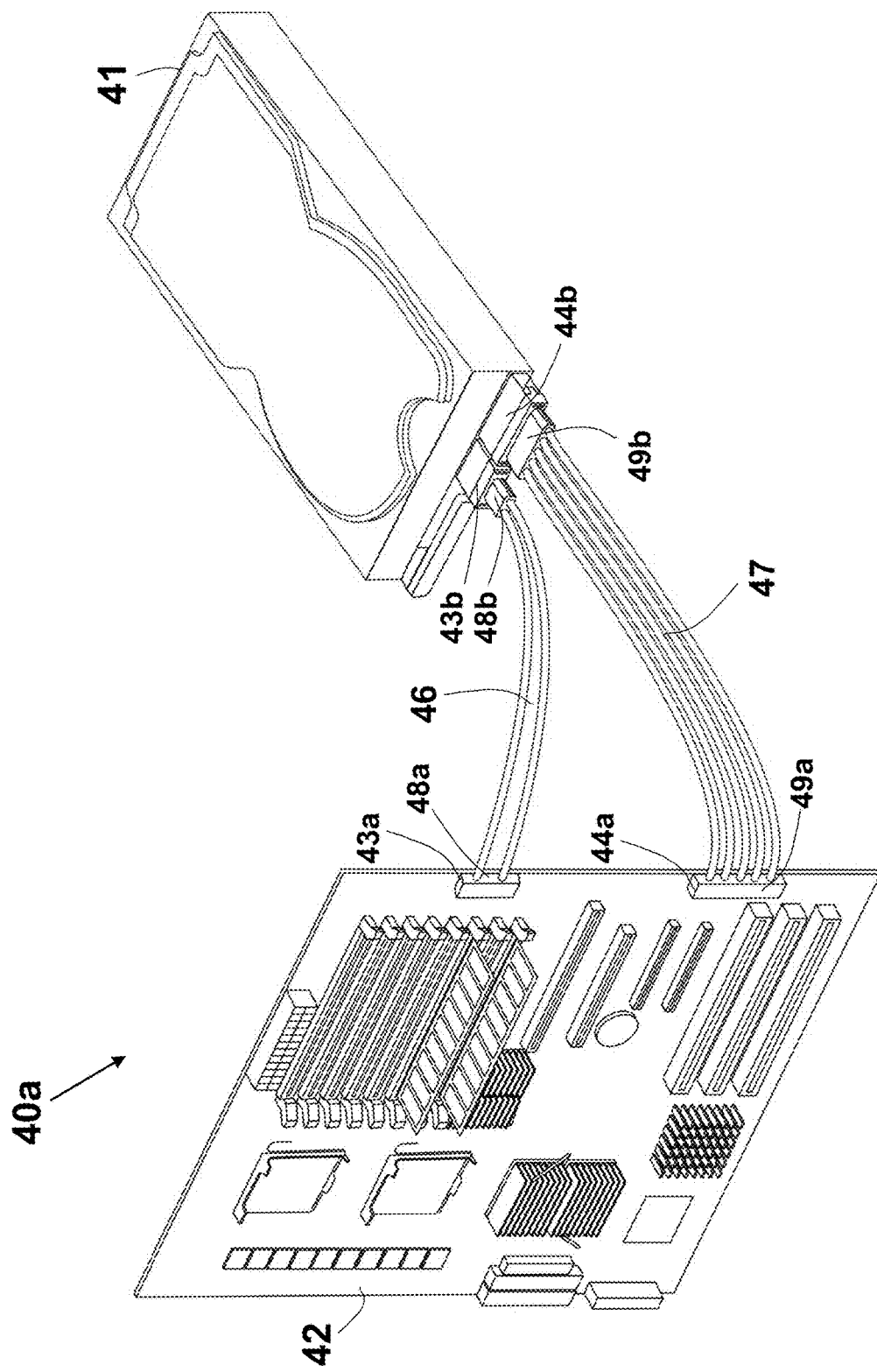
FIG. 4a depicts schematically an HDD connected via an SATA bus to a motherboard.
Figure 5:
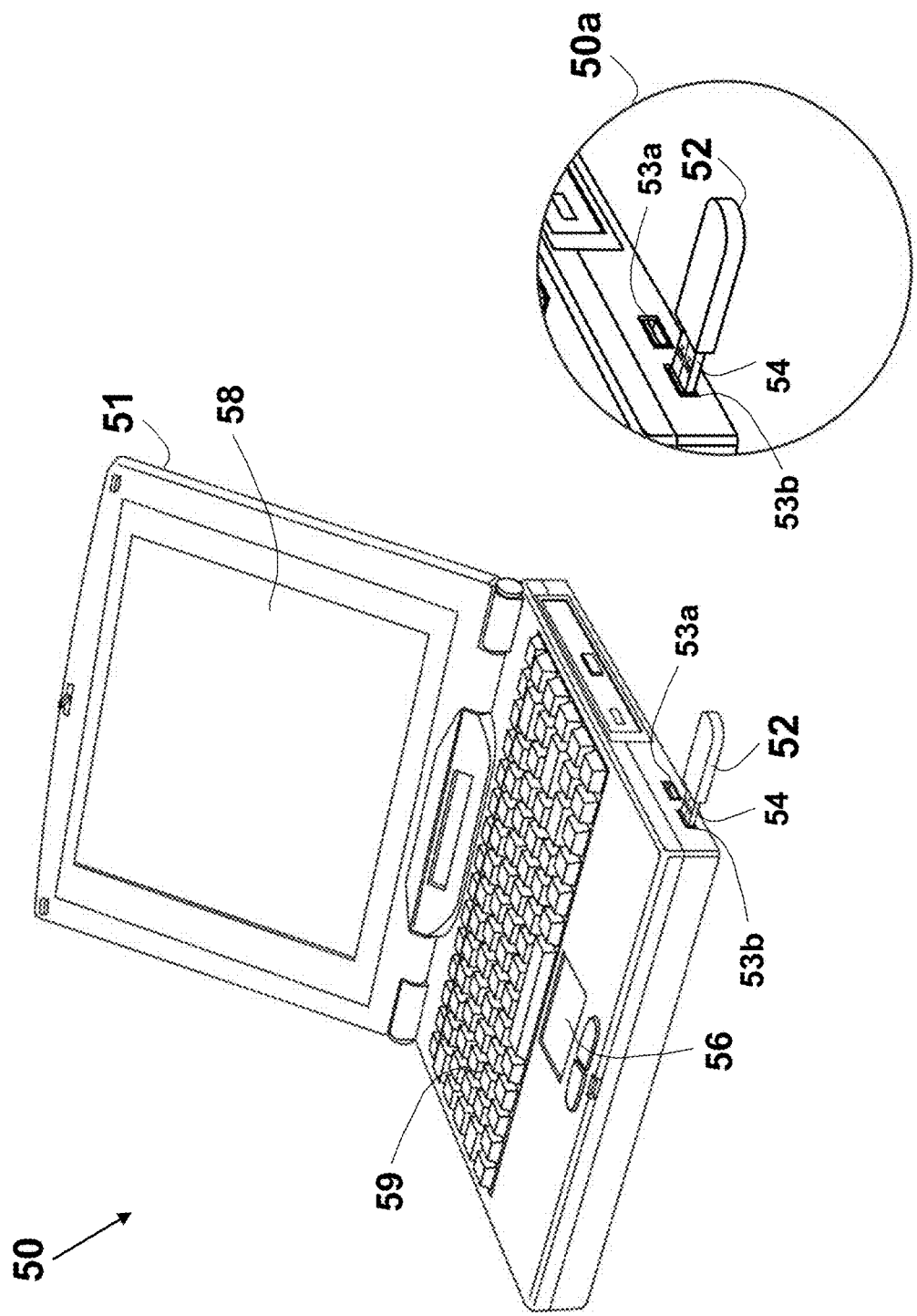
FIG. 5 depicts schematically a laptop and 'thumb drive' flash drive.
Figure 5A:
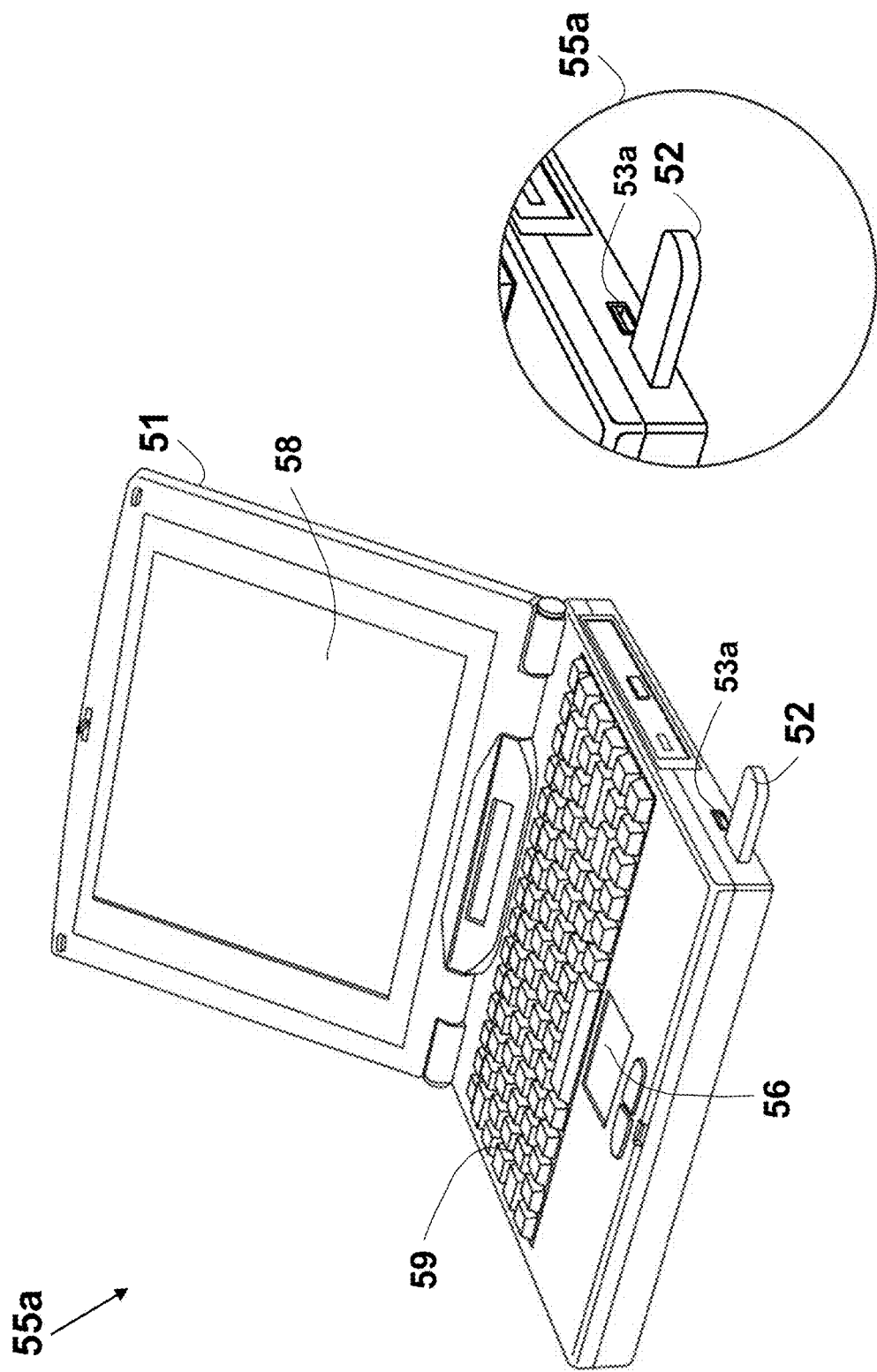
FIG. 5a depicts schematically a laptop and 'thumb drive' flash drive inserted thereto.
Figure 6:
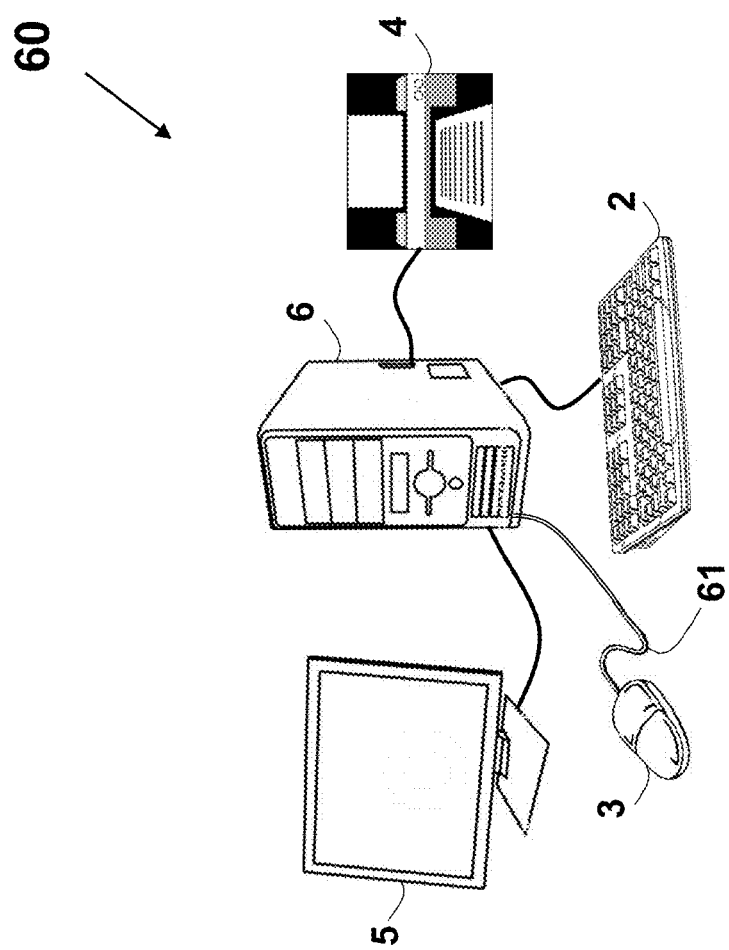
FIG. 6 depicts schematically a computer enclosure and peripheral devices connected thereto.
Figure 7:
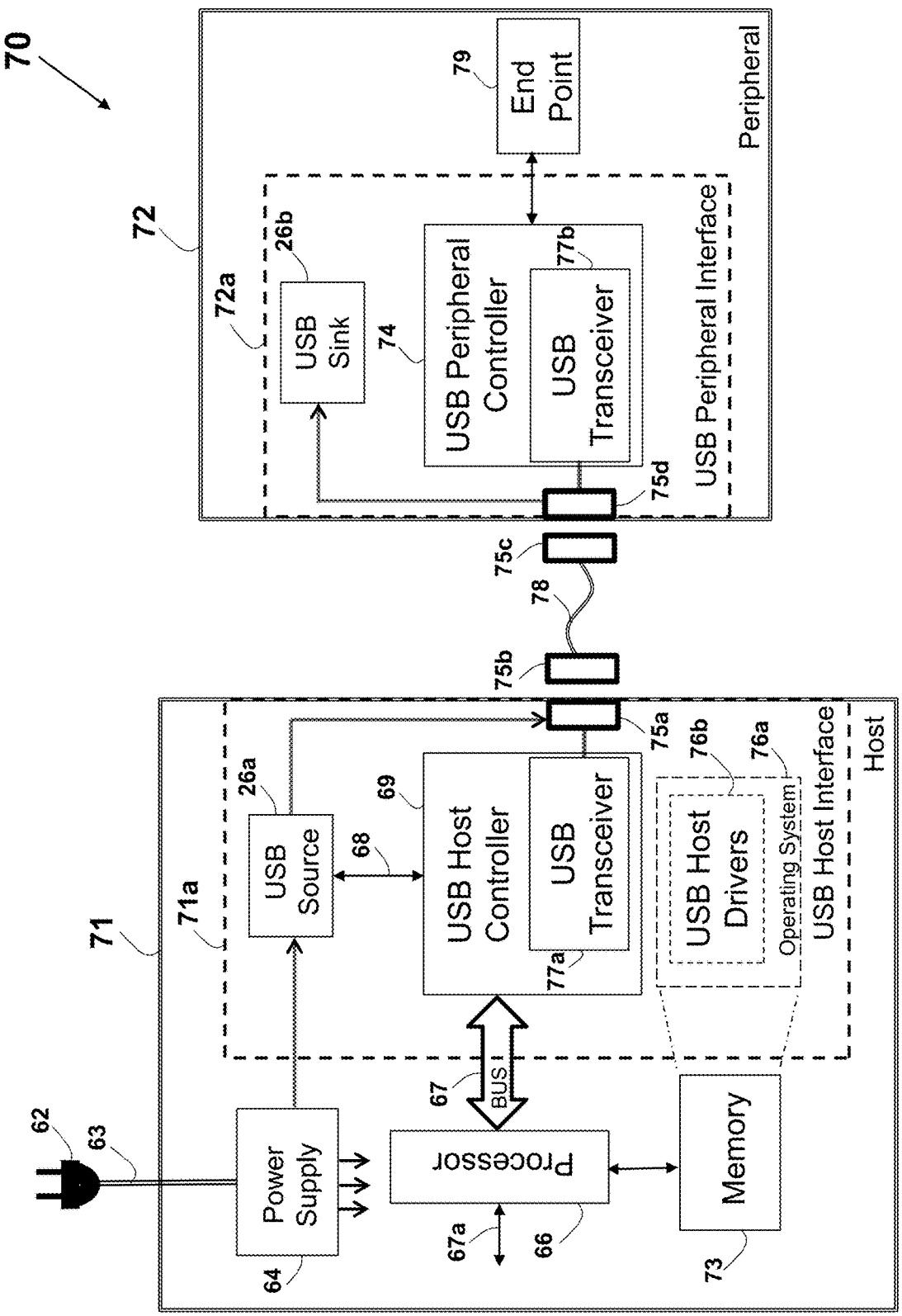
FIG. 7 illustrates schematically a block diagram of a USB connection between a host device and a peripheral device.
Figure 7A:
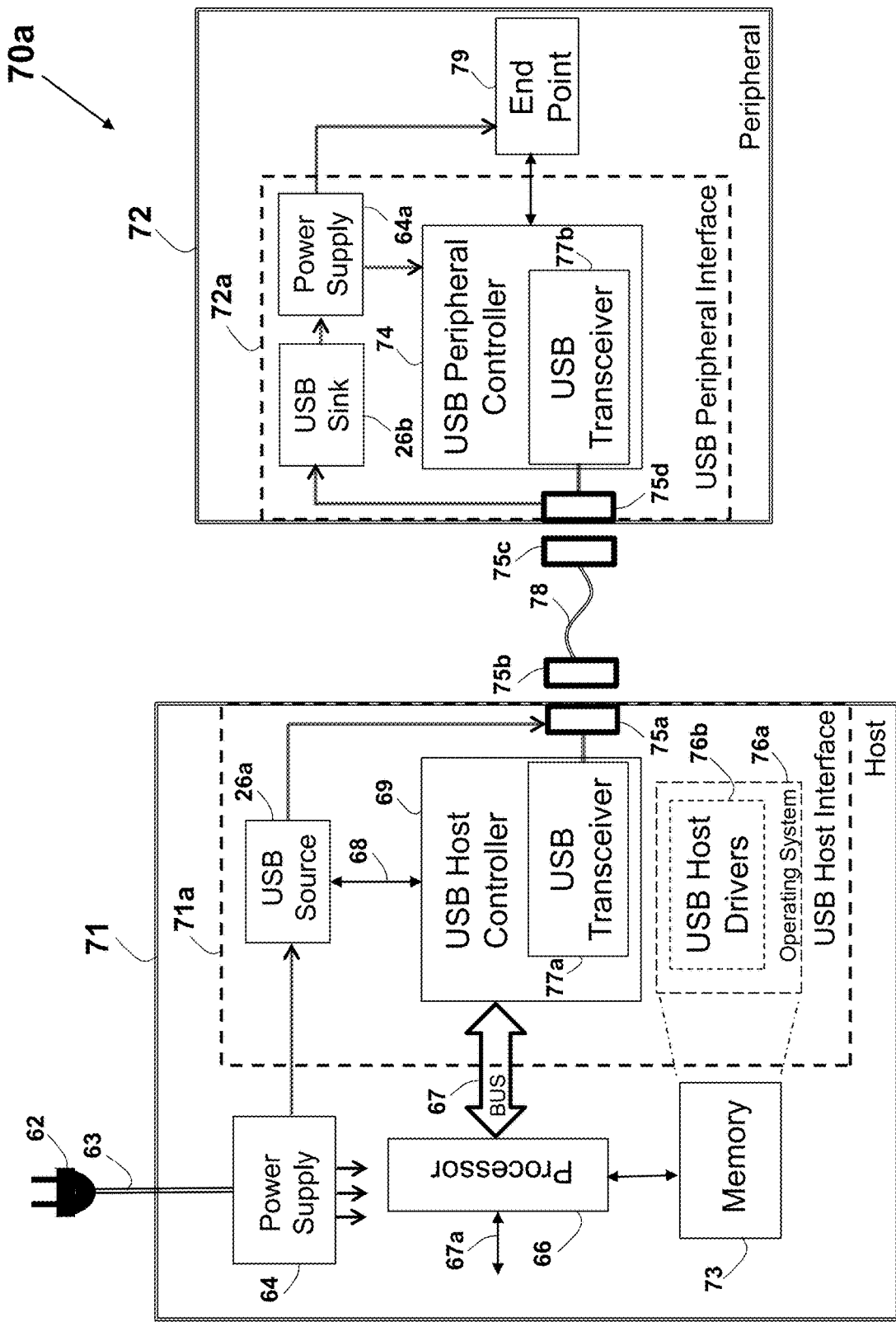
FIG. 7a illustrates schematically a block diagram of a USB connection including the powering scheme between a host device and a peripheral device.
Figure 19:
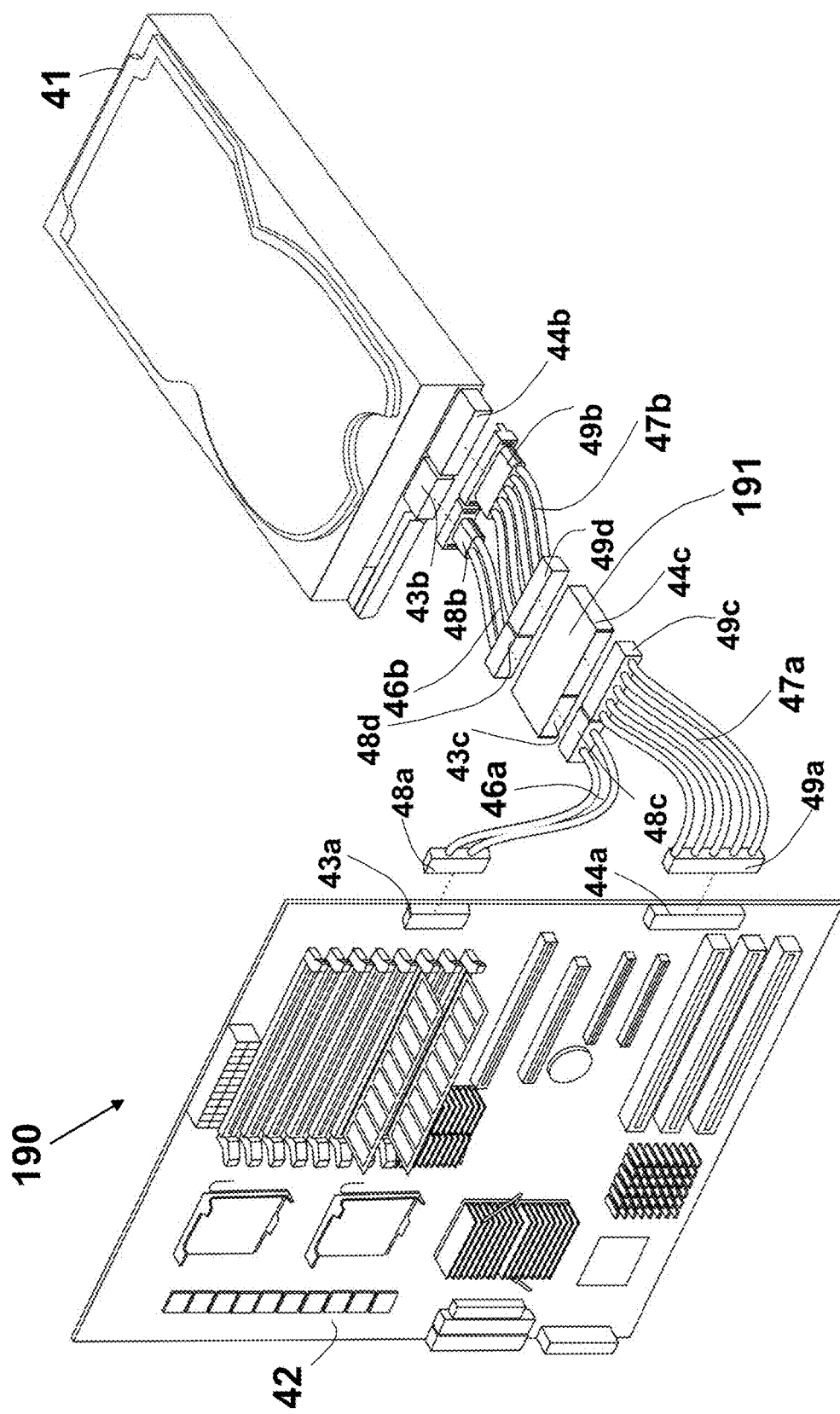
FIG. 19 depicts schematically an HDD, a motherboard, and an isolator device for connecting.
Figure 19A:
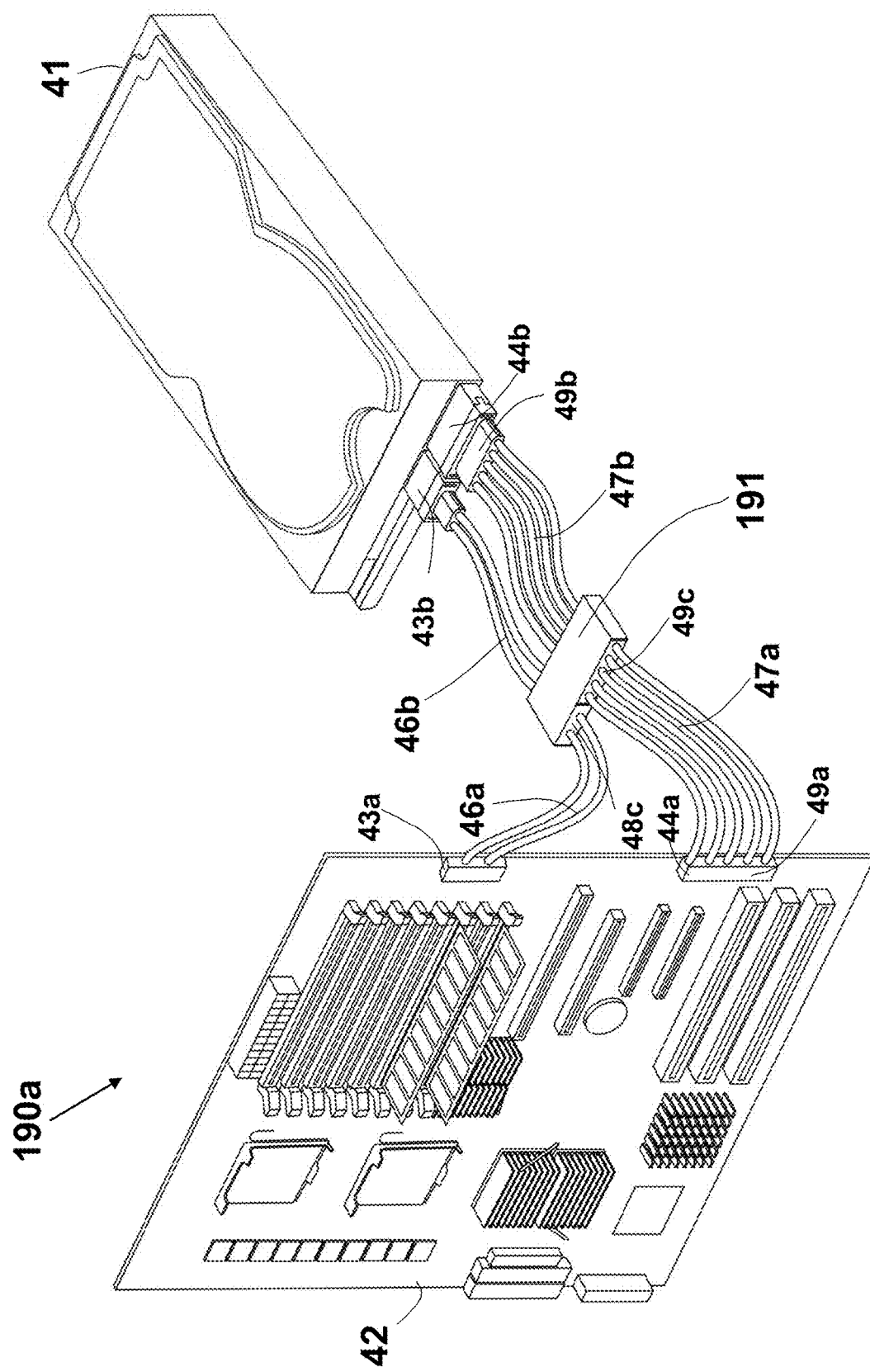
FIG. 19a depicts schematically an HDD connected via an isolator module and an SATA bus to a motherboard.

While exampled above regarding a USB bus, the devices and methods herein may equally apply to any wired connection between a host device and peripheral device. For example, the peripheral may be the HDD 41 connected via an SATA bus over SATA defined cables as shown in arrangements 40 and 40*a* respectively shown in FIGS. 4 and 4A. An isolator device 191, corresponding to an isolator device 80 where an SATA connection substitutes the USB connection, may be in full or in part integrated onto the motherboard 42, or to the HDD 41. Further, part or the entire of the SATA-based isolator device 191 may be a separate enclosure, such as the box-shaped enclosure 191 shown in a view 190 in FIG. 19, connected between the motherboard 42 and the HDD 41. A power cable 46*a* is terminated with the cable power connectors 48*a* and 48*c*, which may be respectively connected to the mating power connector 43*a* in the motherboard 42 and the mating power connector 43*c* in the isolator device 191. A power cable 46*b* is terminated with the cable power connectors 48*d* and 48*b*, which may be respectively connected to the mating power connector in the isolator device 191 and the mating power connector 43*b* in the HDD 41. A data cable 47*a* is terminated with the cable data connectors 49*a* and 49*c*, which may be respectively connected to the mating data connector 44*a* in the motherboard 42 and the mating data connector in the isolator device 191. A data cable 47*b* is terminated with the cable data connectors 49*d* and 49*b*, which may be respectively connected to the mating data connector of the isolator device 191 and the mating data connector 44*b* in the HDD 41. The isolator device 191 connected between the motherboard 42 and the HDD 41 is shown in a view 190*a* in FIG. 19*a*.

Figure 20:
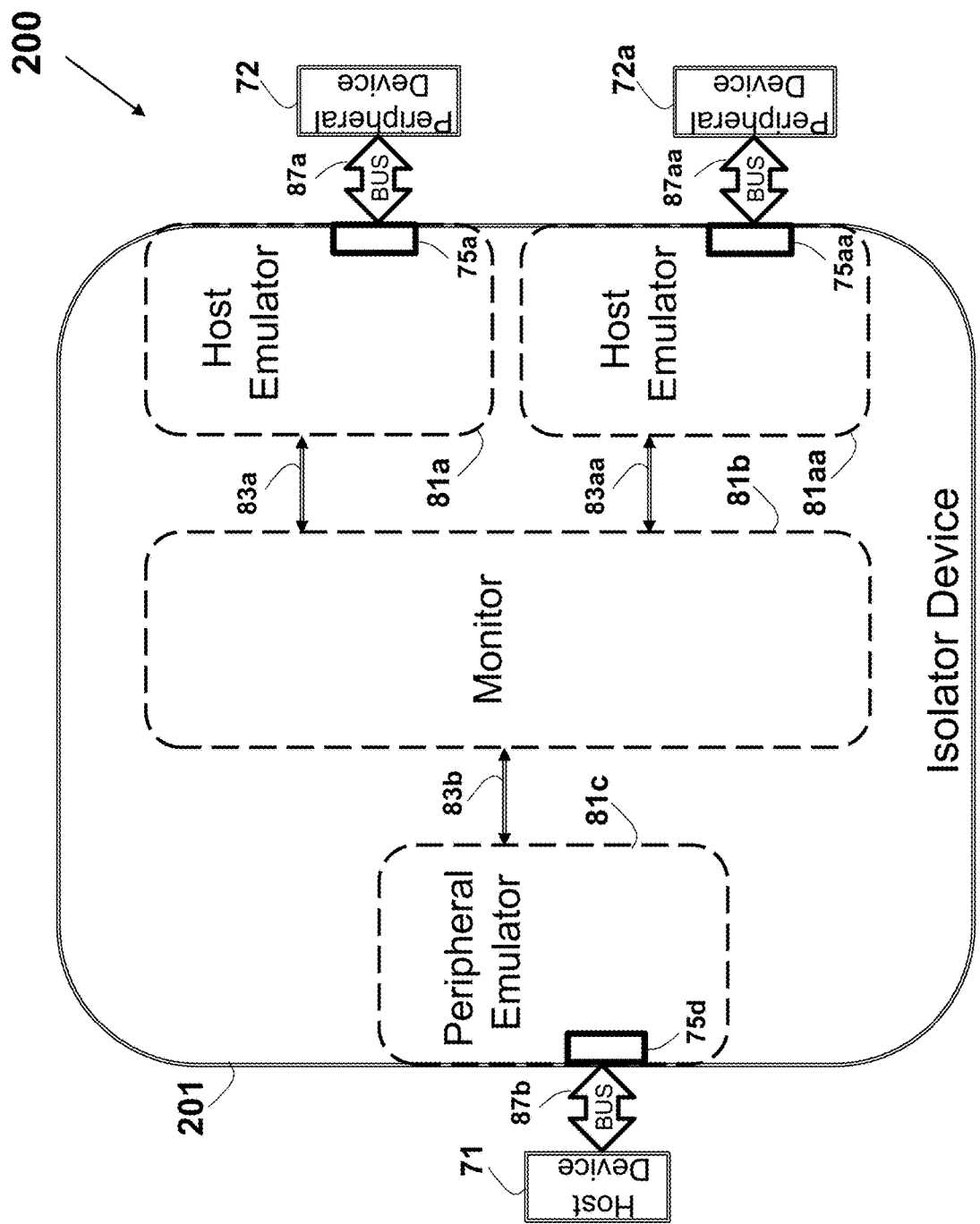
FIG. 20 illustrates schematically a block diagram of an isolator device connected between a host device and two peripheral devices.

While exampled above regarding a host device 71 connected via the isolator device 80 to a single peripheral device 72, any number of peripheral devices may be equally used, such as 2, 3, 4, 5, 6, 7, 8, 9, or 10 peripheral devices. In such a case, a USB hub software is included in the isolator device 80, such as stored in the memory 84*b*, or as part of the isolation application 86*b*. An example of an isolator device 201 connected to two peripheral devices 72 and 72*a*, over two respective USB connections 87*a* and 87*aa*, is shown in an arrangement 200 in FIG. 20. An additional host emulator module 81*aa*, that may be identical, similar, or distinct from the host emulator module 81*a*, is used for connecting over a USB connection 87*aa* and USB connector 75*aa* (serving as a host) to the peripheral device 72*a*, to that peripheral device. The host emulator module 81*aa* is connected to the processor 82*b* in the monitor module 81*b* over an additional local bus 83*aa*. In operation, the isolator module 201 simultaneously functions as the isolator device 80 connectable between the host device 71 and the peripheral device 72, as well as the isolator device 80 connectable between the host device 71 and the peripheral device 72*a*.

While exampled above regarding a USB bus connecting the host computer device 71 and the peripheral device 72, any industry standard or proprietary bus type may equally be used. A communication link (such as Ethernet, or any other LAN, PAN or WAN communication link) may also be regarded as bus herein. A bus may be an internal bus (a.k.a. local bus), primarily designed to connect a processor or CPU to peripherals inside a computer system enclosure, such as connecting components over the motherboard or backplane. Alternatively, a bus may be an external bus, primarily intended for connecting the processor or the motherboard to devices and peripherals external to the computer system enclosure. Some buses may be doubly used as internal, or external buses. A bus may be of parallel type, where each word (address or data) is carried in parallel over multiple electrical conductors or wires; or alternatively, may be bit-serial, where bits are carried sequentially, such as one bit at a time. A bus may support multiple serial links or lanes, aggregated or bonded for higher bit-rate transport. Non-limiting examples of internal parallel buses include ISA (Industry Standard architecture); EISA (Extended ISA); NuBus (IEEE 1196); PATA—Parallel ATA (Advanced Technology Attachment) variants such as IDE, EIDE, ATAPI, SBus (IEEE 1496), VESA Local Bus (VLB), PCI and PC/104 variants (PC/104, PC/104 Plus, PC/104 Express).

Non-limiting examples of internal serial buses include PCIe (PCI Express), Serial ATA (SATA), SMBus, and Serial Peripheral Bus (SPI) bus. Non-limiting examples of external parallel buses include HIPPI (HIgh Performance Parallel Interface), IEEE-1284 ('Centronix'), IEEE-488 (a.k.a. GPIB—General Purpose Interface Bus) and PC Card/PCMCIA. Non-limiting examples of external serial buses include USB (Universal Serial Bus), eSATA and IEEE 1394 (a.k.a. FireWire). Non-limiting examples of buses that can be internal or external are Futurebus, InfiniBand, SCSI (Small Computer System Interface), and SAS (Serial Attached SCSI). The bus medium may be based on electrical conductors, commonly copper wires based cable (may be arranged as twisted-pairs) or a fiber-optic cable. The bus topology may use point-to-point, multi-drop (electrical parallel) and daisy-chain, and may further be based on hubs or switches. A point-to-point bus may be full-duplex, providing simultaneous, two-way transmission (and sometimes independent) in both directions, or alternatively a bus may be half-duplex, where the transmission can be in either direction, but only in one direction at a time.

Buses are further commonly characterized by their throughput (data bit-rate), signaling rate, medium length, connectors, and media types, latency, scalability, quality-of-service, devices per connection or channel, and supported bus-width. A configuration of a bus for a specific environment may be automatic (hardware or software based, or both), or may involve user or installer activities such as software settings or jumpers. Recent buses are self-repairable, where spare connection (net) is provided which is used in the event of a malfunction in a connection. Some buses support hot-plugging (sometimes known as hot swapping), where a connection or a replacement can be made, without significant interruption to the system or without the need to shut-off any power.

Any other auxiliary devices or any computer peripherals may equally be used as the peripheral device 72, or any other device that is connectable to a host computer, but not part of it. Further, communication between two host computers may be equally applied. The peripheral may be input device that is used to interact with, or send data to the host computer, such as a pointing device (e.g., computer mouse), a keyboard, a graphic tablet, a touchscreen, a barcode reader, an image scanner, a microphone, or a digital camera (e.g., webcam). Alternatively or in addition, the peripheral may be an output device, which provides output from the host computer to a user or to another device, such as a display device, an image projector, a graphical output device, a loudspeaker, or a printer. The peripheral may be used to connect the host computer to an external network, such as a modem or a Network Interface Card (NIC). Further, the peripheral may be in part or fully integrated with the host computer. While exampled above regarding a general computer system, any device embedding firmware or software may equally be used, and in particular any communication-related devices such as a router or firewall.

The bus connecting to the between the host device 71 and the peripheral device 72 may be based on a LAN communication, such as Ethernet, and may be partly or in full in accordance with the IEEE802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX). The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 Mbit/s to 1250 Mbit/s, to ensure a DC balanced signal. The symbols are then sent using NRZ. The IEEE 802.3ab, which defines the widely used 1000BASE-T interface type, uses a different encoding scheme in order to keep the symbol rate as low as possible, allowing transmission over twisted pair. Similarly, The 10 gigabit Ethernet (10 GE or 10 GbE or 10 GigE may be used, which is a version of Ethernet with a nominal data rate of 10 Gbit/s (billion bits per second), ten times faster than gigabit Ethernet. The 10 gigabit Ethernet standard only defines full duplex point to point links that are generally connected by network switches. The 10 gigabit Ethernet standard encompasses a number of different physical layers (PHY) standards. A networking device may support different PHY types through pluggable PHY modules, such as those based on SFP+.

The method and steps described herein may be used for detecting malware such as a firmware virus, a computer virus, spyware, DoS (Denial of Service), rootkit, ransomware, adware, backdoor, Trojan horse, or a destructive malware. Further, by stopping a malware related message from passing through the system (such as to, or from, a peripheral), a damage that may be caused by the malware is avoided.

In the case where dedicated PCB is used, the electrical connection may use an edge connector, relating to the portion of a printed circuit board (PCB) consisting of traces leading to the edge of the board that are intended to plug into a matching socket. Such connectors are used in computers for expansion slots for peripheral cards, such as PCI, PCI Express, and AGP cards. Edge connector sockets consist of a plastic "box" open on one side, with pins on one or both side(s) of the longer edges, sprung to push into the middle of the open center. Connectors are often keyed to ensure the correct polarity, and may contain bumps or notches both for polarity, and to ensure that the wrong type of device is not inserted. The socket width is chosen to fit to the thickness of the connecting PCB.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™-2008 entitled: "*Standard for Information Technology—Portable Operating System Interface (POSIX(R)) Description*", and The Open Group Technical Standard Base Specifications, Issue 7, IEEE STD. 1003.1™, 2013 Edition.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any part of, or whole of, any of the methods described herein may be implemented by a processor such as processor 12, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

The isolator device 80 herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Wash., U.S.A.), Linux, and Google Chrome OS available from Google Inc. headquartered in Mountain View, Calif., U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using HyperText Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any device herein, such as the isolator device 80, may be integrated with a part of or in an entire appliance. The primary function of the appliance may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffee-maker, or an iced-tea maker. Alternatively or in addition, the primary function of the appliance may be associated with an environmental control such as temperature control, and the appliance may consist of, or may be part of, an HVAC system, an air conditioner or a heater. Alternatively or in addition, the primary function of the appliance may be associated with a cleaning action, such as a washing machine, a clothes dryer for cleaning clothes, or a vacuum cleaner. Alternatively or in addition, the primary function of the appliance may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions cause the processor to perform the one or more of the methods or steps described herein. Any of the disclosed flow charts or methods, or any step thereof, may be implemented in the form of software stored on a memory or a computer-readable non-transitory information storage medium such as an optical or magnetic disk, a non-volatile memory (e.g., flash or ROM), RAM, and other forms of volatile memory. The information storage medium may be an internal part of the computer, a removable external element coupled to the computer, or unit that is remotely accessible via a wired or wireless network.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled by the same software or hardware. The term "integration" herein refers (as applicable) to a software integration, hardware integration, or any combination thereof.

Any networking protocol may be utilized for exchanging information between the network elements (e.g., clients, and servers) within the network (such as the Internet 22). For example, it is contemplated that communications can be performed using TCP/IP. Generally, HTTP and HTTPS are utilized on top of TCP/IP as the message transport envelope. These two protocols can deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described herein is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing, are classified as server or client systems. Network hosts may also function as nodes in peer-to-peer applications, in which all nodes share and consume resources in an equipotent manner.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer which is small enough to be held and operated while holding in one hand, or fit into a pocket. Such a device, also referred to as a mobile device, typically has a display screen with a touch input and/or a miniature keyboard. Non-limiting examples of such devices include Digital Still Camera (DSC), Digital video Camera (DVC or digital camcorder), Personal Digital Assistant (PDA), and mobile phones and Smartphones.

The mobile devices may combine video, audio and advanced communications capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

As used herein, the terms "network", "communication link" and "communications mechanism" are used generically to describe one or more networks, communications media or communications systems, including, but not limited to, the Internet, private or public telephone, cellular, wireless, satellite, cable, data networks. Data networks include, but not limited to, Metropolitan Area Networks (MANs), Wide Area Networks (WANs), Local Area Networks (LANs), Personal Area networks (PANs), WLANs (Wireless LANs), Internet, internets, NGN, intranets, Hybrid Fiber Coax (HFC) networks, satellite networks, and Telco networks. Communication media include, but not limited to, a cable, an electrical connection, a bus, and internal communications mechanisms such as message passing, interprocess communications, and shared memory. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.). While exampled herein with regard to secured communication between a pair of network endpoint devices (host-to-host), the described method can equally be used to protect the data flow between a pair of gateways or any other networking-associated devices (network-to-network), or between a network device (e.g., security gateway) and a host (network-to-host).

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive, or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for analyzing messages by a device connected between a host computer and a peripheral device using a standard bus, the method comprising:
   emulating the peripheral device to the host computer using a first processor executing a first firmware stored in a first memory, for receiving messages from, and transmitting messages to, the host computer over a first cable using the standard bus;
   emulating the host computer to the peripheral device using a second processor executing a second firmware stored in a second memory, for receiving messages from, and transmitting messages to, the peripheral device over a second cable using the standard bus;
   analyzing messages using a third processor executing a third firmware stored in a third memory;
   transporting messages between the host computer and the third processor exclusively over a first local bus; and
   transporting messages between the peripheral device and the third processor exclusively over a second local bus.

2. The method according to claim 1 for use with a criterion, the method further comprising:
   receiving a first message by the second processor from the peripheral device;
   sending the first message over the second local bus to the third processor;
   checking the first message by the third processor for satisfying the criterion;
   responsive to the message satisfying the criterion, sending the first message over the first local bus to the second processor; and
   sending the first message by the first processor to the host computer.

3. The method according to claim 2, wherein the peripheral device is an input device for sensing an action by a user.

4. The method according to claim 3, wherein the peripheral device consists of, or comprises, a keyboard, a pointing device, a trackball, a touch-pad, a touch-screen, a scanner, a digital camera, or a joystick.

5. The method according to claim 3, wherein the first message is associated with the user action.

6. The method according to claim 1, further for use with a criterion, the method further comprising:

receiving a first message by the first processor from the host computer;

sending the first message over the first local bus to the third processor;

checking the first message by the third processor for satisfying the criterion;

responsive to the message satisfying the criterion, sending the first message over the second local bus to the second processor; and sending the first message by the second processor to the peripheral device.

7. The method according to claim 6, wherein the peripheral device is an output device for notifying information to a user.

8. The method according to claim 7, wherein the user notification consists of, comprises, or is based on, text, graphics, tactile, audio, or video.

9. The method according to claim 7, wherein the output device consists of, or comprises, a printer, a display, or a speaker.

10. The method according to claim 7 wherein the first message is associated with the information used for the user notification.

11. The method according to claim 1, wherein the peripheral device is a non-volatile memory, and at least some of the messages are associated with reading from, or writing to, the memory.

12. The method according to claim 11, wherein the non-volatile memory consists of, or comprises, Hard Disk Drive (HDD), Solid State Drive (SSD), RAM, SRAM, DRAM, TTRAM, Z-RAM, ROM, PROM, EPROM, EEROM, Flash-based memory, CD-RW, DVD-RW, DVD+RW, DVD-RAM BD-RE, CD-ROM, BD-ROM, or DVD-ROM.

13. The method according to claim 1, further comprising detecting a malware or a malware activity.

14. The method according to claim 13, wherein the malware consists of, includes, or is based on, a computer virus, spyware, DoS (Denial of Service), rootkit, ransomware, adware, backdoor, Trojan horse, or a destructive malware.

15. The method according to claim 1, wherein the standard bus is an industry standard bus, and wherein the first and second cables, the communication with the host computer, and the communication with the peripheral device, are according to, or based on, the industry standard bus.

16. The method according to claim 15, wherein the industry standard bus defines a point-to-point serial communication.

17. The method according to claim 16, wherein the industry standard bus is according to, or based on, a Universal Standard Bus (USB).

18. The method according to claim 17, wherein the industry standard bus is according to, or based on, USB 2.0 or USB 3.0.

19. The method according to claim 15, wherein the industry standard bus is according to, or based on, Peripheral Component Interconnect (PCI) Express, Small Computer System Interface (SCSI), Serial Attached SCSI (SAS), Serial ATA (SATA), InfiniBand, PCI, PCI-X, AGP, Thunderbolt, IEEE 1394, FireWire, or Fibre-Channel.

20. The method according to claim 1, wherein the first firmware comprises a first operating system, the second firmware comprises a second operating system, and the third firmware comprises a third operating system.

21. The method according to claim 20, further comprising:

executing, by the first processor, the first operating system;

executing, by the second processor, the second operating system; and executing, by the third processor, the third operating system.

22. The method according to claim 20, wherein the first, second, or third operating system consists of, comprises, is according to, or is based on, Linux.

23. The method according to claim 20, wherein the first, second, or third operating system consists of, comprises, is according to, or is based on, Microsoft Windows or WDM.

24. The method according to claim 23, wherein the first, second, or third operating system consists of, comprises, is according to, or based on, one out of Microsoft Windows 7, Microsoft Windows XP, Microsoft Windows 8, Microsoft Windows 8.1, and Google Chrome OS.

25. The method according to claim 20, wherein the first, second, or third operating system consists of, comprises, is according to, or is based on, a mobile operating system.

26. The method according to claim 25, wherein the mobile operating system consists of, comprises, is according to, or is based on, Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

27. The method according to claim 20, wherein first, second, or third operating system comprises, is according to, uses, or is based on, a class driver, a Human Input device (HID) driver, a minidriver, a class driver, a USB host driver, a USB peripheral driver, a PnP driver, a msdos.sys driver, a io.sys driver, a config.sys driver, or a function driver.

28. The method according to claim 1, wherein the first or the second local bus is a synchronous serial bus.

29. The method according to claim 28, wherein the first or the second local bus is a master/slave bus for connecting ICs.

30. The method according to claim 28, wherein the first or the second local bus is based on, is according to, or comprises, Serial Peripheral Interface (SPI) bus or Inter-Integrated Circuit (I²C) bus.

31. The method according to claim 1, wherein the first or the second local bus is a bi-directional bus.

32. The method according to claim 31 wherein the first or the second local bus is a half-duplex or a full-duplex bus.

33. The method according to claim 1, wherein the first or the second local bus is a uni-directional bus.

34. The method according to claim 33, wherein the first local bus exclusively allows data transfer from the first processor to the third processor.

35. The method according to claim 33, wherein the first local bus exclusively allows data transfer from the third processor to the first processor.

36. The method according to claim 33, wherein the second local bus exclusively allows data transfer from the first processor to the second processor.

37. The method according to claim 33, wherein the second local bus exclusively allows data transfer from the third processor to the second processor.

38. The method according to claim 1, wherein the first or second local bus is using isolation barriers so that the respective first or second processor is galvanically isolated over the respective bus from the third processor.

39. The method according to claim 38, wherein the isolation barrier is based on a capacitance, induction, or electromagnetic waves, or optical barrier.

40. The method according to claim 39, wherein the first or second local bus comprise or use optocouplers or isolation transformers for galvanically isolating the respective processors.

\* \* \* \* \*